(12) United States Patent
Kondo

(10) Patent No.: US 7,817,863 B2
(45) Date of Patent: Oct. 19, 2010

(54) TRANSMITTING APPARATUS AND METHOD, RECEIVING APPARATUS AND METHOD, PROGRAM AND RECORDING MEDIUM, AND TRANSMITTING/RECEIVING SYSTEM

(75) Inventor: Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 839 days.

(21) Appl. No.: 11/581,159

(22) Filed: Oct. 13, 2006

(65) Prior Publication Data

US 2007/0242771 A1    Oct. 18, 2007

Related U.S. Application Data

(62) Division of application No. 10/290,440, filed on Nov. 7, 2002, now Pat. No. 7,453,936.

(30) Foreign Application Priority Data

| Nov. 9, 2001 | (JP) | ............................. 2001-344234 |
| Nov. 9, 2001 | (JP) | ............................. 2001-344235 |
| Nov. 9, 2001 | (JP) | ............................. 2001-344236 |
| Nov. 9, 2001 | (JP) | ............................. 2001-344237 |

(51) Int. Cl.
*G06K 9/36*    (2006.01)
(52) U.S. Cl. ..................................................... 382/232
(58) Field of Classification Search ................ 382/232, 382/236, 238, 239, 240, 244–253; 375/240, 375/240.02–240.24; 348/384.1, 394.1–424.2
See application file for complete search history.

(56) References Cited

U.S. PATENT DOCUMENTS 4,789,858 A    12/1988    Fergason et al.

(Continued)

FOREIGN PATENT DOCUMENTS

JP    61-083595    4/1986

(Continued)

OTHER PUBLICATIONS

Patent Abstracts of Japan, publication No. 07 160363, publication date Jun. 23, 2005.

(Continued)

*Primary Examiner*—Jose L Couso
(74) *Attorney, Agent, or Firm*—Frommer Lawrence & Haug LLP; William S. Frommer; Ellen Marcie Emas

(57) ABSTRACT

A receiving processing unit receives identical SD pictures transmitted a plurality of number of times, and performs addition for weighting an SD picture stored in a storage and the received SD pictures. The receiving processing unit stores the obtained values as a new SD picture in the storage. A picture-quality determining unit determines the picture quality of the new SD picture stored in the storage, and based on the determined picture quality, a request-signal transmitting unit requests class codes representing classes obtained by classifying the pixels of an HD picture in which the quality of an SD picture is increased. A receiving-control unit receives class codes which are transmitted in response to the request, and based on the SD picture and the class codes, an adaptive processing unit calculates predicted values of an HD picture corresponding to the SD picture.

29 Claims, 68 Drawing Sheets

U.S. PATENT DOCUMENTS

| | | | | |
|---|---|---|---|---|
| 4,807,298 | A | * | 2/1989 | Conte et al. ................. 382/253 |
| 5,455,874 | A | * | 10/1995 | Ormsby et al. .............. 382/251 |
| 5,521,988 | A | * | 5/1996 | Li et al. ...................... 382/248 |
| 5,533,138 | A | * | 7/1996 | Kim et al. ................... 382/232 |
| 5,892,847 | A | * | 4/1999 | Johnson ...................... 382/232 |
| 6,108,381 | A | * | 8/2000 | Pau et al. ................. 375/240.22 |
| 6,421,467 | B1 | * | 7/2002 | Mitra ......................... 382/240 |
| 6,661,842 | B1 | * | 12/2003 | Abousleman .......... 375/240.11 |
| 6,968,092 | B1 | * | 11/2005 | Winger ....................... 382/253 |
| 7,386,049 | B2 | * | 6/2008 | Garrido et al. ......... 375/240.15 |

FOREIGN PATENT DOCUMENTS

| | | |
|---|---|---|
| JP | 1 202081 | 8/1989 |
| JP | 2 22934 | 1/1990 |
| JP | 2 145078 | 6/1990 |
| JP | 6 75739 | 3/1994 |
| JP | 6 152430 | 5/1994 |
| JP | 6 237179 | 8/1994 |
| JP | 7 46589 | 2/1995 |
| JP | 7 95563 | 4/1995 |
| JP | 07-160363 | 6/1995 |
| JP | 07-230250 | 8/1995 |
| JP | 7 288474 | 10/1995 |
| JP | 8 84335 | 3/1996 |
| JP | 8 84336 | 3/1996 |
| JP | 8 88849 | 4/1996 |
| JP | 8 317385 | 11/1996 |
| JP | 8 317390 | 11/1996 |
| JP | 09-311737 | 12/1997 |
| JP | 10 83335 | 3/1998 |
| JP | 11 8848 | 1/1999 |
| JP | 11 85108 | 3/1999 |
| JP | 11 353283 | 12/1999 |
| JP | 2001 54096 | 2/2001 |
| JP | 2001 175355 | 6/2001 |
| JP | 2001 189783 | 7/2001 |

OTHER PUBLICATIONS

Patent Abstracts of Japan, publication No. 09 311737, publication date Dec. 2, 1997.

Patent Abstracts of Japan, publication No. 07 230250, publication date Aug. 29, 1995.

* cited by examiner

FIG. 8B
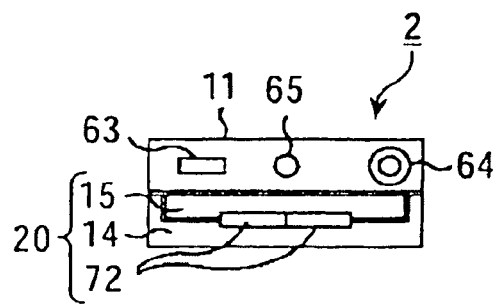
FIG. 8D    FIG. 8A    FIG. 8E
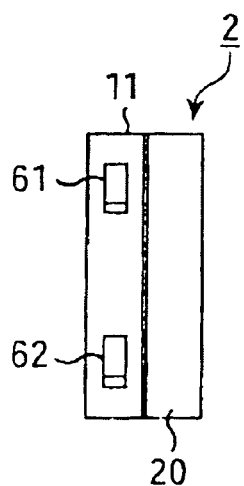 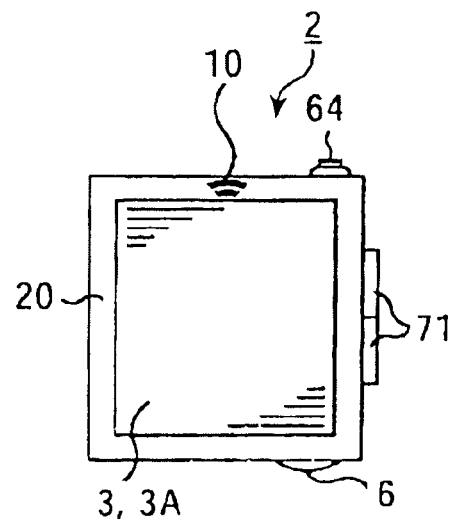 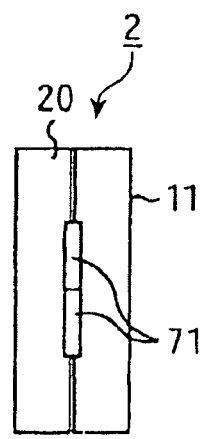
FIG. 8C
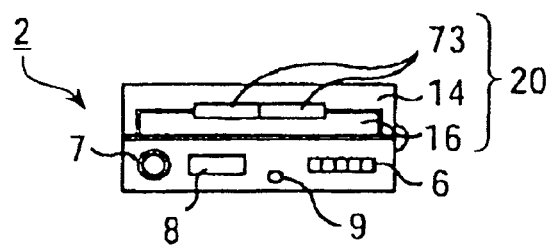

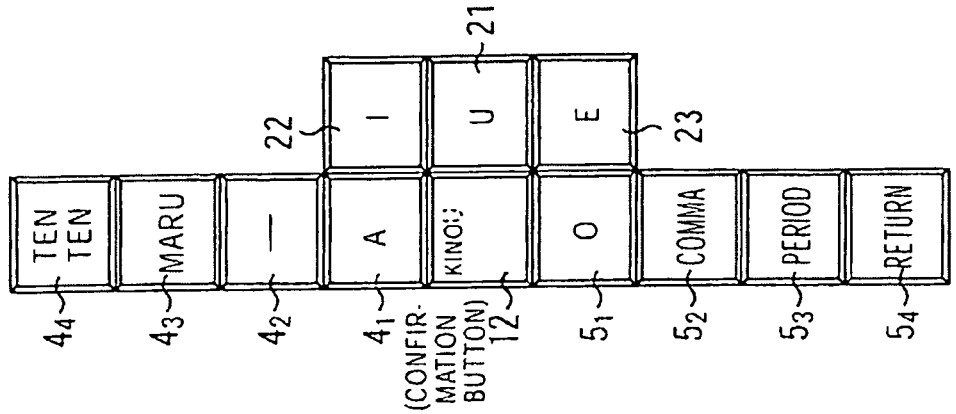
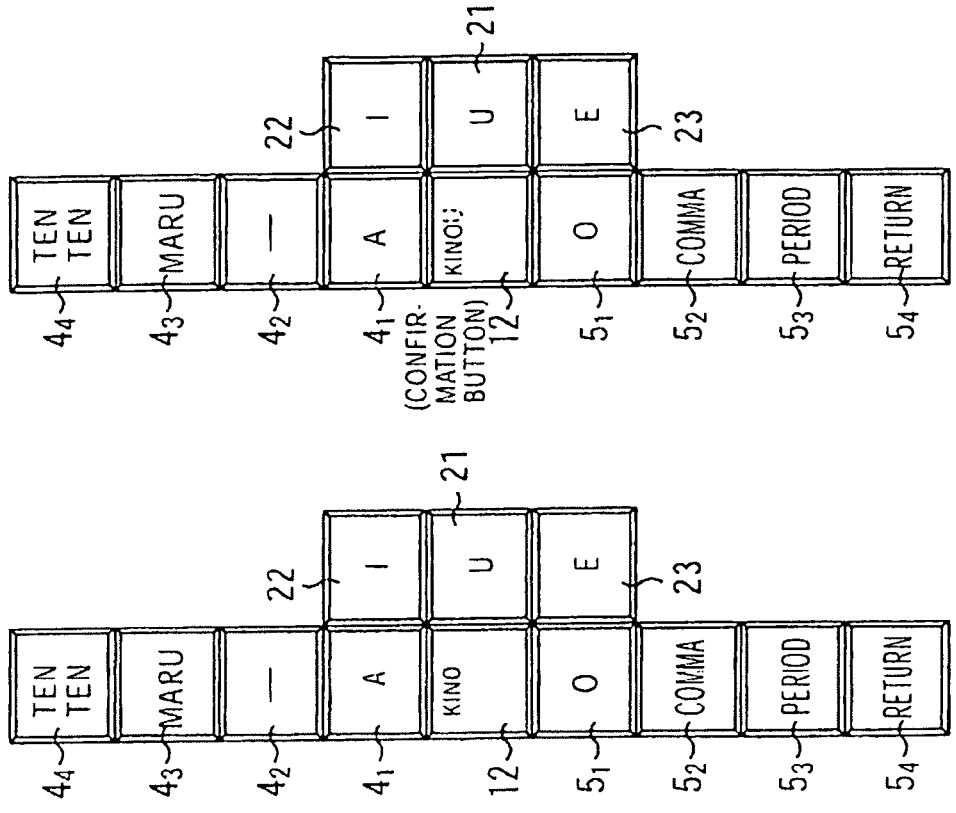
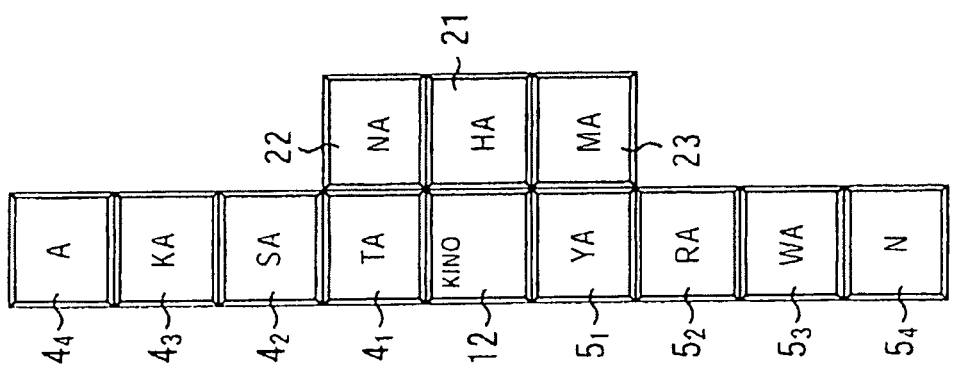

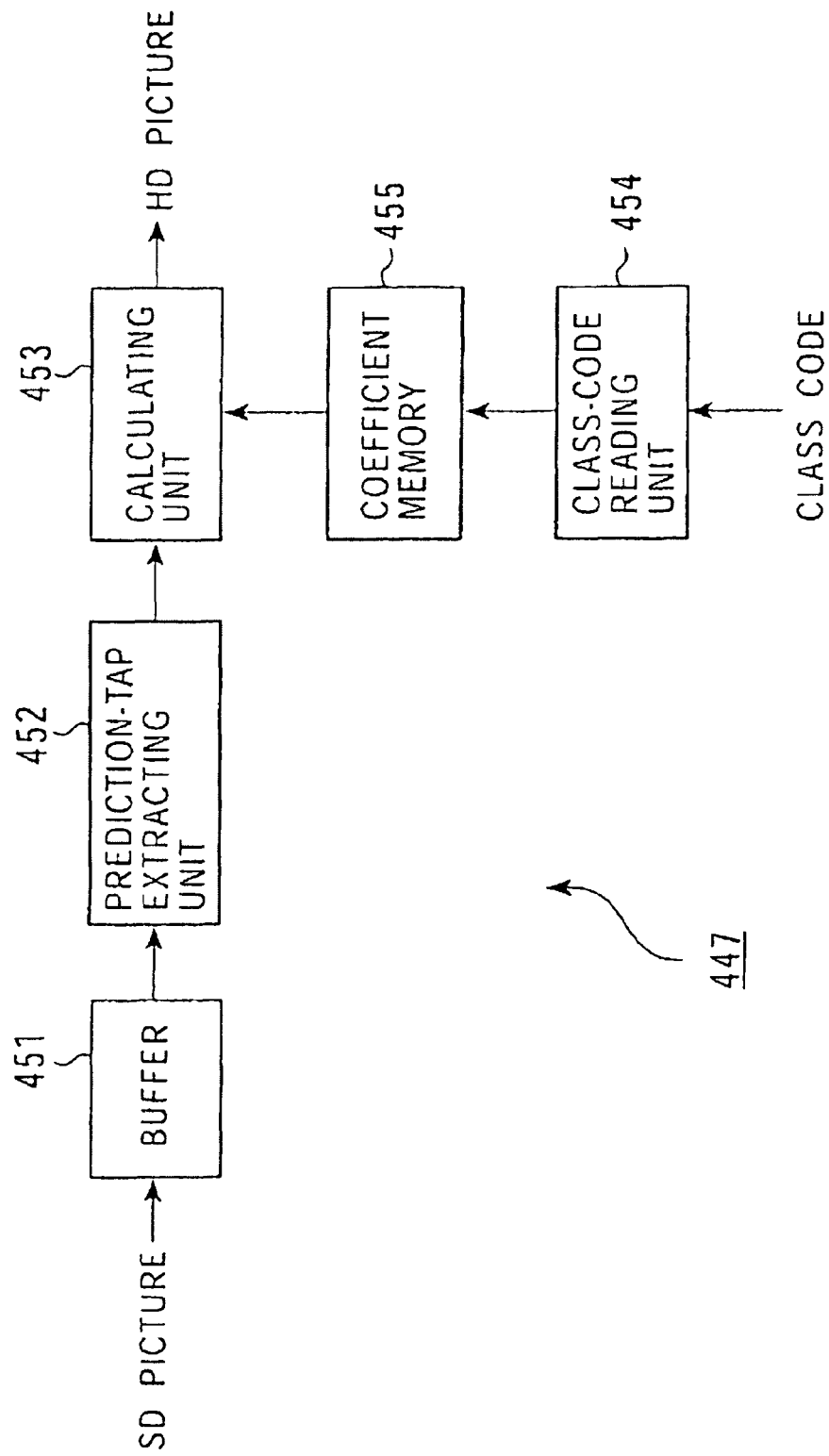

FIG. 57

| CODEBOOK NUMBER | | | | |
|---|---|---|---|---|
| CODEBOOK VERSION | | | | |
| CODE | CODE VECTOR<br>V | FREQUENCY UP TO<br>PREVIOUS UPDATING<br>A | DIFFERENTIAL<br>VECTOR ADDITION<br>$\Sigma\Delta$ | FREQUENCY FROM<br>PREVIOUS UPDATING<br>TO PRESENT<br>B |
| 0 | $(a_0, b_0, \cdots)$ | $A_0$ | $(a'_0, b'_0, \cdots)$ | $B_0$ |
| 1 | $(a_1, b_1, \cdots)$ | $A_1$ | $(a'_1, b'_1, \cdots)$ | $B_1$ |
| 2 | $(a_2, b_2, \cdots)$ | $A_2$ | $(a'_2, b'_2, \cdots)$ | $B_2$ |
| $\cdots$ | $\cdots$ | $\cdots$ | $\cdots$ | $\cdots$ |
| N | $(a_N, b_N, \cdots)$ | $A_N$ | $(a'_N, b'_N, \cdots)$ | $B_N$ |

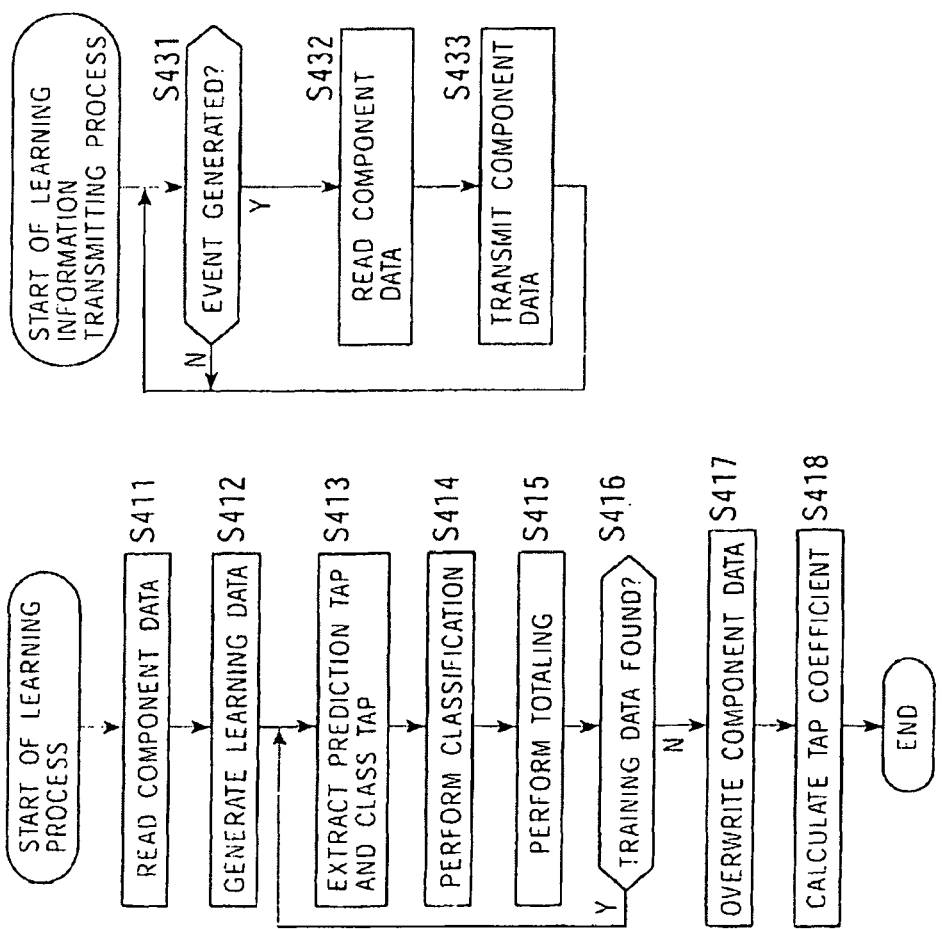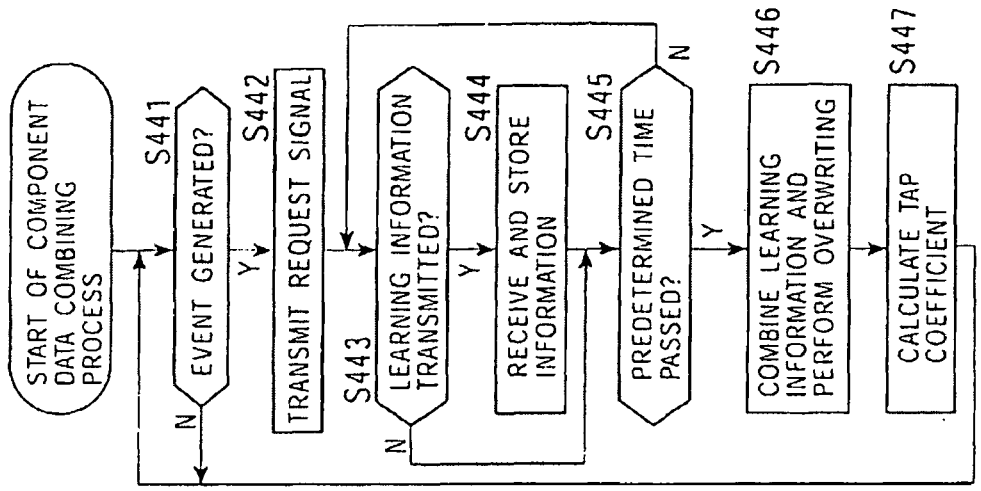

TRANSMITTING APPARATUS AND METHOD, RECEIVING APPARATUS AND METHOD, PROGRAM AND RECORDING MEDIUM, AND TRANSMITTING/RECEIVING SYSTEM

This is a division of application Ser. No. 10/290,440, filed Nov. 7, 2002, now U.S. Pat. No. 7,453,936 which is entitled to the priority filing date of Japanese applications 2001-344234, 2001-344235, 2001-344236 and 2001-344237, all filed in Japan on Nov. 9, 2001, the entirety of which is incorporated herein by reference.

BACKGROUND OF THE INVENTION

1. Field of the Invention

The present invention relates to transmitting apparatuses and methods, receiving apparatuses and methods, programs and recording media used therewith, and transmitting/receiving systems, and in particular, to a transmitting apparatus and method, and a receiving apparatus and method, a program and a recording medium (which are used therewith), and a transmitting/receiving system in which high quality data can be obtained by using, for example, data (information) stored from the past.

In addition, the present invention relates to data processing systems, encoding apparatuses and methods, decoding apparatuses and methods, and programs and recording media used therewith, and in particular, to a data processing system, an encoding apparatus and method, a decoding apparatus and method, a program, and a recording medium which are used for reducing the amount of encoded data obtained by performing vector quantization on data.

2. Description of the Related Art

With the recent development in information communication technology, for example, regarding even personal digital assistances (PDAs) which are used when being carried, a type having a communication function has become common.

In many cases, PDAs perform wireless communication since they are portable. The data rate of the wireless communication is not such high speed as, for example, approximately 64 kilobits per second (bps). Accordingly, when one PDA transmits image data to another PDA, the data is transmitted, with its amount reduced, that is, deteriorated image data is transmitted.

Thus, it is difficult for the receiving PDA to obtain an image having high quality.

Also, in wireless communication, lack of partial transmission data, such as packets, easily occurs, and in this case, in the receiving PDA, the quality of the image more deteriorates.

By way of example, when data is encoded by vector quantization, a codebook in which code vectors are correlated with codes representing the code vectors is used to detect a code vector which minimizes the distance to the data, and the code is output as a vector-quantized result. The difference between the code vector represented by the code as the vector-quantized result and the original data is calculated to find a differential vector. The code as the vector-quantized and the differential vector are output as encoded data.

The codebook for use in vector quantization is created by performing learning based on the Linde Buzo Gray (LBG) algorithm (or the like) using, for example, a large amount of data for learning.

When data is encoded by vector quantization, the encoded data consists of a code and a differential vector. Thus, by reducing the differential vector as much as possible, the amount of the encoded data can be reduced.

However, the codebook has been used in fixed form, the differential vector is large depending on data. Thus, in some cases, it is difficult to reduce the amount of the encoded data.

SUMMARY OF THE INVENTION

The present invention is made in view of the above-described circumstances, and it is an object of the present invention to enable acquisition of high quality data even if the amount of data is small when it is transmitted. In other words, the present invention is intended to suppress deterioration in data quality while reducing transmission data.

It is another object of the present invention to reduce the amount of encoded data.

According to an aspect of the present invention, a transmitting apparatus for transmitting upgrade information for upgrading first data is provided. The transmitting apparatus includes a data transmitting unit for transmitting the first data, a classifying unit for classifying second data of interest into one of classes, which is included in second data generated by upgrading the first data, an acquiring unit for acquiring the upgrade information, which is set for each of the classes, a detecting unit for detecting a predetermined event, and an upgrade-information transmitting unit for transmitting the upgrade information when the predetermined event is detected.

According to another aspect of the present invention a transmitting method for transmitting upgrade information for upgrading first data is provided. The transmitting method includes a data transmitting step for transmitting the first data, a classifying step for classifying second data of interest into one of classes, which is included in second data generated by upgrading the first data, an acquiring step for acquiring the upgrade information, which is set for each of the classes, a detecting step for detecting a predetermined event, and an upgrade-information transmitting step for transmitting the upgrade information when the predetermined event is detected.

According to another aspect of the present invention, a program for causing a computer to perform a transmitting process for transmitting upgrade information for upgrading first data is provided. The program includes a data transmitting step for transmitting the first data, a classifying step for classifying second data of interest into one of classes, which is included in second data generated by upgrading the first data, an acquiring step for acquiring the upgrade information, which is set for each of the classes, a detecting step for detecting a predetermined event, and an upgrade-information transmitting step for transmitting the upgrade information when the predetermined event is detected.

According to another aspect of the present invention, a recording medium containing a program for causing a computer to perform a transmitting process for transmitting upgrade information for upgrading first data is provided. The program includes a data transmitting step for transmitting the first data, a classifying step for classifying second data of interest into one of classes, which is included in second data generated by upgrading the first data, an acquiring step for acquiring the upgrade information, which is set for each of the classes, a detecting step for detecting a predetermined event, and an upgrade-information transmitting step for transmitting the upgrade information when the predetermined event is detected.

According to the present invention, when a predetermined event is detected, upgrade information is transmitted. Therefore, a receiving side which receives the transmitted information can obtain upgraded data.

According to another aspect of the present invention, a receiving apparatus for receiving first data which is transmitted in identical form a plural number of times, and upgrade information for upgrading the first data is provided. The receiving apparatus includes a data receiving unit which receives the first data, a data storage unit which stores the first data, an adding unit which performs addition for weighting the first data stored in the data storage unit and the first data receiving by the data receiving unit, and which uses the resultant values of the addition as new first data to replace the first data stored in the data storage unit, a quality-determining unit which determines the quality of the new first data stored in the data storage unit, a requesting unit which, in accordance with the quality of the first data, requests the upgrade information, which is set for each of classes obtained by classifying second data generated by upgrading the first data, an upgrade-information receiving unit which receives the upgrade information when the upgrade information is transmitted in response to the request by the requesting unit, and a predicting unit which, based on the first data stored in the data storage unit and the upgrade information, calculates a predicted value of the second data which corresponds to the first data.

According to another aspect of the present invention, a receiving method for receiving first data which is transmitted in identical form a plural number of times, and upgrade information for upgrading the first data is provided. The receiving method includes a data receiving step which receives the first data, a data storage unit which stores the first data in data storage unit, an adding step which performs addition for weighting the first data stored in the data storage unit and the first data received by the data receiving step, and which uses the resultant values of the addition as new first data to replace the first data stored in the data storage unit, a quality-determining step which determines the quality of the new first data stored in the data storage unit, a requesting step which, in accordance with the quality of the first data, requests the upgrade information, which is set for each of classes obtained by classifying second data generated by upgrading the first data, an upgrade-information receiving step which receives the upgrade information when the upgrade information is transmitted to response to the request, and a predicting step which, based on the first data stored in the data storage unit and the upgrade information, calculates a predicted value of the second data which corresponds to the first data.

According to another aspect of the present invention, a program causing a computer to perform a receiving process for receiving first data and upgrade information for upgrading the first data is provided. The program includes a data receiving step which receives the first data, a data storage unit which stores the first data in data storage unit, an adding step which performs addition for weighting the first data stored in the data storage unit and the first data receiving by the data receiving step, and which uses the resultant values of the addition as new first data to replace the first data stored in the data storage unit, a quality-determining step which determines the quality of the new first data stored in the data storage unit, a requesting step which, in accordance with the quality of the first data, requests the upgrade information, which is set for each of classes obtained by classifying second data generated by upgrading the first data, an upgrade-information receiving step which receives the upgrade information when the upgrade information is transmitted in response to the request, and a predicting step which, based on the first data stored in the data storage unit and the upgrade information, calculates a predicted value of the second data which corresponds to the first data.

According to another aspect of the present invention, a recording medium containing a program causing a computer to perform a receiving process for receiving first data and upgrade information for upgrading the first data is provided. The program includes a data receiving step which receives the first data, a data storage unit which stores the first data in data storage unit, an adding step which performs addition for weighting the first data stored in the data storage unit and the first data receiving by the data receiving step, and which uses the resultant values of the addition as new first data to replace the first data stored in the data storage unit, a quality-determining step which determines the quality of the new first data stored in the data storage unit, a requesting step which, in accordance with the quality of the first data, requests the upgrade information, which is set for each of classes obtained by classifying second data generated by upgrading the first data, an upgrade-information receiving step which receives the upgrade information when the upgrade information is transmitted in response to the request, and a predicting step which, based on the first data stored in the data storage unit and the upgrade information, calculates a predicted value of the second data which correspond to the first data.

According to the present invention, upgrade information is transmitted in response thereto is received, and based on first data and the upgrade information, a predicted value of second data which corresponds to the first data is calculated. Therefore, upgraded data can be obtained.

According to another aspect of the present invention, a transmitting/receiving system is provided which includes a transmitting apparatus for transmitting first data and upgrade information for upgrading the first data, and a receiving apparatus for receiving the first data and the upgrade information. The transmitting apparatus includes a data transmitting unit for transmitting the first data in identical form a plural number of times, a classifying unit for classifying second data of interest into one of the classes, which is included in second data generated by upgrading the first data, an acquiring unit for acquiring the upgrade information, a detecting unit for detecting a predetermined event, and an upgrade-information transmitting unit for transmitting the upgrade information when the predetermined event is detected. The transmitting apparatus includes a data receiving unit which receives the first data transmitted in identical form a plural number of times, a data storage unit which stores the first data, an adding unit which performs addition for weighting the first data stored in the data storage unit and the first data received by the data receiving unit, and which uses the resultant values of the addition as new first data to replace the first data stored in the data storage unit, a quality-determining unit which determines the quality of the new first data stored in the data storage unit, a requesting unit which requests the upgrade information in accordance with the quality of the first data, an upgrade-information receiving unit which receives the upgrade information when the upgrade information is transmitted in response to the request by the requesting unit, and a predicting unit which, based on the first data stored in the data storage unit and the upgrade information, calculates a predicted value of the second data which corresponds to the first data.

According to the present invention, upgrade information is transmitted in response thereto is received, and based on first data and the upgrade information, a predicted value of second data which corresponds to the first data is calculated. Therefore, upgraded data can be obtained.

According to another aspect of the present invention, a receiving apparatus for receiving upgrade information for upgrading first data is provided which includes an upgrade-information, an upgrade-information storage unit which stores the upgrade information, an upgrade-information updating unit which finds new upgrade information based on the upgrade information received by the upgrade-information receiving unit and the upgrade information stored in the upgrade-information storage unit, and uses the new upgrade information to update the upgrade information stored in the upgrade-information storage unit, and a predicting unit which, based on the upgrade information stored in the upgrade-information storage unit and the first data, finds a predicted value of second data generated by upgrading the first data.

According to another aspect of the present invention, a receiving method for receiving upgrade information for upgrading first data is provided which includes an upgrade-information receiving step which receives the upgrade information, an upgrade-information storage step which stores the upgrade information in upgrade-information storage unit for storing information, an upgrade-information updating step which finds new upgrade information based on the upgrade information received by the upgrade-information receiving unit and the upgrade information stored in the upgrade-information storage unit, and uses the new upgrade information to update the upgrade information stored in the upgrade-information storage unit, and a predicting step which, based on the upgrade information stored in the upgrade-information storage unit, and the first data, finds a predicted value of second data generated by upgrading the first data.

According to another aspect of the present invention, a program causing a computer to perform a receiving process for receiving upgrade information for upgrading first data is provided which includes an upgrade-information receiving step which receives the upgrade information, an upgrade-information storage step which stores the upgrade information in upgrade-information storage unit for storing information, an upgrade-information updating step which finds new upgrade information based on the upgrade information received by the upgrade-information receiving unit and the upgrade information stored in the upgrade-information storage unit, and uses the new upgrade information to update the upgrade information stored in the upgrade-information storage unit, and predicting step which, based on the upgrade information stored in the upgrade-information storage unit and the first data, finds a predicted value of second data generated by upgrading the first data.

According to another aspect of the present invention, a recording medium containing a program causing a computer to perform a receiving process for receiving upgrade information for upgrading first data is provided. The program includes an upgrade-information receiving step which receives the upgrade information, an upgrade-information storage step which stores the upgrade information in upgrade-information storage unit for storing information, an upgrade-information updating step which finds new upgrade information based on the upgrade information received by the upgrade-information receiving unit and the upgrade information stored in the upgrade-information storage unit, and uses the new upgrade information to update the upgrade information stored in the upgrade-information storage unit, and a predicting step which, based on the upgrade information stored in the upgrade-information storage unit and the first data, finds a predicted value of second data generated by upgrading the first data.

According to the present invention, based on upgrade information stored in an upgrade-information storage unit, and first data, a predicted value of second data generated by upgrading the first data is calculated. Therefore, upgraded information can be obtained.

According to another aspect of the present invention, a transmitting/receiving system is provided which includes at least one transmitting apparatus for transmitting upgrade information for upgrading first data, and a receiving apparatus for receiving the upgrade information. The at least one transmitting apparatus includes an upgrade-information calculating unit which, based on the first data and second data generated by upgrading the first data, calculates the upgrade information, and an upgrade-information information transmitting unit which transmits the upgrade information. The receiving apparatus includes an upgrade-information receiving unit which receives the upgrade information, an upgrade-information storage unit which stores the upgrade information, an upgrade-information updating unit which finds new upgrade information based on the upgrade information stored in the upgrade-information storage unit and the upgrade information calculated by the upgrade-information calculating unit, and uses the new upgrade information to update the upgrade information stored in the upgrade-information storage unit, and a predicting unit which, based on the upgrade information stored in the upgrade-information storage unit and the first data, finds a predicted value of the second data which corresponds to the first data.

According to the present invention, upgrade information is transmitted in response thereto is received, and based on first data and the upgrade information, a predicted value of second data which corresponds to the first data is calculated. Therefore, upgraded data can be obtained.

According to another aspect of the present invention, a data processing system is provided which includes an encoding apparatus which encodes data, and a decoding apparatus which decodes the encoded data. The encoding apparatus includes an encoding unit which encodes the data by using the encoding information required for encoding the data, and outputs the encoded data, and an encoding-information updating unit which updates the encoding information by the encoded data. The decoding apparatus includes a decoding unit which decodes the encoded data by using the decoding information required for decoding the encoded data, and a decoding-information updating unit which updates the decoding information by using the encoded data.

According to the present invention, the amount of encoded data can be reduced, and the encoded data reduced in volume can be decoded with good precision.

According to another aspect of the present invention, an encoding apparatus for encoding data is provided which includes an encoding unit which encodes the data by using the encoding information required for encoding the data, and outputs the encoded data, and an encoding-information updating unit which updates the encoding information by using the encoded data.

According to another aspect of the present invention, an encoding method for encoding data is provided which includes an encoding step which encodes the data by using the encoding information required for encoding the data, and outputs the encoded data, and an encoding-information updating step which updates the encoding information by using the encoded data.

According to another aspect of the present invention, a program causing a computer to perform an encoding process for encoding data is provided which includes an encoding step which encodes the data by using the encoding information required for encoding the data, and outputs the encoded data, and an encoding-information updating step which updates the encoding information by using the encoded data.

According to another aspect of the present invention, a recording medium containing a program causing a computer to perform an encoding process for encoding data is provided which includes an encoding step which encodes the data by using the encoding information required for encoding the data, and outputs the encoded data, and an encoding-information updating step which updates the encoding information by using the encoded data.

According to the present invention, the amount of encoded data can be reduced.

According to another aspect of the present invention, a decoding apparatus for decoding encoded data generated by encoding data is provided which includes a decoding unit which decodes the encoded data by using the decoding information required for decoding the encoded data, and outputs the decoded data, and a decoding-information updating unit which updates the decoding information by using the encoded data.

According to another aspect of the present invention, a decoding method for decoding encoded data generated by encoding data is provided which includes a decoding step which decodes the encoded data by using the decoding information required for decoding the encoded data, and outputs the decoded data, and a decoding-information updating unit which updates the decoding information by using the encoded data.

According to another aspect of the present invention, a program causing a decoding process for decoding encoded data generated by encoding data is provided which includes a decoding step which decodes the encoded data by using the decoding information required for decoding the encoded data, and outputs the decoded data, and a decoding-information updating unit which updates the decoding information by using the encoded data.

According to another aspect of the present invention, a recording medium containing a program causing a decoding process for decoding encoded data generated by encoding data is provided which includes a decoding step which decodes the encoded data by using the decoding information required for decoding the encoded data, and outputs the decoded data, and a decoding-information updating unit which updates the decoding information by using the encoded data.

According to the present invention, encoded data reduced in volume can be decoded with good precision.

BRIEF DESCRIPTION OF THE DRAWINGS

FIG. 3 is a perspective view showing a second exterior example of the main block 2 with a cover unit 20 opened;

FIGS. 8A and 8B to 8E are a top view and side views showing the second exterior example of the main block 2;

FIGS. 39A, 39B, and 39C are illustrations of examples of screens displayed on LCDs $4_1$ to $4_4$, $5_1$ to $5_4$, 12, and 21 to 23;

FIG. 48 is a block diagram showing an example of an adaptive processing unit 447;

FIG. 57 is an illustration of a codebook format;

FIGS. 70A to 70C are flowcharts respectively illustrating a learning process earning information transmitting process, and a component combining process which are performed by the learning unit 602.

DESCRIPTION OF THE PREFERRED EMBODIMENTS

FIGS. 1 to 4 show the exterior of a PDA according to an embodiment of the present invention.

Figure 1:
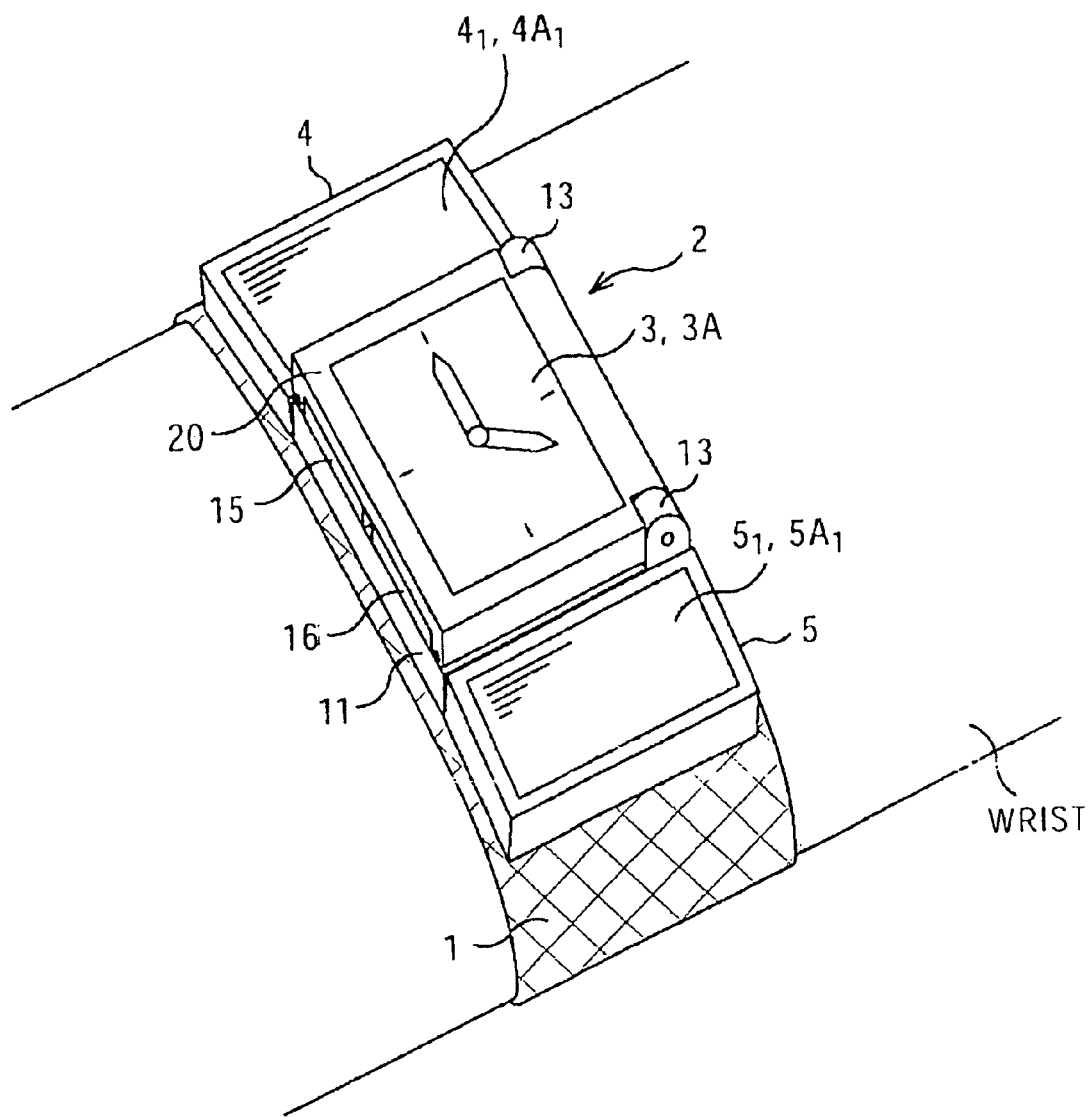
FIG. 1 is a perspective view showing an exterior example of a first embodiment of a PDA 101 to which the present invention is applied.

As shown in FIG. 1, the PDA is of a watch type, and has a structure in which a watch bracelet is provided with a main block 2. A user easily carries the PDA by wearing the watch bracelet 1 on the right or left wrist similarly to wearing a watch.

The main block 2 corresponds to a main unit in the case of a watch, and consists of a main unit 11 and a cover unit 20 which is rotatably joined to an end of the main unit 11.

The cover unit 20 has a liquid crystal display (LCD) 3 provided so as to be exposed on its top surface when it is closed. In the embodiment in FIG. 1, the LCD 3 displays a screen of a watch having the hour hand and the minute hand.

Figure 4:
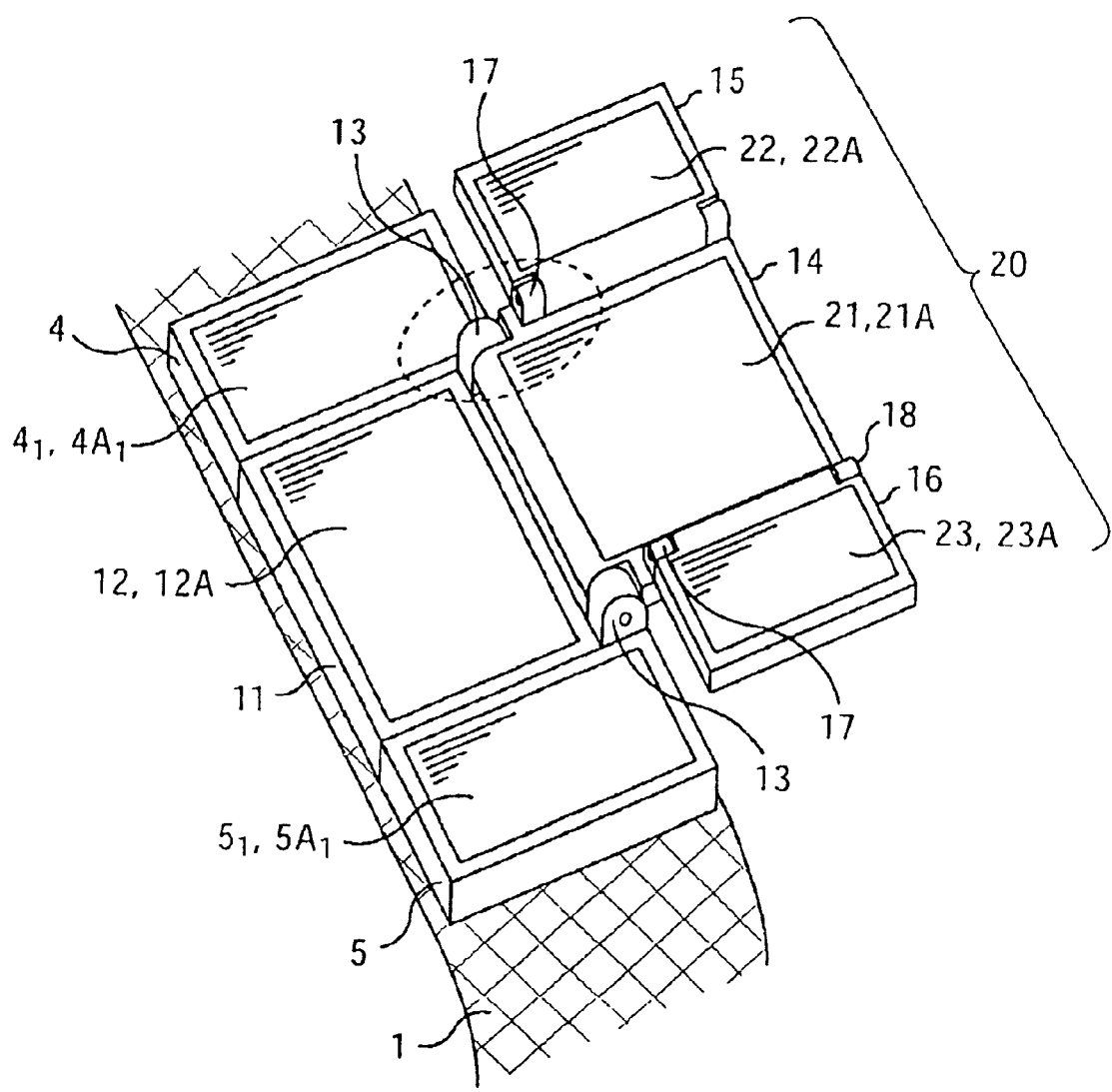
FIG. 4 is a perspective view showing an exterior example of the PDA 101 when the cover unit 20 and sub-panels 15 and 16 are opened.

Also, as shown in FIG. 1 or 4, side panels 4 and 5 are provided on the upper and lower sides of the main block 2 on the watch bracelet 1 of the PDA. In the side panel 4, an LCD $4_1$ is provided so as to be upwardly exposed, and in the side panel 5, an LCD $5_1$ is provided so as to be upwardly exposed.

The LCD 3 is integrated with a transparent touch panel 3. An operation using buttons, etc., which are displayed on the LCD 3 can be detected by the touch panel 3A. Similarly, the LCD $4_1$ is integrated with the touch panel $4A_1$, and the LCD $5_1$ is integrated with a touch panel $5A_1$.

The PDA has a telephone function and other various functions as described later, and the LCD 3, etc., on the cover 20 changes the displayed screen depending on functional modes providing the functions, as required. When the functional mode is, for example, a watch mode, the LCD 3 displays a watch screen, as shown in FIG. 1. When the functional mode is, for example, a telephone mode, the screen on the LCD 3 changes to a screen of buttons to be operated for dialing (inputting a telephone number). The operation using the buttons are detected by the touch panel 3A integrated with the LCD 3, as described above.

Switching of the functional modes is performed in response to a user's operation, or is performed based on a predetermined event by the PDA.

Figure 2:
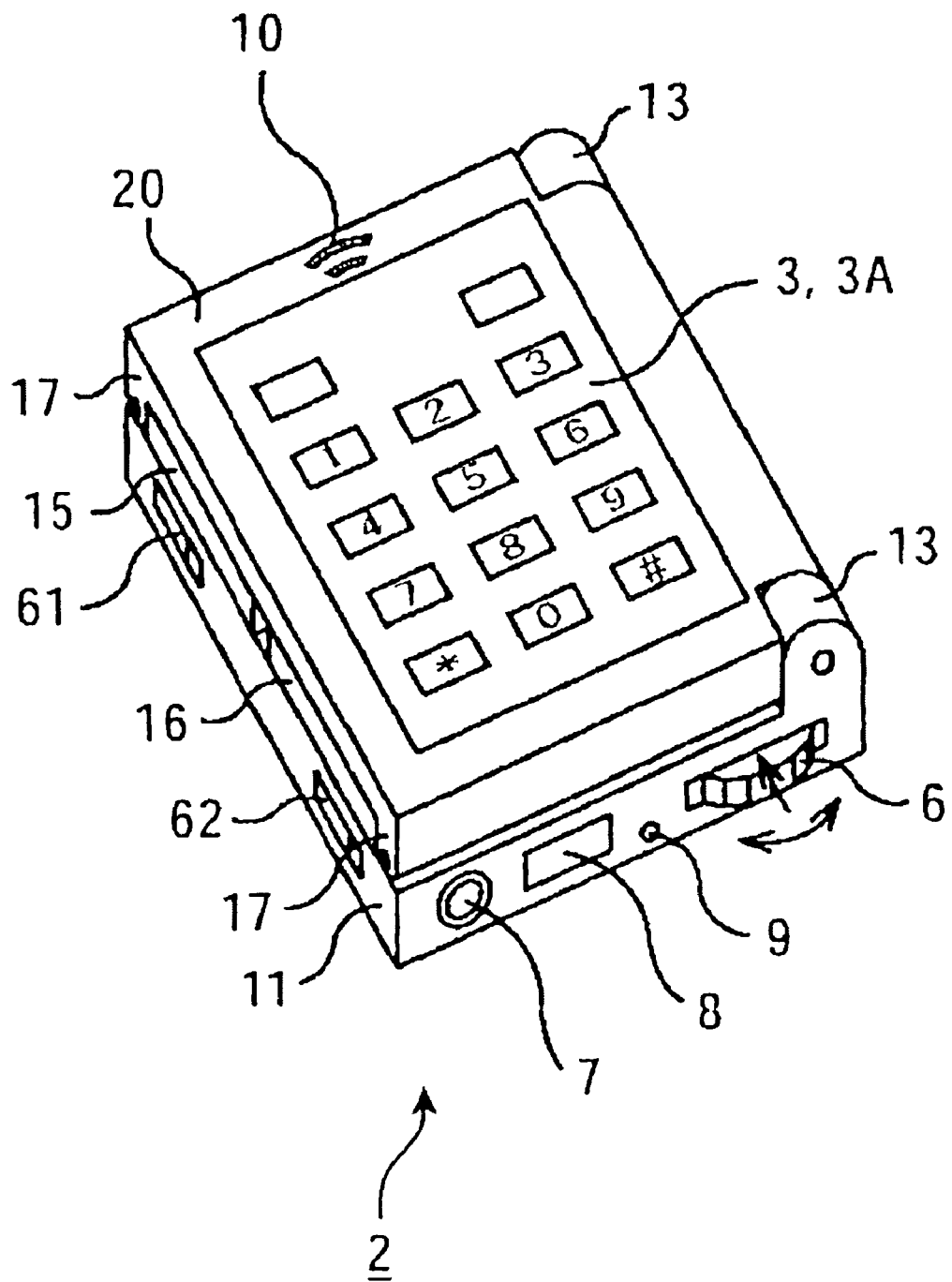

As shown in FIG. 2, one lower side of the main unit 11 has a jog dial 6, an earphone/microphone jack 7, a connector 8, and a microphone 9. In FIG. 1, etc., the jog dial 6, etc., are not shown for brevity of illustration.

The jog dial 6 can be rotated right and left. For example, when the functional mode is the telephone mode, the job dial 6, is operated when the telephone number of a person to whom one makes a call is selected from a list of telephone numbers, etc., which is displayed on the LCD 3, etc. The jog dial 6 can also be pressed on the inward side of the main unit 11. Pressing of the jog dial 6 confirms the selection. For example, when the user selects the telephone number of a person to whom the user makes a call by rotating the jog dial 6, and presses the jog dial 6, the selected telephone number is confirmed and calling to the telephone number is performed.

A force is applied to the jog dial 6 from the inside of the main unit 11 to the exterior. Accordingly, when the user applies a force to the jog dial 6 in the internal direction of the main unit 11, the jog dial 6 moves on the inward side of the main unit 11. However, when the user stops applying the force, the originally applied force returns the jog dial 6 to the original position.

When, for example, a so-called "headset" (not shown) in which an earphone and a microphone are integrated is connected to the main unit 11, a jack provided on the head set is inserted into the earphone/microphone jack 7, whereby the main unit 11 and the headset are electrically connected to each other.

In cases such as data communication with a base station computer 102 (FIG. 22) (described later) is performed, the connector 8 is engaged into a connector portion 337 (FIG. 26) of the base station computer 102, whereby the main unit 11 (PDA) and the base station computer 102 are electrically connected to each other.

The microphone 9 captures and converts user's speech into an audio signal as an electric signal. In the microphone 9, when the functional mode of the PDA is set to be, for example, the telephone mode, user's speech to be transmitted to another person is captured in a telephone call in audio form.

In the upper portion of the top surface of the cover unit 20 when it is closed, there is a speaker 10. From the speaker 10, when the functional mode is set to be, for example, the telephone mode, audio transmitted from the other person is output.

The main unit 11 has, on its left side, a hold switch 61 and a power-supply switch 62. In FIG. 1, etc., the hold switch 61 and the power-supply switch 62 are not shown for brevity of illustration.

The hold switch 61 is operated when the operation of the jog dial 6 or the buttons displayed on the LCD 3, or the like, is validated or invalidated. In the case of operating the hold switch 6 so that the operation of the jog dial 6 or the buttons displayed on the LCD 3, or the like, is invalidated, when the PDA is carried with it put in a bag or the like, and it hits another thing put in the bag, a wrong operation can be prevented from occurring.

The power-supply switch 62 is operated when the main power of the PDA is turned on and off.

Figure 3:
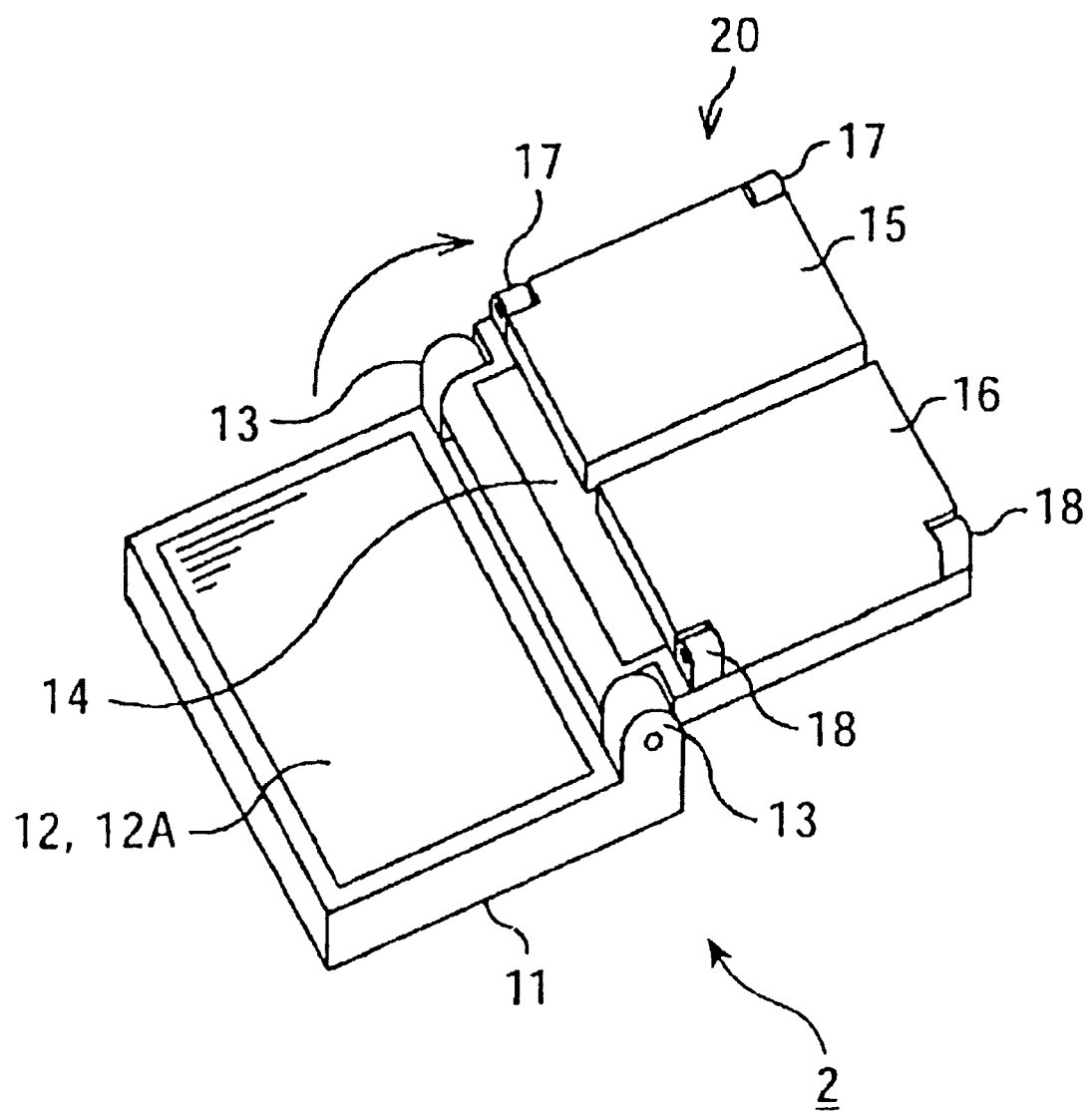
FIG. 3 is a perspective view showing a first exterior example of a main block 2 in the PDA 101.

The main unit 11 has hinges 13 at upper and lower portions of the right end. The cover unit 20 can revolve on the hinges 13. As shown in FIG. 3, the cover unit 20 can revolve on the hinges 13 as revolving center to a position in which the cover unit 20 is on a level with the top surface or bottom surface of the main unit 11. In this structure, the cover unit 20 is open.

As shown in FIG. 3, the main unit 11 has, on its top surface, an LCD 12 so that it opposes the cover unit 20 when it is closed. When the cover unit 20 is closed, the LCD 12 is in an accommodated state. When the cover unit 20 is opened, the LCD 12 is exposed on the top surface. The LCD 12 is also integrated with a transparent touch panel 12A, and an operation using a button or the like displayed on the LCD 12 is detected by the touch panel 12A.

The cover unit 20 has a main panel 14 and two sub-panels 15 and 16.

The main panel 14 has hinges 17 at its upper right and left ends, and hinges 18 at its lower right and left ends. The sub-panel 15 is fastened so as to revolve around the hinges 17 as a revolving center, and the sub-panel 16 is fastened so as to revolve around the hinges 18 as a revolving center.

When the upward or downward direction is referred to as the vertical direction, and the right or left direction is referred to as the horizontal direction, the horizontal length of each of the sub-panels 15 and 16 is slightly smaller than that of the horizontal length of the main panel 14. The vertical length of each of the sub-panels 15 and 16 is approximately half of the vertical length of the main panel 14.

Both the sub-panels 15 and 16 can revolve to a position almost on a level with the top surface or back surface of the main panel 14 by respectively using the hinges 17 and 18 as revolving centers. In this structure, the sub-panels 15 and 16 are opened, as shown in FIG. 4.

As shown in FIG. 4, in the case of the opened sub-panels 15 and 16, on the top surface of the main panel 14, that is, when the cover unit 20 is closed, there is provided an LCD 21. On a surface opposite to the LCD 21 on the main panel 14, there is provided the LCD 3 (FIG. 1). Accordingly, when the cover unit 20 is closed, the LCD 3 is exposed (directed upward), and the LCD 14 is accommodated (directed downward). When the cover unit 20 is opened, the LCD 3 is accommodated, and the LCD 21 is exposed at the top.

The sub-panel 15 has an LCD 22 on its top surface when being opened, and the sub-panel 16 has an LCD 23 on its top surface when being opened. Accordingly, the LCD 22 on the sub-panel 15 is exposed when the sub-panel 15 is opened, and is accommodated opposing the LCD 21 on the main panel 14 when the sub-panel 15 is closed. Similarly, the LCD 23 on the sub-panel 16 is exposed when the sub-panel 16 is opened, and is accommodated opposing the LCD 21 on the main panel 14 when the sub-panel 16 is closed.

The LCD 21 on the main panel 14 is integrated with a transparent touch panel 21A, and an operation using buttons, etc., displayed on the main panel 14 are detected by the touch panel 21A. Similarly, the LCD 22 on the sub-panel 15 is integrated with the touch panel 22A, and the LCD 23 on the sub-panel is integrated with the touch panel 23A.

As described above, in the main block 2, when the cover unit 20 is closed, one LCD or the LCD 3 alone is exposed. Accordingly, in this case, by additionally using the LCD $4_1$ on the sub-panel 4, the LCD $5_1$ on the sub-panel 5, the PDA uses the three LCDs 3, $4_1$, and $5_1$ to display information for the user, as shown in FIG. 1.

When the cover unit 20 is opened, and the sub-panels 15 and 16 on the cover unit 20 are opened, four LCDs 12, 21, 22, and 23 are exposed. Accordingly, in this case, by additionally using the LCD $4_1$ on the sub-panel 4 and the LCD $5_1$ on the sub-panel, the PDA uses six LCDs $4_1$, $5_1$, 12, 21, 22, and 23 to display information for the user, as shown in FIG. 4.

In the above-described main block 2, an electric circuit built into the main unit 11 controls the LCDs 3 and 21 of the main panel 14 in the cover unit 20 (including the touch panels 3A and 21A), the LCD 22 of the sub-panel 15 in the cover unit 20 (including the touch panel 22A), and the LCD 23 of the sub-panel 16. Accordingly, the main panel 14 on the cover unit 20, and the sub-panels 15 and 16 must be wired from the main unit 11.

Figure 5:
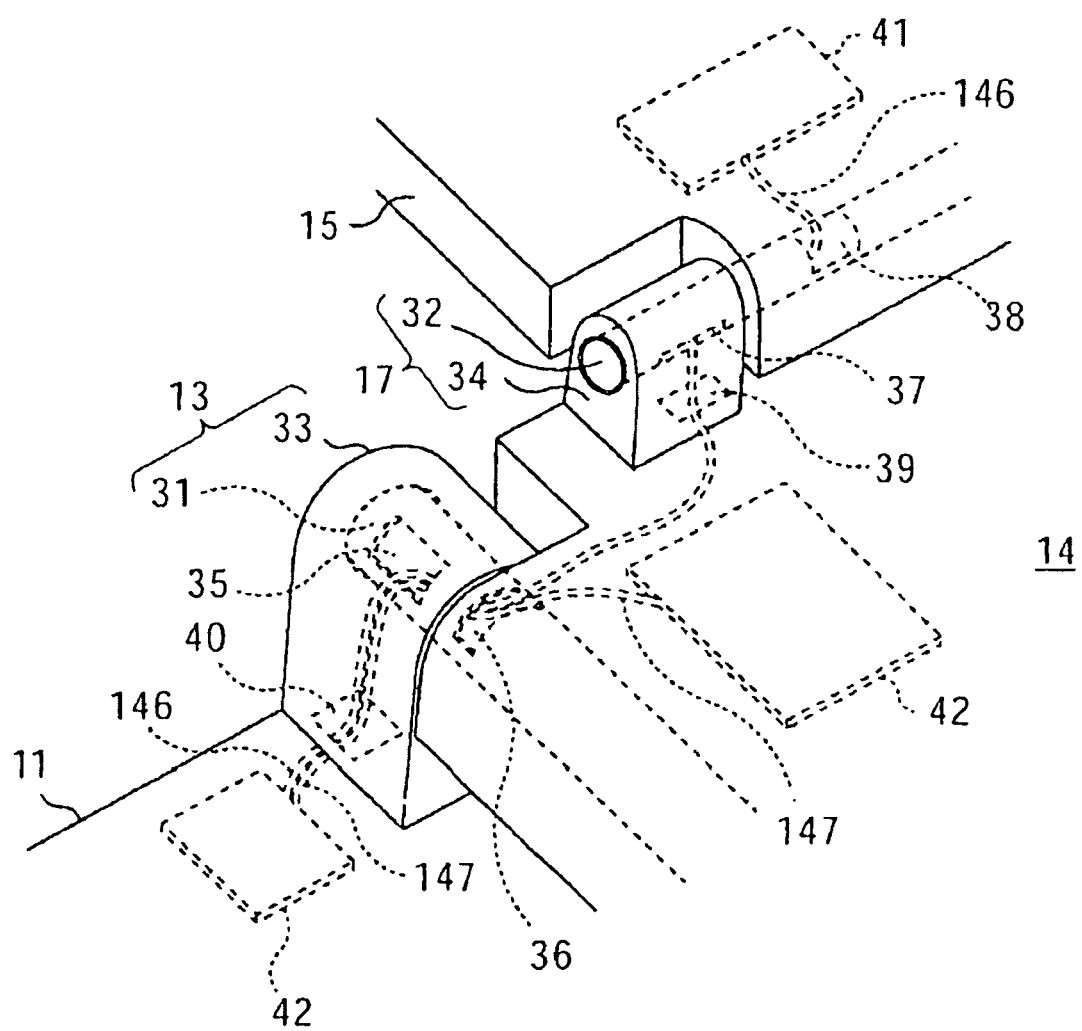
FIG. 5 is a perspective view showing wiring in the PDA 101.

Referring to FIG. 5, the wiring from the main unit 11 of the main panel 14, and the sub-panels 15 and 16 is described below.

FIG. 5 is an enlarged view of a portion surrounded by the broken line in FIG. 4. In FIG. 5, the inside portions of the main block 2 are indicated by broken lines.

Each hinge 13 consists of a shaft 31 and a bearing 33. The shaft 31 is fixed to one side of the main panel 14, and one end thereof is inserted into a hole formed in the bearing 33. In other words, the bearing 33 has a hole having a diameter which is slightly larger than that of the shaft 31, and one end of the shaft 31 is inserted into the hole. Accordingly, the shaft 31 is rotatably supported by the bearing 33, thus enabling the main panel 14 fixed to the shaft 31 to revolve on the shaft 31 as a revolving center.

Also, each hinge 17 consists of a shaft 32 formed similarly to the shaft 31, a bearing 34 formed similarly to the bearing 33. The shaft 32 is fixed to one side of the sub-panel 15. Accordingly, the shaft 32 is rotatably supported by the bearing 34, thus enabling the sub-panel 15 fixed to the shaft 32 to revolve on the shaft 32 as a revolving center.

A portion of the inside of the bearing 33 forming the hinge 13 is a cavity, and the bearing 33 is fixed to a corner of the main unit 11. In the portion of the main unit 11 to which the bearing 33 is fixed, a throughhole is formed, and through the throughhole, flexible cables 146 and 147 extending from a circuit block 43 as the electric circuit built into the main unit 11 reach the inside of the bearing 33.

A portion of the shaft 31 which is inserted into the bearing 33 has a throughhole, and a portion of the shaft 31 which is fixed to the main panel 14 has a throughhole 36. The inside of the shaft 31 is a cavity, and the flexible cables 146 and 146 reaching the inside of the bearing 33 reach the inside of the main panel 14 through the throughhole 35, the inside of the shaft 31, and the throughhole 36.

Inside the main panel 14, the flexible cable 147 is connected to the circuit block 42 as the built-in electric circuit.

Similarly to the bearing 33, the inside of the bearing 34 forming the hinge 17 has a cavity portion, and the bearing 34 is fixed to a corner of the main panel 14. A portion of the main panel 14 to which the bearing 34 is fixed has a throughhole 39, and the flexible cable 146 reach the inside of the bearing 34 through the throughhole 39.

Similarly to the shaft 31, the shaft inserted into the bearing 34 has a throughhole 37, and a portion of the shaft 32 which is fixed to the sub-panel 15 has a throughhole 38. The inside of the shaft 32 is a cavity, and the flexible cable 146 reaching the inside of the bearing 34 reaches the inside of the sub-panel 15 through the throughhole 37, the inside of the shaft 32, and the throughhole 39.

Inside the sub-panel 15, the flexible cable 146 is connected to the circuit block 41 as the built-in electric circuit.

As described above, the built-in circuit block 43 of the main unit 11, the built-in circuit block 42 of the main panel 14, and the built-in circuit block of the sub-panel 15 are electrically connected to one another.

The electric connection between the main unit 11 and the sub-panel 16 is established similar to that between the main unit 11 and the sub-panel 15.

Next, in the case of simply inserting the shaft 31 into the hole of the bearing 33 in the hinge 13, when the user applies some force in order to revolve the cover unit 20, the shaft 31 may be easily off the hole of the bearing 33.

Figure 6A:
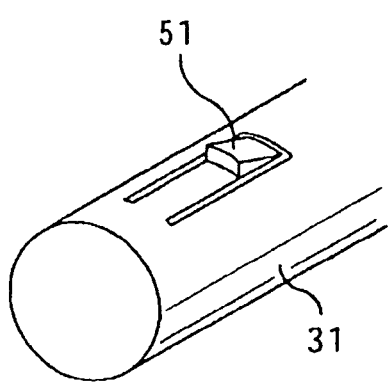
FIGS. 6A and 6B are perspective views-showing a hinge 13.
Figure 6B:
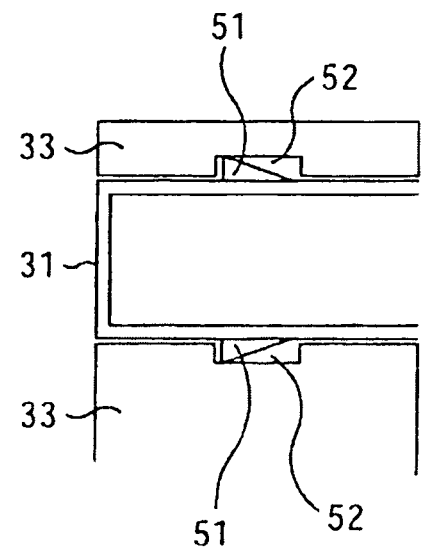

Accordingly, the hinge 13 has a structure as shown in FIGS. 6A and 6B. This structure can prevent the shaft 31 from easily being off the hole of the bearing 33. In FIGS. 6A and 6B, the throughholes 35 and 36 are not shown.

As shown in the perspective view in FIG. 6A, the shaft 31 has, at its one end (portion inserted into the hole of the bearing 33), a locking part 51 in which a roughly U-shaped cut is formed on the surface of the shaft 31 and the other portions are formed so as to vibrate. Thus, the locking part 51 is partially connected to the shaft 31, and is pressed inward into the inside of the shaft 31 when a force is applied on the inward side.

Conversely, when the application of the force is stopped, the locking part 51 can return to its original state by its own elastic force.

The locking part 51 has, at one end opposite to the end connected to the shaft 31, a convex portion having a roughly triangular section.

The shaft 31 has a locking part similar to the locking part 51 also on its 180-degree opposite side.

As sown in the sectional view in FIG. 6B, in a portion of the hole of the bearing 33, a grove 52 which has a depth smaller than the height of the convex portion on the locking part 51 on the shaft 52 is formed along the inner circumference of the hole.

When the shaft 31 is inserted into the hole of the bearing 33, in a portion having the groove 52, the locking parts 51 touch the inner wall of the hole of the bearing 33, whereby the locking parts 51 are pressed on the inward side of the shaft 31. After that, when the locking parts 51 reach the groove 52, their elastic force return them to the original position, and the convex portions on the locking parts 51 become engaged in the groove 52, so that the shaft 31 is easily off the hole of the bearing 33.

The groove 52 is formed so as to have a depth in which, when the convex portions are engaged in the groove 52, they can be slightly pressed. Accordingly, when the convex portions on the locking parts 51 are engaged in the groove 52, the locking parts 52 are in a state slightly pressed on the inward side of the shaft 31.

Therefore, when revolving torque is applied to the shaft 31 for revolving the cover unit 20 due to effects such as gravity, a frictional force stopping the revolution occurs between the convex portions on the locking parts 51 on the shaft 31 and the inner wall of the groove 52.

Accordingly, when the cover unit 20 is opened at an arbitrary angle (0 to 180 degrees) to the main unit 11, the state of the cover unit 20 is maintained by the above frictional force. The frictional force is at a level similar to that of revolving torque generated by the own weight of the cover unit 20, and does not prevent the operation by the user of revolving the cover unit 20.

Also, the shaft 32 and the bearing 34 constituting the hinge 17 are formed similarly to the hinge 13 shown in FIGS. 6A and 6B. The hinge 18 is also formed similarly to the hinge 13 in FIGS. 6A and 6B.

Next, FIGS. 7 to 10 are external views showing another example of the main block 2. In FIGS. 7 to 10, portions corresponding to those in FIGS. 1 to 4 are denoted by identical reference numerals, and descriptions thereof are omitted in the following.

Figure 7:
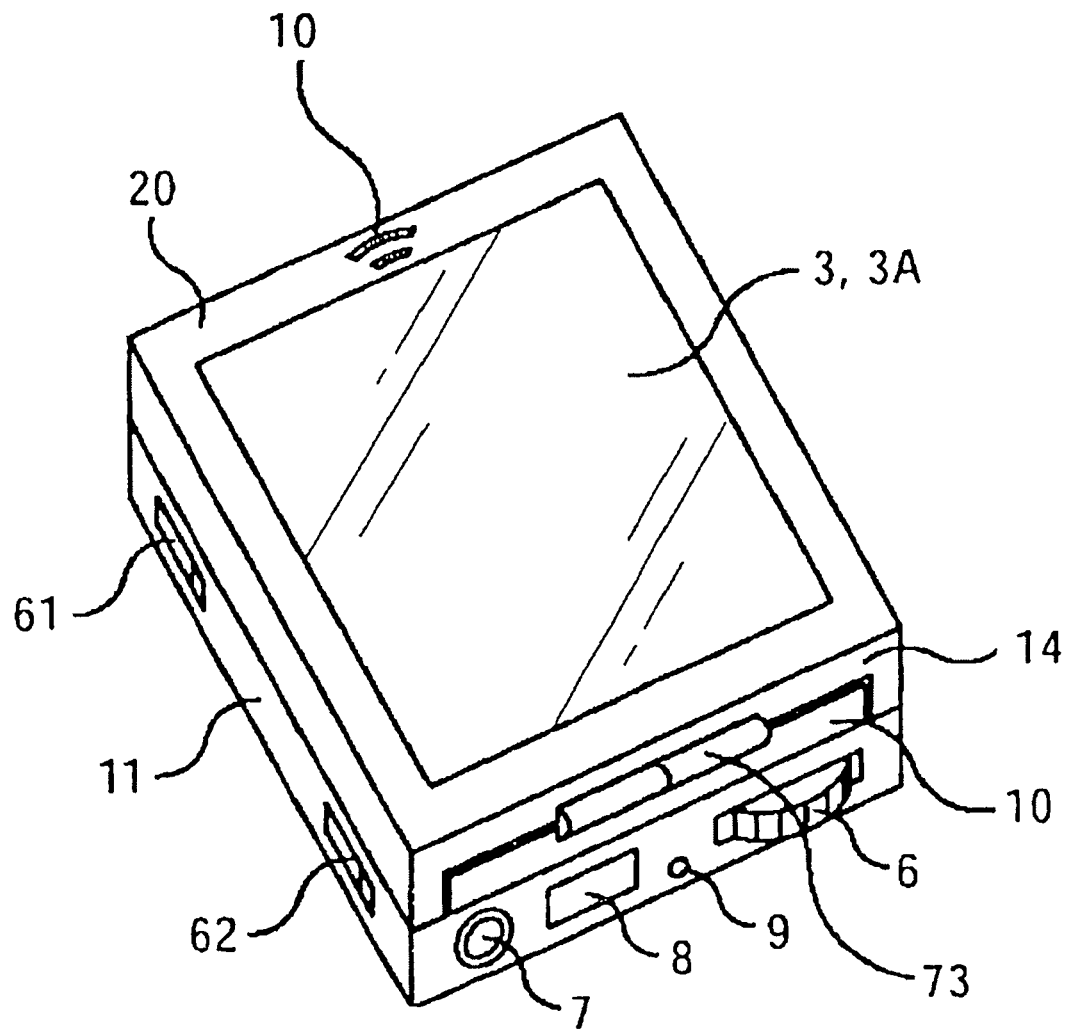
FIG. 7 is a perspective view showing a second exterior example of the main block 2 in the PDA 101.
Figure 9:
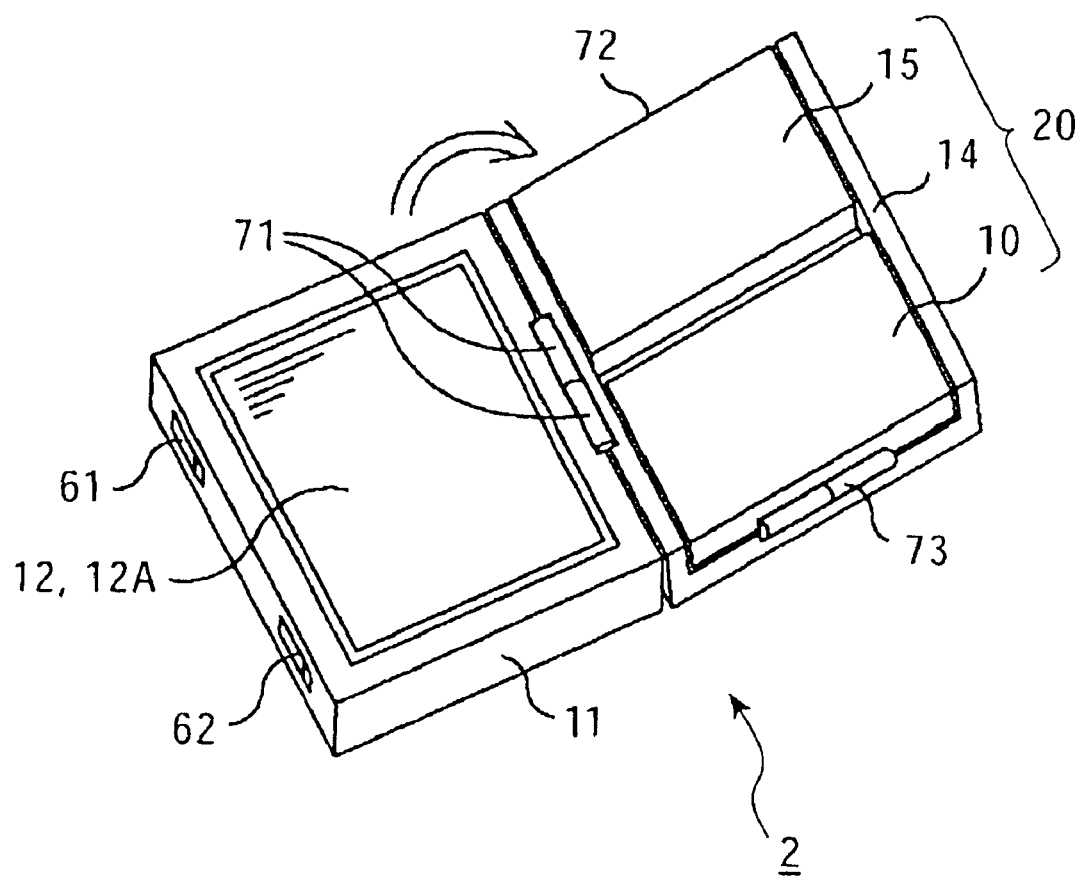
FIG. 9 is a perspective view showing an exterior example of the main block 2 with the cover unit 20 opened.
Figure 10:
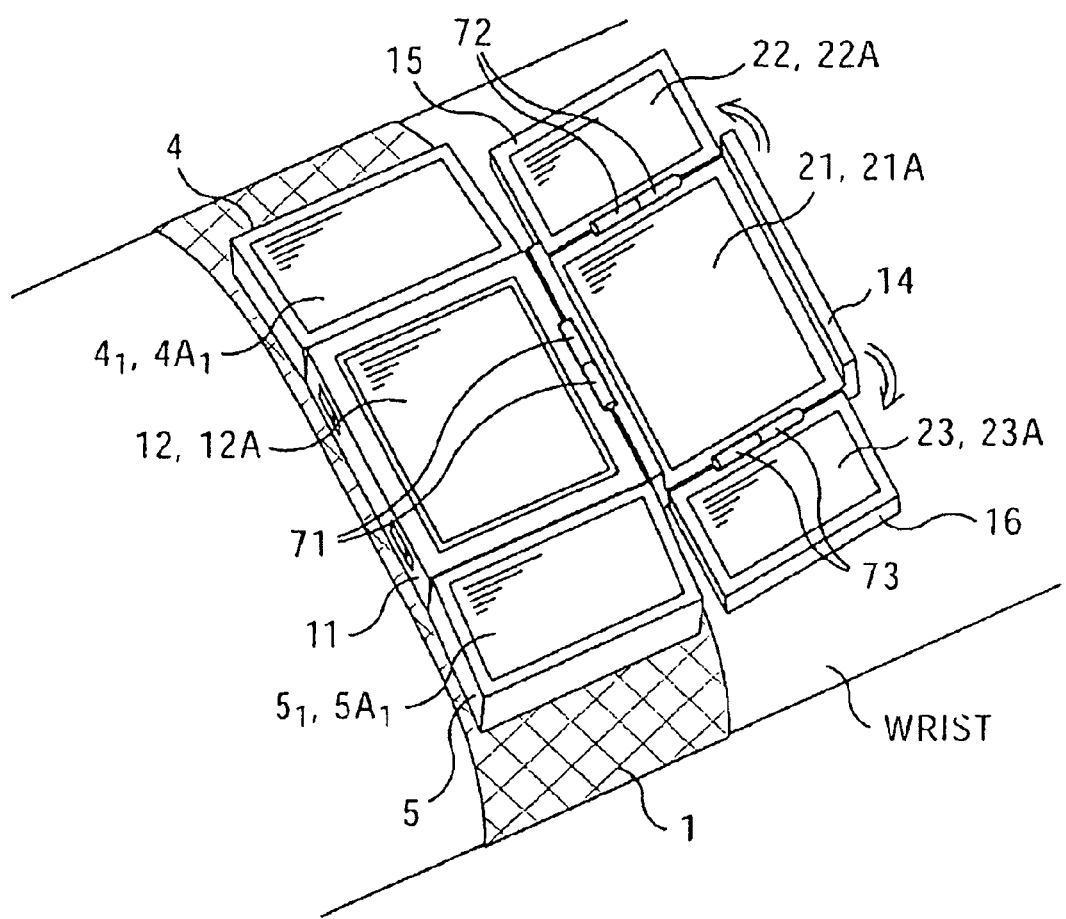
FIG. 10 is a perspective view showing an exterior example of the PDA 101 with the cover unit 20 and the sub-panels 15 and 16 opened.

FIG. 7 is a perspective view of the main block 2. FIG. 8A is a front (top surface) view of the main block 2. FIG. 8B is an upper side view of the main block 2. FIG. 8C is a lower side view of the main block 2. FIG. 8D is a left side view of the main block 2. FIG. 8E is a right side view of the main block 2. FIG. 9 is a perspective view of the main block 2 in a state in which the cover unit 20 is opened. FIG. 10 is a perspective view of the main block 2 in a state in which the sub-panels 15 and 16 are opened.

As shown in FIG. 8B, the main unit 11 in the main block 2 has, on its upper side, a wireless communication unit 63, an antenna 64, and a charge-coupled device (CCD) camera 65.

The wireless communication unit 63 emits and receives infrared signals when performing, for example, wireless communication using infrared radiation.

The antenna 63 radiates and receives radio signals when performing, for example, wireless communication using radio waves. The antenna 64 can also perform radio-wave transmission and reception for wireless communication in accordance with, not only radio-wave transmission and reception for telephone communication in audio form, but also, for example, Bluetooth (trademark).

By photoelectrically converting incident light, the CCD camera 65 outputs an image signal corresponding to the light. In other words, the CCD camera 65 performs image capturing.

Although the wireless communication unit 63, the antenna 64, and the CCD camera 65 are provided also in the main lock 2 in the FIG. 2, they are not shown.

The main block 2 shown in FIGS. 7 to 10, and the main block 2 shown in FIGS. 1 to 4 have similar functions.

However, the main block 2 shown in FIGS. 7 to 10 differs from that shown in FIGS. 1 to 4 in hinge mechanism.

Specifically, in the main block 2 in FIGS. 7 to 10, a cover unit 20 revolves on hinges 71 (FIGS. 8A, 8E, 9, 10) provided on the right side of the main block 2. A sub-panel 15 revolves on hinges 72 (FIGS. 8B, 9, 10) provided in an upper portion of the main panel 14. A sub-panel 16 revolves on hinges 73 (FIGS. 7, 8C, 10) provided in a lower portion of the main panel 14.

Figure 11:
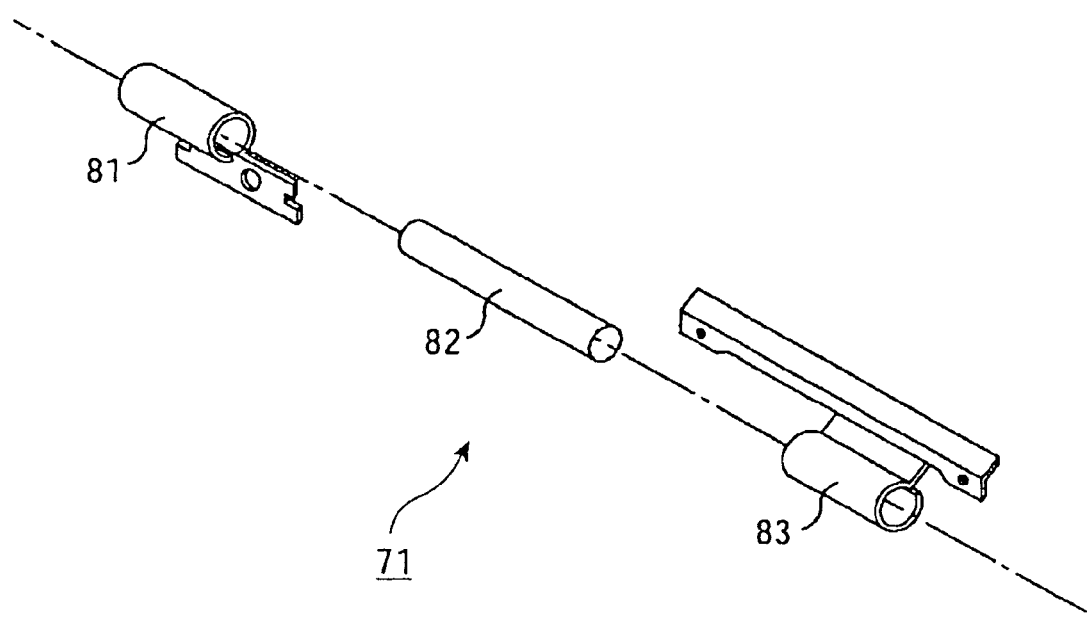
FIG. 11 is an exploded perspective view showing a hinge 71.

FIG. 11 is an exploded view of a hinge 71.

As shown in FIG. 11, the hinge 71 consists of a hinge bracket fixed to the main unit 11, a hinge bracket 83 fixed to the cover unit 20, and a shaft 82 rotatably joined to both brackets.

Figure 12:
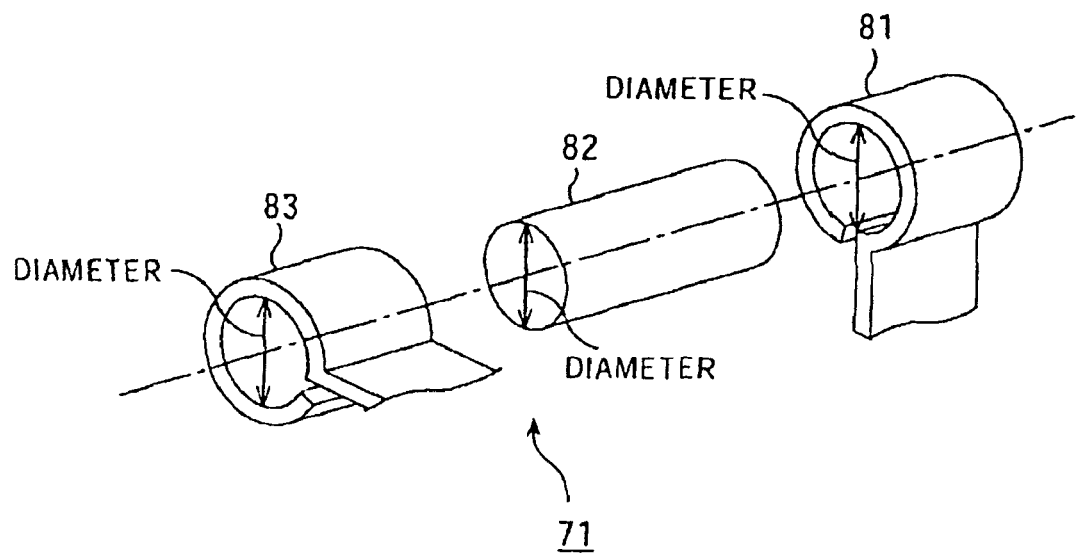
FIG. 12 is a more detailed exploded perspective view showing the hinge 71.

As FIG. 12 shows, the hinge brackets 81 and 83 are made of steel for springs, and each bracket is cylindrically formed, with its one end bent (processed by curling). Both brackets have the same hole diameter. The shaft 82 is a stainless cylinder having a predetermined length, and its diameter is slightly larger than the hole diameter of the hinge brackets 81 and 83. The ends of the shaft 82 are forcibly inserted into the hinge brackets 81 and 83, respectively.

As described above, the diameter of the shaft 82 is larger than the hole diameter of the hinge brackets 81 and 83. Thus, forcible insertion of the shaft 82 enlarges (causes elastic deformation of) the hole diameter of the hinge brackets 81 and 83, so that the hinge brackets 81 and 83 elastically support the shaft 82 so that it can rotate.

In this state, the shaft 82 is not completely supported by the hinge bracket 81 and 83. When the revolution of the cover unit 20 applies revolving torque to the shaft 82, frictional force that stops the revolution occurs between the shaft 82 and the hinge brackets 81 and 83, due to an effect of gravity.

Accordingly, when the cover unit 20 is opened at an arbitrary angle (0 to 180 degrees) to the main unit 11, the state of the cover unit 20 is maintained by the above frictional force. The frictional force is at a level similar to that of revolving torque generated by the own weight of the cover unit 20, and does not prevent the operation by the user of revolving the cover unit 20.

The hinges 72 and 73 are formed similarly to those shown in FIGS. 11 and 12.

Next, referring to FIGS. 13 to 15, the wiring from the main unit 11 to the main panel 14 and the sub-panels 15 and 16 in the case of employing the hinges 71 to 73 in the main block 2 is described below.

Figure 13:
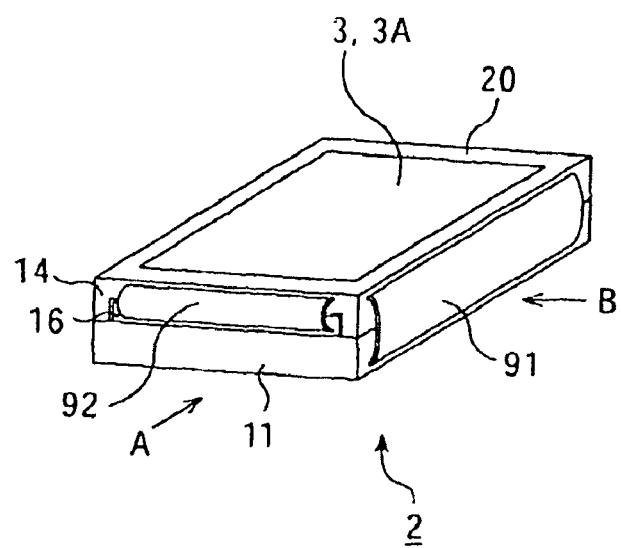
FIG. 13 is a perspective view showing a third exterior example of the main block 2 in the PDA 101.

In the main block 2, a hinge cover 91 for covering the hinge 71 joining the main unit 11 and the cover unit 20 is provided as shown in FIG. 13, though it is not shown for brevity of illustration in FIGS. 7 to 10.

Also, as shown in FIG. 13, in the cover unit 20, a hinge cover 92 for covering a hinge 73 joining the main panel 14 and the sub-panel 16 is provided.

In the cover unit 20, also a hinge cover for covering a hinge 72 joining the main panel 14 and the sub-panel is provided, though it is not shown in FIG. 13.

Figure 14:
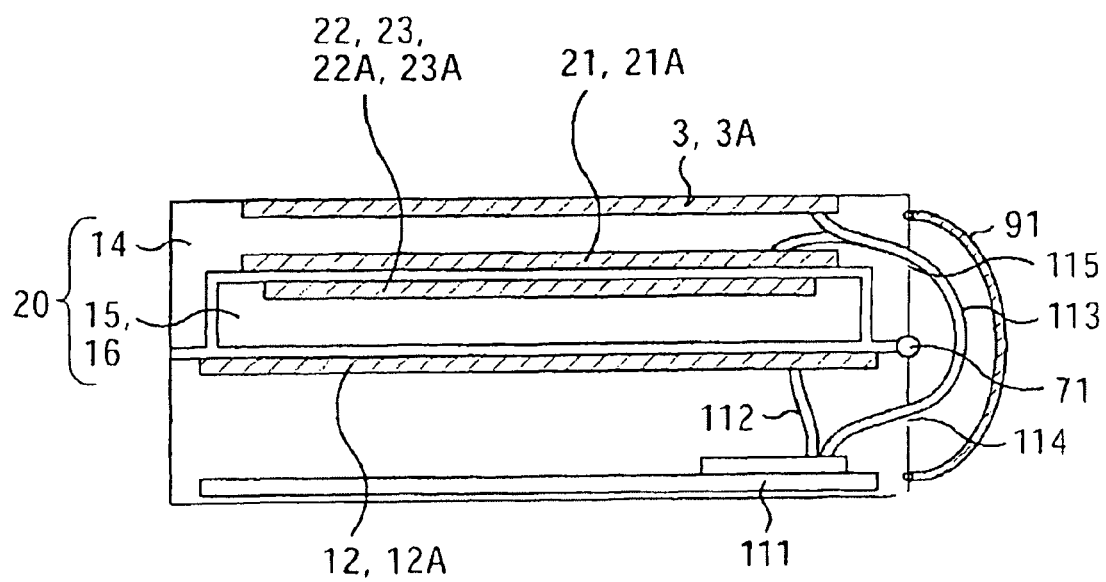
FIG. 14 is a sectional view showing wiring in the main block 2.

FIG. 14 is a sectional view of the main block 2 which is observed from the lower side denoted by the arrow A in FIG. 13.

Inside the main unit 11, there is a circuit board 111 on which various electric circuits (electronic circuits) are formed. The circuit board 111 is electrically connected to an LCD 12 (including a touch panel 12A) on the upper surface of the main unit 11 by a flexible cable 112.

A flexible cable 113 is also connected to the circuit board 111. After leading to the exterior through a hole 114 on a side to which the hinge 71 of the main unit 11 is fixed, the flexible cable 113 leads to the inside of the main panel 14 through a hole 115 on a side to which the hinge 71 on the main panel 14, the flexible cable 113 is connected to an LCD 3 (including a tablet 3A) on the upper surface of the main panel 14, and to an LCD 21 (including a tablet 21A) on the lower surface of the main panel 14. In this structure, the LCDs 3 and 21 on the main panel 14 are electrically connected to the circuit board 111.

The hinge cover 91 is provided so as to protect the flexible cable 113 which is exposed in the exterior between the holes 114 and 115. This prevents the flexible cable 113 from being damaged.

Figure 15:
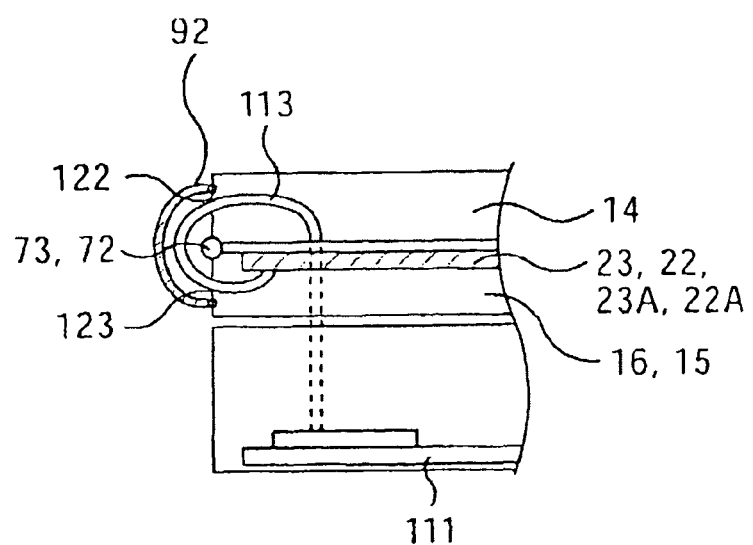
FIG. 15 is a sectional view showing wiring in the main block 2.

FIG. 15 is a sectional view of the main block 2 which is observed from the right side denoted by the arrow B in FIG. 13.

Part of the flexible cable 113 which leads to the inside of the main panel 14 leads to the exterior through a side to which the hinge 73 on the main panel 14 is fixed, and leads to the inside of the sub-panel 16 through a hole 123 on a side to which the hinge 73 on the sub-panel 16 is fixed. Inside the sub-panel 16, the flexible cable 113 is connected to an LCD 23 (including a touch panel 23A) on the sub-panel 16. In this structure, the LCD 23 on the sub-panel 16 is electrically connected to the circuit board 111.

The hinge cover 92 covering the hinge 73 is provided in the form of protecting part of the flexible cable 113 which is exposed to the exterior between the holes 122 and 123. This prevents the flexible cable 113 from being damaged.

Similarly to the case of the sub-panel 16, the flexible cable 113 also reaches the inside of the sub-panel 15. In this structure, the LCD 22 (including the touch panel 22A) on the sub-panel 15 is electrically connected to the circuit board 111.

In the above-described embodiment, the PDA has the LCDs $4_1$ and $5_1$ on the upper and lower sides of the main block 2 on the watch bracelet 1. However, more LCDs may be provided on the watch bracelet 1.

Figure 16:
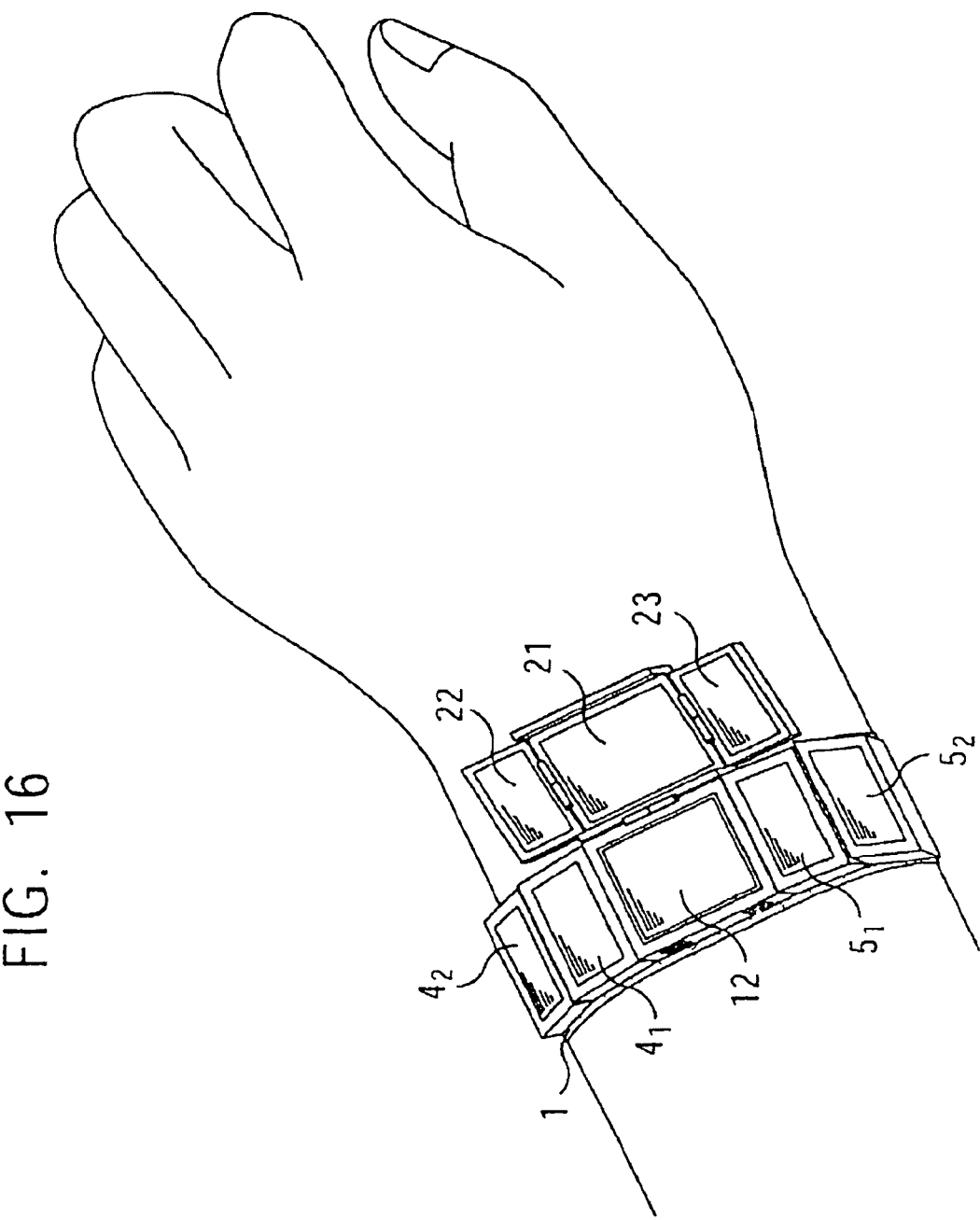
FIG. 16 is a perspective view showing an exterior example of a second embodiment of the PDA 101 to which the present invention is applied.
Figure 17A:
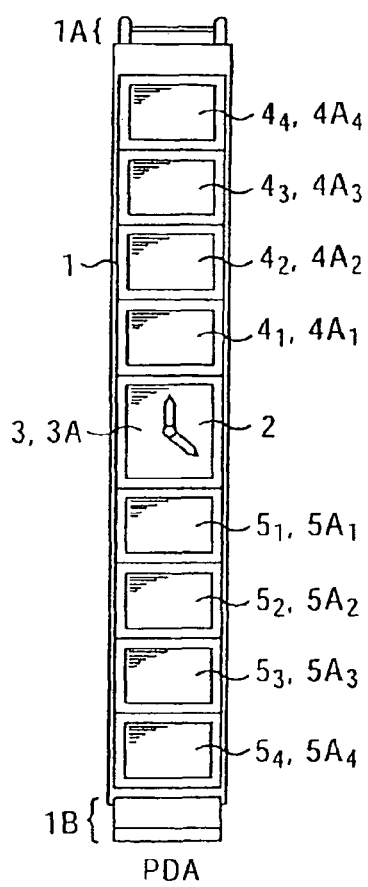
FIGS. 17A and 17B are plan views showing the second embodiment of the PDA 101.
Figure 17B:
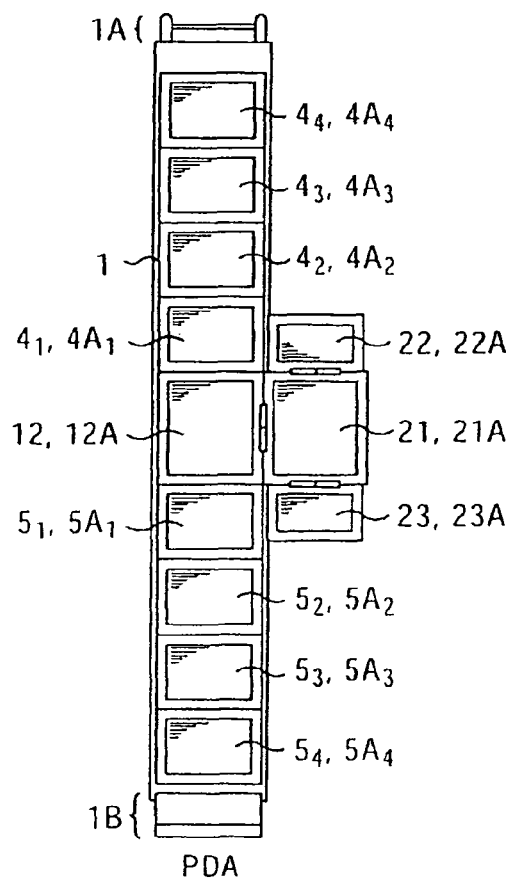

Accordingly, FIGS. 16 to 17B show the exterior of an example of a PDA having more LCDs provided on the watch bracelet 1.

In the embodiment shown in FIGS. 16 to 17B, there are four LCDs $4_1$, $4_2$, $4_3$, and $4_4$ on the upper side of the main block 2 on the watch bracelet 1, and there are four LCDs $5_1$, $5_2$, $5_3$, and $5_4$ on the lower side of the main block 2 on the watch bracelet 1.

As shown in FIG. 17A, the watch bracelet 1 has fasteners 1A and 1B at two ends thereof. By putting the watch bracelet 1 on the user's wrist, and joining the fasteners 1A and 1B, the watch bracelet 1 forms a loop, and as shown in FIG. 16, a state in which the user wears the watch bracelet 1 is maintained.

FIG. 17A shows a state in which the PDA is put on a plane, with the cover unit 20 closed, after the watch bracelet 1 which is put on the user's wrist is removed.

In this state, in addition to the LCD 3 on the cover unit 20 on the main block 2, a total of nine LCDs, namely, LCDS $4_1$ to $4_4$ and LCDs $5_1$ to $5_4$ on the watch bracelet 1 are exposed at the top.

Accordingly, the nine LCDs $4_1$ to $4_4$ and LCDs $5_1$ to $5_4$ are used to display information for the user.

Similarly to the LCDs $4_1$ and $5_1$, the LCDs $4_2$, $4_3$, $4_4$, $5_2$, $5_3$, and $5_4$ are integrated with transparent tough panels $4A_2$, $4A_3$, $4A_4$, $5A_2$, $5A_3$, and $5A_4$, respectively. The LCDs $4_2$, $4_3$, $4_4$, $5_2$, $5_3$, and $5_4$ display buttons, and when the user operates the buttons, the operations of the buttons are detected by the touch panels $4A_2$, $4A_3$, $4A_4$, $5A_2$, $5A_3$, and $5A_4$.

FIG. 17B shows a state in which, from the state in FIG. 17A, the cover unit 20 is opened and the sub-panels 15 and 16 are also opened.

In this state, in the main block 2, the LCDs 12, 21, 22, and 23 are exposed at the top in place of the LCD 3.

Accordingly, in this case, by using a total of twelve LCDs, that is, the LCDs $4_1$ to $4_4$ and $5_1$ to $5_4$ on the watch bracelet 1, and the LCDs 12 and 21 to 23 in the main block 2, information can be displayed for the user.

Next, FIGS. 18A to 21C shown another example of the main block 2.

Figure 18A:
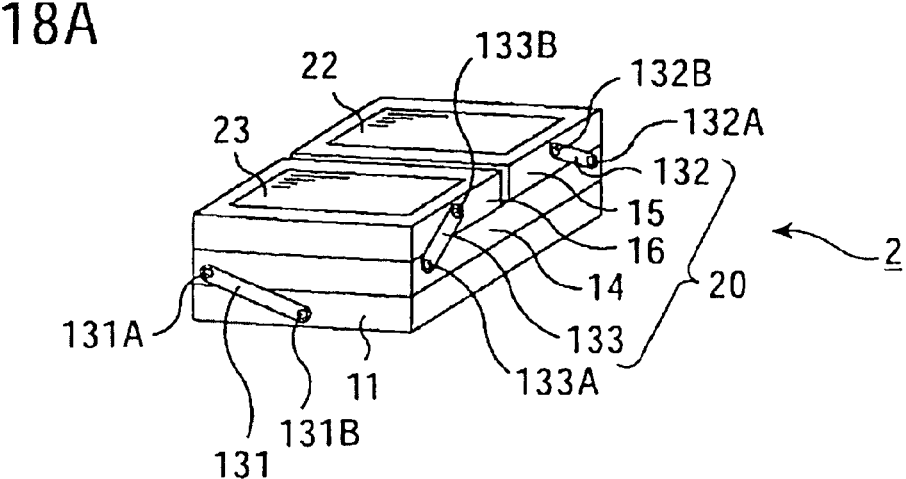
FIGS. 18A to 18C are perspective views showing a fourth exterior example of the main block 2 in the PDA 101.

In the embodiment shown in FIG. 18A, the main block 2 has a structure in which, with the cover unit 20 closed, the main panel 14 is positioned on the main unit 11, and the sub-panels 15 and 16 are positioned on the main panel 14.

In the embodiments shown in FIGS. 2 and 7, the sub-panels 15 and 16 are positioned on the main unit 11, and the main panel 14 is positioned on the sub-panels 15 and 16, with the cover unit 20 closed. The embodiment in FIG. 18 differs therefrom in that the main panel 14 and the sub-panels 15 and 16 are transposed. Accordingly, in FIG. 18A, when the cover unit 20 is closed, the LCD 22 on the sub-panel 15 and the LCD 23 on the sub-panel 16 are exposed at the top. The LCDs 22 and 23 are used as, for example, the LCD 3 which is exposed at the top when the cover unit 20 is closed in the main block 2 shown in FIG. 7.

As shown in FIG. 18A, the main unit 11 and (the main panel 14) the cover unit 20 are coupled by a so-called "link structure" consisting of an arm member 131 and pins 131A and 131B.

Also, the main panel 14 and the sub-panel 15 in the cover unit 20 are coupled by a link structure consisting of an arm member 132 and pins 132A and 132B. The main panel 14 and the sub-panel 16 are coupled by a link structure consisting of an arm member 133 and pins 133A and 133B.

Figure 18B:
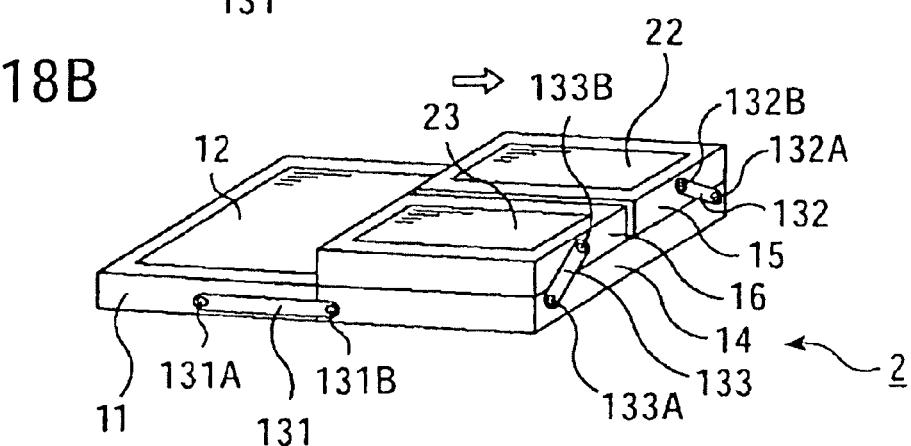
Figure 18C:
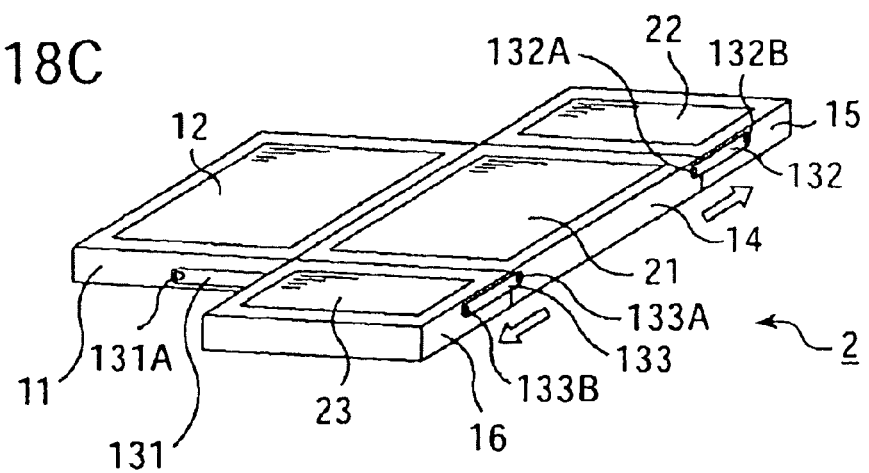

In FIGS. 18A to 18C, the main block 2 has, on its upper side, a link structure similar to that consisting of the arm member 131 and the pins 131A and 131B. The main block 2 has, on its left side, a link structure similar to that consisting of the arm member 132 and the pins 132A and 132B, and a link structure similar to that consisting of the arm member 133 and pins 133A and 133B.

The arm member 131 has, at its ends, the pins 131A and 131B, which are rotatably provided. The pin 131A is inserted into the bottom left corner of the lower side of the main panel 14 in the cover unit 20, and the pin 131B is inserted into the bottom center of the lower side of the main unit 11.

The arm member 132 has, at its ends, the pins 132A and 132B, which are rotatably provided. The pin 132A is inserted into the top right corner of the right side of the main panel 14, and the pin 132B is inserted into the top center of the right side of the sub-panel 15.

The arm member 133 has, at its ends, the pins 133A and 133B, which are rotatably provided. The pin 133A is inserted into the top left corner of the right side of the main panel 14, and the pin 133B is inserted into the top center of the right side of the sub-panel 16.

Accordingly, by moving the cover unit 20 so as to slide right, the arm member 131 turns around the pin 131A and turns around the pin 131B, so that the cover unit 20 moves to a position adjacent to the right side of the main unit 11, with the LCD 12 on the main unit 11 exposed, as shown in FIG. 18B.

In addition, by moving the sub-panel 15 so as to slide upwardly (depth direction), the arm member 132 turns around the pin 132A and turns around the pin 132B, so that the sub-panel 15 moves to a position adjacent to the upper side of the main panel 14, as shown in FIG. 18C.

Also, by moving the sub-panel 16 so as to slide downwardly (front direction), the arm member 133 turns around the pin 133A and turns around the pin 133B, so that the sub-panel 16 moves to a position adjacent to the lower side of the main panel 14, as shown in FIG. 18C.

The above operation causes the LCD 21 on the main panel 14 to be seen.

In the main block 2 shown in FIGS. 18A to 18C, from the state shown in FIG. 18A, after sliding the sub-panels 15 and 16 at first, all of the main panel 14 and the sub-panels 15 and 16 can be slid leading to the state shown in FIG. 18C.

Next, wiring in the case of employing the link structure shown in FIGS. 18A to 18C is described below with reference to FIG. 19.

Figure 19:
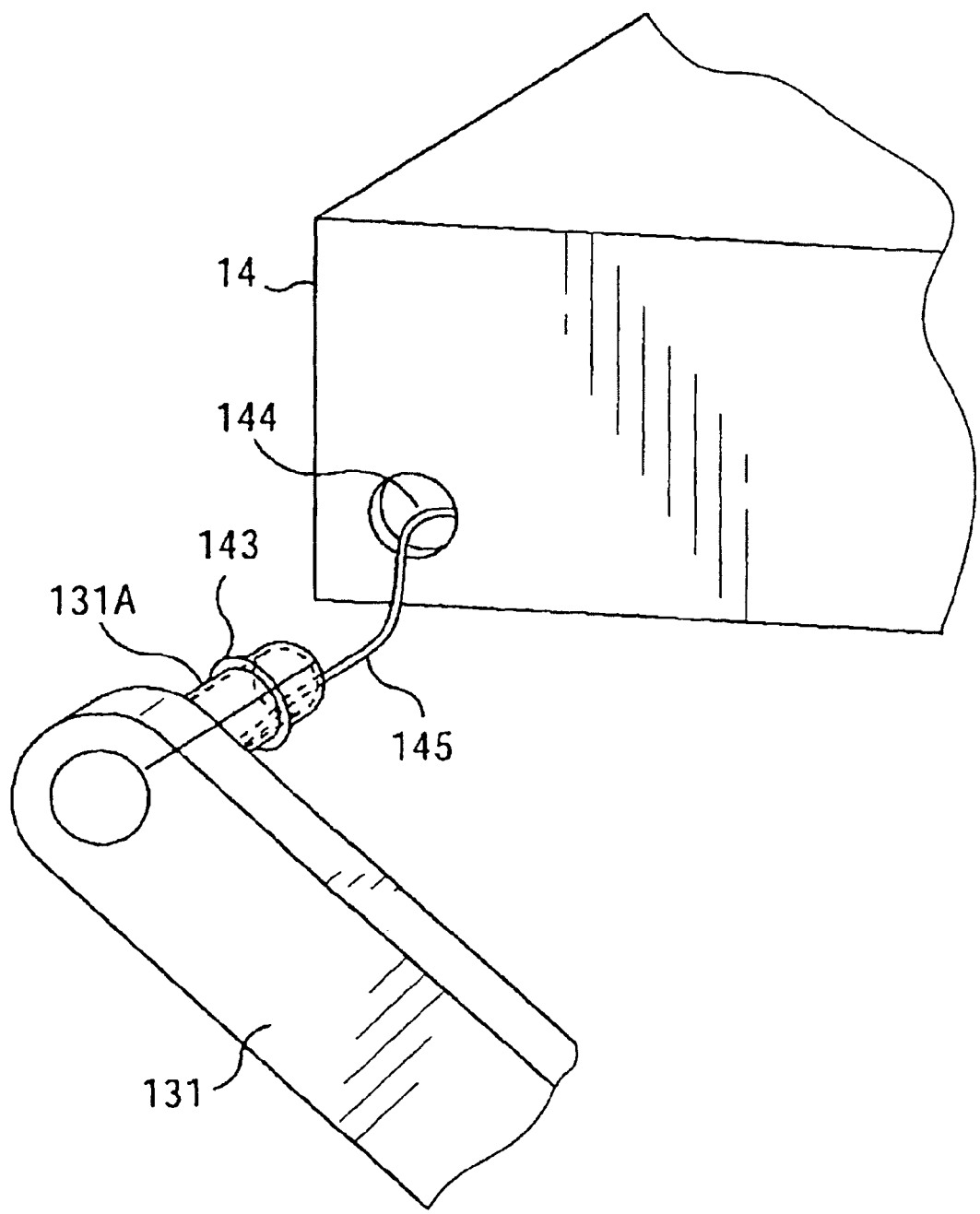
FIG. 19 is a perspective view showing wiring in the main block 2.

FIG. 19 is an enlarged view of the portion of the main panel 14 (FIGS. 18A to 18C) into which the pin 131A is inserted.

The main panel 14 is provided with a hole 144 into which the pin 131A is inserted, and the diameter of the hole 144 is slightly larger than that of the pin 131A.

The pin 131A has, at the end for insertion into the hole 144, a locking part 143 made of an elastic body such as rubber, and the diameter of the locking part 143 is slightly larger than that of the hole 144.

Accordingly, when the pin 131A is inserted into the hole 144, the locking part 143 gets stuck with the hole 144. However, since the locking part 143 is elastic, by using a large force to press the pin 131A into the hole 144, the elastic body as the locking part 143 is deformed to pass through the hole 144. When the locking part 143 passes through the hole 144 and reaches the inside of the main panel 14, its elastic force returns it to be in the original state. This causes the pin 131A to be in a state in which it cannot be easily off the hole 144.

Since the inside of the arm member 131 and the inside of the pin 131A are cavities, the flexible cable 145 extending from the main unit 11 passes through the inside of the arm member 131 and the inside of the pin 131A, and reaches the main panel 14.

The other link structures are formed similarly to the structure described with reference to FIG. 19. This enables wiring of the main panel 14 and the sub-panels 15 and 16 from the main unit 11.

Figure 20A:
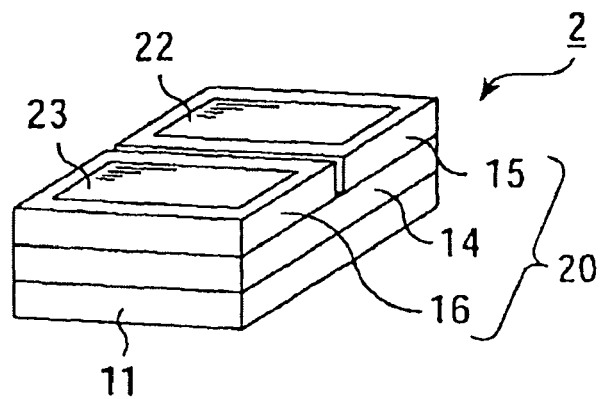
FIGS. 20A, 20B, an 20C are perspective views showing a fifth exterior example of the main block 2 in the PDA 101.
Figure 20B:
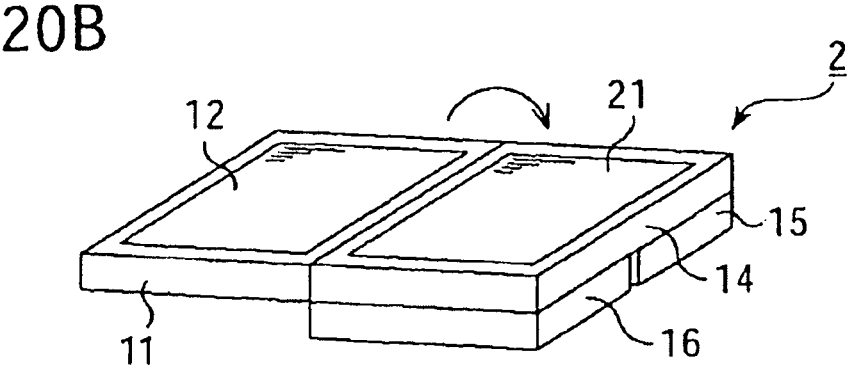
Figure 20C:
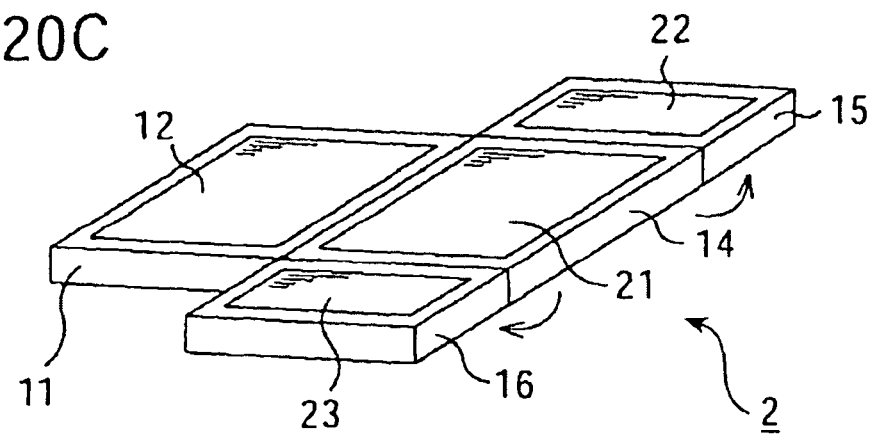

Next, in the embodiment shown in FIGS. 20A to 20C, positional relationships among the main unit 11, and the main panel 14 and the sub-panels 15 and 16 which form the cover unit 20 are identical to those shown in FIGS. 18A to 18C. Accordingly, when the cover unit 20 is closed, as shown in FIG. 20A, the LCD 22 on the sub-panel 15 and the LCD 23 on the sub-panel 16 are exposed at the top.

However, in the embodiment in FIGS. 20A to 20C, not link structures but hinge structures are employed as structures for coupling the main unit 11 and the main panel 14, for coupling the main panel 14 and the sub-panel 15, and the main panel 14 and the sub-panel 16, similarly to the embodiments in FIGS. 2 and 7.

Accordingly, when the cover unit 20 is opened, as shown in FIG. 20B, the LCD 21 on the main panel 14 of the cover unit 20 is exposed at the top. By opening the cover unit 20, as shown in FIG. 20B, the LCD 22 on the sub-panel 15 and the LCD 23 on the sub-panel 16, which are exposed at the top when the cover unit 20 is closed, are directed downward.

By opening the sub-panels 15 and 16, as shown in FIG. 20C, the LCD 22 on the sub-panel 15 and the LCD 23 on the sub-panel 16 are exposed at the top.

Figure 21A:
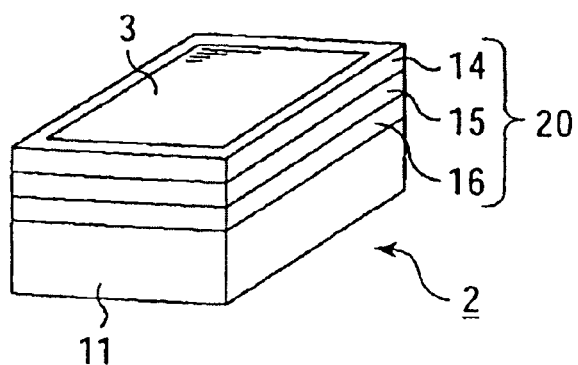
FIGS. 21A, 21B, and 21C are perspective views showing a sixth exterior example of the main block 2 in the PDA 101.
Figure 21B:
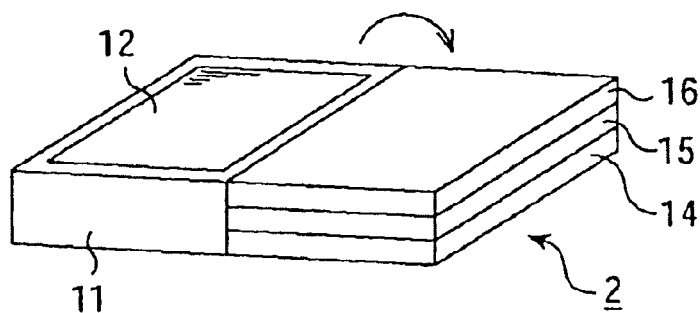
Figure 21C:
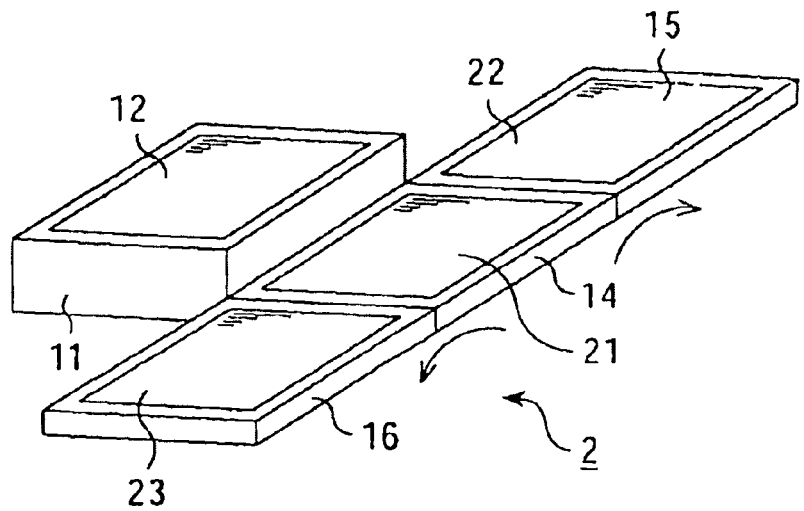

In the embodiment shown in FIGS. 21A to 21C, the main block 2 is basically identical in structure to that in the cases in FIGS. 2 and 7. In the embodiments in FIGS. 2 and 7, the vertical length of each of sub-panels 15 and 16 is approximately half or slightly less of the vertical length of the main panel 14. However, in the embodiment in FIGS. 21A to 21C, the vertical length of each of sub-panels 15 and 16 is at the same level as (slightly smaller than) the vertical length of the main panel 14. In FIGS. 21A to 21C, the sub-panels 15 and 16 are almost identical in size to the main panel 14.

Referring to the main block 2, by opening the cover unit 20 from a state in which the cover unit 20 is closed as shown in FIG. 21A, the LCD 12 on the main unit 11 is exposed as shown in FIG. 21B, and by opening the sub-panels 15 and 16, the LCD 21 on the main panel 14, the LCD 22 on the sub-panel 15, and the LCD 23 on the sub-panel 16 are exposed as shown in FIG. 21C.

As described above, in the embodiment in FIGS. 21A to 21C, the sub-panels 15 and 16 are almost identical in size to the main panel 14. Thus, the LCD 21 on the sub-panel 15 and the LCD 23 on the sub-panel 16 are also almost identical to the LCD 21 on the main panel 14.

Therefore, in the embodiment in FIGS. 21A to 21C, the LCDs 22 and 23 can display more items or larger items, compared with the embodiments in FIGS. 2 and 7.

Although in the above embodiment the cover unit 20 is provided with the sub-panels 15 and 16, the sub-panels 15 and 16 can be provided on the main unit 11.

Although in the above embodiment the cover unit 20 is provided with two sub-panels 16 and 16, a single sub-panel can be provided.

In addition, each sub-panel can be provided so as not to open upwardly or downwardly but to open in a direction such as the right. In the cover unit 20, a sub-panel 15 which opens upwardly, a sub-panel 16 which opens downwardly, and a sub-panel which opens right can be provided.

Figure 22:
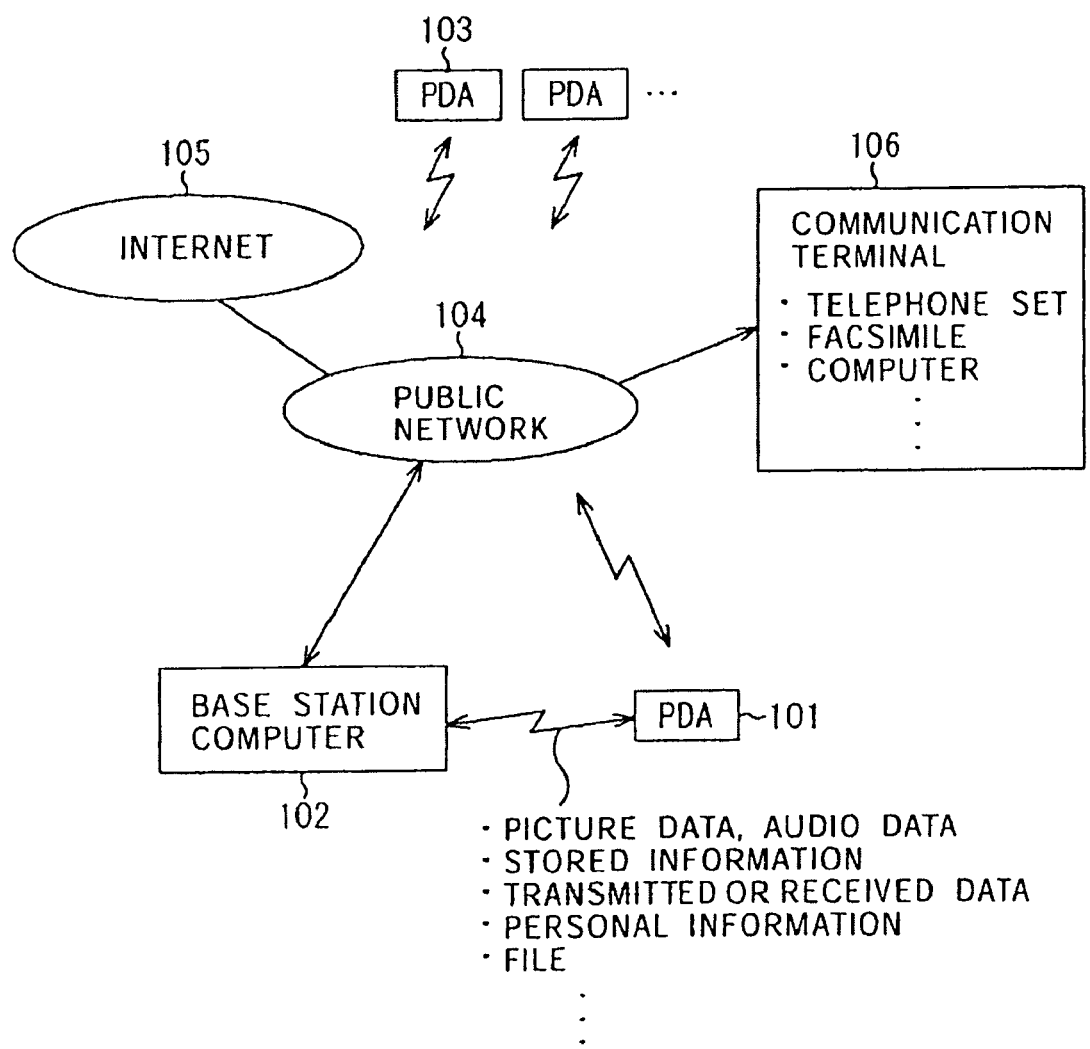
FIG. 22 is a block diagram showing an embodiment of a PDA system using the PDA 101.

Next, FIG. 22 shows the configuration of an embodiment of a PDA system using the PDAs described using FIGS. 1 to 21C.

A PDA is one of the PDAs described in FIGS. 1 to 21C. The PDA 101 can perform various data processes and can communicate with another PDA 103, the Internet 105, and various types of other communication terminals 106 by using a public network 104.

The various types of other communication terminals 106 include telephone sets (including cellular phones), facsimile machines, and computers.

The PDA 101 can also perform data communication (exchanging various types of data) with a base station computer 102.

The data exchanged between the PDA 101 and the base station computer 102 includes, for example, picture data (including moving pictures and still pictures), sound data (audio data), personal information such as mail addresses and telephone numbers, various files such as program and other binary files, and text files, information that is stored after being downloaded through the public network 104 from the Internet 105 and the other PDA 103, which is identical in structure to the PDA 101, and data that is transmitted/received to/from various types of other information processing apparatuses.

The base station computer 102 has a structure based on, for example, a desktop computer or a notebook computer, and is used as a so-called "base station" for the PDA 101. Since the PDA 101 is small-sized for convenience of portability, its performance is inferior to that of the desktop computer or notebook computer, which can be made in larger size. Accordingly, the base station computer 102 can acquire (receive) and processes data retained by the PDA 101, and can provide (transmit) the processed result to the PDA 101. The base station computer 102 can also provide the PDA 101 with data acquired from the Internet 105 or the like.

The base station computer 102 is similar in basic structure to a common desktop or notebook computer except to be a base station for the PDA 101. Accordingly, the base station computer 102 can establish a link to the Internet 105 by using the public network 104, and can perform the execution of various programs, etc.

Figure 23:
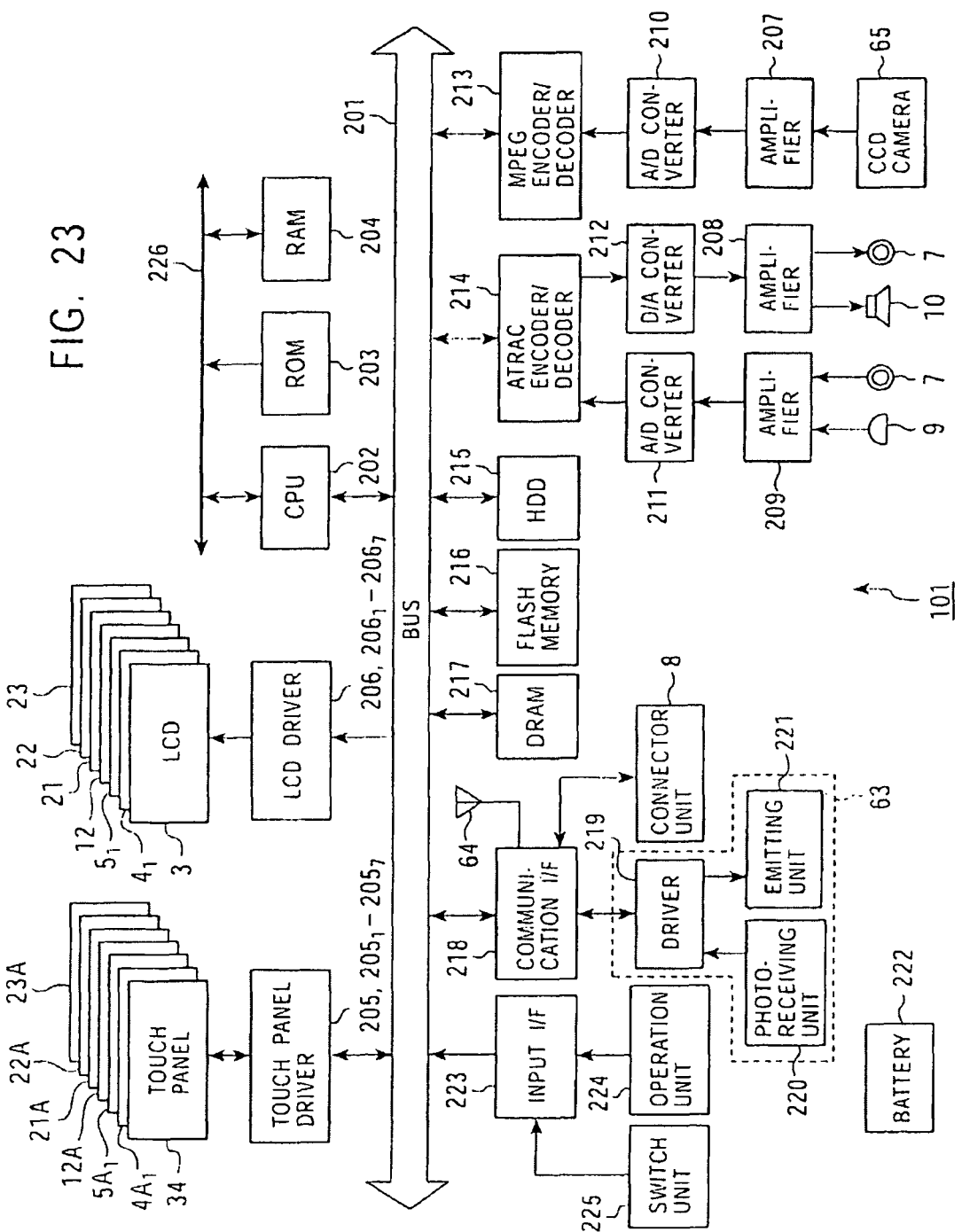
FIG. 23 is a block diagram showing the hardware structure of the PDA 101.

Next, FIG. 23 shows the hardware structure of the PDA 101.

A central processing unit (CPU) 202 is connected to a bus 201, and performs control of blocks connected to the bus 201. The CPU 202 is also connected to a read-only memory (ROM) 203 and a random access memory (RAM) 204 by a bus 226, and performs various processes including the above control by executing a program which is stored in the ROM 203, and a program which is loaded into the RAM 204.

The ROM 203 stores the programs required for starting, such as an initial program loading (IPL). In the RAM 204, programs and data transferred from the CPU 202 are loaded through the bus 226, and the data required for operating the CPU 202, etc., are temporarily stored.

Touch panel drivers $205_1$, $205_2$, $205_3$, $205_4$, $205_5$, $205_6$, and $205_7$ drive touch panels 3A, $4A_1$, $5A_1$, 12A, 21A, 22A, and 23A, respectively, whereby touched positions, etc., on the touch panels 3A, $4A_1$, $5A_1$, 12A, 21A, 22A, and 23A are detected and supplied to the CPU 202 through the bus 201. In FIG. 23, the touch panel drivers $205_1$ to $205_7$ are collectively denoted by reference numeral 205.

LCD drivers $206_1$, $206_2$, $206_3$, $206_4$, $206_5$, $206_6$, and $206_7$ drive LCDs 3, $4_1$, $5_1$, 12, 21, 22, and 23, respectively, in response to signals supplied through the bus 201, whereby the LCDs 3, $4_1$, $5_1$, 12, 21, 22, and 23 display predetermined pictures. In FIG. 23, the LCD drivers $206_1$, $206_2$, $206_3$, $206_4$, $206_5$, $206_6$, and $206_7$ are collectively denoted by reference number 206.

An amplifier amplifies a picture signal output from a CCD camera 65, and supplies the amplified signal to an analog/digital (A/D) converter 210. An amplifier 208 amplifies an audio signal output from a digital/analog (D/A) converter 212, and outputs the amplified signal to a speaker 10 or an earphone/microphone jack 7. An amplifier 209 amplifies an audio signal input from the earphone/microphone jack 7 and supplies the amplified signal to the A/D converter 211.

The A/D converter 210 performs analog-to-digital conversion on the picture signal supplied in analog form from the amplifier 207, and supplies the obtained digital picture data to an image-encoded-data encoder/decoder, for example, an MPEG (Moving Picture Experts Group) encoder/decoder 213. The A/D converter 211 performs analog-to-digital conversion on the audio signal supplied in analog form from the amplifier 209, and supplies the obtained digital audio data to an audio-encoded-data encoder/decoder, for example, an ATRAC (Adaptive Transform Acoustic Coding) encoder/decoder 214. The D/A converter 212 performs digital-to-analog conversion on the audio data supplied in digital form from the ATRAC encoder/decoder 214, and supplies the obtained analog audio signal to the amplifier 208.

The picture-coding-data encoder/decoder 213 encodes the picture data supplied from the A/D converter 210 or the bus 201 in accordance with the MPEG standard, and outputs the obtained encoded data to the bus 201. The picture-coding data encoder/decoder 213 also decode the encoded data supplied from the bus 201 in accordance with the MPEG standard, and outputs the obtained picture data to the bus 201.

Also, the picture-coding-data encoder/decoder 213 can directly output, to the bus 201, the picture data which is supplied from the A/D converter 210, as required, without particularly processing it.

The ATRAC encoder/decoder 214 encodes the audio data which is supplied from the A/D converter or the bus 201 in accordance with the ATRAC standard, and outputs the obtained encoded data to the bus 201. Also, the ATRAC encoder/decoder 214 decodes the encoded data which is supplied from the bus 201 in accordance with the ATRAC standard, and outputs the obtained audio data to the bus 201 or the D/A converter 212.

Also, the ATRAC encoder/decoder 214 can directly output, to the bus 201, the audio data which is supplied from the D/A converter 212, as required, without particularly processing it.

A hard disk drive (HDD) 215 has a built-in hard disk (not shown). Under control of the CPU 202, the HDD 215 reads data (including a program) which is recorded on the hard disk and output the read data to the bus 201, and writes into the hard disk the data which is supplied from the bus 201.

A flash memory 216 is connected to the bus 201, and uses the bus 201 to store data that must be stored even if the main power of the PDA is turned off. Specifically, the flash memory 216 stores, for example, the internal state of the PDA just before the main power of the PDA is turned off. Accordingly, when the main power of the PDA is turned on again, by referring to the stored content of the flash memory 216, the internal state of the PDA can be restored to the internal state of the PDA just before the main power of the PDA is turned off.

A dynamic RAM (DRAM) 217 temporarily stores data which is supplied through the bus 201, for example, picture data and audio data to be encoded, encoded picture data and audio data, etc.

A communication interface (I/F) 218 is connected to the bus 201, and functions as an interface for performing various types of communication such as a wireless type (including an infrared type other than a radio type) and wired type.

Specifically, the communication interface 218 performs the process required for communication, such as demodulation, on a received signal which is supplied from an antenna 64, and outputs the processed signal to the bus 201. Also, the communication interface 218 performs the process required for communication, such as demodulation, on data which is supplied through the bus 201, and supplies the obtained transmitting signal to the antenna 64.

The communication interface 218 performs a necessary process on received data which is supplied from a connector unit 8, and outputs the processed data to the bus 201. Also, the communication interface 218 performs a predetermined process on data supplied from the bus 201, and supplies the processed data to the connector unit 8.

The communication interface 218 performs a necessary process on received data which is supplied from the driver 219, and outputs the processed data to the bus 201. Also, the communication interface 218 performs a predetermined process on data supplied from the bus 201, and supplies the processed data to a driver 219.

The driver 219, a photo-receiving unit 220, and an emitting unit 221 constitute a wireless communication section 63. The driver 219 drives the photo-receiving unit 220 in response to data supplied from the communication interface 218, and supplies the communication interface 218 with data which is extracted from a signal supplied from the photo-receiving unit 220. The photo-receiving unit 220 receives, for example, infrared radiation, and supplies the driver 219 with an electric signal in accordance with the received amount. The emitting unit 221 is driven by the driver 219 to emit, for example, infrared radiation.

A battery 222 supplies necessary power to the blocks constituting the PDA 101.

An input interface 223 is connected to the bus 201, and functions as an interface for responding to external operation inputs. Specifically, the input interface 223 receives and outputs, to the bus 201, signals from an operation unit 224 and a switch unit 225.

The switch unit 225 includes switches for detecting the open/close state of the cover unit 20, and the open/close states of the sub-panels 15 and 16. The switch unit 225 supplies the input interface 223 with signals in response to the open/close states of the cover unit 20, and the sub-panels 15 and 16.

The operation unit 224 includes the job dial 6, the hold switch 61, and the power-supply switch 62, which are shown in FIG. 7, etc., and supplies the input interface 223 with operations signals in response to their operation.

Figure 24:
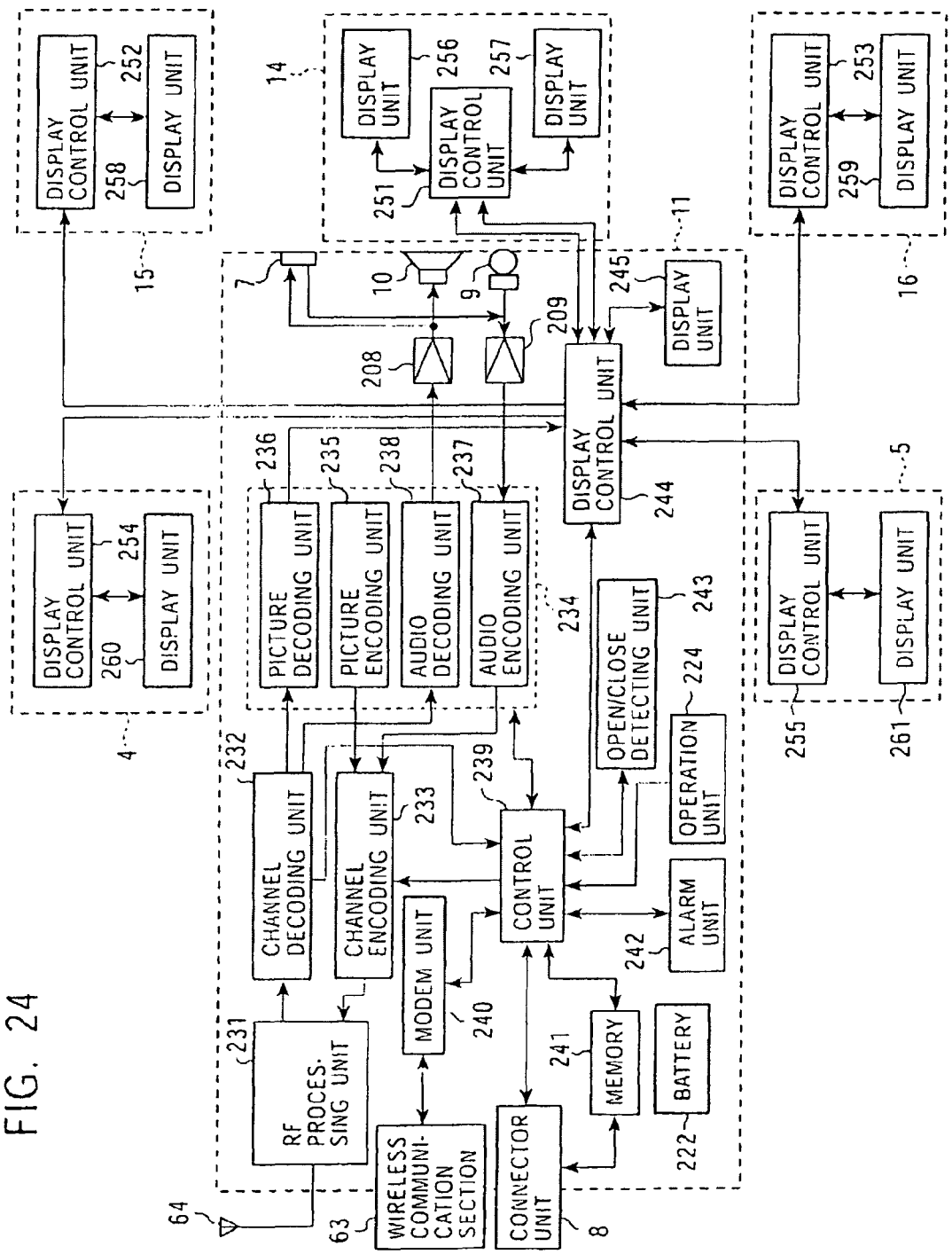
FIG. 24 is a block diagram showing the functional structure of the PDA 101.

Next, FIG. 24 shows the functional structure of the PDA 101. Portions corresponding to those in the hardware structure in FIG. 23 of the PDA 101 are denoted by identical reference numerals, as needed.

In a radio frequency (RF) processing unit 231, an RF signal as a received signal which is supplied from the antenna 64 is demodulated and output to a channel decoding unit 232. The RF processing unit 231 obtains an RF signal by modulating a signal which is supplied from the channel encoding unit 233, and supplies the RF signal to the antenna 64.

The channel decoding unit 232 performs channel decoding on the signal supplied from the RF processing unit 231, and supplies the decoded signal to an encode/decode unit 234 and a control unit 239. The channel encoding unit 233 supplies the RF processing unit 231 with a signal which is obtained by performing channel encoding on a signal supplied from the encode/decode unit 234 or the control unit 239.

The RF processing unit 231, the channel decoding unit 232, and the channel encoding unit 233 correspond to the communication interface 218 in FIG. 23.

The encode/decode unit 234 includes a picture encoding unit 235, a picture decoding unit 236, an audio encoding unit 237, and an audio decoding unit 238.

Under control of the control unit 224, the picture encoding unit 235 encodes the picture data which is supplied from the control unit 224, and supplies the encoded data to the control unit 224 or the channel encoding unit 233. The picture decoding unit 236 decodes encoded picture data which is supplied from the channel decoding unit 232 or the control unit 239, and supplies the decoded data to the control unit 239 or a display control unit 244. The audio encoding unit 237 encodes audio data which is supplied from the amplifier 209 or the control unit 239, and supplies the encoded data to the channel encoding unit 233 or the control unit 239. The audio decoding unit 239 decodes encoded audio data which is supplied from the channel decoding unit 232 or the control unit 239, and supplies the decoded data to the speaker 208 or the control unit 239.

The encode/decode unit 234 corresponds to the picture-coding-data encoder/decoder 213 and the ATRAC encoder/decoder 214 which are shown in FIG. 23, and is realized such that the CPU 202 executes a program.

The control unit 239 is realized such that the CPU 202 in FIG. 23 executes a program, and performs exchange of data by using the connector unit 8, processes in response to operation signals from the operation unit 224, and other processes (including control of the blocks constituting the PDA 101) of various types.

A modem 240 modulates data which is supplied from the control unit 239, and supplies the modulated data to the wireless communication section 63. Also, the modem 240 demodulates a signal which is supplied from the wireless communication section 64, and supplies the demodulated signal to the control unit 239. The modem 240 corresponds to the communication interface 218 in FIG. 23.

A memory 241 stores data, etc., which is supplied from the control unit 239, and also supplies the stored data to the control unit 239. In this embodiment, the memory 241 is connected not only to the control unit 239, but also to the connector unit 8. The memory 241 corresponds to the flash memory 216, the DRAM 217, etc., which are shown in FIG. 23.

An alarm unit 242 monitors, for example, the remaining capacity of the battery 222. When the battery 222 is in a so-called "low-battery state", the alarm unit 242 notifies the control unit 239 of the low-battery state. The alarm unit 242 is realized such that, for example, the CPU 202 in FIG. 23 executes a program.

An open/close detecting unit 243 detects the opening and closing of the cover unit 20, and the opening and closing of the sub-panels 15 and 16, and supplies the detected result to the control unit 239. The open/close detecting unit 243 corresponds to the switch unit 225 in FIG. 23.

The display control unit 244 controls a display unit 245 to display a picture controlled by the control unit 239, and a picture supplied from the picture decoding unit 236. Also, the display control unit 244 detects an operation on a button or the like which is displayed on the display unit 245, and supplies the control unit 239 with an operation signal in response to the operation. In addition, the display control unit 244 supplies a signal from the control unit 239 to display control units 251, 252, 253, 254, and 255, as needed, and supplies the control unit 239 with signals from the display control units 251, 252, 253, 254, and 255.

The display control unit 244 corresponds to the touch panel driver 205 and the LCD driver 206, which are shown in FIG. 23. This applies to the display control units 251 to 255, which are described later.

The display unit 245 displays the picture in response to control by the display control unit 244. Also, it detects an operation on the displayed screen and supplies the display control unit 244 with a signal representing the operated position on the screen. The display unit 245 corresponds to the LCD 11 and the touch panel 12A (FIG. 10, etc.) which are integrated with the main unit 11.

A display control unit 251 controls a display unit 256 or 257 to display a picture in accordance with a control signal supplied from the control unit 239 through the display control unit 244. Also, it detects an operation on a button or the like which is displayed on the display unit 256 or 257, and supplies an operation signal in response to the operation to the control unit 239 through the display control unit 244. Under control of the display control unit 251, the display units 256 and 257 display pictures, detect operations on the displayed screens, and supply the display control unit 251 with signals representing the operated positions on the screens. The display unit 256 corresponds to the LCD 3 and the touch panel 3A (FIG. 7, etc.) which are integrated with the main panel 14, and the display unit 257 corresponds to the LCD 21 and the touch panel 21A (FIG. 10, etc.) which are integrated with the main panel 14.

The display control unit 252 controls a display unit 258 to display a picture in accordance with a control signal supplied from the control unit 239 through the display control unit 244. Also, it detects an operation on a button or the like which is displayed on the display unit 258, and supplies an operation signal corresponding to the operation to the control unit 239 through the display control unit 244. The display unit 258 displays a picture in accordance with control by the display control unit 252, detects an operation on the displayed screen, and supplies the display control unit 252 with a signal representing the operated position on the displayed screen. The display unit 258 corresponds to the LCD 22 and the touch panel 22A (FIG. 10, etc.) which are integrated with the sub-panel 15.

The display control unit 254 controls the display unit 259 to display a picture in accordance with a control signal supplied from the control unit 239 through the display control unit 244. Also, it detects an operation on a button or the like which is displayed on the display unit 259, and supplies an operation signal corresponding to the operation to the display control unit 244 through the control unit 239. The display unit 259 displays a picture in response to control by the display control unit 253, detects an operation on the displayed screen, and supplies the display control unit 253 with a signal representing the operated position on the screen. The display unit 259 corresponds to the LCD 253 and the touch panel 23A (FIG. 10, etc.) which are integrated with the sub-panel 16.

The display control unit 254 controls the display unit 260 to display a picture in accordance with a control signal supplied from the control unit 239 through the display control unit 244, detects an operation on a button or the like displayed on the display unit 260, and supplies an operation signal corresponding to the operation to the control unit 239 through the display control unit 244. The display unit 260 displays a picture in accordance with control by the display control unit 254, detects an operation on the displayed screen, and supplies a signal representing the operated position on the screen to the display control unit 254. The display unit 260 corresponds to the LCD $4_1$ and the touch panel $4A_1$ (FIG. 10, etc.) which are integrated with the sub-panel 4.

The display control unit 255 controls the display unit 261 to display a picture in response to a control signal supplied from the control unit 239 through the control unit 239, detects an operation on a button or the like displayed on the screen, and supplies an operation signal corresponding to the operation to the control unit 239 through the display control unit 244. The display unit 260 displays a picture in accordance with control by the display control unit 255, detects an operation on the screen, and supplies the display control unit 255 with a signal representing the operated position on the screen. The display unit 261 displays a picture in accordance with control by the display control unit 255, detects an operation on the displayed screen, and supplies the display control unit 255 with a signal representing the operated position on the screen. The display unit 261 corresponds to the LCD $5_1$ and the touch panel $5A_1$ (FIG. 10, etc.) which are integrated with the sub-panel 5.

Figure 25:
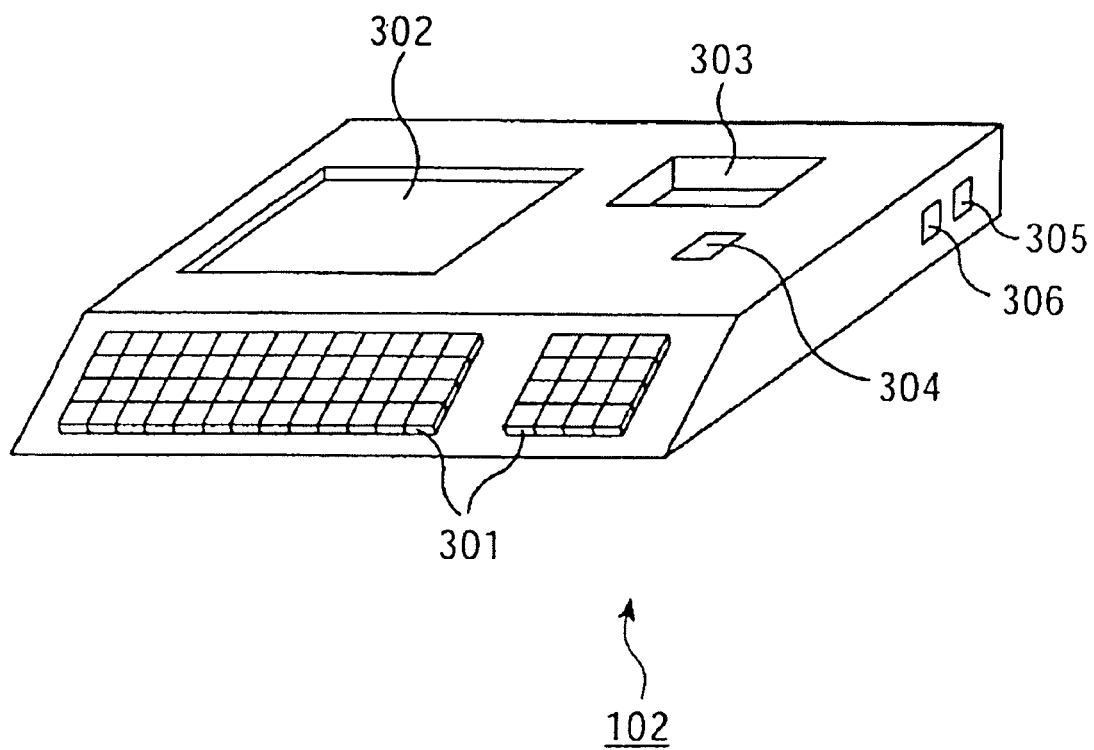
FIG. 25 is a perspective view showing an exterior example of a base station computer 102.

Next, FIG. 25 is a perspective view showing the exterior of the base station computer 102 shown in FIG. 22.

In the embodiment in FIG. 25, the base station computer 102 is almost planar, and its front part has a tapering shape having a predetermined taper angle. The tapering-shaped part has a user-operated keyboard 301 thereon.

The base station computer 102 has, for example, a display unit 302 formed by an LCD, on the slightly left side on its top surface. The display unit 302 can display various types of information.

Also, the base station computer 102 has a PDA slot 303 and a wireless communication unit 304 on the slightly right side.

The PDA slot 303 is a depression slot into which the main block 2 of the PDA 101 can be loaded. Inside the PDA slot 302, there is a connector unit 337 which is described later using FIG. 26. By loading the main block 2 of the PDA 101 into the PDA slot 303 so that the connector unit 8 (FIG. 7, etc.) opposes the bottom surface of the depression of the PDA slot 303, electric connection is established between the connector unit 8 of the main block 2 and the connector unit 337 of the PDA slot 303. This enables the PDA 101 (the main block 2) and the base station computer 102 to communicate with each other.

When communication with the PDA 101 is performed by using infrared radiation or the like, the wireless communication unit 304 transmits and receives the infrared radiation or the like.

In one embodiment in FIG. 25, the base station computer 102 has, on its right side, an IEEE (Institute of Electrical and Electronic Engineers) 1394 terminal 305 which is connected to another device when performing communication in accordance with the IEEE 1394 standard, and a USB (Universal Serial Bus interface) terminal 306 which is connected to another device when performing communication in accordance with the USB standard. A device in accordance with the IEEE 1394 standard, for example, a video camera or the like is connected to the IEEE 1394 terminal 305. Also, a device in accordance with the USB standard, for example, a mouse or the like is connected to the USB terminal 306.

Figure 26:
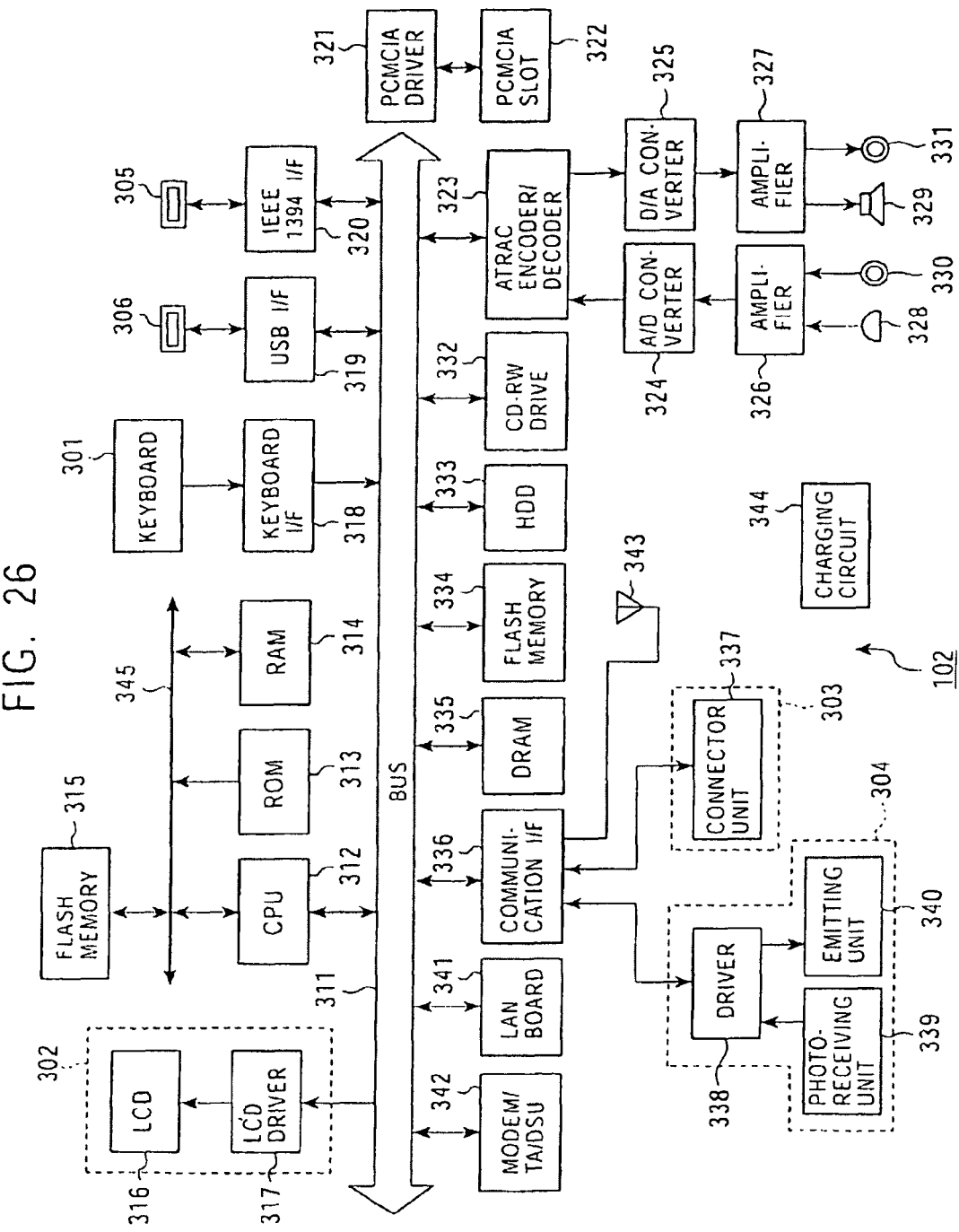
FIG. 26 is a block diagram showing the hardware structure of the base station computer 102.

Next, FIG. 26 shows the hardware configuration of the base station computer 102.

A CPU 312 is connected to a bus 311, and controls blocks connected to the bus 311. The CPU 312 is connected to a ROM 313, a RAM 314, and a flash memory 315 by a bus 345, and performs various processes including the above control by executing a program store in the ROM 313 and a program loaded into the RAM 314.

The ROM 312 stores the programs required for starting, such as an IPL program. Programs and data transferred from the CPU 312 are loaded, and the data required for operating the CPU 312, etc., are temporarily stored in the RAM 314. The flash memory 315 stores, for example, a basic input output system (BIOS) program. In other words, in this embodiment, the BIOS program is stored in the flash memory 315, which can be rewritten. This can easily cope with situations such as BIOS-version upgrading.

An LCD 316 and an LCD driver 317 constitute the display unit 302. The LCD driver 316 controls the LCD 316 to display a predetermined picture by driving the LCD 316 in accordance with a signal supplied through the bus 311.

A keyboard interface 318 functions as an interface between the keyboard 301 and the bus 311, and outputs, to the bus 311, operation signals corresponding to operations on the keyboard 311.

A USB interface 319 is a communication interface in accordance with the USB standard. The USB interface 319 receives data from the bus 311 and transmits the data from the USB terminal 306, and receives data from the USB terminal 306 and transmits the data to the bus 311. The IEEE 1394 interface 320 is a communication interface in accordance with the IEEE 1394 standard. The IEEE 1394 interface 320 receives data from the bus 311 and transmits the data from the IEEE 1394 terminal 305, and receives data from the IEEE 1394 terminal 305 and outputs the data to be bus 311.

A PCMCIA (Personal Computer Memory Card International Association) driver 321 is connected to the bus 311, and drives a PC card (not shown) loaded into a PCMCIA slot 322. For example, a flash memory or a hard disk, or a PC card, such as an SCSI card, a LAN card, or a modem card, can be loaded into the PCMCIA slot 322. In FIG. 25, the PCMCIA slot 322 is not shown.

An ATRAC encoder/decoder 323 performs encoding based on the ATRAC standard on audio data supplied from an A/D converter 324 or the bus 311, and outputs the obtained encoded data to the bus 311. Also, the ATRAC encoder/decoder 323 performs decoding based on the ATRAC standard on encoded data supplied from the bus 311, and outputs the obtained audio data to the bus 311 or the D/A converter 325.

The ATRAC encoder/decoder 323 is designed to directly output the audio data from the bus 311 to the D/A converter 325 and to directly output the audio data from the A/D converter 324 to the bus 311, as required.

The A/D converter 324 performs A/D conversion on an analog audio signal supplied from an amplifier 326, and supplies the obtained signal as digital audio data to the ATRAC encoder/decoder 326. The D/A converter 325 performs D/A conversion on the digital audio data supplied from the ATRAC encoder/decoder 323, and supplies the obtained data as an analog audio signal to an amplifier 327.

The amplifier 326 amplifies an audio signal input from a microphone 328 or a microphone jack 330, and supplies the signal to the A/D converter 324. The amplifier 327 amplifies an audio signal supplied from the D/A converter 325, and supplies the signal to an earphone jack 331.

The microphone 328 converts audio as an electric signal into an audio signal and supplies the audio signal to the amplifier 326. A speaker 329 outputs sound corresponding to the audio signal from the amplifier 327. A microphone or the like for inputting audio is connected to the microphone jack 330, and an earphone or the like for outputting audio is connected to the earphone jack 331. In FIG. 25, the microphone 328, the speaker 329, the microphone 330, and the earphone jack 331 are not shown.

A compact-disk-rewritable (CD-RW) drive 332 drives a CD-RW disk, which is not shown, writes data supplied from the bus 311 onto the CD-RW disk, and plays back data from the CD-RW disk and outputs the data to the bus 311.

A hard disk drive (HDD) 333 has a built-in hard disk (HD), which is not shown. Under control of the CPU 312, the HDD 333 reads and outputs data recorded on the HD to the bus 311, and writes data supplied from the bus 311 onto the hard disk.

A flash memory 334 and a dynamic random access memory (DRAM) 335 temporarily store data supplied by the bus 311.

A communication interface (I/F) 336 is connected to the bus 311, and functions as an interface for performing various types of communication such as wireless types and wired types.

Specifically, the communication interface 336 performs the processing required for communication, such as demodulation, on a received signal supplied from 344, and outputs the processed signal to the bus 311. Also, the communication interface 336 performs the processing required for communication, such as modulation, on data supplied by the bus 311, and supplies the obtained transmitting signal to an antenna 343.

The communication interface 336 performs necessary processing on data supplied form the connector unit 337 of the PDA slot 303, and outputs the processed data to the bus 311. Also, the communication interface 336 performs predetermined processing on data supplied through the bus 311, and outputs the processed data to the connector unit 337.

The communications interface 336 receives and performs necessary processing on data supplied from a driver 338, and outputs the processed data to the bus 311. Also, the communication interface 336 performs predetermined processing on data supplied through the bus 311, and supplies the processed data to the drive 338.

As described above, the connector unit 337 is provided on the bottom of the depression part (slot) as the PDA slot 303, and includes one or more connectors which are connected to one or more connectors of the connector unit 8 (FIG. 7, etc.) of the PDA 101.

The driver 338, a photo-receiving unit 339, an emitting unit 340 constitute a wireless communication section 304. The driver 338 drives the emitting unit 340 in response to data supplied from the communication interface 338, and supplies the communication interface 336 with data which is extracted from a signal supplied from the photo-receiving unit 339. The photo-receiving unit 339 receives, for example, infrared radiation, and supplies the driver 338 with an electric signal in accordance with the received amount of radiation. The emitting unit 340 is driven by the driver 338 to emit, for example, infrared radiation.

When a local area network (LAN) such as the Ethernet (registered trademark) is formed, a LAN cable is connected to a LAN board 341. The LAN board 341 transmits and receives data between the LAN cable and the bus 311. A telephone line, such as a public switched telephone network (PSTN) line or an integrated services digital network (ISDN) line, is connected to a modem/TA (terminal adapter)/DSU (digital service unit) 342. The modem/TA/DSU 342 transmits and receives data between the telephone line and the bus 311.

The 343 transmits data from the communication interface 336 in the form of radio waves, receives transmitted radio waves, and supplies the received radio waves to the communication interface 336. The antenna 343 is used for transmission and reception of radio waves for radio communication based on, for example, Bluetooth (registered trademark) or another specification. In FIG. 25, the antenna 343 is not shown.

A charging circuit 344 is used, when the PDA 101 is loaded into the PDA slot 303, to charge the battery 222 (FIGS. 23, 24) of the PDA 101.

Figure 27:
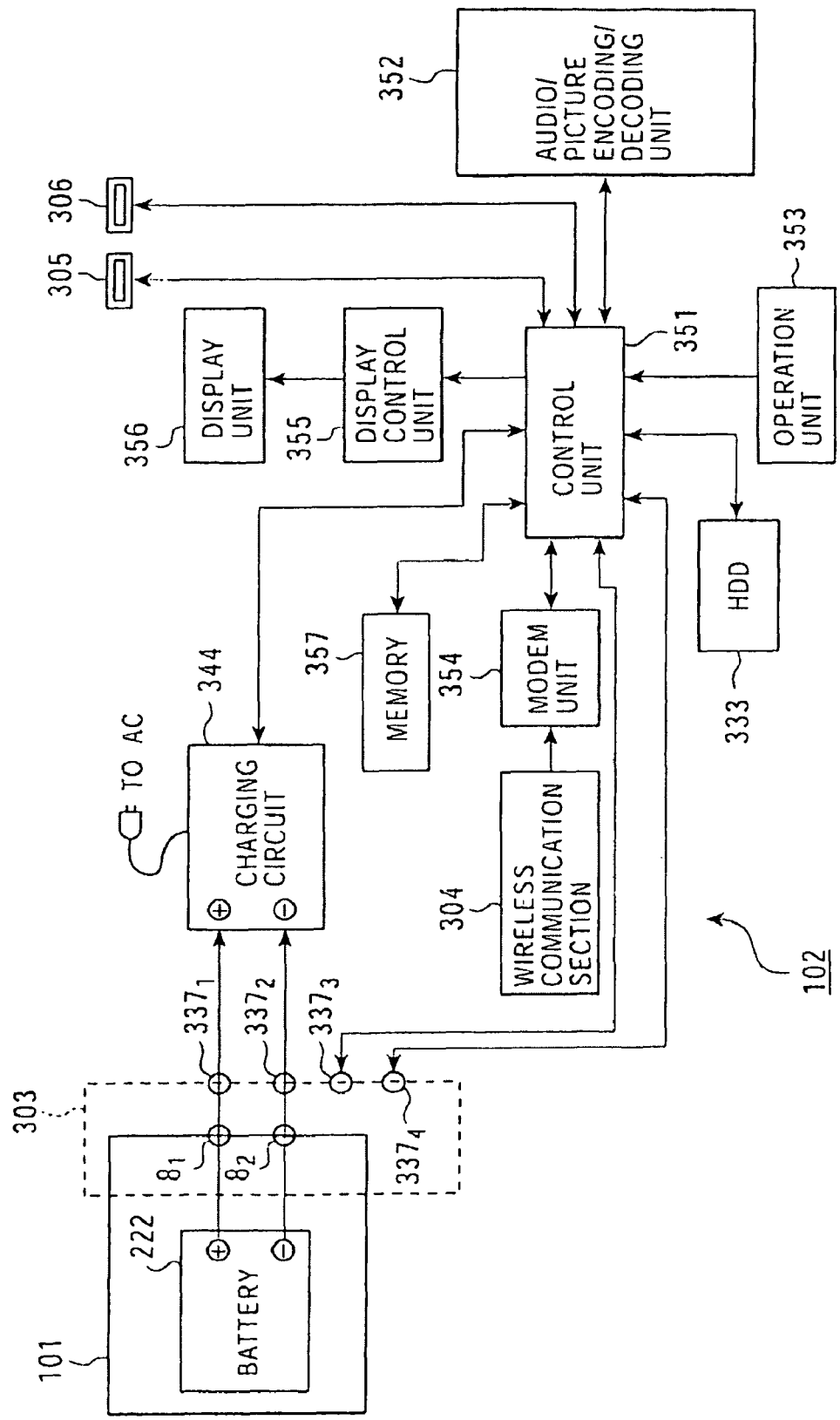
FIG. 27 is a block diagram showing the functional structure of the base station computer 102.

Next, FIG. 27 shows the functional structure of the base station computer 102. Portions corresponding to those in the hardware structure in FIG. 26 of the base station computer 102 are denoted by identical reference numerals, if need.

A control unit 351 is realized such that the CPU 312 in FIG. 26 executes a program, and performs various processes (including control of blocks constituting the base station computer 102).

Specifically, the control unit 351 performs, for example, a process in response to an operation signal from the operation unit 353. The control unit 351 supplies picture data and audio data to an audio/picture encoding/decoding unit 352, and controls it to encode the picture data and the audio data. The control unit 351 supplies the audio/picture encoding/decoding unit 352 with, for example, the encoded picture and audio data, and controls it to decode the encoded data. Also, the control unit 351 supplies a modem unit 354 with, for example, data to be transmitted in wireless form, and receives data supplied from the modem unit 354. The control unit 351 supplies a display control unit 355 with, for example, picture data to be displayed. The control unit 351 supplies and stores, in memory 357, data that must be retained, and reads necessary data from the memory 357. The control unit 351 transmits and receives necessary data by using, for example, connectors $337_3$ and $337_4$, etc., among one or more connectors constituting the connector unit 337 of the PDA slot 303, the IEEE 1394 terminal 305, and the USB terminal 306. The control unit 351 writes data and reads necessary data by, for example, controlling the HDD 333. The control unit 351 controls, for example, the charging circuit 344.

The audio/picture encoding/decoding unit 352 encodes picture data and audio data supplied from the control unit 351, and supplies the encoded data to the control unit 351. Also, the audio/picture encoding/decoding unit 352 decodes encoded data supplied from the control unit 351, and supplies the resultant picture data and audio data to the control unit 351.

The audio/picture encoding/decoding unit 352 corresponds to the ATRAC encoder/decoder 323 in FIG. 26, and is realized such that the CPU 312 executes a program.

The modem unit 354 modulates data supplied from the control unit 351, and supplies the modulated data to the wireless communication section 304. Also, the modem unit 354 demodulates a signal supplied from the wireless communication section 304, and supplies the demodulated signal to the control unit 351. The modem unit 354 corresponds to the communication interface 336 in FIG. 26.

The display control unit 355 performs display control that controls the display unit 356 to display picture data supplied from the control unit 351. The display control unit 355 corresponds to the LCD driver 317 in FIG. 26.

The display unit 356 performs displaying in accordance with display control by the display control unit 355. The display unit 356 corresponds to the LCD 316 in FIG. 26.

The memory 357 stores data, etc., supplied from the control unit 351, and supplies the stored data to the control unit 351. The memory 357 corresponds to the flash memory 334 and the DRAM 335, etc., in FIG. 26.

In FIG. 27, connectors $337_1$, $337_2$, $337_3$, and $337_4$ constitute the connector unit 337 of the PDA slot 303. The connectors $337_1$ and $337_2$ are connected to the positive and negative terminals of the charging circuit 344, respectively. The connectors $337_3$ and $337_4$ are connected to the control unit 351.

The positive and negative terminals of the battery 222 in the PDA 101 are respectively connected to connectors $8_1$ and $8_2$ among one or more connectors constituting the connector unit 8 (FIG. 23) in the PDA 101.

When the PDA 101 is loaded into the PDA slot 303, the connectors $8_1$ and $8_2$ can be electrically connected to the connectors $337_1$ and $337_2$, respectively. Accordingly, when the PDA 101 is loaded into the PDA slot 303, the charging circuit 344 in the base station computer 102 charges the battery 222 in the PDA 101 by using the connectors $8_1$ and $337_1$, and the connectors $8_2$ and $337_2$.

Next, the connection between the PDA 101 and the base station computer 102 in a case in which the PDA 101 is loaded into the PDA slot 303 of the base station computer 102 is described below with reference to FIG. 28.

Figure 28:
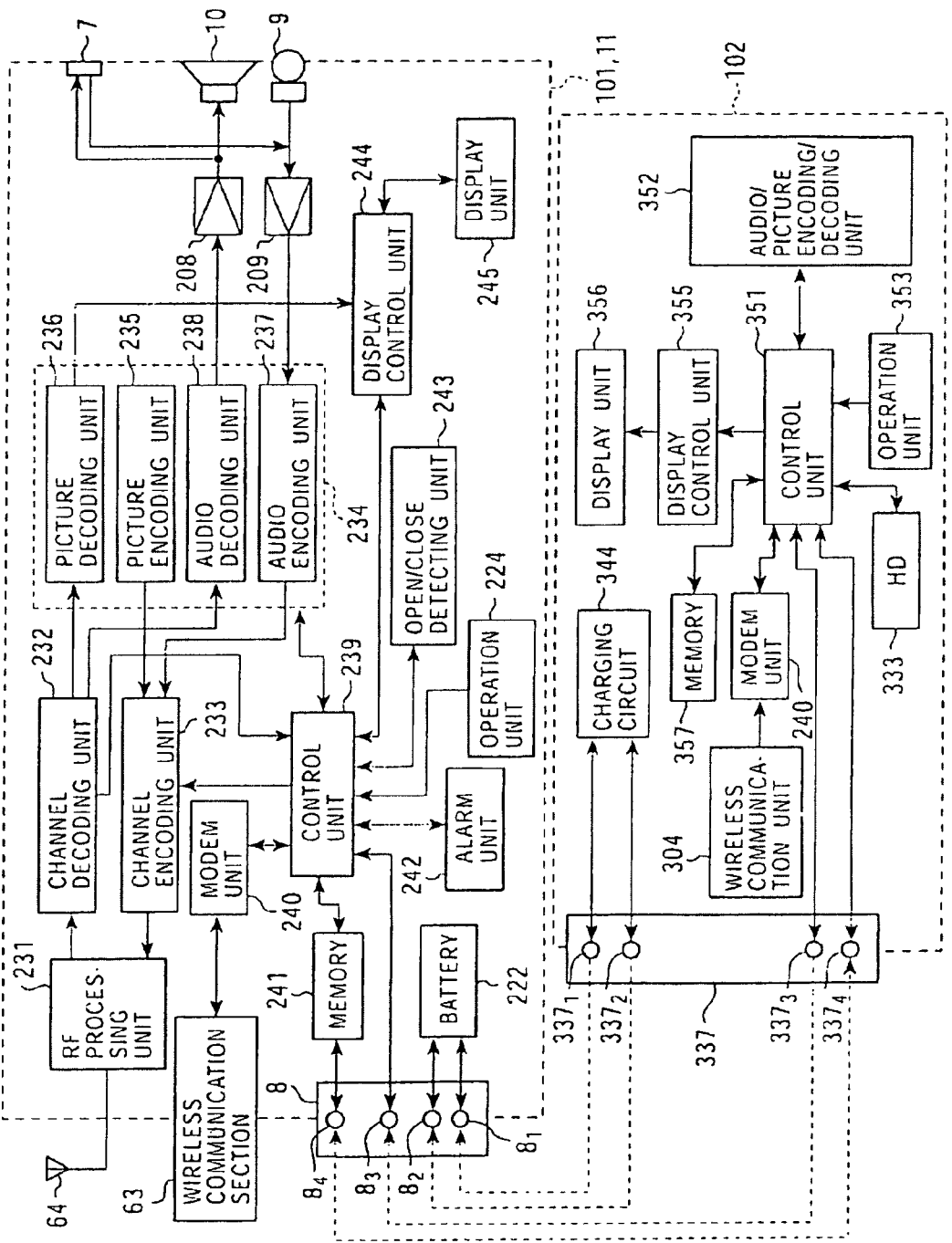
FIG. 28 is a block diagram showing a state in which the PDA 101 and the base station computer 102 are connected to each other.

As shown in FIG. 28, the connector unit 8 of the PDA 101 includes connectors $8_3$ and $8_4$ other than the connectors $8_1$ and $8_2$. The connector $8_3$ is connected to the control unit 239, and the connector $8_4$ is connected to the memory 241.

When the PDA 101 is loaded into the PDA slot 303 of the base station computer 102, the connectors $337_3$ and $337_4$ of the PDA 101 are connected to the connectors $337_3$ and $337_4$ of the base station computer 102, respectively.

As described above, in the base station computer 102, both the connectors $337_3$ and $337_4$ of the base station computer 102 are connected to the control unit 351. Thus, the connector $8_3$ included in the connector unit 8 of the PDA 101 is connected to the control unit 351 of the base station computer 102 by the connector $337_3$, and the connector $8_4$ included in the connector unit 8 is connected to the control unit 351 of the base station computer 102.

As a result, the control unit 239 connected to the connector $8_3$ in the PDA 101 is electrically connected to the control unit 351 of the base station computer 102 by the connectors $8_3$ and $337_3$.

Accordingly, the control unit 239 of the PDA 101 and the control unit 351 of the base station computer 102 become able to exchange data. By sending a request to the control unit 351 of the base station computer 102, the control unit 239 of the PDA 101 can perform reading and writing of data in the memory 357 of the base station computer 102. Conversely, by sending a request to the control unit 239 of the PDA 101, the control unit 351 of the base station computer 102 can perform reading and writing of data in the memory 241 of the PDA 101.

Also, the control unit 351 of the base station computer 102 uses the connectors $337_4$ and $8_4$ to perform direct reading and writing of data in the memory 241 of the PDA 101 without using the control unit 239 of the PDA 101.

In other words, when the PDA 101 is loaded into the PDA slot 303 of the base station computer 102, the memory 241 of the PDA 101 can function as part of the base station computer 102. This enables the control unit 251 of the base station computer 102 to access the memory 241 of the PDA 101 as if it were part of the memory 357 of the base station computer 102.

When the PDA 101 and the base station computer 102 are connected by using the connector units 8 and 337, another block of the PDA 101 can be controlled to function as part of the base station computer 102. In other words, for example, the control unit 239 of the PDA 101 can be controlled to function as part of the control unit 351 of the base station computer 102.

The PDA 101 shown in FIG. 23 is designed to perform telephone calling in audio form with the other PDA 103 and the communication terminals (FIG. 22). Specifically, when the functional mode of the PDA 101 is set to be a telephone mode for audio calling by telephone, the PDA 101 performs the calling process and the call-out process shown in FIG. 29.

At first, the calling process is described below with reference to flowchart (A) in FIG. 29.

In the calling process, in Step S1, the communication interface 218 (FIG. 23) is on standby, with the communication mode set to be the control channel mode.

The types of the communication mode include a calling channel mode that can perform audio transmission and reception with a base station (not shown) or the like by using a calling channel, a data channel mode that can perform data transmission and reception by using a data transmitting/receiving channel, and a control channel mode (so-called "standby mode") that performs only exchange of a pilot signal and other control data by using a control channel for controlling without performing transmission and reception by using another channel. In Step S1, the calling mode is set to be the control channel mode.

After that, when some event occurs, such as a case in which control data representing a call-in is transmitted through a control channel, or a case in which an operation signal representing a performed operation of requesting a call-out is supplied from the operation unit 224 or the like, the process proceeds to Step S2, and the communication interface 218 determines whether a call-in has occurred.

In other words, the communication interface 218 monitors the data of the control channel always received from the antenna 64. In Step S2, based on the data of the control channel, the communication interface 218 determines whether the call-in has occurred.

In Step S2, if the communication interface 218 has determined that the call-in has occurred, it supplies a message representing the determination to the CPU 202 through the bus 201. When receiving the message, the CPU 202 controls the speaker 10 to output ring tone by using the bus 201, the ATRAC encoder/decoder 214, the D/A converter 212, and the amplifier 208 before proceeding to Step S3.

In Step S3, the communication interface 218 switches the communication mode from the control channel mode to a calling channel mode using a calling channel on which audio transmission and reception are performed, and proceeds to Step S4. In Step S4, the CPU 202 determines whether the operation unit 224 or the like has been operated by the user so that an on-hook state is activated. If the CPU 202 has determined negatively, it returns to Step S1.

Conversely, if the CPU 202 has determined in Step S4 that the operation unit 224 or the like has been operated so that the on-hook state is activated, the CPU 202 proceeds to Step S5. In Step S5, the communication interface 218 establishes a link to a call-in side, and performs audio-data transmission and reception for calling in audio form.

In this construction, sound input to the microphone 9 is transmitted from the antenna 64 after passing through the amplifier 209, the A/D converter 211, the ATRAC encoder/decoder 214, the bus 201, and the communication interface 218. Sound transmitted in radio waves is received by the antenna 64 and is output from the speaker 10 through the communications interface 218, the bus 201, the ATRAC encoder/decoder 214, the D/A converter 212, and the amplifier 208.

After that, proceeding to Step S6, the CPU 202 determines whether to finish calling, that is, whether the user of the PDA 101 has operated the operation unit 224 so that the on-hook state is activated, or whether the other side is in an on-hook state. If the CPU 202 has determined not to finish calling, it returns to Step S5.

If the CPU 202 has determined to finish calling, the communication interface 218 breaks the link to the call-in side, and returns to Step S1.

In Step S2, if it is determined that no call-in is found, the process proceeds to Step S7, and the communication interface 218 determines whether an event (hereinafter referred to also as a "call-out event") requesting a call-out has occurred.

The occurrence of the call-out event is described below with reference to the flowchart (B) in FIG. 29.

In Step S7, if it is determined that no call-out event has occurred, the process returns to Step S1, and identical steps are repeatedly performed.

In Step S7, if it is determined that a call-out event has occurred, the process proceeds to Step S8. In Step S8, the communication interface 218 switches the communication mode from the control channel mode to the calling channel mode, and transmits, from the antenna 64, the telephone number of a destination which is supplied together with the call-out event.

After that, when the other side corresponding to the telephone number is in an of-hook state, the communication interface 218 establishes a communication link to the other side, and proceeds to Step S9. In Step S9, similarly to the case in Step S5, the communication interface 218 performs audio-data transmission and reception for calling in audio form.

After that, proceeding to Step S10, the CPU 202 determines whether to finish calling similarly to the case in Step S6. If the CPU 202 has determined not to finish the calling, it returns to Step S9.

In Step S10, if the CPU 202 has determined to finish the calling, the communication interface 218 breaks the link to the other side, and returns to Step S1.

Next, a call-out process is described below with reference to the flowchart (B) in FIG. 29.

The HDD 215 (or the flash memory 216) in the PDA 101 (FIG. 23) stores a telephone number list on which telephone numbers recorded by the user beforehand are correlated with the names of those corresponding to the telephone number. In a telephone mode, by operating the operation unit 224 so that the telephone number list is displayed, the call-out process is started.

Specifically, in the call-out process, in Step S21, the CPU 202 uses the bus 201 to read the telephone number list stored in the HDD 215 and to supply the list to the LCD driver 206, and proceeds to Step S22.

In Step S22, the LCD driver 206 controls the LCD 3, $4_1$, 12, 21, 22, or 23 to display the telephone number list from the CPU 202.

The LCD 3, $4_1$, 12, 21, 22, or 23 is hereinafter referred to as the "LCD 3".

After that, when the user selects a telephone number from the telephone number list displayed on the LCD 3, the process proceeds to Step S23, and the CPU 202 recognizes the selected telephone number as a telephone number to be called out.

The LCD 3 can display the telephone number list, with a cursor. This cursor is used to designate a telephone number on the telephone number list, and can be moved to change telephone numbers for designation when the job dial 6 (FIG. 7, etc.) as the operation unit 224 (FIG. 23). The telephone number designated by the cursor is confirmed as the selected telephone number by pressing the jog dial 6.

Accordingly, when the user rotates the jog dial 6, moves the cursor to the position of the telephone number of a destination to be called, and pressing the jog dial 6, the telephone number (the telephone number being designated by the cursor) is recognized in Step S23.

When the telephone number list contains a large number of telephone numbers, it is difficult for the LCD 3 to display all the telephone numbers. In this case, by rotating the jog dial 6, telephone numbers out of the screen can be scrolled and displayed.

Also, regarding telephone number selection, in addition to operating the jog dial 6, by directly touching a telephone number on the telephone number list which is displayed on the LCD 3, the displayed telephone number can be selected. In other words, when the user touches a telephone number on the telephone number list which is displayed on the LCD 3, the touched position is detected by the touch panel 3A and the touch panel driver 205, and the telephone number corresponding to the touched position is recognized as the user-selected telephone number.

When the CPU 202 recognizes the user-selected telephone number in Step S23, it proceeds to Step S24. The CPU 202 correlates the telephone number with a call-out event (message representing a call-out event), supplies the telephone number to the communication interface 218, and terminates the call-out process.

Figure 29:
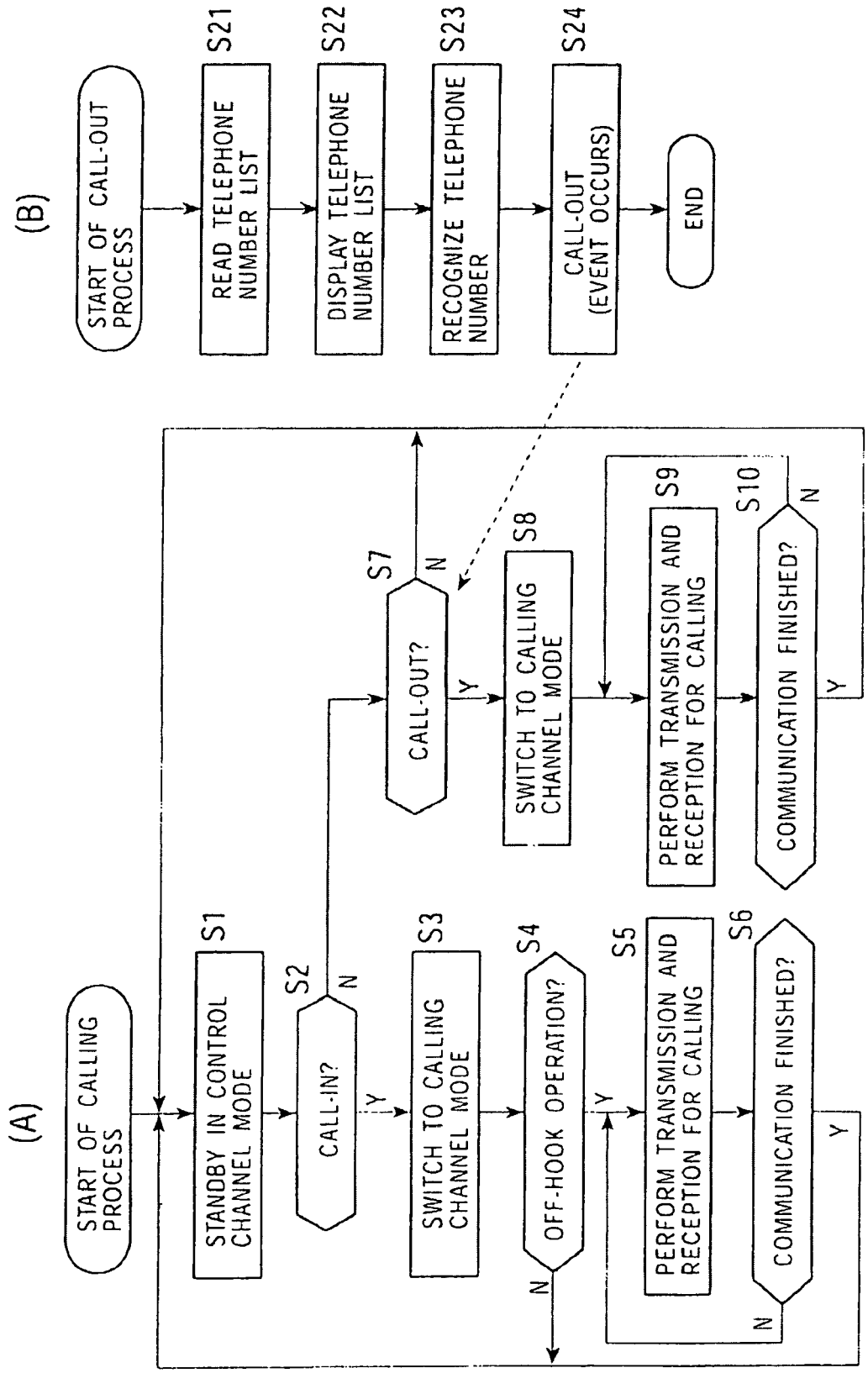
FIG. 29 consists of flowcharts respectively illustrating a calling process and a call-out process which are performed by the PDA 101.

As described using the flowchart (A) in FIG. 29, the communication interface 218 detects the occurrence of the call-out event in Step S7, and calls out the telephone number correlated with the call-out event.

Although the communication interface 218 calls out the telephone number which is selected from the telephone number list by the user, the call-out telephone number may be directly input by the user.

Figure 36:
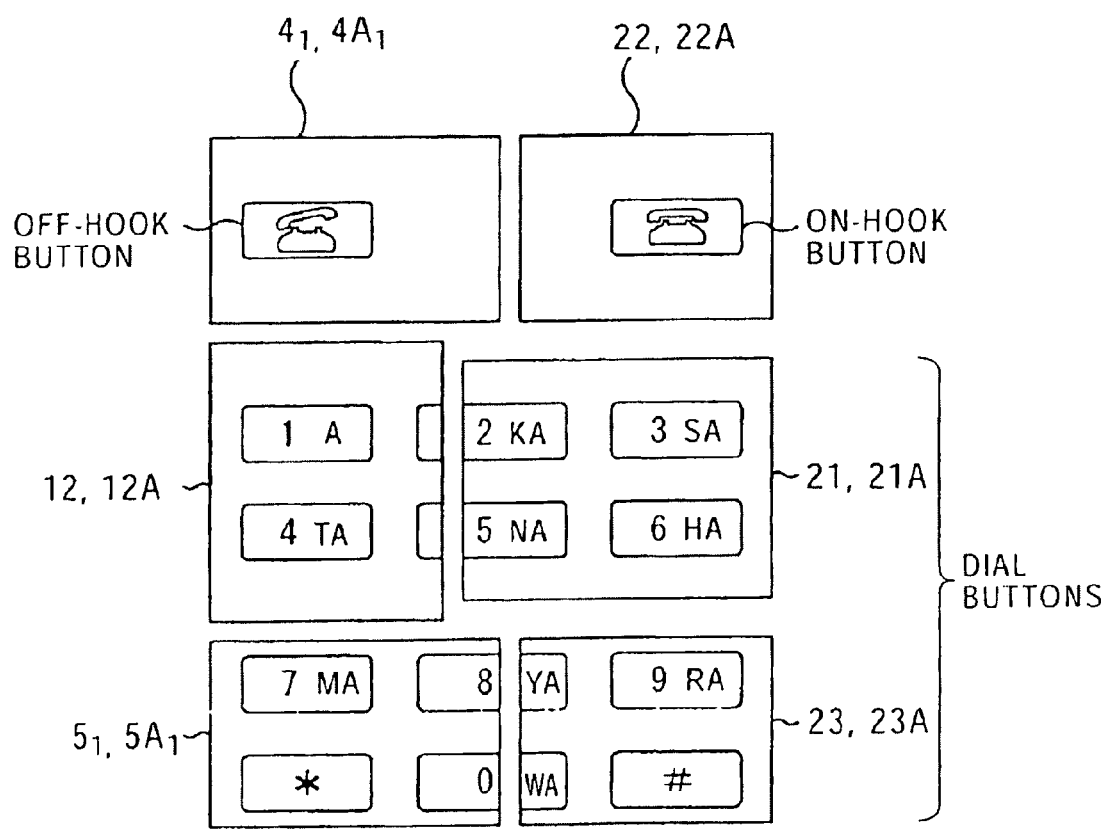
FIG. 36 is an illustration of examples of screens displayed on LCDs $4_1$, $5_1$, 12, and 21 to 23.

As shown in FIG. 2, or FIG. 36 which is described later, the LCD 3 is controlled to display dial buttons for inputting a telephone number. An operation on the dial buttons is detected by the touch panel 3A, $3A_1$, $5A_1$, 12A, and 21A, 22A, or 23A (hereinafter referred to as the "touch panel 3A"), and the touch panel driver 205, and a telephone number corresponding to the detected operation can be called out.

Figure 30:
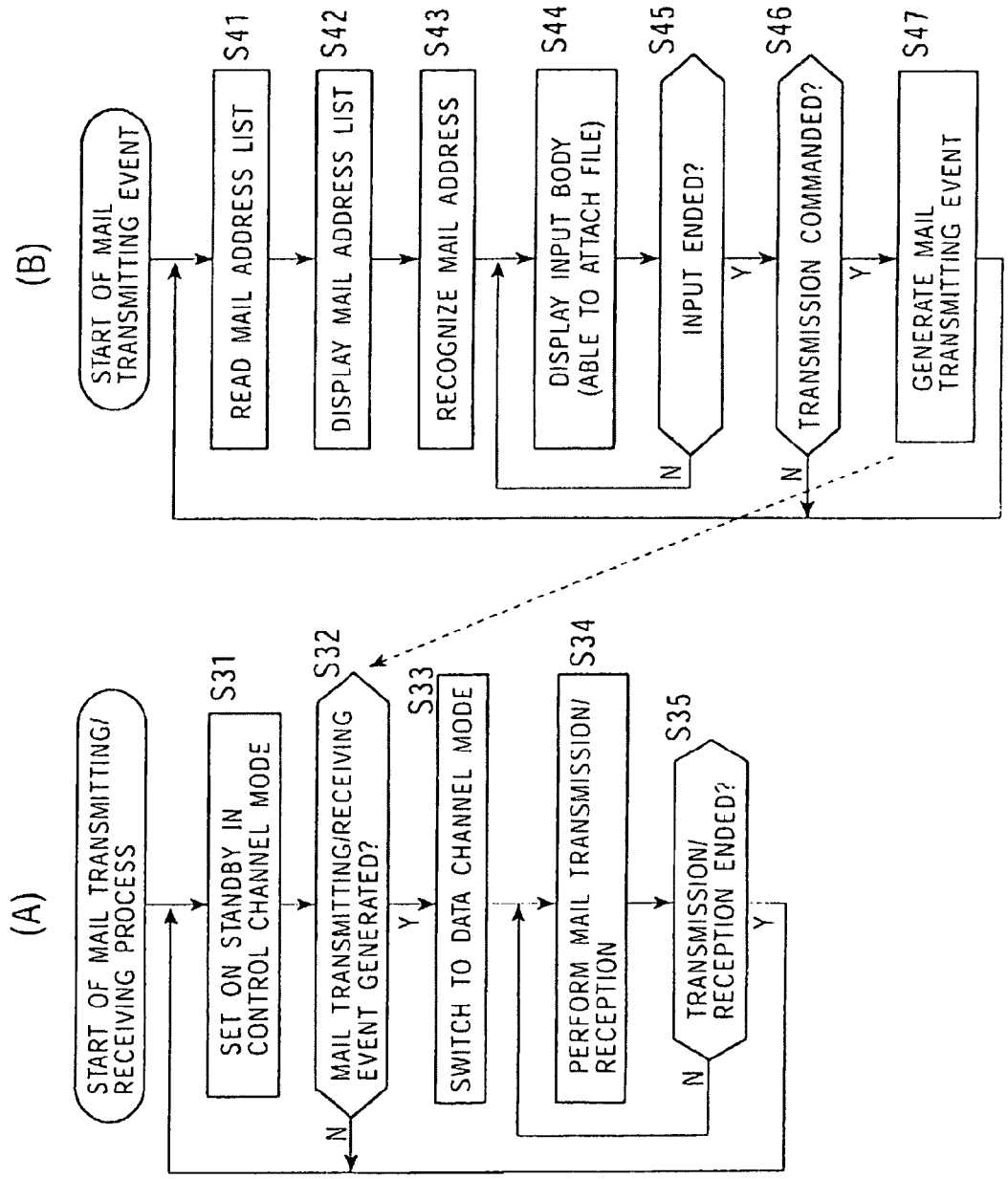
FIG. 30 consists of flowcharts respectively illustrating a mail transmission/reception process and a mail-transmitting event process which are performed by the PDA 101.

Next, the PDA 101 in FIG. 23 can perform electronic mail transmission and reception with the other PDA 103, the communication terminal 106 (FIG. 22), the public network 104, and a computer on the Internet. When the functional mode of the PDA 101 is set to be an electronic mail mode, the PDA 101 performs a mail transmission/reception process and a mail-transmitting-even process which are shown in the flowcharts of FIG. 30.

At first, the mail transmission/reception process is described below with reference to the flowchart (A) of FIG. 30.

In the mail transmission/reception process, in Step S31, the communication interface 218 (FIG. 23) is set on standby, with the communication mode set to be control channel mode.

After that, the occurrence of some event causes the process to proceed to Step S32, and the communication interface 218 determines whether the event is one (hereinafter referred to also as a "mail transmitting/receiving event") related to transmission or reception of electronic mail.

In this process, the communication interface 218 monitors data on the control channel which is always received by the antenna 64, and generates a mail receiving event, for example, when control data representing electronic mail transmission is transmitted to the communication interface 218. Also, when being supplied with an operation signal from the operation unit 224 which indicates a performed operation requesting electronic mail transmission, the CPU 202 generates a mail transmitting event. The mail transmitting event and the mail receiving event are collectively referred to as mail transmitting/receiving events.

In Step S32, if it is determined that the generated event is not the mail transmitting/receiving event, the process returns to Step S31.

In Step S32, if it is determined that the generated event is the mail transmitting/receiving event, the process proceeds to Step S33. The communication interface 218 switches the communication mode from the control channel mode to the data channel mode that can perform data transmission and reception by using the data transmitting/receiving channel, and proceeds to Step S34. In Step S34, the communication interface 218 establishes a communication link to (a mail server) of a base station which is not shown, and performs transmission and reception of electronic mail data.

By way of example, when the mail transmitting/receiving event is an event type (mail receiving event) indicating that the control data representing electronic mail transmission has been transmitted through the control channel, the communication interface 218 requests electronic mail from (the mail server of) the base station, and uses the antenna 64 to receive electronic mail data transmitted from the base station.

Also, for example, when the mail transmitting/receiving event is an event type (mail transmitting event) indicating that the performed operation requesting electronic mail transmission has been supplied from the operation unit 224, the communication interface 218 uses the antenna 64 to transmit, to (the mail server of) the base station, electronic mail data supplied through the bus 201.

After that, the process proceeds to Step S35, and the CPU 202 determines whether transmission/reception of electronic mail data has ended, that is, whether all the data, stored in (the mail server of) the base station, of electronic mail addressed to the PDA 101 has been received, or whether all the data of the electronic mail requested for transmission has been transmitted.

In Step S35, if the CPU 202 has determined that transmission/reception of electronic mail data has not ended yet, it returns to Step S34, and transmission/reception of electronic mail data which has not transmitted/received yet is continuously performed.

Conversely, in Step S35, if the CPU 202 has determined that transmission/reception of electronic mail data has ended, it returns to Step S31, and repeatedly performs the same processing.

Next, the mail-transmitting-even process is described below with reference to the flowchart (B) of FIG. 30.

The HDD 215 (or the flash memory 216) in the PDA 101 (FIG. 23) stores, in addition to the above telephone number list, a mail address list on which electronic mail addresses recorded by the user beforehand are correlated with the names of other parities corresponding to the electronic mail addresses. In an electronic mail mode, by operating the operation unit 224 so that the mail address list is displayed, the mail-transmitting-event process is started.

Specifically, in the mail-transmitting-event process, in Step S41, the CPU 202 uses the bus 201 to read the mail address list stored in the HDD 215, uses the bus 210 to supply the real list to the LCD driver 206, and proceeds to Step S42.

In Step S42, the LCD driver 206 controls the LCD 3 to display the mail address list form the CPU 202.

After that, when the user selects an electronic mail address from the mail address list displayed on the LCD 3, the process proceeds to Step S43, and the CPU 202 recognizes the selected address as an electronic mail destination.

Here, the display of the mail address list by the LCD 3, and the electronic mail address selection from the mail address list are respectively performed similarly to the cases described using FIG. 29 of displaying the telephone number list and selecting the telephone number. Similarly, to the telephone number described using FIG. 29, the user may directly input the electronic mail address.

The mail address list and the telephone number list can be combined to form a single list, that is, a list on which users' names are correlated with their electronic mail addresses and telephone numbers.

After recognizing the electronic mail address as an electronic mail destination, the CPU 202 proceeds to Step S44 on receiving input text to be used as the body of the electronic mail. The CPU 202 controls the LCD 3 to display the input text by using the bus 201 to control the LCD driver 206.

The input of the text to be used as the body of the electronic mail is performed such that the user performs the operations of rotating and pressing the job dial 6 (FIG. 7, etc.) as the operation unit 224. The performed operation of rotating the jog dial 6 causes the CPU 202 to control the LCD driver 206, whereby characters to be input are displayed on the LCD 3, with the cursor. Also, when the cursor is designating a character, and the jog dial 6 is pressed, the CPU 202 confirms the designated character as a text input.

Also, the input of the text to be used the body of the electronic mail can be also performed, for example, such that the user operates a button or the like displayed on the LCD 3. Specifically, the CPU 202 causes the LCD 3 to display buttons for inputting characters by controlling the LCD driver 206. Touching by the user of a button displayed on the LCD 3 causes the touch panel 3A and the touch panel driver 205 to detect the touched button, and a character corresponding to the button is confirmed as a text input.

Regarding the electronic mail, designation of an electronic mail address as a so-called "carbon copy", and designation of a file to be attached to electronic mail, etc., can be performed. When such designation is performed, in Step S44, the LCD 3 displays a screen reflecting the designation.

Also, regarding the electronic mail, similarly to the input of the text, already input text can be edited. When the operation unit 224 is operated so as to perform such editing, in Step S44, the LCD 3 displays a screen reflecting the edited content.

After that, proceeding to Step S45, the CPU 202 determines whether the user has operated the operation unit 224 in order to end the input of the text. If the CPU 202 has determined that the operation has been performed, it proceeds to Step S44.

In Step S45, if the CPU 202 has determined that the user has operated the operation unit 224 in order to end the input of the text, it proceeds to Step S46, and the CPU 202 determines whether the user has operated the operation unit 224 in order to command transmission of electronic mail containing the input body.

In Step S46, if it is determined that transmission of electronic mail has not been commanded, the process returns to Step S41 when the user operates the operation unit 224 in order to display the mail address list.

In this case, the electronic mail is stored in, for example, the HDD 215, and after that, it is transmitted with arbitrary timing or in response to a user's instruction.

Conversely, in Step S46, if it is determined that transmission of electronic mail is commanded, that is, when the operation unit 224 supplies the CPU 202 with an operation signal requesting transmission of electronic mail, the process proceeds to Step S47. The CPU 202 supplies a mail transmitting event to the communication interface 218 through the bus 201, and returns to Step S41 when the user operates the operation unit 224 in order to display the mail address list.

Figure 31:
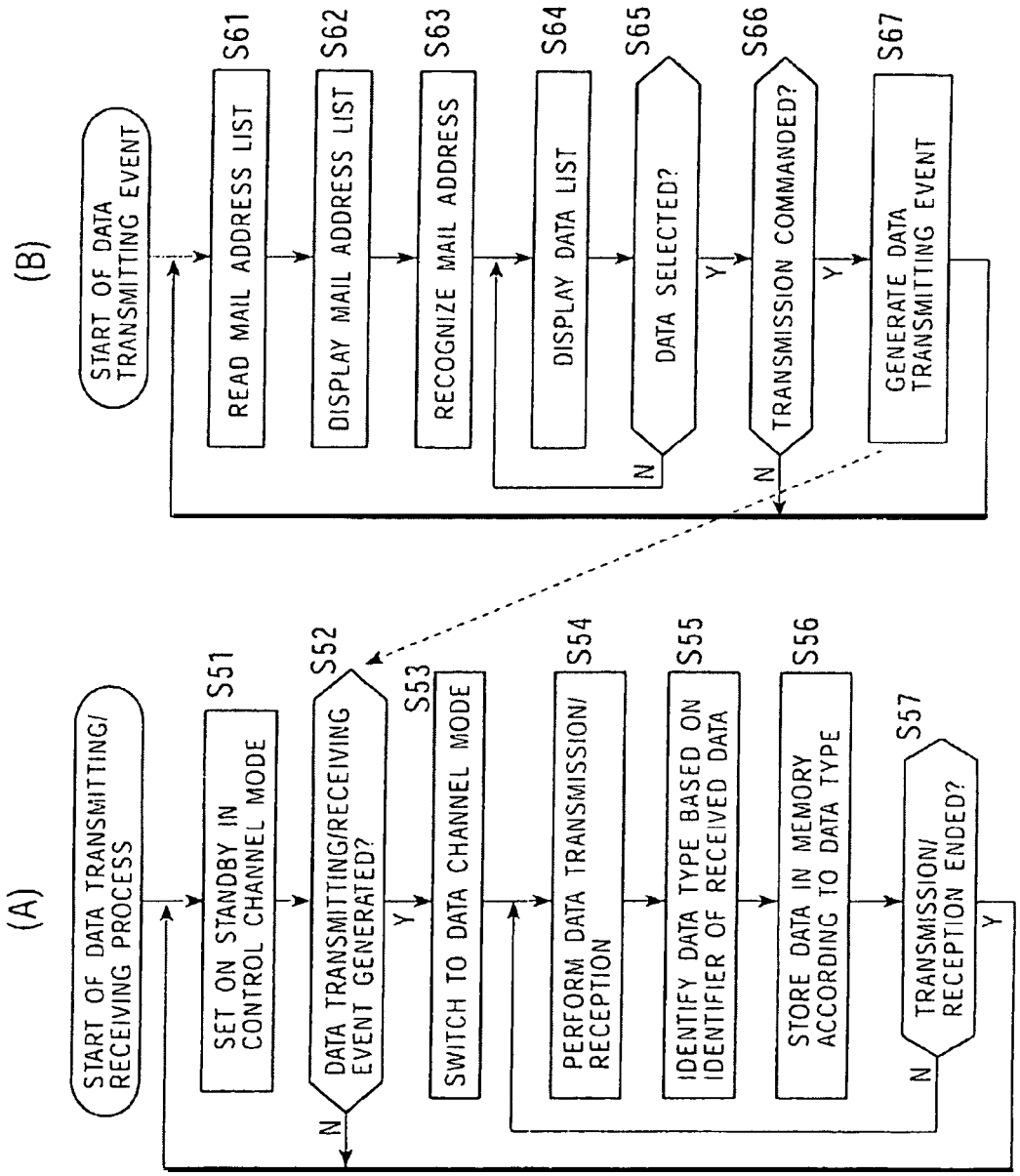
FIG. 31 consists of a data transmission/reception process and a data-transmitting-event process which are performed by the PDA 101.

As described using the flowchart (A) of FIG. 31, the communication interface 218 detects the generation of the mail-transmitting event in Step S32, and transmits the electronic mail.

In Step S45, if it is determined that the input of text to be used as the body of the electronic mail has ended, the CPU 202 causes the electronic mail to include the electronic mail address of the user of the PDA 101 as a sender. The electronic mail address of the user of the PDA 101 can be stored in the HDD 215 such that the user operates the operation unit 224.

The PDA 101 in FIG. 23 can transmit and receive data such as binary data. The PDA 101 can use a base station to perform data transmission and reception, and can perform direct data transmission and reception with the other PDA 103 and the communicatable communication terminal 106 (FIG. 22) without using the base station. When the functional mode of the PDA 101 is set to be the data mode for performing transmission and reception of various types of data with the other PDA 103 and the communicatable communication terminal 106, the PDA 101 performs the data transmitting/receiving process and data transmitting event process shown in FIG. 31.

At first, the data transmitting/receiving process is described below with reference to the flowchart (a) of FIG. 31.

In the data transmitting/receiving process, in Step S51, the communications interface 218 (FIG. 23) is set to be on standby, with the communication mode set to be the control channel mode.

After that, when some even occurs, the process proceeds to Step S52, and the communication interface 218 determines whether the event is one (hereinafter referred to as the "data transmitting/receiving event") related to transmission or reception of data.

The communication interface 218 monitors data on the control channel which is always received by the antenna 64. For example, when control data representing the transmission of the data is transmitted, the communication interface 218 generates a data receiving event. Also, when the operation unit 224 supplies the CPU 202 with an operation signal representing a performed operation of requesting data transmission, the CPU 202 generates a data-transmitting event. The data-transmitting event and the data receiving event are collectively referred to as "data transmitting/receiving event".

In Step S52, if it is determined that the generated event is not a data transmitting/receiving event, the process returns to Step S51.

In Step S52, when the generated event is a data transmitting/receiving event, the process proceeds to Step S53. The communication interface 218 switches the communication mode from the control channel mode to a data channel mode using a data channel, and proceeds to Step S54. In Step S54, the communication interface 218 performs data transmission and reception with the other PDA 103.

Accordingly, when the data transmitting/receiving event is, for example, one (data receiving even) indicating that control data representing the transmission of data has been transmitted through the control channel, the communication interface 218 uses the antenna 64 to receive data transmitted through the data channel from the other PDA 103.

Also, when the data transmitting/receiving event is, for example, one (data transmitting event) indicating that an operation signal representing a performed operation of requesting data transmission has been supplied, the communication interface 218 uses the antenna 64 to transmit the data supplied by the bus 201 to the other PDA 103.

Here, data transmission and reception between the PDA 101 and the other PDA 103 are performed in radio waves by the antenna 64. However, the data transmission and reception between the PDA 101 and the other PDA 103 can be performed in infrared form by using, for example, the wireless communication unit 63. Also, the communication between the PDA can be performed, not only in non-contact form using radio waves and infrared radiation (and other types of electromagnetic radiation), as described above, but also in wired form (contact state), by using the connector unit (FIG. 23).

When the data is received in Step S54, steps S55 and S56 are sequentially performed. When the data is transmitted, the process skips over steps S55 and S56 and proceeds to Step S57.

In Step S55, the CPU 202 identifies the type of the data received by the communication interface 219. Specifically, in this embodiment, data includes a data identifier which represents a data type among picture data, audio data, program data, etc., and which represents an encoding type when the data is encoded. In Step S55, by referring to a data identifier included in the data received by the communication interface 218, the CPU 202 identifies the data type.

Proceeding to Step S56, the CPU 202 transfers the data received by the communication interface 218 to the HDD 215 through the HDD 215, and controls the HDD 215 to store the data before proceeding to Step S57.

In this embodiment, data is stored for each data type, for example, with it separated in different directories or folders.

In this embodiment, data is stored as a file.

Here, the received data is stored in the HDD 215. However, the data can be stored in the flash memory 216 or the DRAM 217.

When the received data is, for example, picture or audio data which is not encoded, the picture or audio data can be stored in the HDD 215 after being encoded. Encoding of the picture data can be performed by the picture-coding-data encoder/decoder 213. Encoding of the audio data can be performed by the ATRAC encoder/decoder 214. Also, the picture data and the audio data can be encoded in another encoding method such that the CPU 202 executes a program.

In Step S57, the CPU 202 determines whether the transmission or reception of the data has ended, that is, whether the PDA 101 has received all the data transmitted from the other PDA 103, or whether the PDA 101 has received all the data requested to be transmitted.

In Step S57, if the CPU 202 has determined that the data transmission of reception has not ended, it returns to Step S54, and continuously performs transmission or reception of data that has not been transmitted or received.

In Step S57, if the CPU 202 has determined that the data transmission or reception has ended, it returns to Step S51, and repeatedly performs the same processing.

Next, the data transmitting event is described below with reference to the flowchart (B) of FIG. 31.

In the data mode, the user operates the operation unit 224 so that the mail address list is displayed, whereby the data transmitting event is started.

In the data transmitting event process, steps S61 to S63 are performed which are respectively identical to steps S41 to S43 in the flowchart (B) of FIG. 30. This causes the CPU 202 to recognize an electronic mail address as a destination of data.

In the data transmitting event, the electronic mail address is employed as information indicating the destination of data. However, when the destination can be specified by, for example, an Internet protocol (IP) address, a media access control (MAC) address, a user identification (ID), or the like, such information can be used as data-destination address.

After that, proceeding to Step S64, by creating a data list, and supplying the data list to the LCD driver 206 through the bus 201, the CPU 202 displays the data list on the LCD 3.

In other words, the CPU 202 accesses the HDD 215, and acquires, the file names of files of, for example, picture data, audio data, programs, etc. The CPU 202 creates a data list containing the file names in list form, and displays the data list on the LCD 3.

After displaying the data list on the LCD 3, the CPU 202 proceeds to Step S65, and determines whether some data (a file name here) is selected from the data list by the user.

Regarding the data list, similarly to the case of selecting a telephone number from the telephone number list, and the case of selecting an electronic mail address from the mail address list, by operating the jot dial 6 (FIG. 7, etc.) as the operation unit 224, the user can select data (file name) from the data list. In Step S65, the CPU 202 determines whether some data is selected from the data list, as described above.

In Step S65, when it is determined that no data is selected, the process proceeds to Step S64, and repeatedly performs the same processing.

In Step S65, if it is determined that data is selected, the process proceeds to Step S66, and the CPU 202 determines whether the user has operated the operation unit 224 in order to command transmission of the data (hereinafter referred to as the "selected data") determined in Step S65 to be selected.

In Step S66, if it is determined that the transmission of the selected data is not commanded, the process returns to S61 when the user operates the operation unit 224 in order to display the mail address list.

In Step S66, if it is determined that the transmission of the selected data is commanded, that is, when the operation unit 224 supplies the CPU 202 with an operation signal requesting the transmission of the selected data, the process proceeds to Step S67. The CPU 202 supplies the data transmitting event through the bus 201, and returns to Step S61 when the user operates the operation unit 224 in order to display the mail address list.

As described using the flowchart (A) of FIG. 31, in Step S52, the communication interface 218 detects the generation of the data transmitting event, and transmits the selected data.

The transmission of the selected data is performed by using the electronic mail address recognized in Step S63 in the flowchart (B) of FIG. 31 as a destination.

The PDA 101 in FIG. 23 can play back picture data and audio data recorded (stored) in the HDD 215. Specifically, when the functional mode of the PDA 101 is set to be a data playback mode for playing back picture data or audio data, the PDA 101 perform the data playback process shown in the flowchart in FIG. 32.

In the HDD 215, data, obtained such that an encoder realized by executing a program by the picture-coding-data encoder/decoder 213 or the CPU 202 encodes pictured data captured by the CCD camera 65 (FIG. 23), can be recorded. Also, in the HDD 215, data, obtained by executing a program by the ATRAC encoder/decoder 214 or the CPU 202 encodes audio data input from the earphone/microphone jack 7 or the microphone 9, can be recorded. In the HDD 215, encoded data of picture data and audio data received by the data transmitting/receiving process (described using the flowchart (a) of FIG. 31) can be recorded.

Figure 32:
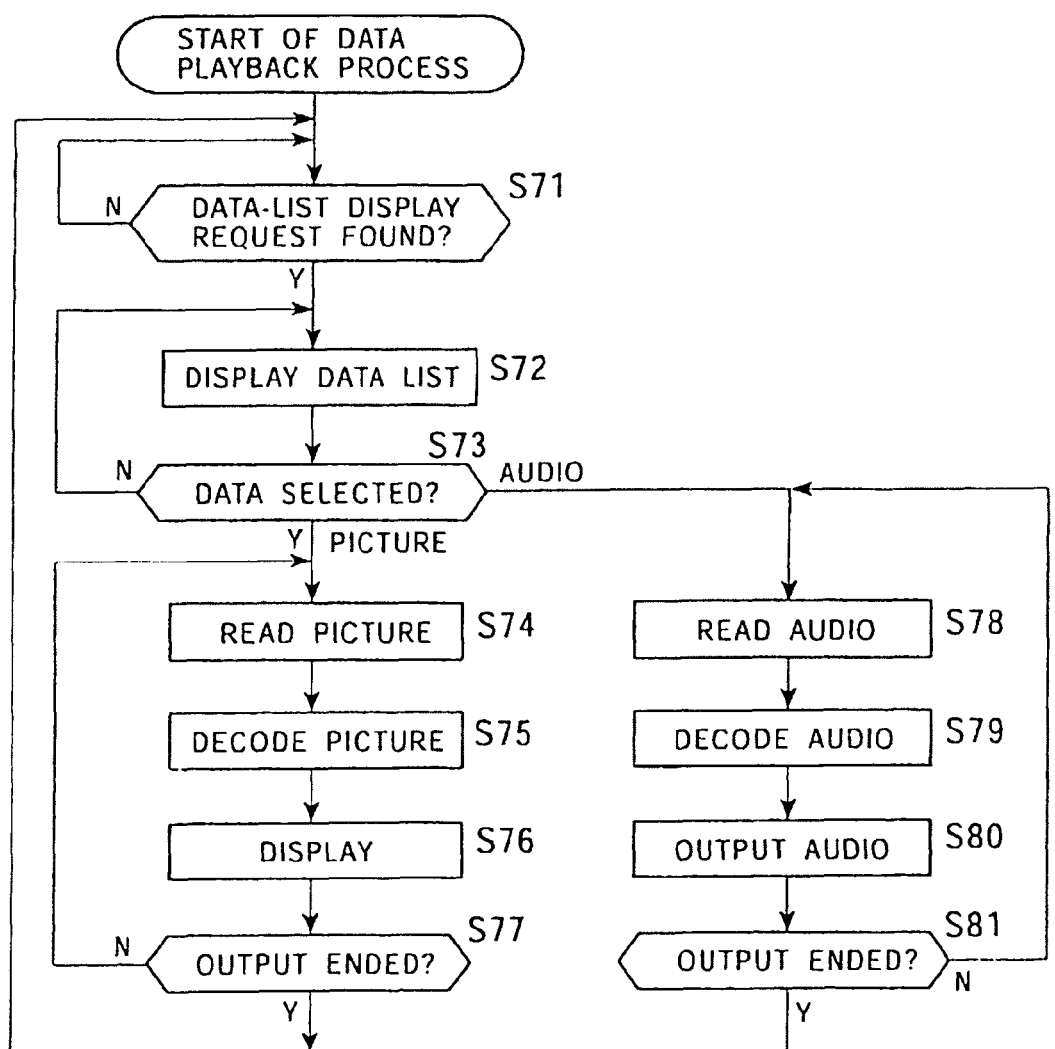
FIG. 32 is a flowchart illustrating a data playback process performed by the PDA 101.

In the data playback process shown in FIG. 32, the data recorded in the HDD 215, as described above, is played back.

In this data playback mode, in Step S71, the CPU 202 determines whether the user has operated the operation unit 224 in order to request the display of the data list. If the CPU 202 has determined that the operation has not been performed, it returns to Step S71.

In Step S71, if the CPU 202 has determined that the user has operated the operation unit 224 in order to request the display of the data list, it proceeds to Step S72. The CPU 202 creates the data list, and displays the data list on the LCD 3 by supplying it to the LCD driver 206 through the bus 201.

In other words, the CPU 202 accesses the HDD 215, and acquires the file names of files of picture data and audio data stored in the HDD 215. The CPU 202 creates a data list containing the file names in list form, and displays the data list on the LCD 3.

After the data list is displayed on the LCD 3, the CPU 202 proceeds to Step 73, determines, similarly to the case of Step S65 in the flowchart (B) of FIG. 31, whether some data is selected from the data list.

In Step S73, if it is determined that no data is selected, the process returns to Step S72, and repeatedly performs the same processing.

Also, in Step S73, if it is determined that data is selected, the CPU 202 determines which the selected data is between picture data and audio data. When the selected data is picture data, the process proceeds to Step S74. When the selected data is audio data, the process proceeds to Step S78.

In Step S74, the CPU 202 reads, from the HDD 215, (the file of) the picture data determined in Step S73 to be selected, and proceeds to Step S75. In Step S75, the CPU 202 performs a decoding process on the read picture data.

In other words, the picture data stored in the HDD 215 has encoded form, and in Step S75, the encoded picture data is decoded.

Here, the decoding of the picture data is performed by a decoder realized such that the picture-coding-data encoder/decoder 213 or the CPU 202 executes a program.

After decoding the picture data in Step S75, the CPU 202 proceeds to Step S76, and displays the picture on the LCD 3 by supplying the decoded data to the LCD driver 206 through the bus 201.

After that, proceeding to Step S77, the CPU 202 determines whether playback of all the picture data determined in Step S73 to be selected has ended. If the CPU 202 has determined that the playback has not ended, it returns to Step S74, and repeatedly performs the same processing. In other words, these continue playing back the picture data.

In Step S73, if the CPU 202 has determined that playback of all the picture data determined in Step S73 to be selected has ended, it returns to Step S71, and repeatedly performs the same processing.

Also, in Step S78, the CPU 202 reads, from the HDD 215, (the file of) the audio file determined in Step S73 to be selected, and proceeds to Step S79. In Step S79, the CPU 202 performs a decoding process on the audio data read from the HDD 215.

In other words, the audio data stored in the HDD 215 has encoded form, as described above. In step S79, the encoded audio data is decoded.

The decoding of the audio data is performed by a decoder realized such that the ATRAC encoder/decoder 214 or the CPU 201 executes a program.

After decoding the audio data in Step S79, the CPU 202 proceeds to Step S80, and outputs the audio data by supplying the data to the earphone/microphone jack 7 or the speaker 10 through the bus 201, the ATRAC encoder/decoder 214, the D/A converter 212, and the amplifier 208.

After that, proceeding to Step S81, the CPU 202 determines whether playback of all the audio data determined in Step S73 to be selected has ended. If the CPU 202 has determined that the playback has not ended, it returns to Step S78, and repeatedly performs the same processing. In other words, these continue playing back the audio data.

In Step S81, if the CPU 202 has determined that the playback of all the audio data has ended, it returns to Step S71, and repeatedly performs the same processing.

In this embodiment, the picture data or the audio data stored in the HDD 215 is played back. In addition, when programs are installed in the HDD 215 after being downloaded from servers or the like (not shown) on the Internet 105 (FIG. 22), in Step S72, a data list including the file names of the programs can be displayed, and when one of the programs is selected by the user, the selected program can be executed by the CPU 202.

When the data determined in Step S73 to be selected includes both picture data and audio data, the process of steps S74 to S77, and the process of steps S78 to S81 are performed in parallel.

Figure 33:
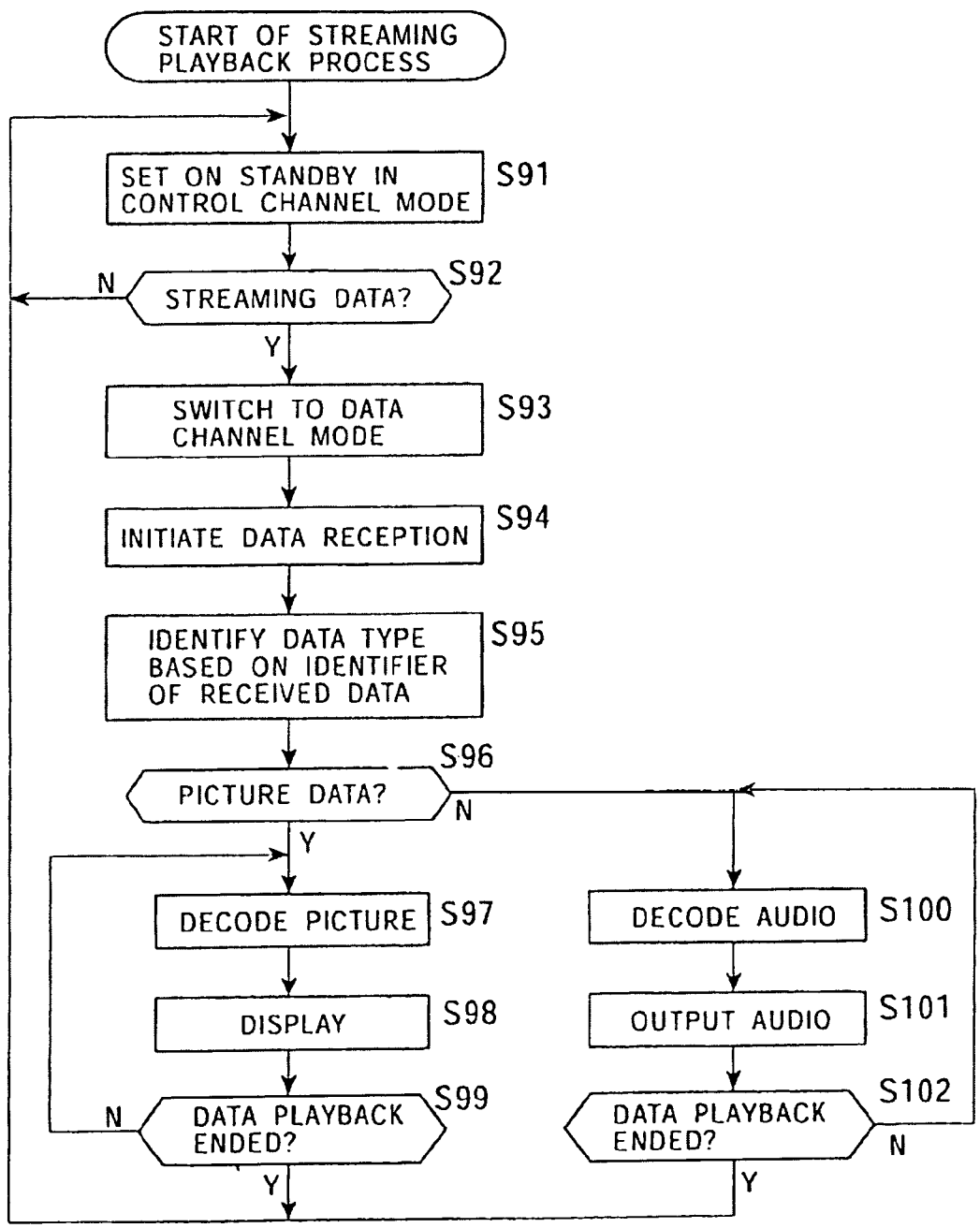
FIG. 33 is a flowchart illustrating a streaming playback process performed by the PDA 101.

The PDA 101 in FIG. 23 can perform streaming playback on picture data and audio data which are transmitted in a so-called "push-type delivery" from servers or the like (not shown) on the Internet 105 (FIG. 22) through the public network 104. In other words, when the functional mode of the PDA 101 is set to be a streaming playback mode for performing streaming playback, the PDA 101 performs the streaming playback process in FIG. 33.

In the streaming playback process, in Step S91, the communication interface 218 (FIG. 23) is set to be on standby, with the communication mode set to be the control channel mode.

After that, when control data indicating that some data is transmitted is transmitted through the control channel, the control data is received by the communication interface 218 through the antenna 64. Proceeding to Step S92, based on the control data, the communication interface 218 determines whether streaming playback data (hereinafter referred to as "streaming data") can be transmitted.

In Step S92, if it is determined that the streaming data is not transmitted, the process proceeds to Step S91, and repeatedly performs the same processing.

In Step S92, if it is determined that the streaming data is transmitted, the process proceeds to Step S93. The communication interface 218 switches the communication mode from the control channel mode to the data channel mode, and proceeds to Step S94. In Step S94, the communication interface 218 initiates receiving the streaming data which is transmitted through the data channel.

The streaming data received by the communication interface 218 is supplied through the bus 201 and temporarily stored in the DRAM 217.

When the DRAM 217 initiates storing the streaming data, the CPU 202 proceeds to Step S95, and identifies the data type of the streaming data. In other words, similarly to the case of describing the data transmitting/receiving process described using the flowchart (A) of FIG. 31, the streaming data includes a data identifier indicating the type of the streaming data. In Step S95, the CPU 202 identifies the data type by referring to the data identifier of the streaming data stored in the DRAM 217.

Proceeding to Step S96, the CPU 202 determines, based on the data type identified in Step S95, which the streaming data is between picture data and audio data.

In Step S96, if the CPU 202 has determined that the streaming data stored in the DRAM 217 is picture data, it proceeds to Step S97. The CPU 202 reads the picture data stored in the DRAM 217, and performs a decoding process on the picture data.

In other words, the streaming data has an encoded form based on, for example, MPEG or another encoding method. In Step S95, the encoded picture data is decoded.

The decoding of the picture data is performed by a decoder realized such that the picture-coding-data encoder/decoder 213 or the CPU 202 executes a program.

After decoding the picture data in Step S97, the CPU 02 proceeds to Step S98, and displays the picture data on the LCD 3 by supplying the picture data to the LCD driver 206 through the bus 201.

After that, proceeding to Step S99, the CPU 202 determines whether playback of all the streaming data (here, picture data) stored in the DRAM 217 has ended. If the CPU 202 has determined that the playback has not ended yet, it returns to Step S97, and continues to perform the decoding and display (playback) of the streaming data stored in the DRAM 217.

In Step S99, if the CPU 202 has determined that the playback of all the streaming data stored in the DRAM 217 has ended, it returns to Step S91, and repeatedly performs the same processing.

Also, in Step S96, if it is determined that the streaming data is audio data, the process proceeds to Step S100. The CPU 202 reads the audio data stored in the DRAM 217, and performs a decoding process on the audio data.

The streaming data has an encoded form based on, for example, the ATRAC or another encoding method. In Step S100, the encoded audio data is decoded.

The decoding of the audio data is performed by a decoder realized such that the ATRAC encoder/decoder 214 or the CPU 202 executes a program.

After decoding the audio data in Step S100, the CPU 202 proceeds to Step S101, and outputs the audio data by supplying the audio data to the earphone/microphone jack 7 or the speaker 10 through the bus 201, the ATRAC encoder/decoder 214, the D/A converter 212, and the amplifier 208.

After that, proceeding to Step S102, the CPU 202 determines whether playback of all the streaming data (here, audio data) stored in the DRAM 217 has ended. If the CPU 202 has determined that the playback has not ended yet, it returns to Step S100, and continues to perform the decoding and output (playback) of the streaming data stored in the DRAM 217.

In Step S102, if the CPU 202 has determined that the playback of all the streaming data stored in the DRAM 217 has ended, it returns to Step S91, and repeatedly performs the same processing.

When the streaming data include both picture data and audio data, the process of steps S97 and S99 and the process of steps S100 to S102 are performed in parallel.

The PDA 101 in FIG. 23 can exchange various types of data (files) with the base station computer 102 in FIG. 26.

The procedure of file exchange between the PDA 101 AND the base station computer 102 is described below with reference to FIGS. 34 and 35.

The file exchange between the PDA 101 (FIG. 23) and the base station computer 102 (FIG. 26) can be performed by any one of wireless communication using the antennas 64 and 343, wired communication using the connector units 8 and 337, and infrared communication using the wireless communication units 64 and 304. Here, by using the antennas 64 and 343 to perform wireless communication, file exchange is performed between the PDA 101 and the base station computer 102.

At first, a process for the case of transmitting a file from the PDA 101 to the base station computer 102 is described below with reference to FIG. 34.

The CPU 312 (corresponding to the control unit 351 in FIG. 27) of the base station computer 102 (FIG. 26) is on standby (A1) until the user operates the keyboard 301 (corresponding to the operation unit 353 in FIG. 27) to designate a file to be received from the PDA 10. The CPU 312 selects the designated file to be received from the PDA 101 (A2). At this time, the CPU 202 (corresponding to the control unit 239 in FIG. 24) of the PDA 101 (FIG. 23) is on standby in the control channel mode (B1).

Figure 34:
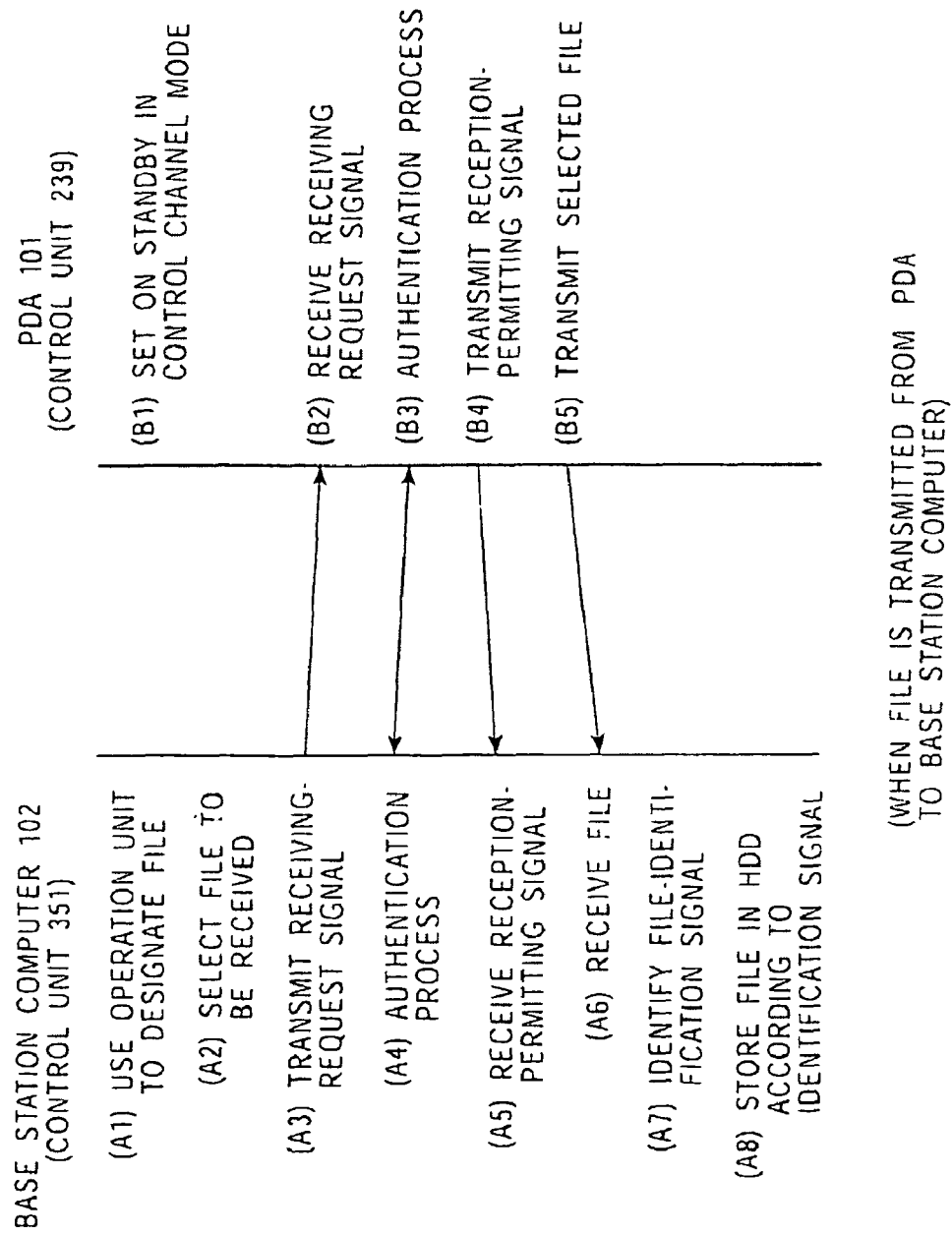
FIG. 34 is an illustration of a communication procedure for the case of transmitting a file from the PDA 101 to the base station computer 102.
Figure 35:
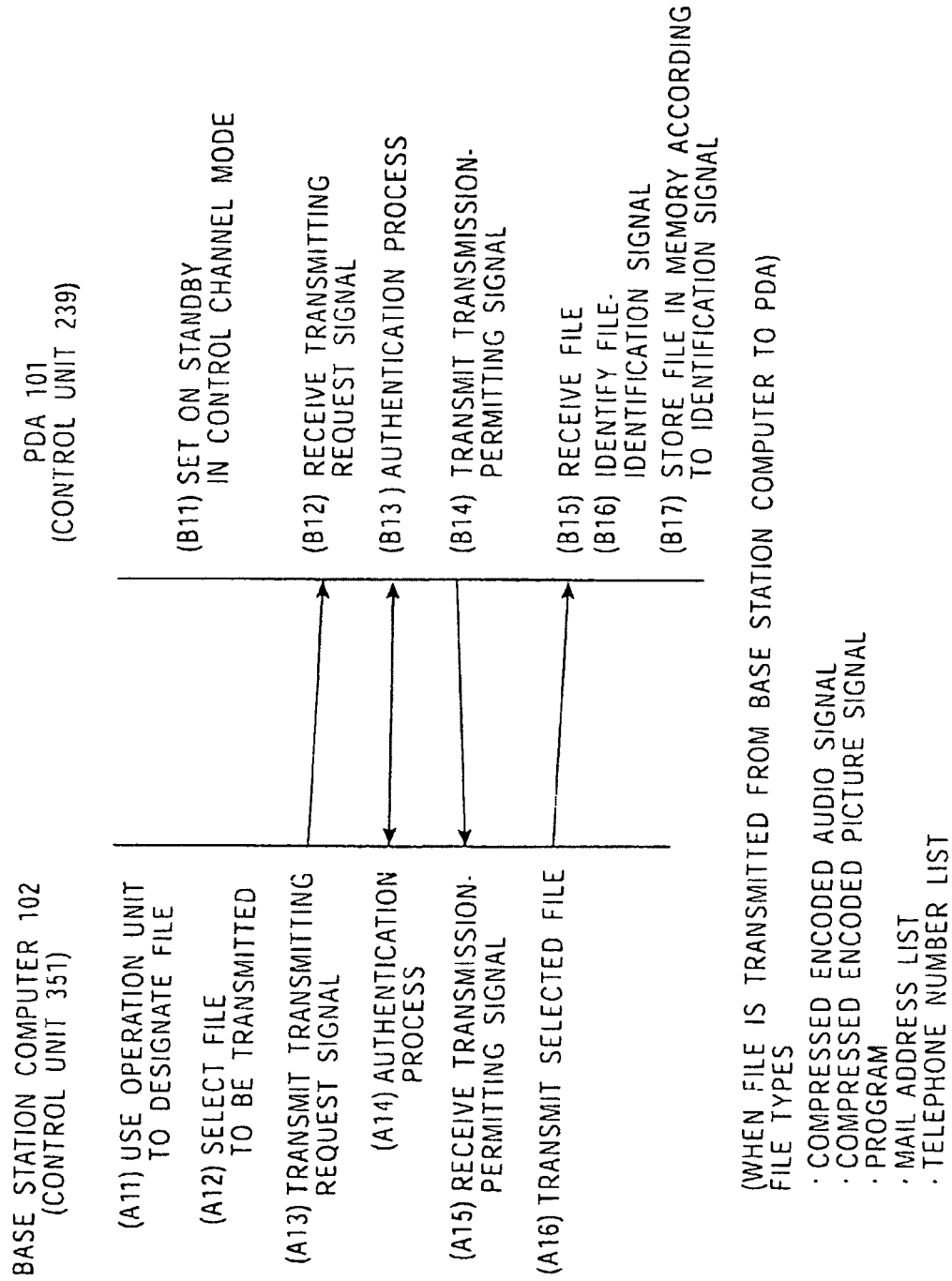
FIG. 35 is an illustration of a communication procedure for the case of transmitting a file from the base station computer 102 to the PDA 101.

In the embodiment shown in FIG. 34, for example, by communicating with the PDA 101, the base station computer 102 regards its state as having already acquired the list of file names of files stored in the HDD 215 of the PDA 101. The user can designate a file from the list of file names (A1).

After selecting the file to be received, by controlling the communication interface 336, the CPU 312 of the base station computer 102 transmits, from the antenna 343 to the PDA 101, a receiving request signal requesting reception of the selected file, together with, for example, a file name for identifying the selected file (A3).

The receiving request signal from the base station computer 102 is received by the communication interface 218 in the PDA 101 through the antenna 64 (B2), and is supplied to the CPU 202.

After receiving the receiving request signal, the CPU 202 of the PDA 101 requests the base station computer 102 to perform an authentication process by controlling the communication interface 218, whereby the authentication process is performed between the CPU 202 of the PDA 101 and the CPU 312 of the base station computer 102 (A4, B3).

When authentication is successful between the CPU 202 of the PDA 101 and the CPU 312 of the base station computer 102, the CPU 202 of the PDA 101 controls the communication interface 218 to transmit, to the base station computer 102, a reception-permitting signal representing permission to receive the file (B4).

When the authentication fails, subsequent processes are not performed. Thus, no file is transmitted from the PDA 101 to the base station computer 102.

The reception-permitting signal transmitted from the PDA 101 is at the antenna 343 by the communication interface 336 in the base station computer 102 (A5), and is supplied to the CPU 312 through the bus 311. This causes the CPU 312 to recognize that a file is transmitted from the PDA 101.

After that, the CPU 202 of the PDA 101 reads, for example, from the HDD 215, the file corresponding to the file name transmitted from the base station computer 102, with the receiving-requesting signal, and supplies the read file to the communication interface 218 through the bus 201, whereby the CPU 202 is controlled to transmit the file from the antenna 64 (B5).

The file transmitted from the PDA 101 is received at the antenna 343 by the communication interface 336 in the base station computer 102 (A6). The communication interface 336 transfers through the bus 311 and stores the received file in the DRAM 335. Based on the file identification signal of the stored file in the DRAM 335, the CPU 312 identifies the file type among, for example, picture data, audio data, program, and text data (A7).

The file includes a file identification signal representing its file type. By referring to the file identification signal, the file type can be identified.

The CPU 312 transfers through the bus 311 and stores the file stored in the DRAM 335 in accordance with its file type (A8).

In other words, in this embodiment, the base station computer 102 stores files in the HDD 333, with them separated in different directories and folders according to file types.

Next, a process for the case of transmitting a file from the base station computer 102 to the PDA 101 is described below with reference to FIG. 35.

The CPU 312 (corresponding to the control unit 351 in FIG. 27) of the base station computer 102 (FIG. 26) is on standby until the user operates the keyboard 301 (corresponding to the operation unit 353 in FIG. 27) to designate a file to be transmitted to the PDA 101 from among files stored in the HDD 333 (A11). The CPU 312 selects the designated file as a file to be transmitted to the PDA 101 (A12). At this time, the CPU 202 (corresponding to the control unit 239 in FIG. 24) of the PDA 101 (FIG. 23) is on standby in the control channel mode (B11).

After selecting the file to be transmitted to the PDA 101, the CPU 312 of the base station computer 102 controls the communication interface 336 to transmit, from the antenna 343 to the PDA 101, a transmission requesting signal requesting transmission of the selected file, together with, for example, a file name identifying the selected file (A13).

The transmitting request signal from the base station computer 102 is received at the antenna 64 by the communication interface 218 in the PDA (B12), and is supplied to the CPU 202.

After receiving the transmitting request signal, by controlling the communication interface 219, the CPU 202 of the PDA 101 requests the base station computer 102 to perform an authentication process. This causes the CPU 202 of the PDA 101 and the CPU 312 of the base station computer 102 to perform an authentication process for recognizing that each is valid (A14, B13).

When the authentication is successful between the CPU 202 of the PDA 101 and the CPU 312 of the base station computer 102, the CPU 202 of the PDA 101 controls the communication interface 218 to transmit, to the base station computer 102, transmission-permitting signal representing permission to transmit the file (B14).

When the authentication fails, similarly to the case in FIG. 34, subsequent processes are not performed. Thus, no file is transmitted from the base station computer 102 to the PDA 101.

The transmission-permitting signal transmitted from the PDA 101 is received at the antenna 343 by the communication interface 336 in the base station computer 102 (A15), and is supplied to the CPU 312 through the bus 311. This causes the CPU 312 to recognize permission to transmit the file from the PDA 101.

After that, the base station computer 102 reads, for example, from the HDD 333, the file corresponding to a file name transmitted to the PDA 101 with the transmitting request signal, and supplies the read file to the communication interface 336, whereby the PDA 101 is controlled to transmit the file from the antenna 343 (A16).

The film transmitted from the base station computer 102 is received at the antenna 63 by the communication interface 218 in the PDA 101 (B15). The communication interface 218 transfers through the bus 201 and temporarily stores the received files in the DRAM 217. Based on the file identification signal of the file stored in the DRAM 217, the CPU 202 identifies the file type of the file among picture data, audio data, a program, and text data (B16).

As described using FIG. 34, the file includes a file identification signal representing its file type. By referring to the file identification signal, the file type can be identified.

The CPU 202 transfers through the bus 201 and stores the file stored in the DRAM 217 in the flash memory 216 according to its file type (B17).

In the PDA 101, the file is not stored in the flash memory 216, but can be stored in the HDD 215.

Next, an information display method for the PDA 101 is described below.

As sown in FIG. 10, by opening the control unit 20 of the PDA 101, and opening the sub-panels 15 and 16, six LCDs $4_1$, $5_1$, 12, 21, 22, and 23 are disposed on almost identical planes so that one is adjacent to another.

Accordingly, in the PDA 101, as shown in, for example, FIG. 36, the six LCDs $4_1$, $5_1$, 12, 21, and 22 to 23 are regarded as a single screen, and a single piece of information can be displayed on the single screen.

In other words, FIG. 36 shows an example of display by the six LCDs $4_1$, $5_1$, 12, and 21 to 23 when the functional mode of the PDA 101 is set to be the telephone mode.

In the embodiment in FIG. 36, the six LCDs $4_1$, $5_1$, 12, and 21 to 23 are treated as the single screen, and the single screen displays buttons for causing the PDA 101 to function as a telephone set.

Specifically, in FIG. 36, the LCD $4_1$ displays the entire off-hook button for activating an off-hook state. The LCD $5_1$ displays, among dial buttons for inputting a telephone number, the entire button for inputting the numeral "7", part of a button for inputting the numeral "8", the entire button for inputting the symbol "*", and part of a button for inputting the numeral "0". The LCD 12 displays the entire button for inputting the numeral "1", part of a button for inputting the numeral "4", and part of a button for inputting the numeral "5". The LCD 21 displays the remaining part of the button for inputting the numeral "2", the entire button for inputting the numeral "3", part of a button for inputting the numeral "5", and the entire button for inputting the numeral "6". The LCD 22 displays the entire on-hook button for activating an on-hook state. The LCD 23 displays the remaining part of the button for inputting the numeral "8", the entire button for inputting the numeral "9", the remaining part of the button for inputting the numeral "0", and the entire button for inputting the symbol "#".

Among the dial buttons, those for inputting numerals are also used to input Japanese hiragana characters, alphabets, etc., for writing the body of electronic mail, etc.

When each of buttons displays on the LCDs $4_1$, $5_1$, 12, 21, 22, and 23 is operated, the operation of the button is detected by each of the touch panels $4A_1$, $5A_1$, 12A, 21A, 22A, and 23A which are respectively integrated with the LCDS $4_1$, $5_1$, 12, 21, 22, and 23.

Accordingly, an operation on a button whose entirety is displayed on one LCD is detected by a touch panel integrated with the LCD. An operation on a button displayed on a plurality of LCDs is detected by an one of a plurality of touch panels integrated with the LCDs.

Specifically, in FIG. 36, for example, in the case of the button for inputting the numeral "1", its entirety is displayed on the LCD 12, and an operation on the button is accordingly detected by the touch panel 12A integrated with the button. For example, since the button for inputting the numeral "2" is displayed on the LCDs 12 and 21, an operation on the buttons is detected by either of the touch panel 12A integrated with the LCD 12 and the touch panel 21A integrated with the LCD 21.

Accordingly, for the user, by touching the button for inputting the numeral "2" which is displayed on the LCD 12, or also touching displayed part of the button for inputting the numeral "2", the numeral "2" can be input.

As described above, when the six LCDs 41, 51, 12, 21, 22, and 23 are used as a single screen to display a single piece of information, the information can be displayed larger compared with the case of displaying the information on a single LCD.

To display information on a single screen composed of a plurality of LCDs, as described above, is hereinafter referred to also as "multi-screen display".

In addition to displaying information by using all the six LCDs $4_1$, $5_1$, 12, 21, 22, and 23 as a single screen, as described above, by using the six LCDs $4_1$, $5_1$, 12, 21, 22, and 23 as separate screens, each piece of information can be displayed on each screen.

Figure 37A:
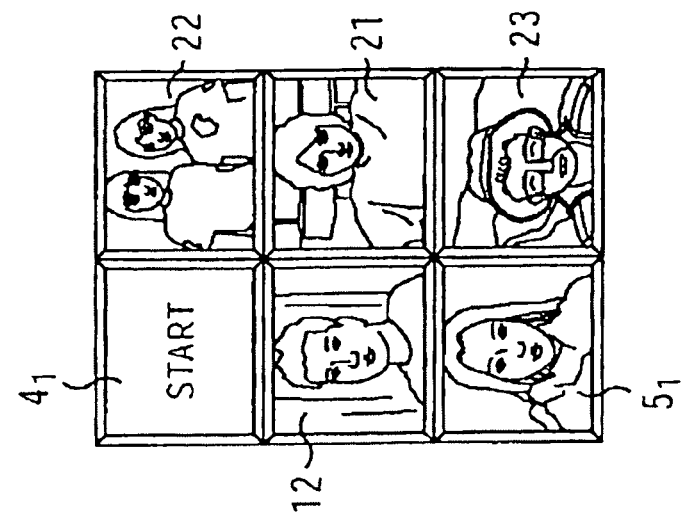
FIGS. 37A, 37B, and 37C are illustrations of examples of screens displayed on the LCDs $4_1$, $5_1$, 12, and 21 to 23.
Figure 37B:
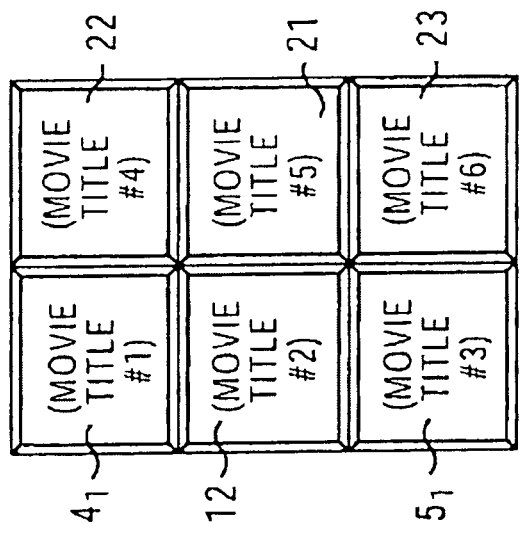
Figure 37C:
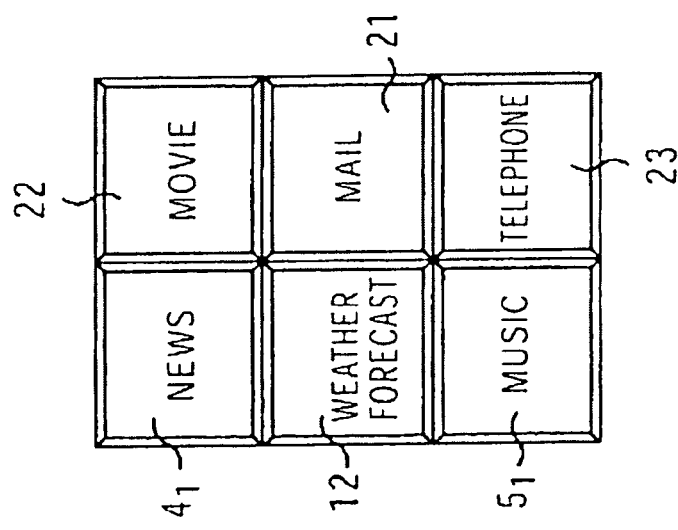

FIGS. 37A to 37C show that, with the six LCDs $4_1$, $5_1$, 12, 21, 22, and 23 used as separate screens, pieces of information are displayed on the screens. In the embodiment in FIG. 37 (similarly in FIGS. 38 and 39 described later), the LCDs are schematically drawn.

In the embodiment in FIG. 37A, the six LCDs $4_1$, $5_1$, 12, 21, 22, and 23 display items of a menu, respectively. Specifically, the LCD $4_1$ displays the item "News", the LCD $5_1$ displays the item "Music", the LCD 12 displays the item "Weather Forecast", the LCD 21 displays the item "Mail", the LCD 22 displays the item "Movie", and the LCD 23 displays the item "Telephone".

In the state in FIG. 37A, when the user touches, for example, the LCD 22, which displays the item "Movie", the touch is detected by the touch panel 22A integrated with the LCD 22. For example, as FIG. 37B shows, pieces of information which are linked to the item "Movie" are displayed on the six LCDs $4_1$, $5_1$, 12, 21, 22, and 23, respectively.

In the embodiment in FIG. 37B, Movie titles #1 to #6 are displayed on the six LCDs $4_1$, $5_1$, 12, 21, 22, and 23, respectively.

In the state shown in FIG. 37B, when the user touches, for example, the LCD $4_1$, which displays the Movie title #1, the touch is detected by the touch panel $4A_1$ integrated with the LCD $4_1$, and as shown in FIG. 37C, pieces of information which are linked to the Movie title #1 are displayed on the six LCDs $4_1$, $5_1$, 12, 21, 22, and 23, respectively.

In one embodiment in FIG. 37C, the LCD $4_1$ displays a button (hereinafter referred to as a "Start button") showing the characters "Start". Also, the LCDs $5_1$, 12, 21, 22, and 23 display a plurality of images related to the movie of title #1, a director, a scenario writer, a leading character actor, a supporting character actor, and an interview.

In the state shown in FIG. 37C, when the user touches, for example, the LCD $4_1$ which displays the "Start" button, the PDA 101 initiates playing back the picture data of the movie of title #1, and multi-screen display of the played-back pictures is performed by using the six LCDs $4_1$, $5_1$, 12, 21, 22, and 23 as a single screen.

Also, in the state in FIG. 37C, when the user touches, for example, the LCD which displays the image of the movie's director, the PDA 101 initiates playing back information introducing the personal history of the director, other works, etc., and multi-screen display of the information is performed by using the six LCDs $4_1$, $5_1$, 12, 21, 22, and 23 as a single screen.

As described above, when the six LCDs $4_1$, $5_1$, 12, 21, 22, and 23 are respectively used as separate screens, pieces of information are displayed on the screens, each piece of information is displayed depending on the piece of the information on a different LCD. Accordingly, when the user selects one piece of information from pieces of information, he or she can select the information as virtually selecting the LCD displaying the piece of information.

In other words, in the case of multi-screen display, as shown in FIG. 36, a button may be displayed on two LCDs. In this case, by touching either of the two parts of the button which are displayed, the button can be operated. However, when a single button is displayed on two LCDs, so to speak, one button corresponds to two LCDs. Thus, the correspondence between the button and the LCDs is not one-to-one relationship, so that the user may get bewildered in operation.

As shown in FIGS. 37A to 37C, when the six LCDs $4_1$, $5_1$, 12, 21, 22, and 23 are respectively used as separate screen, and a piece of information is displayed on each screen, the correspondence between each piece of information and each LCD is one-to-one relationship. Accordingly, the information displayed on one LCD is easily distinguished from that displayed on the other LCDs. This enables the user to perform a facilitated and accurate operation of selecting desired information.

Also, when a piece of information is displayed on one LCD, the information can be displayed larger compared with the case of displaying pieces of information on a single LCD. This enables information display which is easily untreatable.

When one LCD screen is divided into a plurality of regions, and a piece of information is displayed in each region, apparently, displaying similar to the case in FIGS. 37A to 37C can be performed. However, to display information in size identical to that in the case in FIGS. 37A to 37C by dividing one LCD into a plurality of regions, a large LCD must be employed as the one LCD, so that the entire apparatus is large. Also, in a case in which one LCD is divided into a plurality of regions, and buttons are respectively displayed in the regions, when the user touches the boundary between two regions, it is difficult to determine which of the buttons in the two regions is operated.

Conversely, as in the embodiment in FIGS. 37A to 37c, when a piece of information is displayed on each of a plurality of LCDs which can be revolved, the above size enlargement and difficulty of determining a user's operation can be prevented.

Here, to respectively display pieces of information on a plurality of LCDs is hereinafter referred to also as "directory display".

To display information by using the six LCDs $4_1$, $5_1$, 12, 21, 22, and 23, the user can select which display form between multi-screen display and directory display, and can switch the multi-screen display and the directory display.

Figure 38A:
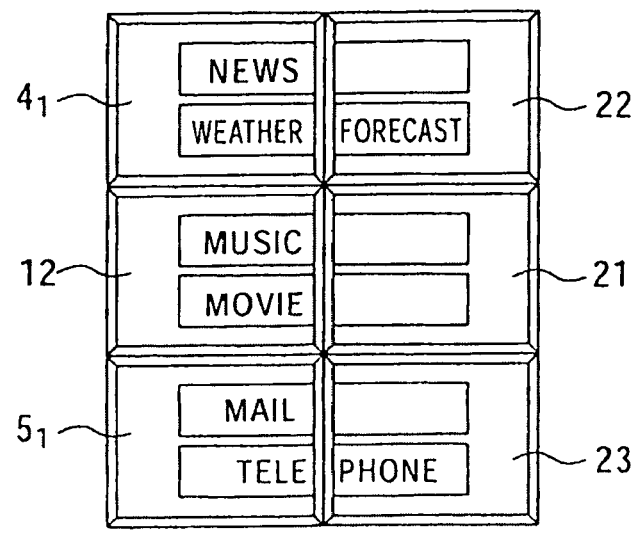
FIGS. 38A, 38B, and 38C are illustrations of examples of screens displayed on the LCDs $4_1$, $5_1$, 12, and 21 to 23.
Figure 38B:
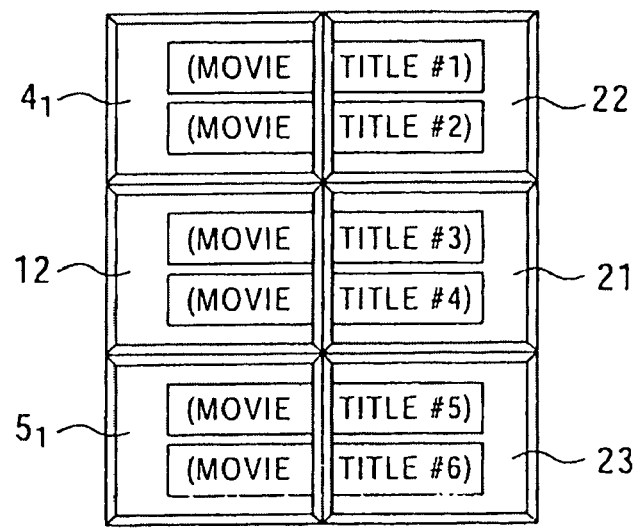
Figure 38C:
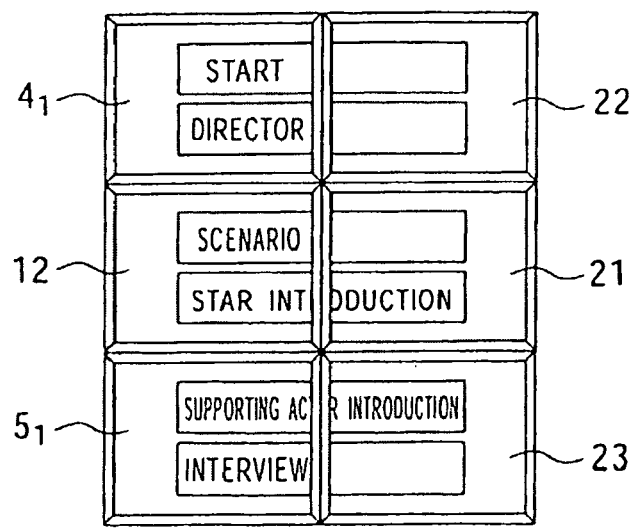

FIGS. 38A to 38C show examples of multi-screen display changed from the directory display shown in FIGS. 37A to 37C.

FIG. 38A shows multi-screen display changed from the directory display in FIG. 37A, FIG. 38B shows multi-screen display changed from the directory display in FIG. 37B, and FIG. 38C shows multi-screen display changed from the directory in FIG. 37C.

The directory display can be performed even when the watch bracelet 1 is provided with a plurality of LCDs $4_1$, $4_2$, $4_3$, $4_4$, $5_1$, $5_2$, $5_3$, and $5_4$, as shown in the embodiments in FIGS. 16 and 17.

FIGS. 39A to 39C show examples of directory display using twelve LCDs $4_1$ to $4_4$, $5_1$ to $5_4$, 12, and 21 to 23.

FIGS. 39A to 39C show examples of displayed screens for inputting the body of electronic mail or the like. In the example in FIG. 39A, the LCD 12 displays the already input character string "KINOU (yesterday)". The LCD $4_4$ displays the (Japanese) character "A" indicating the "A"-column. The LCD $4_3$ displays the (Japanese) character "KA" indicating the "KA"-column. The LCD $4_2$ displays the (Japanese) character "SA" indicating the "SA"-column. The LCD $4_1$ displays the (Japanese) character "TA" indicating the "TA"-column. The LCD 22 displays the (Japanese) character "NA" indicating the "NA"-column. The LCD 21 displays the (Japanese) character "HA" indicating the "HA"-column. The LCD 23 displays the (Japanese) character "MA" indicating the "MA"-column. The LCD $5_1$ displays the (Japanese) character "YA" indicating the "RA"-column. The LCD $5_2$ displays the (Japanese) character "RA" indicating the "RA"-column. The LCD $5_3$ displays the (Japanese) character "WA" indicating the "WA"-column. The LCD $5_4$ displays the (Japanese) character "N".

When the user inputs, for example, a character of the "A"-column, he or she touches the LCD $4_4$ displaying the character "A" indicating the "A"-column. Then, the touch panel $4A_1$ (FIGS. 17A and 17B) integrated with the LCD $4_1$ detects the touch of the LCD $4_4$. Based on the detected result, the CPU 202 (FIG. 23) changes the displayed screens on the LCDs $4_1$ to $4_4$, $5_1$ to $5_4$, 12, and 21 to 23 to the screens shown in FIG. 39B.

The displayed screen on the LCD 12 remains unchanged as shown in FIG. 39A, but the other LCDs $4_1$ to $4_4$, $5_1$ to $5_4$, and 21 to 23 change to screens for inputting a character of the "A"-column.

Specifically, the LCD $4_4$ displays the characters "TENTEN (voiced sound symbol in Japanese)" indicating a voiced sound symbol. The LCD $4_1$ displays the characters "MARU (semivoiced sound symbol in Japanese)" indicating a semi-voiced sound symbol. The LCD $4_2$ displays the symbol "-" indicating a long sound. The LCD $4_1$ displays the character "A" of the "A"-column. The LCD 22 displays the character "I" of the "A"-column. The LCD 21 displays the character "U" of the "A"-column. The LCD 23 displays the character "E" of the "A"-column. The LCD $5_1$ displays the character "O" of the "A"-column. The LCD $5_2$ displays the characters "PERIOD" for inputting a (Japanese) period. The LCD $5_3$ displays the characters "COMMA" for inputting a (Japanese) comma. The LCD $5_4$ displays the characters "RETURN" indicating a return to the state shown in FIG. 39A.

When inputting, for example, the character "U", the user touches the LCD 21, which displays the character "U". Then the touch panel 21A integrated with the LCD 21 detects the touch. Based on the detected result, the CPU 202 (FIG. 231 changes the displayed screens on the LCDS $4_1$ to $4_4$, $5_1$ to $5_4$, 12, and 21 to 23 to those shown in FIG. 39C.

The states in FIG. 39C differs for the state in FIG. 39B only in the displayed screen on the LCD 12. The LCD 12 displays the characters "KINOU (yesterday)" obtained by adding the character "U" displayed on the touched LCD 21 in the state in FIG. 39B to the already displayed characters "KINO".

the LCD 12 displays the newly displayed character "U" in a form in which it can be separated from the already displayed characters "KINO", and its input is unconfirmed. In FIG. 39C, the characters "KINO", whose input has been confirmed, are drawn by solid lines, and the character "U", whose input is unconfirmed, is drawn by a broken line.

When confirming the input of the character "U", whose input is unconfirmed, the user touches the LCD 12, which displays the characters "KINOU" in the state in FIG. 39C. This touch is detected by the touch panel 12A integrated with the LCD 12A. This confirms the input of the character "U". Then, the LCD 12 displays the character "U" in a condition identical to that of the already displayed characters on the LCD 12.

The LCD 12 can have a function of a confirming button as described above, and a function of designating conversion from "kana" characters to "kanji" characters in Japanese. In this case, it is possible that conversion of characters on the LCD 12 from "kana" form to "kanji" form and input confirmation be performed depending on the position of operating the LCD 12.

The PDA described using FIGS. 7 to 15 has seven LCDs 3, $4_1$, $5_1$, 12, and 21 to 23. When the power-supply switch 62 (FIG. 7, etc.) is switched on, it is not preferable, from a point of power consumption in the battery 222 (FIG. 23), that the all the seven LCDs 3, $4_1$, $5_1$, 12, and 21 to 23 be switched on.

Among the seven LCDs 3, $4_1$, $5_1$, 12, and 21 to 23, particularly, five LCDs 3, 12, and 21 to 23 are not always in an exposed state (state enabling the user to view the displayed screen). Thus, constant setting of the LCDs to be in on-condition consumes unnecessary power.

Accordingly, the PDA 101 (FIG. 23) uses the switch unit 225 to the states of the cover unit 20 and the sub-panels 15 and 16. Based on the detected result, the CPU 202 controls switching of the LCDs 3, 12, and 21 to 23.

The always exposed LCDs $4_1$ and $5_1$ ($4_1$ to $4_4$ and $5_1$ to $5_4$ in the embodiments in FIGS. 16 to 17B) can be manually switched on and off by the user. Also, the cover unit 20 and the sub-panels 15 and 16 can be switched on only in a case in which they are all open, and in other cases, they can be switched off. The LCDs $4_1$ and $5_1$ can be switched on and off in association with, for example, the LCD 3.

Figure 40:
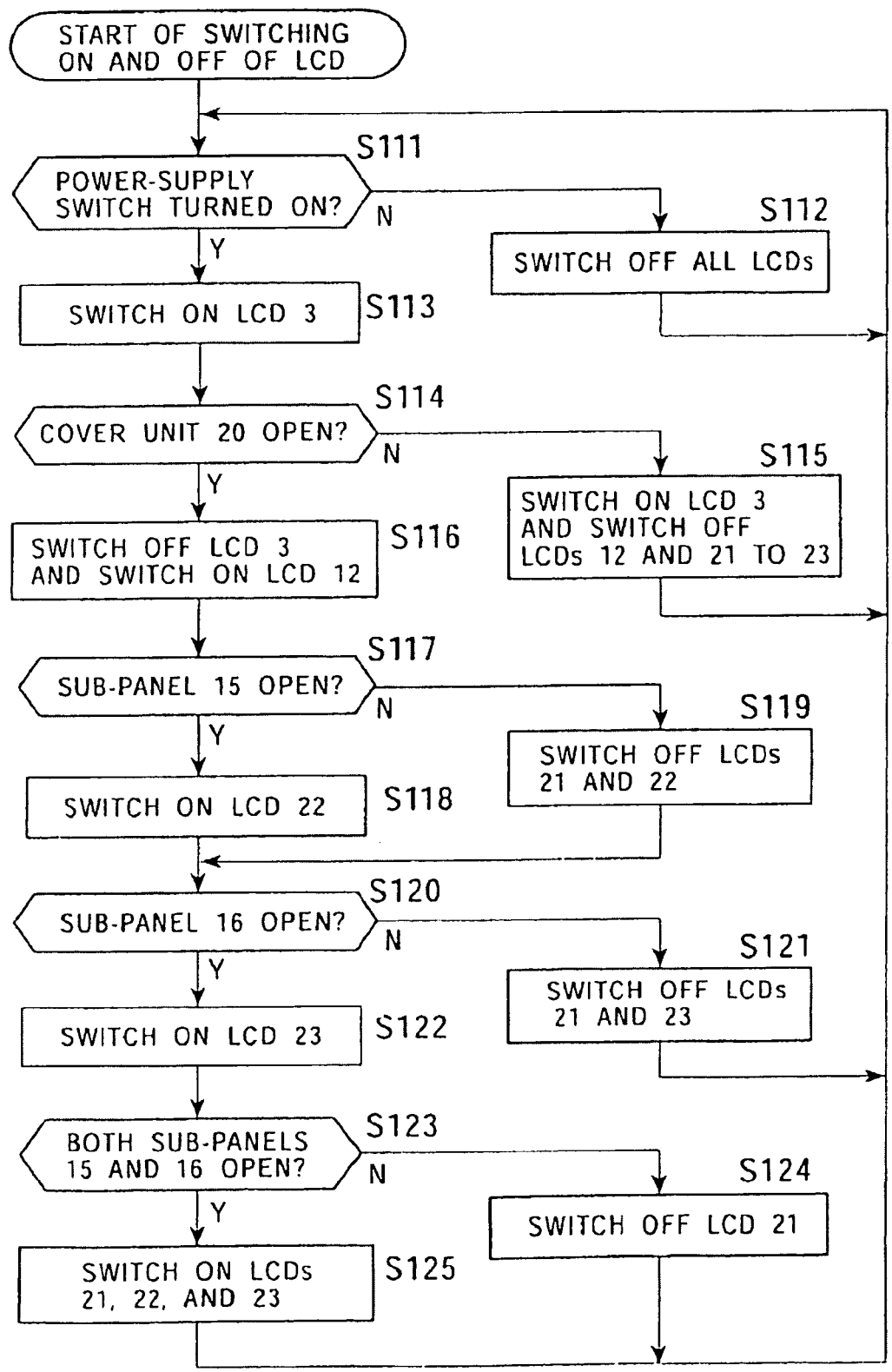
FIG. 40 is a flowchart illustrating a process for switching on and off LCDs 3, 12, and 21 to 23.

Reference is now made to the flowchart of FIG. 40 showing on/off control processing which is performed by the CPU 202 on the LCDs 3, 12, and 21 to 33 based on the states of the cover unit 20, the sub-panels 15 and 16.

The process begins with Step S111 in which the CPU 202 determines whether the power-supply switch 62 of FIG. 7 as part of the operation unit 224 of FIG. 23 has been turned on or off.

If the power-supply switch 62 has been turned off, the process proceeds to Step S112 which turns off the LCDs 3, 12, and 21 to 33 if one or more of them have been turned on. For instance, the backlight of the LCD, if it has been turned on, is turned off. The process then returns to Step S111.

The CPU 202 also controls the touch panel driver 205 in a manner linked to the on/off control of the LCD, so as to turn on or off the touch panel that is associated with the LCD turned on or off by the LCD driver 206. In this case, the terms "turn on" and "turn off" respectively mean commencement and cease of supply of the electrical power.

Referring again to Step S111, if the power-supply switch 62 has been turned on, the process proceeds to Step S113 which, if the LCD 3 has not been turned on, controls the LCD driver 206 so as to turn on the LCD 3. Thus, the backlight of the LCD is lit, for example. The process then advances to Step S114.

In Step S114, the CPU 202 determines whether the cover unit 20 of FIG. 7 is open, based on the result of detection of the state of the cover unit 20 performed by the switch unit 225. The process proceeds to Step S115 if the cover unit 20 has not been opened, i.e., when the cover unit 20 is closed and the LCD 3 alone is exposed while other LCDs 12, and 21 to 23 are kept accommodated without facing upward. In Step S115, the CPU 202 controls the LCD driver 206 so that the LCD 3 is turned on if it has been off and, in addition, turns off any of the LCDs 12, and 21 to 23 that has been turned on. The process then returns to Step S111.

The process skips to S116 if Step S114 has determined that the cover unit 20 is open, i.e., if the LCD 3 is in the accommodated state and invisible while the LCD 12 (See FIG. 9) faces upward and exposed. In Step S116, the CPU 202 controls the LCD driver 206 so as to turn the LCD 3 off if it has been turned on and to turn on the LCD 12 if it has been turned off. The process then proceeds to Step S117.

In Step S117, the CPU 202 determines whether the sub-panel 15 (See FIGS. 9 and 10) is open, based on the result of detection of the state of the sub-panel 15 performed by the switch unit 225. If the sub-panel 15 is open, i.e., if the LCD 22 (see FIG. 10) under the sub-panel 15 has been exposed, the process advances to Step S118 in which the CPU 202 controls the LCD driver 206 so as to turn the LCD 22 if it has been turned off. The process then skips to S120.

The process skips from Step S117 to Step S119, if Step S117 has determined that the sub-panel 15 has been closed, i.e., when the LCD 22 under the sub-panel 15 is in the accommodated state and upper half portion of the LCD 21 on the main panel 14 is concealed by the closed sub-panel 15. In Step S119, the CPU 202 controls the LCD driver 206 so as to turn off either the LCD 21 or the LCD 22 that has been turned on. The process then advances to Step S120.

In Step S120, the CPU 202 determines whether the sub-panel 16 (See FIGS. 9 and 10) is open, based on the result of detection of the state of the sub-panel 16 performed by the switch unit 225. The process advances to Step S121 if the sub-panel 16 is closed, i.e., if the LCD 23 under the sub-panel 15 is in the accommodated state and the lower half part of the LCD 21 (See FIG. 10) on the main panel 14 is concealed by the closed sub-panel 16. In Step S121, the CPU 202 controls the LCD driver 206 so as to turn off whichever one of the LCD 21 and the LCD 23 that has been turned on. The process then returns to Step S111.

The process skips from Step S120 to S122 if Step S120 has determined that the sub-panel 16 is open, i.e., when the LCD 23 (See FIG. 10) under the sub-panel 16 is exposed. In Step S122, the CPU 202 controls the LCD driver 206 so as to turn the LCD 23 on if it has been turned off. The process then proceeds to Step S123.

In Step S123, the CPU 202 determines whether both the sub-panel 15 and the sub-panel 16 are open, based on the result of detection of the states of the sub-panel 15 and the sub-panel 16 performed by the switch unit 225. The process proceeds from Step S123 to S124 when Step S123 has determined that at least one of the sub-panel 15 and the sub-panel 16 is closed, i.e., when the LCD 21 (see FIG. 10) on the main panel 14 is concealed at least partially, more specifically at upper or lower half part thereof, by the sub-panel 15 and/or the sub-panel 16 which is closed. In Step S124, the CPU 202 controls the LCD driver 206 so that the LCD 21 if turned on is turned off. The process then returns to Step S111.

The process skips from Step S123 to Step S125 when Step S123 has determined that both the sub-panel 15 and the sub-panel 16 are open, i.e., when the LCD 22 and the LCD 23 (see FIG. 10) associated with the sub-panel 15 and the sub-panel 16 are exposed and the LCD 21 provided on the main panel 14 is also exposed. In Step S125, the CPU 202 controls the LCD driver 206 so as to turn on any of the LCDs 21 to 23 that has been turned off. The process then returns to Step S111.

As explained before in connection with FIG. 37, the PDA 101 employs a plurality of LCDs, more specifically six LCDs denoted by $4_1$, $5_1$, 12, and 21 to 23. Each of these LCDs displays one piece of information. When a piece of information has been selected from the plurality of pieces of information displayed by these LCDs $4_1$, $5_1$, 12, and 21 to 23, a plurality of pieces of information which are linked to the selected information are displayed on the six LCDs $4_1$, $5_1$, 12, and 21 to 23. The PDA 101 can repeat this operation.

If a series of pieces of information have been hierarchically structured, the PDA 101 displays a plurality of pieces of information of higher hierarchical level and, when one of such displayed pieces of information is selected by the user, pieces of information of lower hierarchical level, linked or correlated to the selected information, are displayed. This operation can be performed repeatedly, so that the user can rather easily reach or search the target information.

Figure 41:
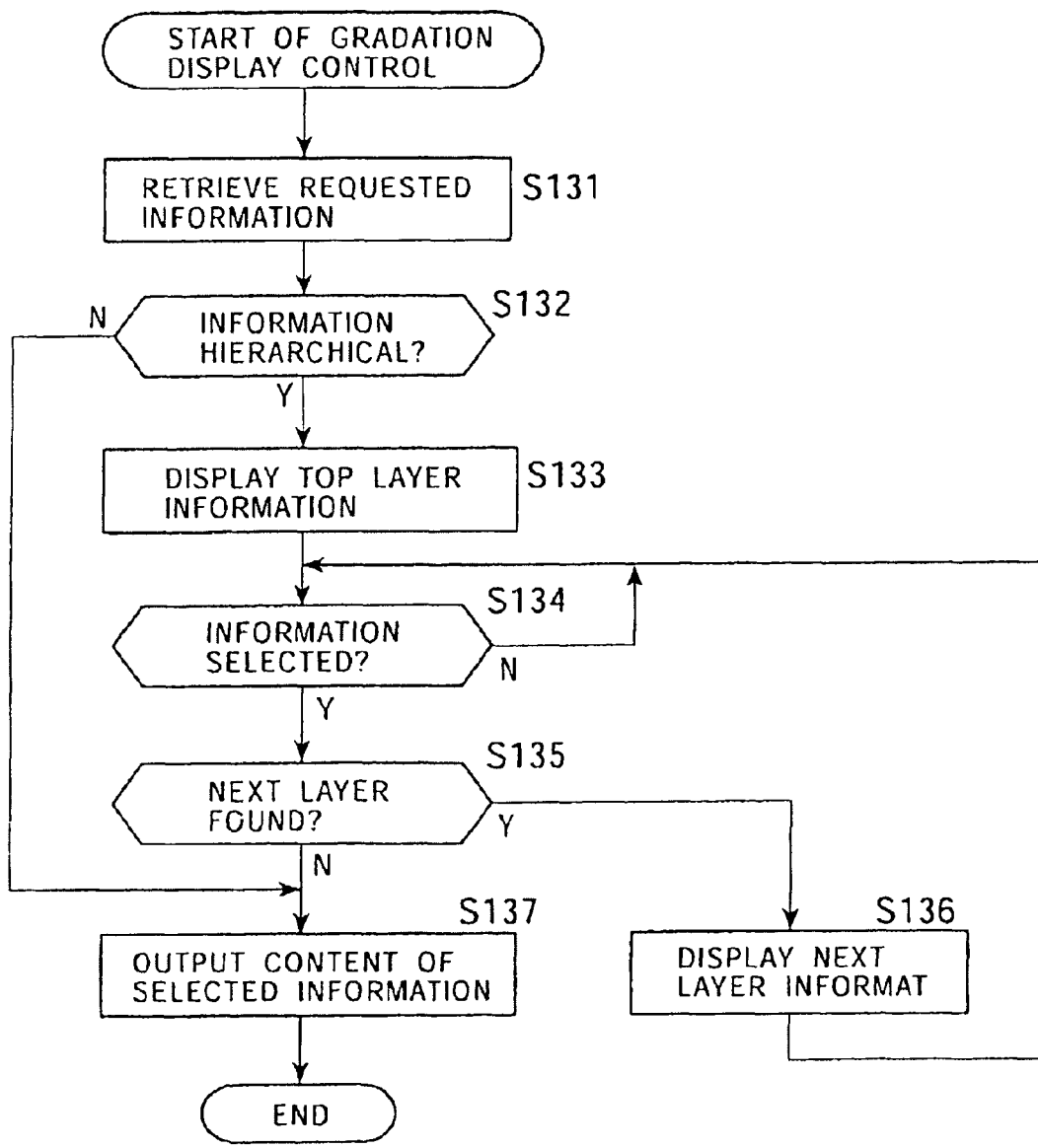
FIG. 41 is a flowchart illustrating a gradation-display control process.

A description will now be given of a process for controlling the display of such hierarchically structured information, with specific reference to FIG. 41.

The user can give a display request for information of interest, by operating, for example, the operation unit 244 of FIG. 23. The display request is delivered to the CPU 202 through the INTERFACE 223 and the bus 201. Upon receipt of such a request, the CPU 202 accesses the HDD 215 through the bus 201. Step S131 is executed to search for the information of interest requested by the user.

Although in this embodiment the information retrieval is performed to find the information from the HDD 215, this is not exclusive. For instance, the arrangement may be such that CPU 202 obtains the information from a storage or recording medium of an external device such as the base station computer, other PDA 103, SERVERS (NOT SHOWN) on the Internet 105, or the communication terminal 106, through communication with such an external device via a communication interface 218.

When the information designated by the display request is found from the HDD 215, the CPU 202 advances the process to Step S132 which determines whether the information thus found has a hierarchical structure. If the information retrieved from the HDD 215 does not have any hierarchical structure, the process advances to Step S137 skipping over Steps S133 to S136. In Step S137, the CPU 202 delivers to the LCD driver 206 the information obtained from the HDD 215 thereby causing the LCDs $4_1$, $5_1$, 12, and 21 to 23 to display the information in, for example, the multi-screen display mode described before in connection with FIG. 36, thus completing the process.

Conversely, if Step S132 has determined that the information derived from the HDD 215 has a hierarchical structure, the process advances to Step S133 in which the CPU 202 delivers to the LCD driver 206 a plurality of pieces of information of the highest hierarchical level, whereby such pieces of information of the highest hierarchical level are displayed on the LCDs $4_1$, $5_1$, 12, and 21 to 23 in the form of a directory as explained before in connection with FIG. 37. The process then advances to Step S134.

In Step S134, the CPU 202 determines whether the user has selected any of the pieces of information displayed on the LCDs $4_1$, $5_1$, 12, and 21 to 23 by touching the corresponding LCD.

More specifically, the CPU 202 monitors the output of the touch panel driver 205 so as to be able to determine whether one of the LCDs $4_1$, $5_1$, 12, and 21 to 23 is touched.

If Step S134 has determined that none of the pieces of information displayed on the LCDs $4_1$, $5_1$, 12, and 21 to 23 has been selected, the process returns to Step S134.

Conversely, if Step S134 has determined that nay of the pieces of information displayed on the LCDs $4_1$, $5_1$, 12, and 21 to 23 has been selected, the process advances to Step S135 in which the CPU 202 determines whether there is a lower hierarchical level linked to the level of the selected information.

If Step S135 has determined that there is a lower hierarchical level linked to the level of the selected information, the process advances to Step S136 in which the CPU 202 delivers to the LCD driver 206 a plurality of pieces of information of such lower hierarchical level, whereby such pieces of information of the lower hierarchical level are displayed on the LCDs $4_1$, $5_1$, 12, and 21 to 23 in the form of a directory. The process then returns to Step S134 to repeat the described operation.

Repetition of Steps S134 through S136 allows pieces of information of further lower hierarchical levels to be displayed on the LCDs $4_1$, $5_1$, 12, and 21 to 23.

If Step S135 has determined that no lower hierarchical level is linked to the level of the information selected by the user, the process skips to Step S137 in which the CPU 202 controls the LCD driver 206 so that the contents of the information selected by the user is displayed on the LCDs $4_1$, $5_1$, 12, and 21 to 23 in the form of a multi-screen, thus completing the processing.

Figure 42:
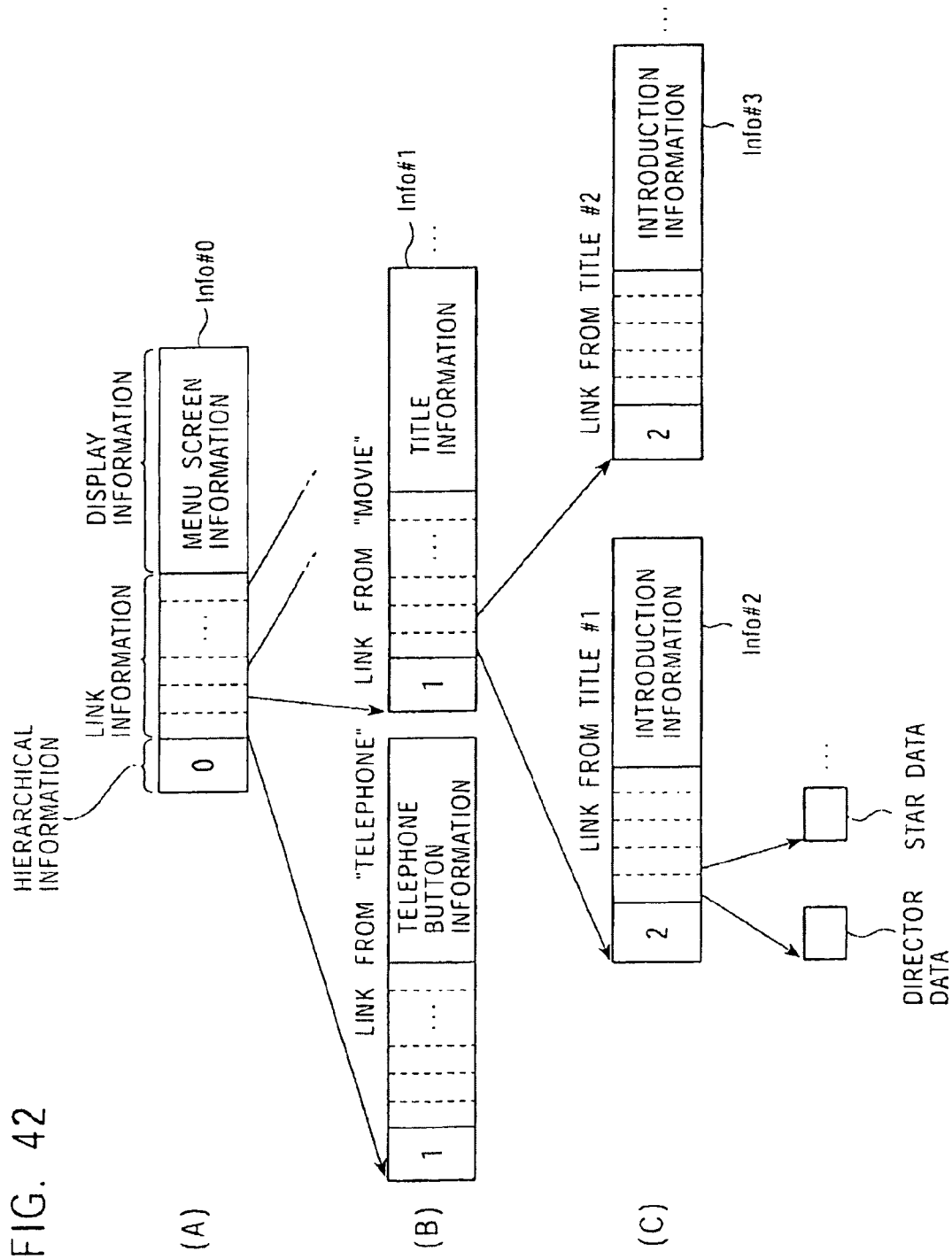
FIG. 42 is an illustration of information having a hierarchical structure.

FIG. 42 shows the format of a hierarchically-structured information.

A section (A) of FIG. 42 shows pieces of information on the highest hierarchical level. A section (B) of FIG. 42 shows pieces of information on the second hierarchical level which is directly linked to the highest level. A section (C) of FIG. 42 shows pieces of information on the third hierarchical level which is immediately under the second level.

The information of each level includes hierarchical information, link information and display information.

The hierarchical information indicates the number or order of the hierarchical level. In the structure shown in FIG. 42, "0" is assigned to the highest hierarchical level, and the number indicating the level is incremented by "one" for the successive levels of the hierarchy.

The link information shows the information to which the information of interest is linked.

The display information is the picture data to be displayed on the LCDs $4_1$, $5_1$, 12, and 21 to 23.

It is assumed here that picture data of a menu screen is allocated to the display information in the information Info #0 of the highest hierarchical level shown in Section (A) of FIG. 42. A user's request for the display of a menu screen causes the menu screen of FIG. 37A to be displayed on the LCDs $4_1$, $5_1$, 12, and 21 to 23.

If the user selects the item "movies" by touching the LCD 22, the LCDs $4_1$, $5_1$, 12, and 21 to 23 display the pieces of display information which are linked to the item "movies" of the information Info#0 of the highest level and which are allocated in the information Info#1 of the second hierarchical level shown in Section B of FIG. 42. Practically, pieces of information representing titles of movies, e.g., picture data of such titles, are allocated to the information Info#1 which is linked to the item "movies", so that such titles are displayed on the LCDs $4_1$, $5_1$, 12, and 21 to 23. As a consequence, titles #1 to #6 of movies are displayed in the form of a directory as shown in FIG. 37B.

The user selects, for example, the title #1 in the directory of FIG. 37B by touching the corresponding LCD $4_1$. As a result, the LCDs $4_1$, $5_1$, 12, and 21 to 23 display pieces of information which constitute the display information Info#2 of the third hierarchical level shown in Section C of FIG. 42 and which are linked to the title #1 in the link information of the Info#1 of the second hierarchical level shown in Section B of FIG. 42. Practically, the display information in the Info#2 linked to the movie title #1 is introductory information concerning the movie, e.g., picture data of still pictures of the movie director and featured actor, and this introductory information as the display information is displayed on the LCDs $4_1$, $5_1$, 12, and 21 to 23. It is thus possible to display images of the movie director, features actor and so forth in the form of a directory, as shown in FIG. 37C.

The link information in the information Info#2 of the third hierarchical level contains links to data such as video clips of the movie director and the featured actor whose images are displayed as the introductory information in the information Info#2. A touch by the user on, for example, the LCD carrying the image of the movie director causes the LCDs $4_1$, $5_1$, 12, and 21 to 23 to function as a multi-screen which displays images reproduced from video clips of the movie director.

It will be seen that the described hierarchical structure of the information facilitates the retrieval of the information.

Each information of the hierarchical structure may be picture data, text data or audio data. When audio data is used as the information having the hierarchical structure, the LCDs $4_1$, $5_1$, 12, and 21 to 23 may be arranged to display texts corresponding to the audio data, e.g., titles of music when audio data are music data, because the audio data per se cannot be "displayed" on the LCDs $4_1$, $5_1$, 12, and 21 to 23.

Alternatively, speakers may be associated with the LCDs $4_1$, $5_1$, 12, and 21 to 23 so that sounds corresponding to audio data are released from the speakers, thus implementing demonstration of audio data in a manner similar to the visual display in the form of directory.

Figure 43:
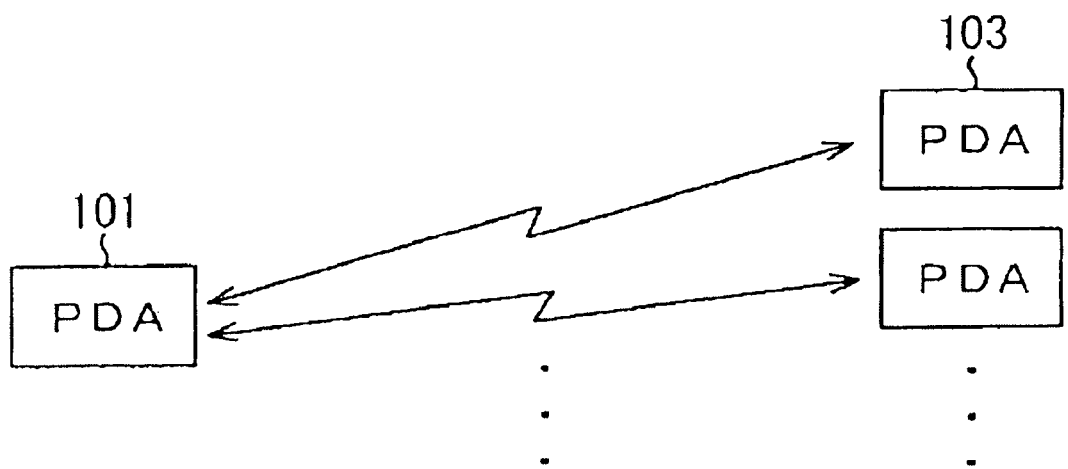
FIG. 43 is an illustration of a state in which the PDA 101 communicates with other PDAs 103.

FIG. 43 shows the communication between the PAD 101 and another PAD 103. As will be seen from this Figure, the PAD 101 can communicate with another PAD 103 or with a plurality of PDAs including the PAD 103. This applies to the case of the PAD 103 as well.

The PAD 101 and the PAD 103 are thus possible to communicate with one or more PDAs, and can obtain and provide data of higher quality based on data obtained through the communication.

Figure 44:
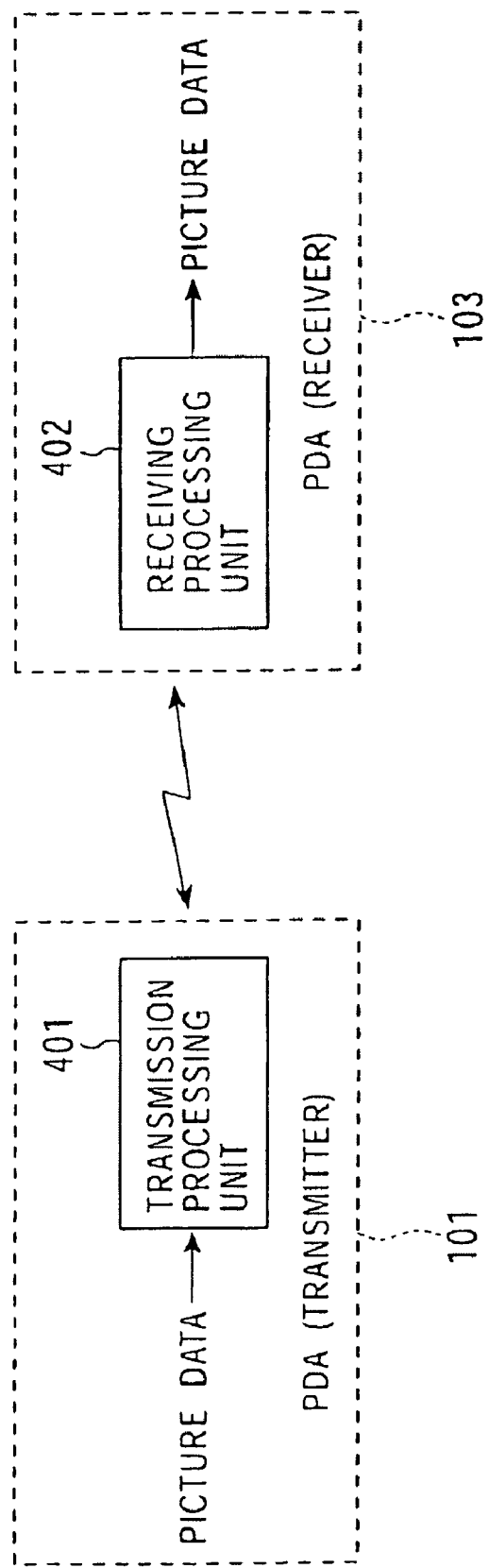
FIG. 44 is a block diagram showing the second functional structure of the PDA 101.

FIG. 44 shows, by way of example, functional configurations of the PDA 101 and the PDA 103 for data communication therebetween. The functional configuration of the PDA 101 shown in FIG. 44, as well as that of the PDA 103, can be implemented by a program executed by the CPU 202 of FIG. 23.

The arrangement shown in FIG. 44 assumes that data is sent from the PDA 101 to the PDA 103. Thus, the data is transmitted from the PDA 101 serving as a transmitter and is received by the PDA 103 serving as a receiver.

The PDA 101 as the transmitter has a transmitting processing unit 401 which performs a predetermined processing on the data to be transmitted, e.g., picture data, and transmits the processed data to the PDA 103 as the receiver.

Upon receipt of the data transmitted from the PDA 101 as the transmitter, the PDA 103 as the receiver effects a predetermined receiving processing on the received data and outputs the resultant picture data.

Although the description assumes that the data is transmitted from the PDA 101 to the PDA 103, this is not exclusive and the data may be sent from the PDA 103 to the PDA 101. In such a case, the PDA 103 serves as a transmitter which transmits the data, and the PDA 101 serves as a receiver which receives the data.

Thus, each of the PDA 101 and the PDA 103 can function both as a transmitter and a receiver and, therefore, has both the transmitting processing unit 401 and the receiving processing unit 402. In FIG. 44, the receiving processing unit 402 of the PAD 101 and the transmitting processing unit 401 of the PDA 103 are omitted. The description therefore proceeds on the assumption that the PDA 101 and the PDA 103 respectively serve as a transmitter and a receiver, unless otherwise specified.

Figure 45:
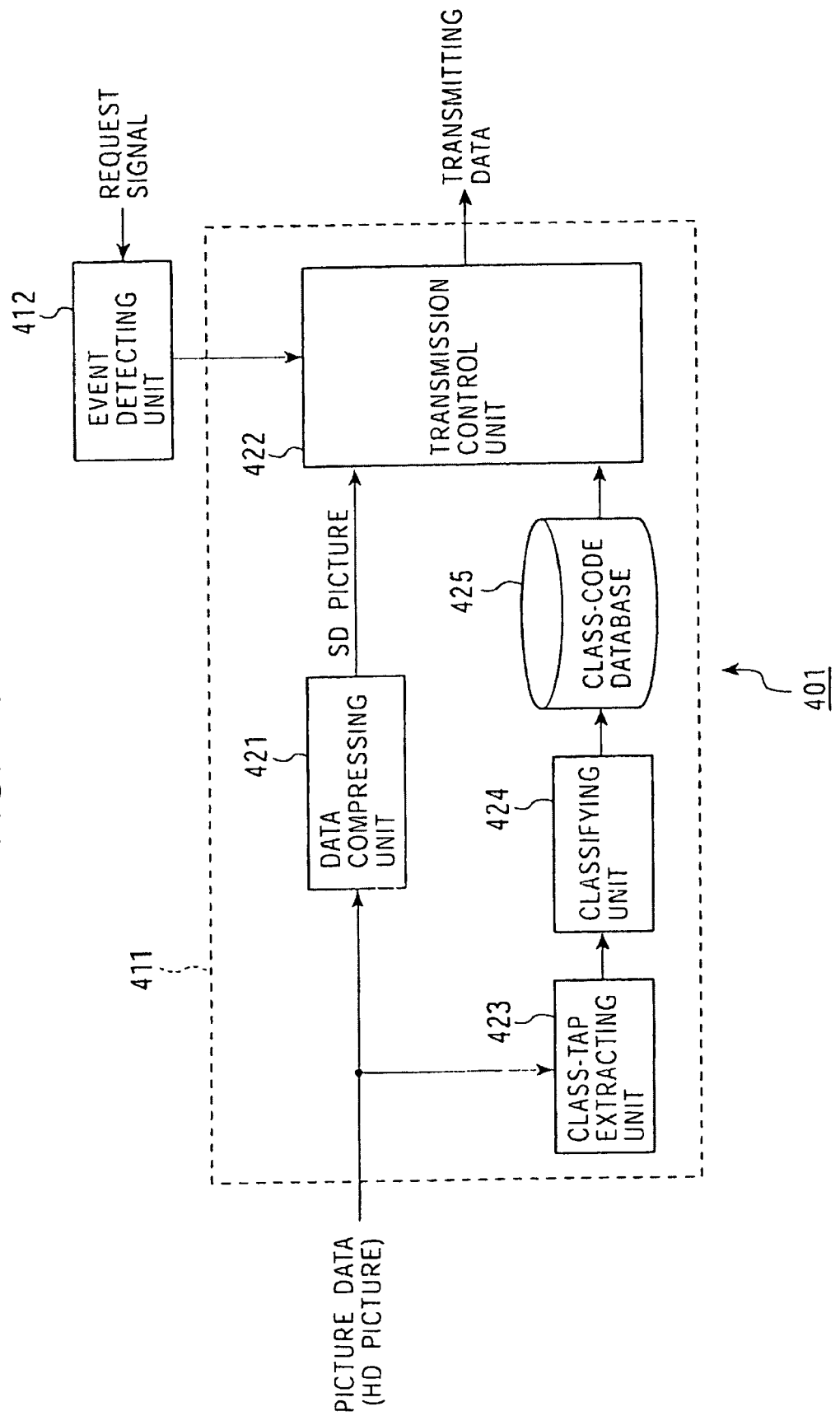
FIG. 45 is a block diagram showing a first example of a transmitting processing unit 401.

FIG. 45 illustrates a first example of the configuration of the transmitting processing unit 401 shown in FIG. 44.

Referring to FIG. 45, the transmitting processing unit 401 includes an encoder 411 and an event detecting unit 412. The encoder 411 is supplied with picture data which is to be sent to the PAD 103, while the event detecting unit 412 receives a request signal which will be described later.

The picture data supplied to the encoder 411 may be data captured by a CCD camera 65 of the PAD 101 of FIG. 23, or may be data derived from the HDD 215. It is assumed here that the picture data supplied to the encoder 411 carries picture information of high quality with high resolution. Thus, the picture will be referred to also as a high-definition picture and abbreviated as "HD" picture.

The request signal to be supplied to the event detecting unit 412 is transmitted from the PAD 103 as the receiver, and is received by a communication interface 218 and then delivered to the event detecting unit 412.

The encoder 411 encodes the HD picture data supplied thereto, thereby producing the transmission data to be sent to the PDA 103 as the receiver and transmits such data to the same. More specifically, the transmission data is transmitted to the PDA 103 as the receiver, via the communication interface 218 shown in FIG. 23.

Upon receipt of the request signal, the event detecting unit 412 detects the receipt as an event, and supplies the encoder 411 with a message indicative of the occurrence of the event. This message will be referred to also as "event message".

As will be seen from FIG. 45, the encoder 411 includes a data compressing unit 421, a transmission-control unit 422, a class-tap extracting unit 423, a classifying unit 424, and a class-code database 425.

The HD picture data supplied to the encoder 411 is delivered to the data compressing unit 421 and also to the class-tap extracting unit 423. The data compressing unit 421 compresses the received HD picture data by, for example, thinning out pixels in the spatial directions, thereby transforming the HD picture data into data of a lower or standard definition which will be referred to also as SD (Standard Definition) data. The SD picture data is supplied from the data compressing unit 421 to the transmission-control unit 422.

The communication between the PDA 101 and the PDA 103 when implemented in a wireless manner may fail to preserve a wide transmission band. Therefore, the voluminous HD picture data is transformed, i.e., compressed, by the data compressing unit 421 into the SD picture of smaller volume, in order to enable high-rate data transmission even through a narrow transmission band.

The transmission-control unit 422 receives a class code from the class-code database 425, in addition to the SD picture data received from the data compressing unit 421. The transmission-control unit 422 also receives an event message from the event detecting unit 412. The transmission-control unit 422 primarily selects and outputs the SD picture data received from the data compressing unit 421 as the transmission data, but selects and transmits the class code coming from the class-code database 425 upon receipt of the event message from the event detecting unit 412.

The class-tap extracting unit 423 deals with each of successive pixels of the HD picture data (such pixels are referred to also as "HD pixels") supplied thereto as a pixel of interest, and extracts the HD pixels which are to be used in classifying such pixel of interest. The class-tap extracting unit 423 outputs such HD pixels as a class tap.

More specifically, the class-tap extracting unit 423 extracts from the HD picture data supplied thereto a predetermined number of HD pixels that are spatially or temporally neighboring the pixel of interest, and outputs such pixels as a class tap. The extracted HD pixels are to be used in clustering or classifying such a pixel of interest into one of a plurality of clusters or classes. For instance, a matrix consisting of HD pixels of three columns and three lines centered at the pixel of interest is extracted. The class tap output from the class-tap extracting unit 423 is delivered to the classifying unit 424.

Based on the class tap on the pixel of interest as received from the class-tap extracting unit 423, the classifying unit 424 classifies the pixel of interest, and outputs a class code indicative of the class which is obtained as the result of classification and to which the pixel of interest belongs.

The classification may be conducted by using a technique known as ADRC (Adaptive Dynamic Range Coding).

When the classification is conducted in accordance with ADRC, the pixel levels of the pixels constituting the class tap are subjected to a k-bit ADRC processing and the class of the pixel of interest is determined based on the resultant ADRC code.

More specifically, in the k-bit ADRC processing, the maximum value MAX and the minimum value MIN are detected from among the pixel levels of the pixels constituting the class tap, and the minimum value MIN is subtracted from the maximum value MAX to provide a dynamic range DR=MAX−MIN. Then, the pixels constituting the class tap are re-quantized into k bits based on this dynamic range DR. In other words, the maximum value MIN is subtracted from the pixel level of each of the pixels constituting the class tap, and the result of the subtraction is divided (quantized) by $DR/2^k$. A bit stream is then obtained by arranging in a predetermined order the pixel levels of the k-bit pixels constituting the class tap, and the stream thus obtained is output as the ADRC code. Therefore, when a 1-bit ADRC processing is performed on the class tap, the pixel level of each of the pixels of the class tap is first subjected to an operation for subtracting the minimum value MIN therefrom, and then the difference thus determined is divided by the mean value between the maximum value MAX and the minimum value MIN, whereby the pixel level of each pixel is expressed by one bit, i.e., binarized. The 1-bit pixel levels thus obtained are arranged in a predetermined order to form a bit stream which is then output as the ADRC data.

The classification may be executed also by directly outputting, as the class code, the level distribution pattern, i.e., the pixel level distribution pattern, of the pixels constituting the class tap. In such a case, however, the number of the class codes obtained through the classification is increased to a numerous extent. For instance, if each class tap is composed of N pixels to each of which are allocated k bits, the number of the class codes is as large as $(2^N)^K$.

It is therefore preferred that the classification be executed using a technique which compresses the information of the class tap by, for example, the above-described ADRC technique or by a vector quantization.

The class-code database 425 stores the class codes output from the classifying unit 424.

The classifying unit 424 performs the classification by employing each of the HD pixels of the HD picture data as the pixel of interest, so that one class code is obtained for each of the HD pixels. This means that the class-code database 425 stores picture data having the pixel level constituted by the class code of each of the HD pixels of the HD picture data. The picture constituted by the class code will be referred to also as a "class code picture", hereinafter.

The transmitting processing unit 401 having the described configuration performs picture data transmission processing for transmitting the SD picture data obtained from the HD picture data, class code generating processing for generating the class code pictures from the HD picture data, and class code transmission processing for transmitting the class code pictures stored in the class-code database 425.

A description will now be given of the picture data transmission process, class code generating process and the class code transmission process which are performed by the transmitting processing unit 401 shown in FIG. 45, with specific reference to flowcharts shown in FIG. 46.

Section A of FIG. 46 shows a flowchart illustrating the picture data transmission process performed by the transmitting processing unit 401 of FIG. 45.

The picture data transmission process is triggered by the user when the user operates the operation unit 224 of FIG. 23 so as to request sending of the picture data.

The HD picture data to be transmitted is supplied to the encoder 411 in units of frames. The picture data transmission process begins with Step S201 in which the data compressing unit 421 of the encoder 411 compresses the HD picture data to transform the same into the SD picture data. The data compressing unit 421 then delivers the SD picture data to the transmission-control unit 422.

The term "frame" may be construed to mean one frame of a moving picture of one frame of a still picture.

In Step S202, the transmission-control unit 422 selects SD data from among those received from the data compressing unit 421, and outputs the selected SD picture data as the transmission data. The transmission data is supplied to the communication interface 218 of FIG. 23 and is transmitted from, for example, an antenna 64.

In Step S202, if time allowance exists from completion of transmission of SD picture data of one frame until the transmission of SD picture data of the next frame, the SD picture data of the format frame is repeatedly transmitted. Thus, in Step S202, the SD picture data of a frame is transmitted one or more times.

The process then proceeds to Step S203 in which the data compressing unit 421 determines whether any HD picture data of the next frame is found, i.e., whether there is a frame to be subsequently processed. When there is a next frame, the process returns to Step S201 to repeat the described process.

The picture data transmission process is ceased when Step S203 has determined that no next HD picture data is found, i.e., when there is no next frame.

In the process described heretofore, Step S202 may transmit SD picture data of the same frame of plurality of times. This, however, is only illustrative and the transmission or resending of the same SD picture data may be performed after the transmission of subsequent SD picture data. Thus, the illustrated process may be modified such that, after completion of transmission of a series of SD picture data, the same series of SD picture data is transmitted once again thereby achieving the resending of the SD picture data.

Next, the class-code generating process performed by the transmitting processing unit 401 in FIG. 45 is described below with reference to the flowchart shown FIG. 46B.

Figure 46C:
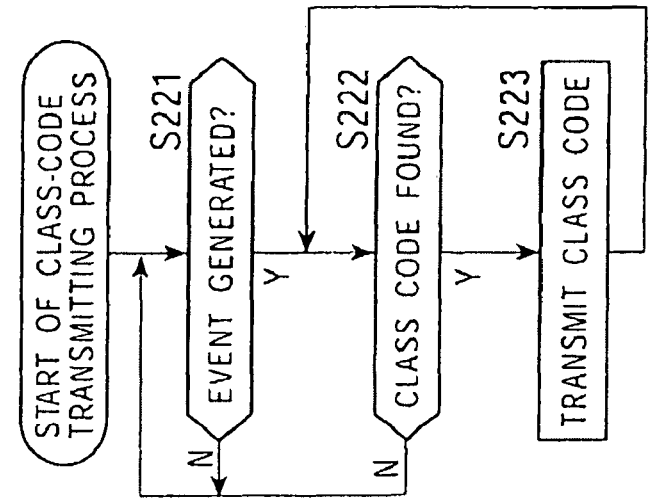
FIGS. 46A, 46B, and 46C are flowcharts respectively illustrating a picture data transmitting process, a class-code generating process, and a class-code transmitting process which are performed by the transmitting processing unit 401.
Figure 46B:
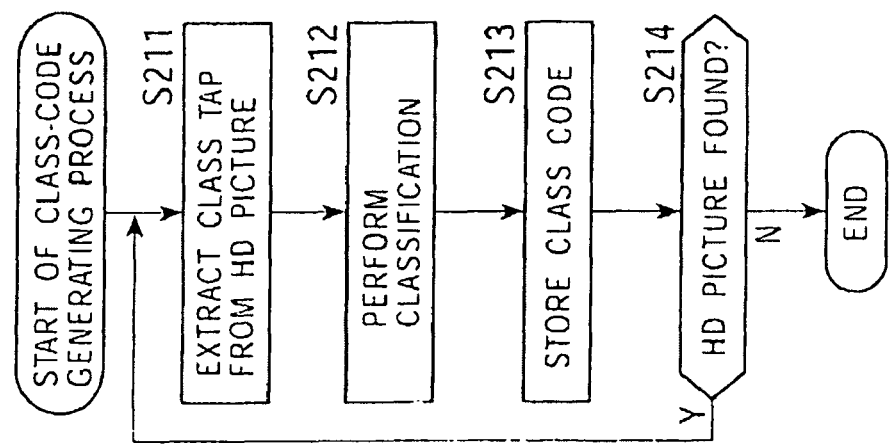
Figure 46A:
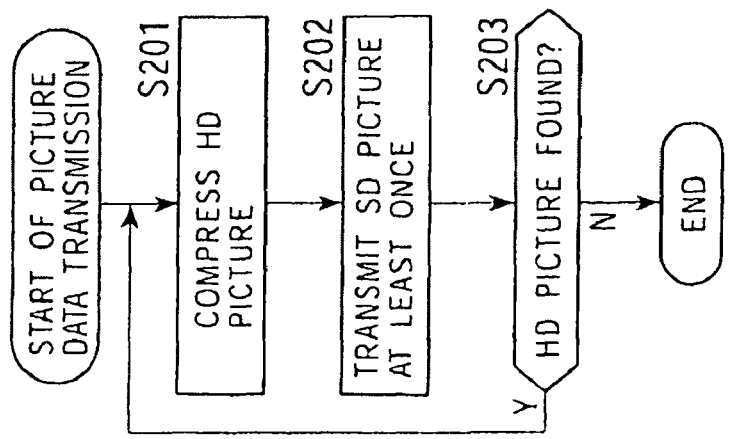

The class-code generating process is started, for example, when the picture data transmitting process shown in FIG. 46A starts.

Specifically, HD picture data identical to that supplied to the data compressing unit 421 is supplied to a class-tap extracting unit 423, for example, in units of frames. In Step S211, in the class-tap extracting unit 423, HD pixels constituting the supplied HD picture data for one frame are used as pixels of interest, and class taps are extracted for each pixel of interest. The class taps are supplied to a classifying unit 424.

When receiving, from the class-tap extracting unit 423, the class taps in which each HD pixel in one frame is used as a pixel of interest, in Step S212, the classifying unit 424 acquires the class codes of the HD pixels by performing classification based on the class taps for the HD pixels, and supplies the class codes to a class-code database 425.

In Step S213, the class-code database 425 stores a class-code picture, that is, a picture composed of class codes for the HD pixels of the HD picture data for one frame which is supplied from the classifying unit 424, and proceeds to Step S214.

In Step S214, the class-tap extracting unit 423 determines whether the HD picture data of the next frame is stored. If the class-tap extracting unit 423 determines affirmatively, the process returns to Step S211, and the same processing is repeatedly performed.

In Step S214, if it is determined that the HD picture data of the next frame is not stored, the class-code generating process ends.

Next, the class-code transmitting process performed by the transmitting processing unit 401 in FIG. 45 is described below with reference to the flowchart in FIG. 46C.

In the class-code transmitting process, in Step S221, a transmission control unit 422 determines whether a predetermined event has been generated.

In the transmission control unit 422, transmission of the request signal from the PDA 103 as the receiver is employed as the predetermined event. In Step S221, determination of whether the predetermined event has been generated is performed based on whether an event detecting unit 412 supplies the transmission control unit 422 with an event message representing generation of an event that the request signal has been transmitted from the PDA 103 after receiving the request signal.

In Step S221, if it is determined that the predetermined event has not been generated, the process returns to Step S221, and the predetermined event is awaited.

In Step S221, if it is determined that the predetermined event has been generated, the process proceeds to Step S222, and the transmission control unit 422 determines whether the class-code picture is stored in the class-code database 425.

In Step S222, if it is determined that the class-code picture is not stored, the process returns to Step S221, and the same processing is repeatedly performed.

In Step S222, if it is determined that the class-code picture is stored, the process proceeds to Step S223, and the transmission control unit 422 reads the class-code picture stored in the class-code database 425 and selects the read picture as transmitting data. The transmitting data is supplied from the transmission control unit 422 to the communication interface 218 (FIG. 23), and is transmitted from the antenna 64.

In Step S223, at the start thereof, when the transmission control unit 422 finishes the transmission of all the class-code pictures stored in the class-code database 425, it deletes the transmitted class-code pictures from the class-code database 425, and returns to Step S222. As described above, in Step S222, the transmission control unit 422 determines whether the class-code picture is stored in the prediction-tap extracting unit 452.

Between the start of performing Step S223 in the previous time and the start of performing Step S222 in the present time, there may be a case in which the class-code picture is stored in the class-code database 425. Thus, the transmission control unit 422 determines whether the class-code picture is stored in the class-code database 425. Based on the result of determination, the same processing is repeatedly performed.

Accordingly, in the class-code transmitting process, when the predetermined event is generated, transmission of class-code pictures is performed until no class-code picture is stored in the class-code database 425.

Figure 47:
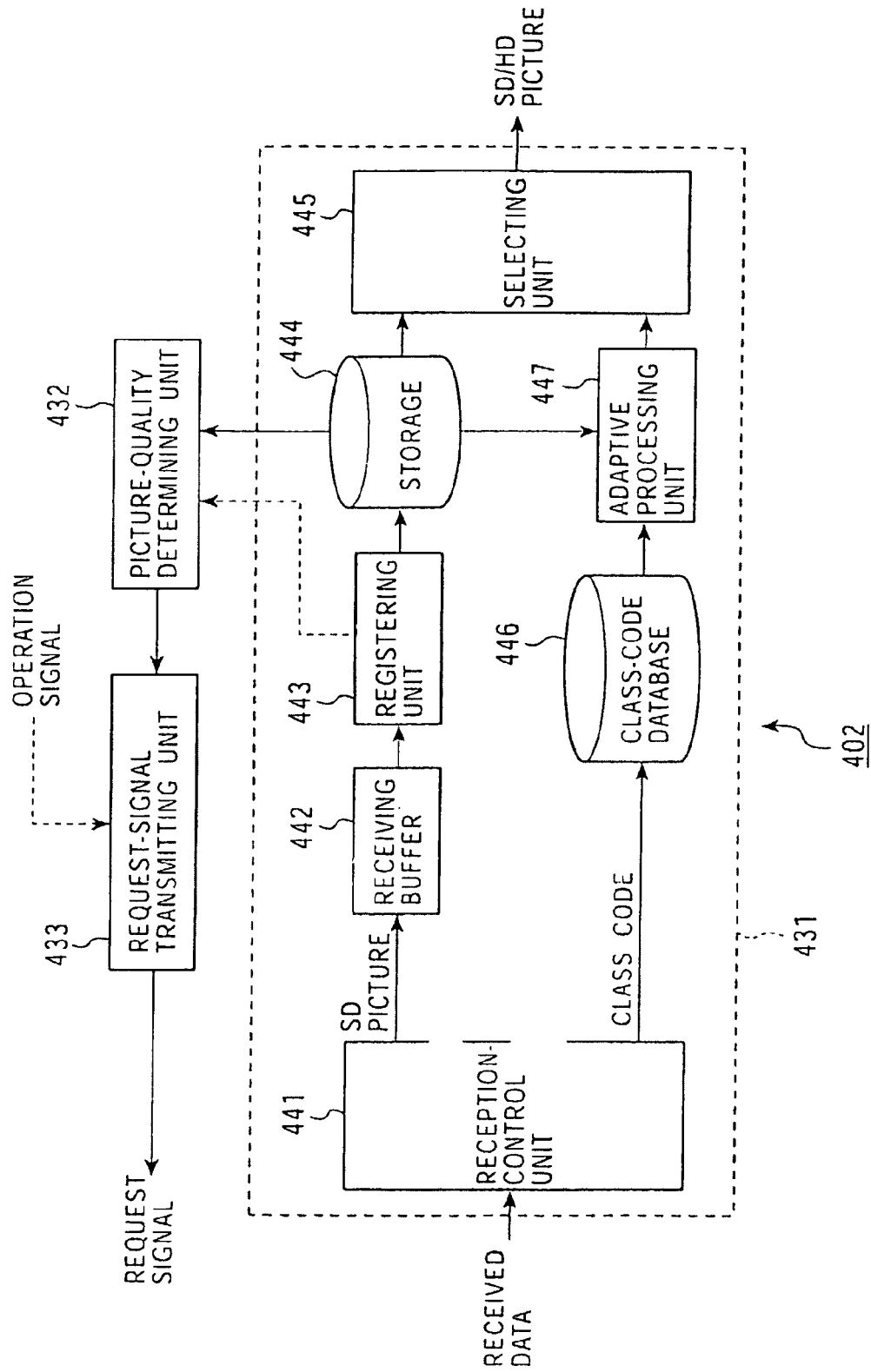
FIG. 47 is a block diagram showing a first example of a receiving processing unit 402.

Next, FIG. 47 shows a first configuration of the receiving processing unit 402 in FIG. 44.

In the embodiment in FIG. 47, the receiving processing unit 402 includes a decoding unit 431, a picture-quality determining unit 432, and a request-signal transmitting unit 433.

The decoding unit 431 obtains SD picture data or HD picture data by performing decoding on received data which is supplied to the decoding unit 431.

The data transmitted from the transmitting processing unit 401, as described using FIGS. 45 to 46C, is received by the communication interface 218 through the antenna 64 (FIG. 23) in the PDA 103, and the obtained received data is supplied to the receiving processing unit 402.

In the receiving processing unit 402, the received data from the communication interface 218 is supplied to the decoding unit 431. The decoding unit 431 obtains SD picture data HD picture data by processing the received data.

The picture-quality determining unit 432 determines the picture quality of the SD picture data obtained by the decoding unit 431, and supplies the determined result to the request-signal transmitting unit 433.

Based on the result of determining the picture quality of the SD picture data, in cases such as bad picture quality, the request-signal transmitting unit 433 generates and outputs a request signal requesting a class-code picture. The request signal is supplied to the communication interface (FIG. 23), and is transmitted from the antenna 64 to the PDA 101 as a transmitter.

As FIG. 47 shows, the decoding unit 431 includes a receiving-control unit 441, a receiving buffer 442, a registering unit 443, a storage 444, a selecting unit 445, a class-code database 446, and an adaptive processing unit 447.

The receiving-control unit 441 receives the received data, and supplies the received data to the receiving buffer 442 when the received data is SD picture data. When the received data represents a class-code picture, the receiving-control unit 441 supplies the received data to the class-code database 446.

The receiving buffer 442 temporarily stores the SD picture data supplied from the receiving-control unit 441. The registering unit 443 controls the storage 444 so that the frames of the SD picture data stored in the receiving buffer 442 are stored (registered). Under control of the registering unit 443, the storage 444 stores the SD picture data. The SD picture data is read from the storage 444, and is supplied to the selecting unit 445.

The selecting unit 445 selectively supplies the SD picture data supplied from the storage 444 to the LCD driver 206 (FIG. 23), and displays the SD picture on the LCD 3. However, when the adaptive processing unit 447 outputs HD picture data, as described above, the selecting unit 445 selectively supplies the HD picture data to the LCD driver 206 (FIG. 23), and displays the HD picture on the LCD 3.

The class-code database 446 stores class-code pictures supplied from the receiving-control unit 441.

The adaptive processing unit 447 obtains HD picture data having increased picture quality of SD picture data by using class codes constituting the class-code picture stored in the class-code database 446 to perform adaptive processing on the SD picture data stored in the storage 444. The adaptive processing unit 447 supplies the obtained HD picture data to the selecting unit 445.

In the adaptive processing, by linearly coupling pixels (hereinafter referred to also as "SD pixels") constituting an SD picture and predetermined tap coefficients, predicted values of pixels of an HD picture in which the spatial resolution, etc., of the SD picture are increased are calculated. This can obtain a picture in which the resolution of the SD picture is increased.

Specifically, it is possible that, by using an HD picture as training data, and an SD picture (in which the resolution of the HD picture is reduced) as student data, predicted values $E[y]$ of the pixel levels of pixels constituting the HD picture be calculated based on a linear first-degree coupling model defined by linear coupling between a set of the pixel levels $x_1$, $x_2$, etc., of some SD pixels (pixels constituting the SD picture) and predetermined tap coefficients $w_1$, $w_2$, etc. In this case the predicted values $E[y]$ can be expressed by the following expression:

$$E[y] = w_1 x_1 + w_2 x_2 + \ldots \quad (1)$$

To generalize expression (1), when matrix W composed of a set of tap coefficients $w_j$, matrix X composed of a set of student data $x_{ij}$, and matrix Y' composed of a set of predicted values $E[y_j]$ are defined by the following expressions:

$$X = \begin{pmatrix} x_{11} & x_{12} & \cdots & x_{1J} \\ x_{21} & x_{22} & \cdots & x_{2J} \\ \cdots & \cdots & \cdots & \cdots \\ x_{I1} & x_{I2} & \cdots & x_{IJ} \end{pmatrix}$$

$$W = \begin{pmatrix} w_1 \\ w_2 \\ \cdots \\ w_J \end{pmatrix}, Y' = \begin{pmatrix} E[y_1] \\ E[y_2] \\ \cdots \\ E[y_I] \end{pmatrix}$$

the following observation equation holds:

$$XW = Y' \qquad (2)$$

where component $x_{ij}$ represents the j-the student data in a set of the i-th student data (a set of student data for use in predicting the i-th training data $y_i$), component $w_j$ of matrix W represents a tap coefficient by which the j-th student data in the set of student data. Also, $y_i$ represents the i-th training data. Thus, $E[y_i]$ represents a predicted value of the i-th training data. On the left side of expression (1), "y" is a representation in which the suffix "i" of components $y_i$ of matrix Y is omitted, and on the right side in expression (1), "$x_1, x_2, \ldots$" are representations in which the suffix "i" of component $x_{ij}$ of matrix X.

By applying the least square method to the observation equation in expression (2), predicted values E[y] close to the pixel levels y of HD pixels can be calculated. In this case, when matrix Y composed of a set of true pixel levels y of HD pixels to be used as training data, and matrix E composed of residuals of predicted values E[y] with respect to pixel levels Y of HD pixels are defined by the following expression:

$$E = \begin{pmatrix} e_1 \\ e_2 \\ \cdots \\ e_I \end{pmatrix}, Y = \begin{pmatrix} y_1 \\ y_2 \\ \cdots \\ y_I \end{pmatrix}$$

from expression (2), the following residual equation holds:

$$XW = Y + E \qquad (3)$$

In this case tap coefficients $w_j$ for calculating predicted values E[y] close to pixel levels y of HD pixels can be found by minimizing the following square error:

$$\sum_{i=1}^{I} e_i^2$$

Therefore, when the result of differentiating the above square root by tap coefficient $w_j$ is zero, that is, tap coefficient $w_j$ satisfying the following expression:

$$e_1 \frac{\partial e_1}{\partial w_j} + e_2 \frac{\partial e_2}{\partial w_j} + \ldots + e_I \frac{\partial e_I}{\partial w_j} = 0 \quad (j = 1, 2, \ldots, J) \qquad (4)$$

is an optimal value for finding predicted values E close pixel levels y of HD pixels.

Accordingly, by using tap coefficient $w_j$ to differentiate expression (3), the following expression holds:

$$\frac{\partial e_i}{\partial w_1} = x_{i1}, \frac{\partial e_i}{\partial w_2} = x_{i2}, \cdots, \frac{\partial e_i}{\partial w_J} = x_{iJ}, (i = 1, 2, \cdots, I) \qquad (5)$$

From expressions (4) and (5), the following expression is obtained:

$$\sum_{i=1}^{I} e_i x_{i1} = 0, \sum_{i=1}^{I} e_i x_{i2} = 0, \cdots \sum_{i=1}^{I} e_i x_{iJ} = 0 \qquad (6)$$

In addition, by considering relationships among the student data $x_{ij}$, the tap coefficient $w_j$, the training data $y_i$, and the residual $e_i$ in the residual equation in expression (3), from expression (6), the following normalization equation can be obtained:

$$\begin{cases} \left(\sum_{i=1}^{I} x_{i1}x_{i1}\right)w_1 + \left(\sum_{i=1}^{I} x_{i1}x_{i2}\right)w_2 + \cdots + \left(\sum_{i=1}^{I} x_{i1}x_{iJ}\right)w_J = \left(\sum_{i=1}^{I} x_{i1}y_i\right) \\ \left(\sum_{i=1}^{I} x_{i2}x_{i1}\right)w_1 + \left(\sum_{i=1}^{I} x_{i2}x_{i2}\right)w_2 + \cdots + \left(\sum_{i=1}^{I} x_{i2}x_{iJ}\right)w_J = \left(\sum_{i=1}^{I} x_{i2}y_i\right) \\ \cdots \\ \left(\sum_{i=1}^{I} x_{iJ}x_{i1}\right)w_1 + \left(\sum_{i=1}^{I} x_{iJ}x_{i2}\right)w_2 + \cdots + \left(\sum_{i=1}^{I} x_{iJ}x_{iJ}\right)w_J = \left(\sum_{i=1}^{I} x_{iJ}y_i\right) \end{cases} \qquad (7)$$

In the normalization equation in expression (7), matrix (covariance vector) A and vector v are defined as follows:

$$A = \begin{pmatrix} \sum_{i=1}^{I} x_{i1}x_{i1} & \sum_{i=1}^{I} x_{i1}x_{i2} & \cdots & \sum_{i=1}^{I} x_{i1}x_{iJ} \\ \sum_{i=1}^{I} x_{i2}x_{i1} & \sum_{i=1}^{I} x_{i2}x_{i2} & \cdots & \sum_{i=1}^{I} x_{i2}x_{iJ} \\ & & \cdots & \\ \sum_{i=1}^{I} x_{iJ}x_{i1} & \sum_{i=1}^{I} x_{iJ}x_{i2} & \cdots & \sum_{i=1}^{I} x_{iJ}x_{iJ} \end{pmatrix}$$

$$v = \begin{pmatrix} \sum_{i=1}^{I} x_{i1}y_i \\ \sum_{i=1}^{I} x_{i2}y_i \\ \cdots \\ \sum_{i=1}^{I} x_{iJ}y_i \end{pmatrix}$$

and when vector W is defined as in the following expressions:

$$X = \begin{pmatrix} x_{11} & x_{12} & \cdots & x_{1J} \\ x_{21} & x_{22} & \cdots & x_{2J} \\ \cdots & \cdots & \cdots & \cdots \\ x_{I1} & x_{I2} & \cdots & x_{IJ} \end{pmatrix}$$

$$W = \begin{pmatrix} w_1 \\ w_2 \\ \cdots \\ w_J \end{pmatrix}, Y' = \begin{pmatrix} E[y_1] \\ E[y_2] \\ \cdots \\ E[y_I] \end{pmatrix}$$

the following expression can be obtained:

$$AW = v \quad (8)$$

Regarding the normalization equations in expression (7), by preparing some sets of student data $x_{ij}$ and training data $y_i$, the number of normalization equations can be made identically to the number J of tap coefficients $w_i$ to be found. Thus, by solving expression (8) on vector W (for solving expression (8), matrix A must be regular), optimal tap coefficient $w_j$ can be found. For solving expression (8), for example, Gauss-Jordan elimination method, etc., can be used.

As described above, in adaptive processing, by using student data and training data, learning that finds tap coefficient $w_j$ minimizing statistical error (e.g., square error) in finding training data from the student data and the tap coefficients is performed, and the tap coefficient $w_j$ is used in expression (1) to find predicted value E[y] close to training data y.

The adaptive processing differs from simple interpolation in reproducing a component which is not included in an SD picture but is included in an HD picture. In other words, when only expression (1) is considered, the adaptive processing seems identical to simple interpolation using a so-called "interpolating filter". However, tap coefficient w corresponding to the tap coefficient of the interpolating filer can be found by, so to speak, "learning" using training data y. Thus, the component included in the HD picture can be reproduced. From this point, it may be said that the adaptive processing has, so to speak, a picture creating (resolution creating) operation.

Here, the adaptive processing based on linear first-degree prediction (expression (1) has been described. However, in the adaptive processing, second-degree or higher-degree prediction calculation can be used.

FIG. 48 shows an example of the adaptive processing unit 446 in FIG. 47 for performing the above adaptive processing.

The SD picture data stored in the storage 444 is supplied to a buffer 451, for example, in units of frames. The buffer 451 temporarily stores the SD picture data.

In a prediction-tap unit 452, among the frames of the SD picture data stored in the buffer 451, the oldest frame (the temporarily most previous frame) that has not been processed yet is used as a frame of interest, HD pixels constituting HD picture data having increased picture quality of the SD picture data of the frame of interest are sequentially used as pixels of interest. From the SD picture data stored in the buffer 451, SD pixels for use in predicting the pixel levels of the pixels of interest are extracted and output as prediction taps for use in a calculating unit 453 in a post-stage.

In other words, the prediction-tap extracting unit 452 extracts and outputs, as a prediction tap, some SD pixels (e.g., horizontally 5 by vertically 5 SD pixels) which are spatially or temporally close to the positions of pieces of SD picture data corresponding to the positions of the pixels of interest.

By using the prediction taps on the pixels of interest which are output from the prediction-tap extracting unit 452, and tap coefficients of the class of the pixels of interest which are supplied from a coefficient memory 455 (described later), the calculating unit 453 performs the linear first-degree prediction calculation in expression (1), whereby the pixel levels (predicted values of the pixel levels of HD pixels) of the pixels of interest are calculated and output.

From among the class code pictures stored in the class-code database 446 (FIG. 47), those generated from the HD picture data in the frame of interest are read as class-code pictures of interest by a class-code reading unit 454. Also, in the class-code reading unit 454, among the class codes of class-code pictures of interest, those corresponding to the pixels of interest are supplied as addresses to the coefficient memory 455.

To the class-code pictures generated by the transmitting processing unit 401 shown in FIG. 45, frame identifying information for identifying HD picture frames corresponding to the class-code pictures are added. The class-code picture (the class-code picture generated from the HD picture data in the frame of interest) corresponding to the frame of interest is identified based on its frame identifying information by the class-code reading unit 454.

The coefficient memory 455 stores tap coefficients for HD classes which are calculated by making and solving the normalization equation in expression (8) for classes (hereinafter referred to also as "HD classes") into which the HD pixels of the HD picture data can be classified when HD picture data for learning is used as training data, and SD picture data for learning is used as student data. In other words, in the coefficient memory 455, at addresses corresponding to the HD classes, the tap coefficients of the HD classes are stored. The coefficient memory 455 reads, from the address corresponding to the class of the pixels of interest which is supplied from the class-code reading unit 454, the tap coefficient of the class, and supplies the read tap coefficient to the calculating unit 453.

A method for performing learning that finds tap coefficients for classes is described later.

The receiving processing unit 402 in FIG. 47 performs a picture data receiving process for processing picture data transmitted from the PDA 101, a request signal transmitting process for transmitting a request signal to the PDA 101, and an adaptive process for increasing the picture quality of the picture data.

Figure 49C:
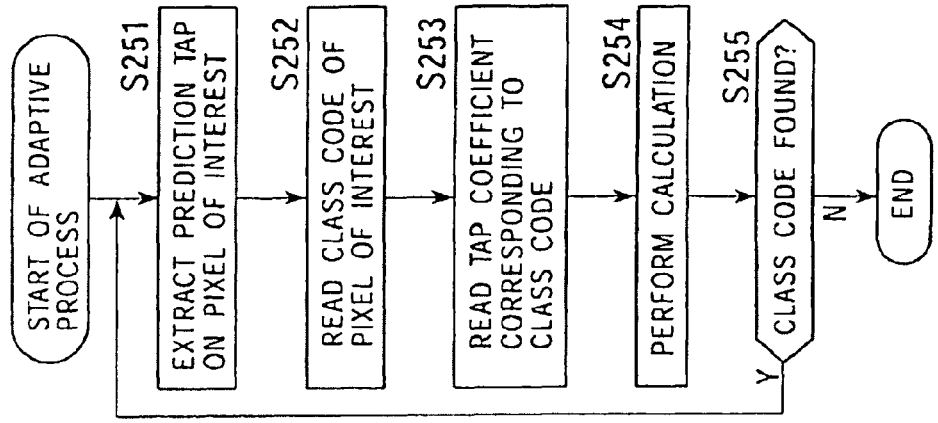
FIGS. 49A, 49B, and 49C are flowcharts respectively illustrating a picture data receiving process, a request signal transmitting process, and an adaptive process which are performed by the receiving processing unit 402.
Figure 49B:
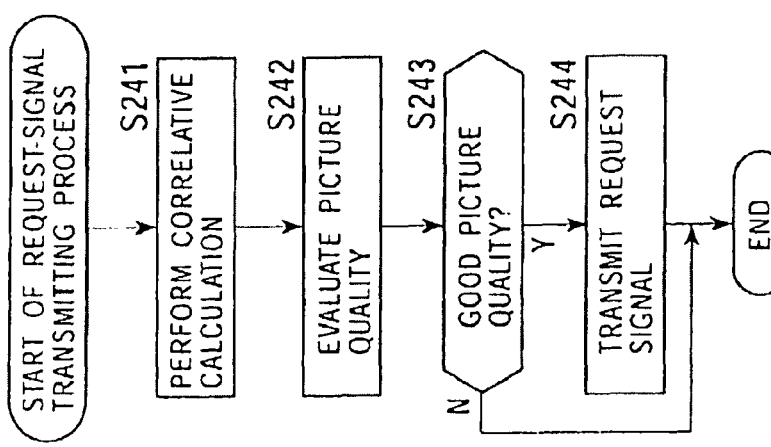

Accordingly, the picture data receiving process, the request signal transmitting process, and the adaptive process which are performed in the receiving processing unit 402 are described below with reference to the flowcharts shown in FIGS. 49A to 49C.

At first, the picture data receiving process is described below with reference to the flowchart in FIG. 49A.

The data transmitted from the PDA 101 is received by the antenna 64 (FIG. 23), and is supplied as received data to the receiving-control unit 441 through the communication interface 218.

When the received data represents class-code picture, the receiving-control unit 441 supplies and stores the class-code picture in the class-code database 446.

When the received data represents SD picture data, the receiving-control unit 441 supplies and stores the SD picture data in the receiving buffer 442.

When the receiving buffer 442 initiates storing the SD picture data, the picture data receiving process starts. At first, in Step S231, by using, as a frame of interest, the oldest (temporarily most previous) frame among the SD picture data stored in the receiving buffer 442, the registering unit 443 reads the SD picture data in the frame of interest, and deletes the read SD picture data from the receiving buffer 442. In Step S231, the registering unit 443 determines whether SD picture data in a frame identical to the frame of interest of the SD picture data which is read from the receiving buffer 442 has already been stored in the storage 444.

In the transmitting processing unit 401 in FIG. 45, the receiving buffer 442 adds, to the frames of the SD picture data output as transmitted data, identifying information for identifying each frame. By referring to the frame identifying information, the registering unit 443 determines whether SD picture data in a frame identical to the frame of interest of the SD picture data which is read from the receiving buffer 442 has already been stored in the storage 444.

The reason that the receiving processing unit 402 has a plurality of identical frames of SD picture data is that, as described in the flowchart in FIG. 46A, the transmitting processing unit 401 may transmit SD picture data in identical frames.

In Step S231, if it is determined that the SD picture data in the frame identical to the frame of interest is not stored in the storage 444, the process proceeds to Step S232. The registering unit 443 writes the SD picture data in the frame of interest in the storage 444, and the process proceeds to Step S236.

Conversely, in Step S231, if it is determined that the SD picture data in the frame identical to the frame of interest is stored in the storage 444, the process proceeds to Step S233. The registering unit 443 reads SD picture data in the frame identical to the frame of interest from the SD picture data stored in the storage 444, and the process proceeds to Step S234.

In Step S234, the registering unit 443 performs weighting addition on the SD picture data in the frame of interest and the SD picture data in the frame identical to the frame of interest which is read in Step S234, and generates SD picture data in a new frame of interest in which weighted added values are used as pixel levels.

Specifically, the registering unit 443 performs positioning on the SD picture data in the frame of interest and the SD picture data in the frame identical to the frame of interest, addition for weighting pixel levels in the same position, and calculates new pixel levels in the same position.

In the addition for weighting in Step S234, weights for use in the addition for weighting can be determined based on, for example, the number of times the addition for weighting is performed on the SD picture data read from the storage 444.

In other words, when the storage 444 stores the SD picture data in the frame identical to the frame of interest, the registering unit 443 performs addition for weighting on the SD picture data in the frame of interest and the SD picture data stored in the storage 444, and SD picture data in which weighted added values are used as pixel levels is newly stored as picture data in the storage 444 in overwritten form.

When the SD picture data in the frame identical to the frame of interest which is stored in the storage 444 consists of weighted added values of SD picture data for N frames, in Step S234, by setting 1 to the weight for the SD picture data in the frame of interest, and N to the weight for the SD picture data in the frame identical to the frame of interest, addition for weighting on the two pieces of SD picture data can be performed.

The weighting method is not limited to that described above.

The registering unit 443 proceeds to Step S235 after, on the frame of interest, obtaining the new SD picture data as added values for weighting the SD picture data read from the receiving buffer 442 and the SD picture data read from the storage 444. The registering unit 443 supplies and uses the new SD picture data in the frame of interest to overwrite, in the storage 444, the stored SD picture data in the frame identical to the frame of interest.

Proceeding to Step S236, the registering unit 443 determines whether the receiving buffer 442 still stores the SD picture data. If the registering unit 443 has determined that the SD picture data is stored, the process returns to Step S231, and repeatedly performs the processing, with the next frame (a frame to be processed next) as a new frame of interest.

In Step S236, if it is determined that the SD picture data is not stored in the receiving buffer 442, the process ends.

As described above, since addition for weighting SD picture data in identical frames are performed in the picture receiving process, SD picture data having increase picture quality can be obtained.

When SD picture data is transmitted from the PDA 101 to the PDA 103, in the transmission, noise may be superimposed on the SD picture data, and part of the data may be lost. The noise superimposition and data lack cause a large deterioration in the picture quality of the SD picture data. Accordingly, the registering unit 443 can prevent the picture quality from deteriorating (can increase the picture quality when a picture having deteriorated quality is used as a reference) by performing addition for weighting SD picture data in identical frames, as described above.

Next, the request signal transmitting process is described below with reference to the flowchart in FIG. 49B.

The request signal transmitting process starts, for example, with arbitrary timing. At first, in Step S241, the picture-quality determining unit 432 reads the SD picture data in each frame which is stored in the storage 444, and calculates auto-correlation of the SD picture data in each frame.

Processing to Step S242, the process evaluates the picture quality of the SD picture data in each frame, based on the auto-correlation calculated in Step S241. The process proceeds to Step S243.

In Step S243, based on the evaluated result of the picture quality in Step S242, the picture-quality determining unit 432 determines whether the SD picture data in each frame has, to some extent, good picture quality. In Step S243, if the picture-quality determining unit 432 has determined that the SD picture data in each frame does not have so good picture quality, the process skips over Step S244 and ends.

In Step S243, if the picture-quality determining unit 432 has determined that the SD picture data in each frame has, to some extent, good picture quality, it proceeds to Step S244, and the picture-quality determining unit 432 controls the request-signal transmitting unit 433 to output a request signal before the process ends.

The request signal is transmitted to PDA 101, as described above, and when receiving the request signal, the transmitting processing unit 401 (FIG. 45) in the PDA 101 transmits a class-code picture, with the request signal as an event, as described above. The class-code picture is supplied through the receiving-control unit 441 and stored in the class-code database 446.

In Step S242, for example, whether the auto-correlation of the SD picture data is not less than (greater than) a predetermined threshold value, a condition that the auto-correlation of the SD picture data is not less than a predetermined threshold value, and the auto-correlation which is not less than the predetermined threshold value does not almost change before and after the addition for weighting is performed in the picture data receiving process, etc., can be employed as standards for evaluating the picture quality of SD pictures.

Figure 49A:
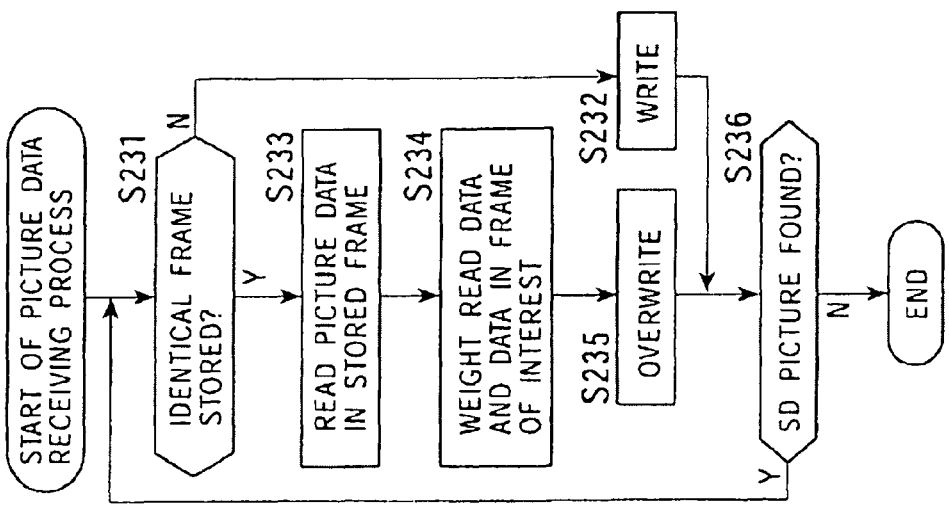

In Step S243, when the above evaluation standard is satisfied, that is, in a case in which the auto-correlation of the SD picture data is not less than a predetermined threshold value, or in a case in which the auto-correlation of the SD picture data is not less than a predetermined threshold value, and the audio-correlation which is not less than the predetermined threshold value does not almost change before and after the addition for weighting is performed in the picture data receiving process in FIG. 49A, it can be determined that the SD picture data in each frame which is stored in the storage 444 has, to some extent, good picture quality.

Although the above example uses the auto-correlation of SD picture data as an evaluation value for evaluating the picture quality of the SD picture data, other evaluation values can be used.

By way of example, mutual correlation of pieces of data before and after the picture data receiving process in FIG. 49A performs the addition for weighting of the SD picture data stored in the storage 444 can be employed as an evaluation value for evaluating the picture quality of SD picture data. In this case, the picture-quality determining unit 432 requires SD picture data in a state before the addition for weighting and SD picture data in a state after the addition for weighting. The SD picture data in the state before the addition for weighting can be acquired by performing reading from the storage 444, and the SD picture data in the state after the addition for weighting can be acquired by requesting the registering unit 443.

Also, in the case of using the above mutual correlation as the evaluation value for evaluating the picture quality of SD picture data, similarly to the case of using the auto-correlation of SD picture data, a condition of whether the mutual correlation of SD picture data is not less than a predetermined threshold value, etc., can be employed as the evaluation standard for the picture quality of SD picture data.

Next, the adaptive process is described below with reference to the flowchart in FIG. 49C.

The adaptive process starts, for example, when the class-code picture is stored in the class-code database 446.

Specifically, when the class-code picture is stored in the class-code database 446, the adaptive processing unit 447 (FIG. 48) sequentially reads the SD picture data stored in the storage 444, and stores the read data in the buffer 451.

In the prediction-tap extracting unit 452, among the frames of the SD picture data stored in the buffer 451, the oldest frame (temporally most previous frame) that has not been processed yet is used as a frame of interest. Also, in Step S251, by using, as a pixel of interest, one of HD pixels whose predicted values have not been calculated, among HD pixels constituting the HD picture data (assumed to exist though it does not actually exist) having increased picture quality of the SD picture data in the frame of interest, the prediction-tap extracting unit 452 extracts SD pixels for use in predicting the pixel level of the pixel of interest from the SD picture data stored in the buffer 451, and outputs the pixels as a prediction tap.

After that, proceeding to Step S252, by using, as a picture of class code of interest, one generated from the HD picture data in the frame of interest from the class-code pictures stored in the class-code database 446 (FIG. 47), the class-code reading unit 454 reads the class code corresponding to the pixel of interest from among the class codes corresponding to the picture of the class code of interest, and supplies the read class code as an address to the coefficient memory 455.

In the class-code database 446, the class code read therefrom is deleted by the class-code reading unit 454, for example after reading the class code.

When receiving the class code as an address, the coefficient 455 proceeds to Step S253, reads a prediction tap in the class corresponding to the class code, and supplies the prediction tap to the calculating unit 453. The process proceeds to Step S254.

In Step S254, by using the prediction tap on the pixel of interest which is output from the prediction-tap extracting unit 452 and the tap coefficient of the class of the pixel of interest which is supplied from the coefficient memory 455, the calculating unit 453 performs the linear first-degree calculation, whereby the pixel level (predicted value of the pixel level of an HD pixel) of the pixel of interest is calculated and output. The process proceeds to Step S255.

In Step S255, the class-code reading unit 454 determines whether the class codes are still stored in the class-code database 446. If the class-code reading unit 454 has determined that the class codes are still stored, the process returns to Step S251, and the same processing is repeatedly performed by using, as a new pixel of interest, an HD pixel corresponding to any one of the class codes stored in the class-code database 446.

In Step S255, if it is determined that no class code is stored in the class-code database 446, the process ends.

As described above, the SD picture data transmitted from the transmitting processing unit 401 is accumulatively stored in the receiving processing unit 402, and the picture quality thereof is increased by the addition for weighting.

When the picture quality of the SD picture data is, to some extent, increased, the request signal is transmitted to the transmitting processing unit 401. This causes the class-code picture transmitted from the transmitting processing unit 401 to be stored in the class-code database 446. By using the class-code picture, the SD picture data is transformed to HD picture data.

Accordingly, in the receiving processing unit 402, when the picture quality of the SD picture data is, to some extent, increased, the increase is used as a trigger to request a class-code picture, and based on the class-code picture, HD picture data in which the picture quality of the SD picture data is further increased can be obtained. In other words, the increase in the picture quality of the SD picture data triggers transformation of the SD picture data to HD picture data having better picture quality.

Therefore, for the user, the picture quality is suddenly increased.

In the above description, the picture quality (e.g., signal-to-noise ratio, etc.) of SD picture data is increased by addition for weighting, and after the picture quality of the SD picture data becomes good to some extent. However, the SD picture data can be transformed into HD picture data without increasing the picture quality of the SD picture data, as described above.

The tap coefficients stored in the coefficient memory 455 which are used in the adaptive processing unit 447 (FIG. 48) for performing the adaptive process as a transformation process from an SD picture into an HD picture are calculated in the normalization equation in expression (8) by, in general, using HD picture data for learning as training data, and SD picture data generated by simply deteriorating the resolution of the HD picture data, as student data. Thus, the SD picture data as student data is free from lack of data and superimposed noise. Therefore, when performing an adaptive process on SD picture having superimposed noise and greatly deteriorated picture quality, it may be difficult to obtain HD picture data having sufficiently increased picture quality.

Accordingly, it is preferable that the adaptive process be performed by using SD picture data with increased picture quality, that is, data generated by accumulatively storing previously received SD picture data while performing addition for weighting.

In the above-described case, based on the auto-correlation of SD picture data, the picture-quality determining unit 432 determines the picture quality of SD picture data stored in the storage 444. However, the determination of the picture quality of the SD picture may be performed by the user.

Specifically, it is possible that, by controlling the LCD 3 (FIG. 23) to display the SD picture data stored in the storage 444, the operation unit 224 (FIG. 23) be operated by the user when he or she feels that the picture quality of the SD picture data becomes good. In this case, the operation unit 225 outputs, to the request-signal transmitting unit 433, an operation signal (hereinafter referred to also as a "picture-quality-increase operation signal") indicating that the operation has been performed. When receiving the picture-quality-increase operation signal as indicated by the broken line in FIG. 47, the request-signal transmitting unit 433 transmits a request signal.

Also, in this case, the class-code picture is transmitted from the transmitting processing unit 401 (FIG. 45) to the receiving processing unit 402. Thus, definitely, the receiving processing unit 402 can obtain HD picture data in which the picture quality of SD picture data is increased. In other words, in this case, the user's operation as an external input triggers transformation of the SD picture into the HD picture.

In addition, the request-signal transmitting unit 433 determines whether the PDA 103 as a receiver is on standby in a state in which it does not perform data transmission and reception. When the PDA 103 is on standby, the request signal can be transmitted. In this case, the class code is transmitted from the transmitting processing unit 401 to the receiving processing unit 402 when the PDA 103 (the receiving processing unit 402) is on standby.

In addition to detection of the request signal, the transmitting processing unit 401 in FIG. 45 determines whether the PDA 101 as a transmitter is on standby in a state in which it does not perform data transmission and reception. When the PDA 101 is on standby, an event message can be output. In this case, the class code is transmitted from the transmitting processing unit 401 to the receiving processing unit 402 when the PDA 101 (the transmitting processing unit 401) is on standby.

In addition, a state in which both the PDA 101 as a transmitter and the PDA 103 as a receiver are on standby is used as a predetermined event to enable the transmission of the class code from the transmitting processing unit 401 to the receiving processing unit 402.

Figure 50:
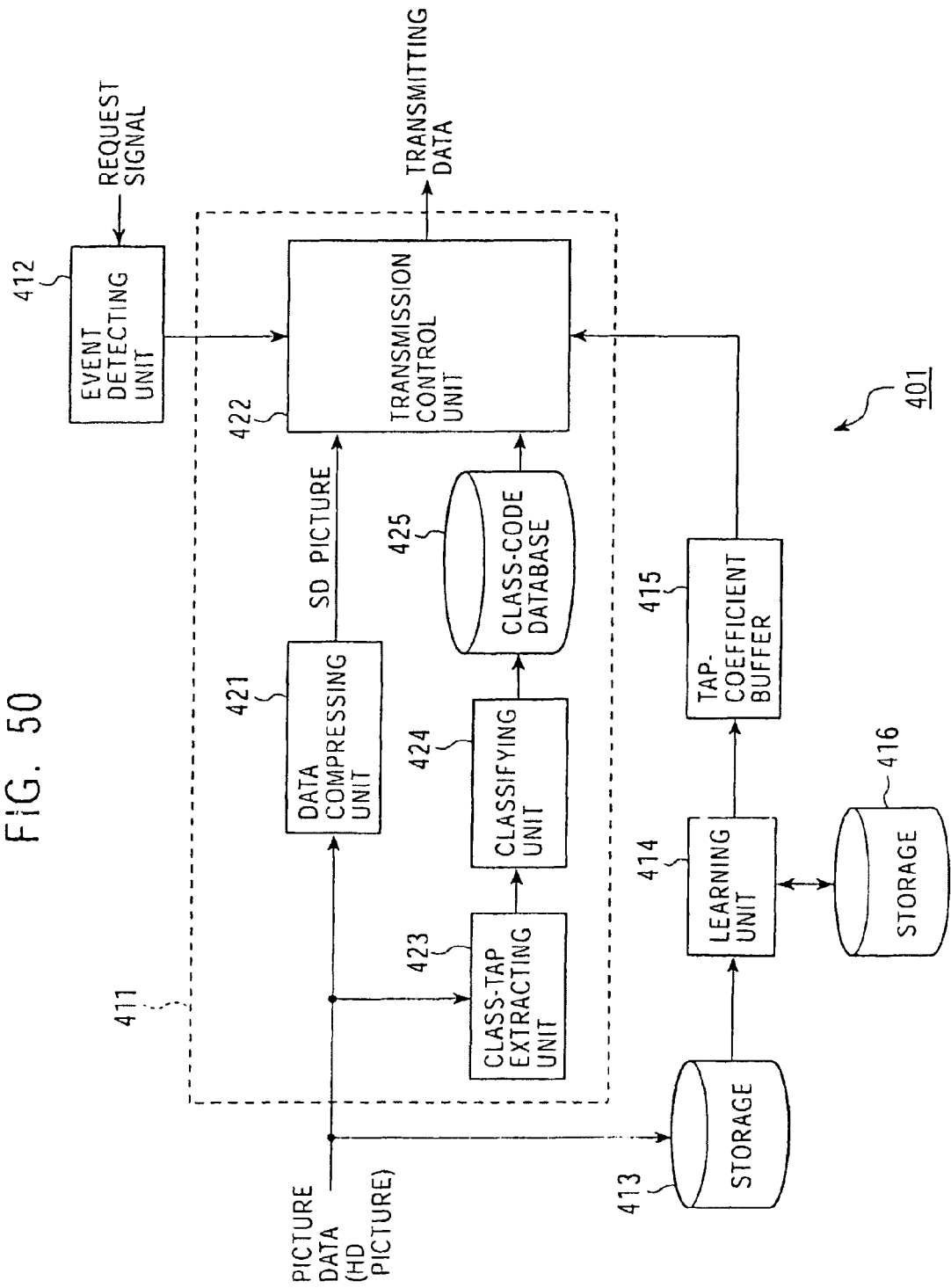
FIG. 50 is a block diagram showing a second example of the transmitting processing unit 401.

Next, FIG. 50 shows a second example of the transmitting processing unit 401 in FIG. 44. In FIG. 50, by denoting portions corresponding to those shown in FIG. 45 by identical reference numerals, their descriptions are omitted if needed. The transmitting processing unit 401 in FIG. 50 is basically identical to that shown in FIG. 45 excluding a storage 413, a learning unit 414, a tap-coefficient buffer 415, and a storage 416 which are newly provided.

HD picture data identical to that supplied to an encoder 411 is supplied to the storage 413. The storage 413 temporarily stores the HD picture data.

By using the HD picture data newly stored in the storage 413 as picture data for learning, and performing learning that makes and solves the normalization equation in expression (8), the learning unit 414 acquires a tap coefficient for use in the adaptive process. The tap coefficient is supplied to a tap-coefficient buffer 415.

The tap-coefficient buffer 415 temporarily stores the tap coefficient output from the learning unit 414. With timing that the class code store in a class-code buffer 425 is transmitted by the transmission-control unit 422, the tap coefficient stored in the tap-coefficient buffer 415 is transmitted with the above class code.

When the learning unit 414 performs learning on tap coefficients, the storage 416 temporarily stores information which can be obtained in the process of the learning.

Figure 51:
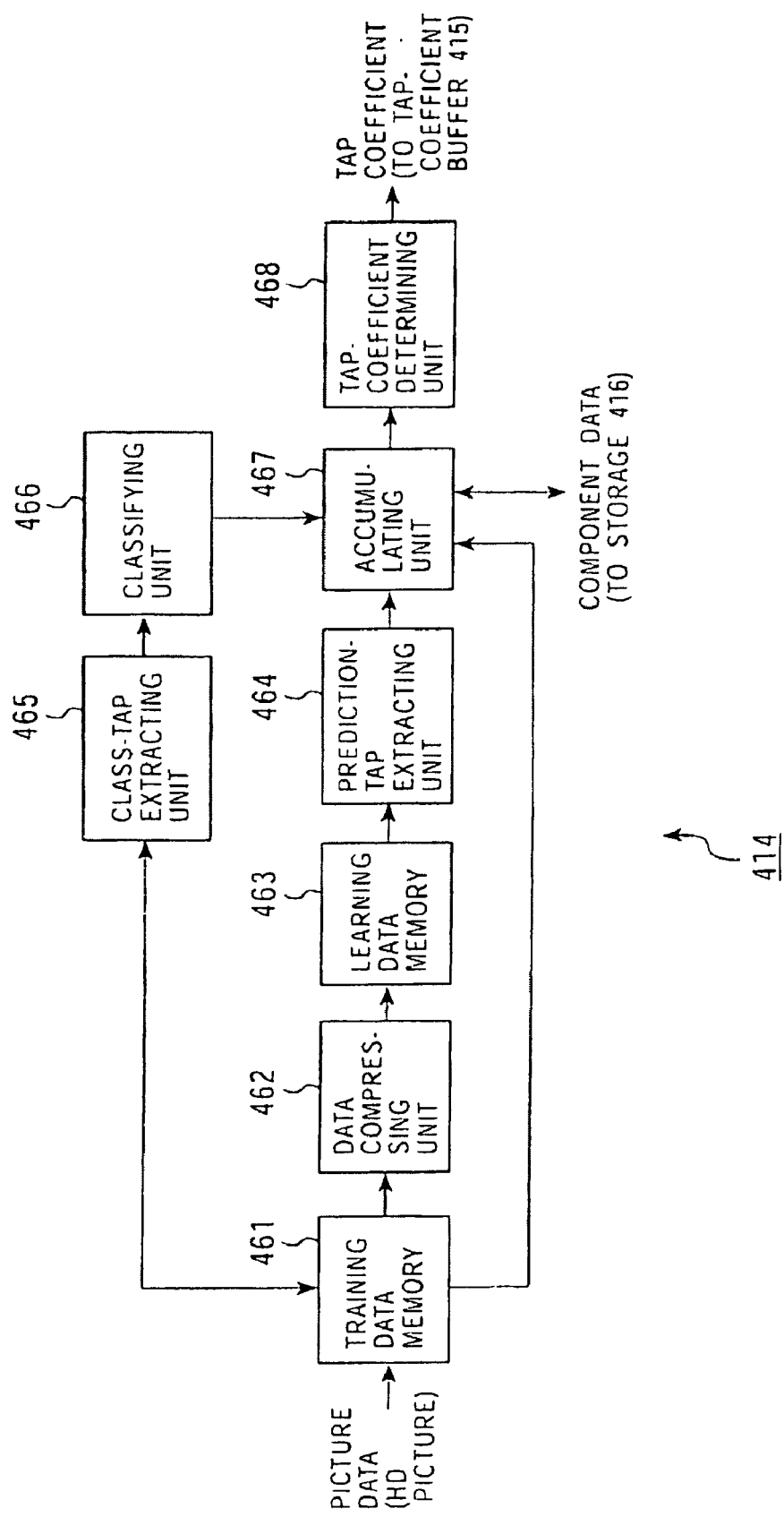
FIG. 51 is a block diagram showing an example of a learning unit 414.

Next, FIG. 51 shows an example of the learning unit 414 in FIG. 50.

In a training data memory 461, for example, HD picture data which is newly stored in the storage 413 is stored as training data.

A data compressing unit 462 generates and outputs SD picture data by compressing the HD picture data similarly to that performed by the data compressing unit 421 in FIG. 50.

In a student data memory 463, the SD picture data output from the data compressing unit 462 are stored as student data.

By sequentially using, as pixels of interest, HD pixels constituting the HD picture data as training data stored in the training data memory 461, a prediction-tap extracting unit 464 generates, for the pixels of interest, from SD pixels constituting the SD picture data as student data stored in the student data memory 463, prediction taps identical to those generated by the prediction-tap extracting unit 452 (the production-tap extracting unit 452 in FIG. 54 which is described later) in FIG. 48, and supplies the prediction taps to an accumulating unit 467.

A class-tap extracting unit 465 generates, for the pixels of interest, class taps identical to those generated by the class-tap extracting unit 423 in FIG. 50 from HD pixels constituting the HD picture data as training data stored in the training data memory 461. The generated class taps are output to a classifying unit 466.

Based on the class taps for the pixels of interest supplied from the class-tap extracting unit 465, the classifying unit 466 classified the pixels of interest similarly to the case of the classifying unit 424 in FIG. 50, and outputs class-representing class codes to the accumulating unit 467.

The accumulating unit 467 reads the training data (HD pixels) used as the training data from the training data memory 461, and performs, for each class supplied from the classifying unit 466, accumulation of student data constituting the prediction taps from the prediction-tap extracting unit 464 and the training data as the pixels of interest while using the storage contents of the storage 416 (FIG. 50).

Specifically, by using the prediction taps (student data), the accumulating unit 467 performs, for each class corresponding to the class code supplied from the classifying unit 466, multiplication ($x_{in}x_{im}$) of pieces of the student data which are components of the matrix A in expression (8) and calculation corresponding to summation ($\Sigma$).

Also, by using the prediction taps (student data) and the pixels of interest (training data), the accumulating unit 467 performs, for each class corresponding to the class code supplied from the classifying unit 466, multiplication ($x_{in}y_i$) of the student data and the training data which are components of the vector v in expression (8), and calculation corresponding to summation ($\Sigma$).

In the storage 416, a component of the matrix A and component of the vector v in expression (8), found up to the previous leaning in the accumulating unit 467, are stored for each class.

When performing learning by using new picture data for learning, the accumulating unit 467 reads the component of matrix A and the component of vector v in expression (8) (found up to the previous learning), and performs accumulation of corresponding component $x_{in}x_{im}$ or $x_{in}y_i$ calculated, for the component of matrix A or the component of vector v by using training data and student data obtained from the new picture data for learning, whereby a new normalization equation as shown in expression (8) is made for each class.

Accordingly, the accumulating unit 467 makes the normalization equation in expression (8) not only based on new picture data for learning but also based on picture data used in the previous learning. In other words, in the storage 416, the components of matrix A and vector v, obtained by the previous learning, are accumulated, and the accumulating unit 467 makes the normalization equation in expression (8) by also using the accumulated components of matrix A and vector v.

By way of example, when the learning unit 414 performs the first learning, the storage 416 does not store the components of matrix A and vector v found up to the previous learning. Thus, the normalization equation in expression (8) is established by simply using the present picture data for learning.

In this case, a class may be generated in which the required number of normalization equations for finding tap coefficients cannot be obtained because the number of samples of picture data for learning is insufficient.

Accordingly, in the storage 416, a component of matrix A and a component of vector v which correspond to each class and which are obtained by performing learning using a large number of prepared HD picture data as data for learning can be stored as initial values. The can prevent the generation of a class in which the required number of normalization equations for finding tap coefficients cannot be obtained.

After finding new components of matrix A and vector v for each class by using components of matrix A and vector v which are obtained from new picture data for learning, and the components of matrix A and vector v which are stored in the storage 416, the accumulating unit 457 supplies and stores the components in the storage 416 in an overwritten form.

Also, the accumulating unit 467 supplies a tap-coefficient determining unit 458 with a normalization equation as shown in expression (8) which includes newly found components for each class of matrix A and vector v.

By solving the normalization equation for each class which is supplied for the accumulating unit 467, the tap-coefficient determining unit 468 finds a tap coefficient for each class, and supplies and stores the tap coefficient in the tap-coefficient buffer 415 (FIG. 50) in overwritten forms.

In the learning unit 414 in FIG. 51, the class-tap extracting unit 465 generates a class tap from HD pixels constituting the HD picture data similarly to the case of the class-tap extracting unit 423 in FIG. 50, and the classifying unit 466 performs classification based on the class tap constituted by the HD pixels. Thus, the tap coefficients for classes obtained in the tap-coefficient determining unit 468 correspond to tap coefficients for HD classes.

In the transmitting processing unit 401 having the above-described construction, in addition to the picture data transmitting process, the class-code generating process, and the class-code transmitting process which are described using FIGS. 46A to 46C, a learning process for finding tap coefficients for classes, and a tap-coefficient transmitting process for transmitting tap coefficients for HD classes are performed.

The learning process and tap-coefficient transmitting process performed in the transmitting processing unit 401 in FIG. 50 are described below with reference to the flowcharts shown in FIGS. 50A and 50B.

At first, the learning process of the transmitting processing unit 401 in FIG. 50 is described below with reference to the flowchart in FIG. 50A.

The learning process starts with predetermined timing in the learning unit 414 (FIG. 51).

Specifically, the learning unit 414 starts the learning process, for example, periodically or when new HD picture data of a predetermined number of frames or greater is stored in the storage 413 (FIG. 50).

When the learning process starts, new HD picture data, stored from the previous learning to the present learning in the storage 413 (FIG. 50), is read as new picture data for leaning and is supplied and stored as training data in the training data memory 461.

In Step S261, the accumulating unit 467 reads, from the storage 416, the components of matrix A and vector v in expression (8), and proceeds to Step S262.

In Step S262, the data compressing unit 462 reads the training data stored in the training data memory 461, and transforms the read data into SD picture data. The SD picture data is supplied and stored as student data in the student data memory 463.

In Step S263, in the prediction-tap extracting unit 464, among the HD pixels as the training data stored in the storage 416, one of those that have not been used yet as pixels of interest is used as a pixel of interest, and for the pixel of interest, some SD pixels are read as student data form the student data memory 463, whereby a prediction tap is generated.

Also, in Step S263, the prediction-tap extracting unit 464 generates a class tap by reading, for the pixel of interest, some HD pixels as training data from the training data memory 461.

The prediction tap generated in the prediction-tap extracting unit 464 is supplied to the accumulating unit 467, and the class tap generated in the class-tap extracting unit 465 are supplied to the classifying unit 466.

After that, the process proceeds to Step S264, and the classifying unit 466 classifies the pixel of interest based on the class tap supplied from the class-tap extracting unit 465, and supplies the accumulating unit 467 with a class code representing the class of the pixel of interest.

In Step S265, the accumulating unit 467 reads a pixel of interest from the training data memory 461, and uses the pixel of interest and the prediction tap form the prediction-tap extracting unit 464 to calculate components of matrix A and vector v. Also, in the accumulating unit 467, the components of matrix A and vector v which are found from the pixel of interest and the prediction tap are added to those, which correspond to the class code supplied from the classifying unit 466, among the components of matrix A and vector v which are read in Step S261 from the storage 416 (FIG. 50), and the process proceeds to Step S266.

In Step S266, the prediction-tap extracting unit 464 determines whether student data that has not been used yet as training data is stored in the training data memory 461. If it is determined that the student data is still stored, the process returns to Step S263, and the same processing is repeatedly performed by using, as new training data, student data that has not been used.

Conversely, if it is determined that the student data that has not been used yet as training data is not stored in the training data memory 461, the accumulating unit 467 supplies the tap-coefficient determining unit 468 with a normalization equation in expression (8) established by the components for each class of matrix A and vector v that have been obtained, and the process proceeds to Step S267.

In Step S267, the accumulating unit 467 supplies and also stores the components for each class of matrix A and vector v which are supplied to the tap-coefficient determining unit 468 in the storage 416 in overwritten form, and the process proceeds to Step S268.

In Step S268, by solving the normalization equation for each class which is supplied from the accumulating unit 467, the tap-coefficient determining unit 468 calculates the tap coefficient for each class. Also, in Step S268, the tap-coefficient determining unit 468 supplies and stores the tap coefficient for each class in the tap-coefficient buffer 415 in overwritten form, and the learning process ends.

Figure 52B:
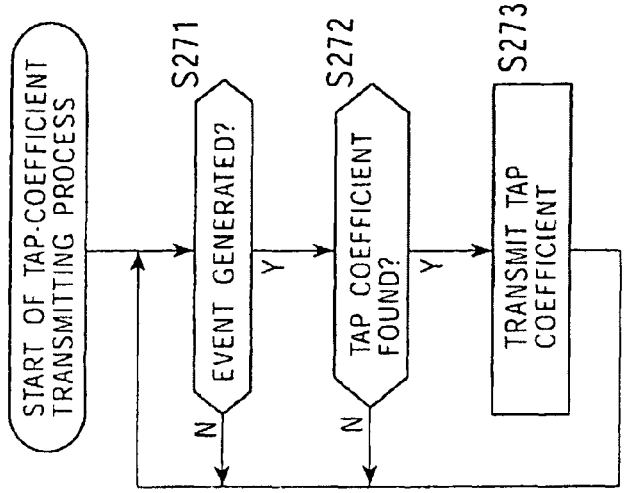
FIGS. 52A and 52B are flowcharts respectively illustrating a learning process and a tap-coefficient transmitting process which are performed by the transmitting processing unit 401.
Figure 52A:
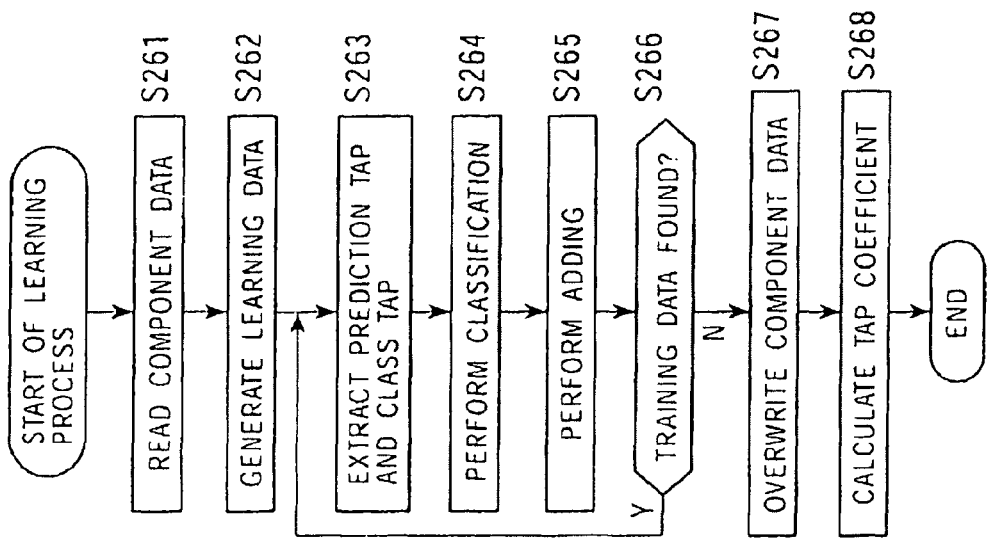

Next, the tap-coefficient transmitting process of the transmitting processing unit 401 in FIG. 50 is described below with reference to the flowchart shown in FIG. 52(B).

In the tap-efficient transmitting process, in Step S271, the transmitting processing unit 401 determines whether a predetermined event has been generated, similarly to the case in Step S221 in FIG. 46C. If it is determined that no event has been generated, the transmitting processing unit 401 returns to Step S271 and waits for the predetermined event to be generated.

In Step S271, if it is determined that the predetermined event has been generated, the process proceeds to Step S272, and the transmission-control unit 422 determines whether the tap coefficient for each class (HD class) is stored in the tap-coefficient buffer 415.

In Step S272, if it is determined that the tap coefficient for each class (HD class) is not stored, the process returns to Step S271, and the same processing is repeatedly performed.

In Step S272, if it is determined that the tap coefficient for each class is stored, the process proceeds to Step S273. The transmission-control unit 422 reads the class code stored in the tap-coefficient buffer 415, and selects the class code as transmitting data. The data is supplied from the receiving buffer 442 to the communication interface 218 (FIG. 23) and is transmitted from the antenna 64.

In Step S273, when the transmission-control unit 422 finishes the transmission of the tap coefficients for all the classes which are stored in the tap-coefficient buffer 415, the process returns to Step S271, and the same processing is repeatedly performed.

Figure 53:
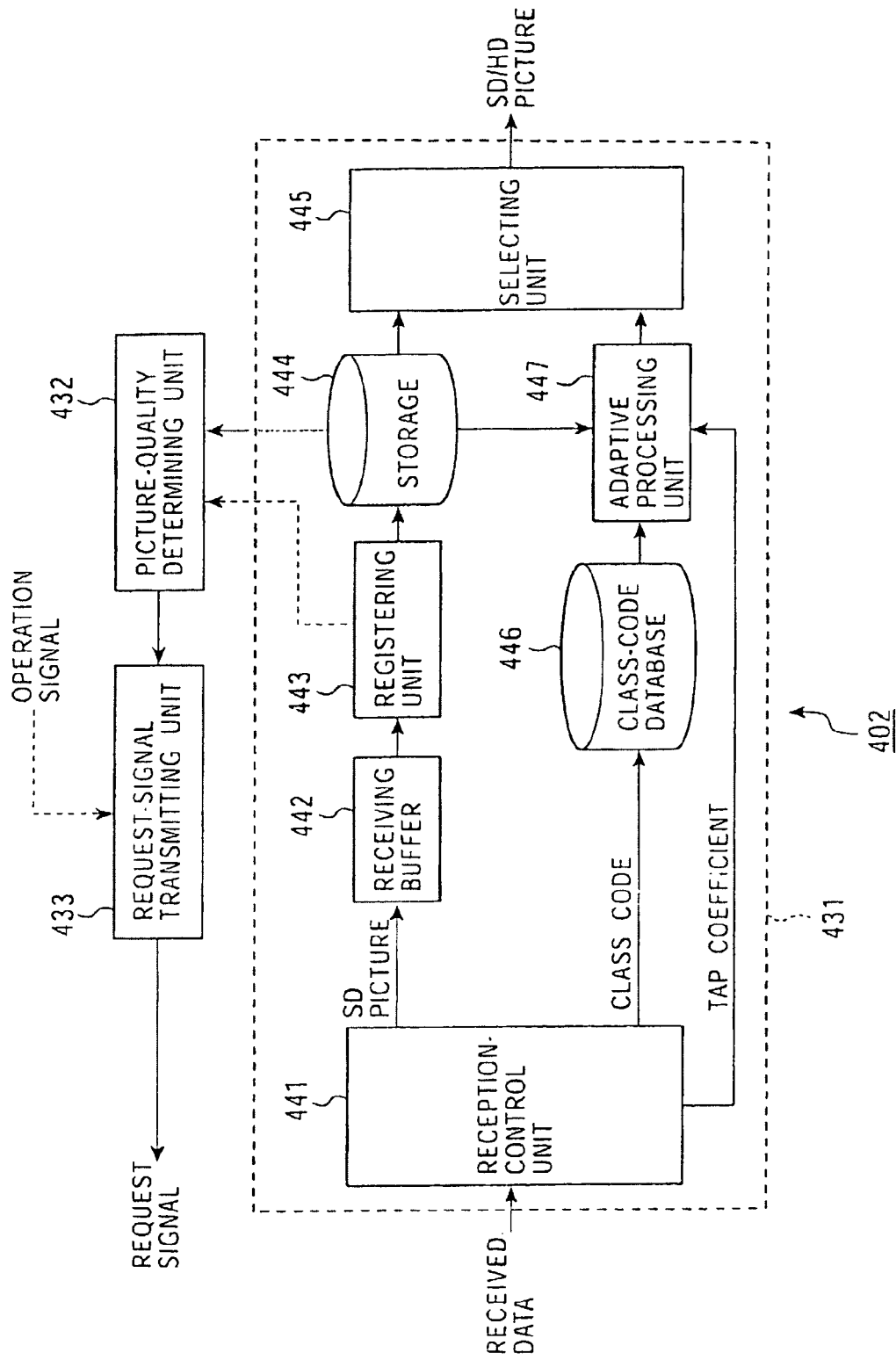
FIG. 53 is a block diagram showing a second example of the receiving processing unit 402.

Next, FIG. 53 shows a second example of the receiving processing unit 402 in FIG. 44. In other words, FIG. 53 shows the structure of the receiving processing unit 402 when the transmitting processing unit 401 has the structure shown in FIG. 50.

In FIG. 53, by denoting portions corresponding to those shown in FIG. 47, their descriptions are omitted if needed. The receiving processing unit 402 in FIG. 53 is basically identical in structure to that shown in FIG. 47 excluding an adaptive processing unit 448 provide instead of the adaptive processing unit 447.

In the example shown in FIG. 53, there may be a case in which the transmitting processing unit 401 in FIG. 50 transmits the tap coefficient for each HD class other than the SD picture data and the class code representing the HD class. When the tap coefficient for each HD class is transmitted, the receiving-control unit 441 supplies the adaptive processing unit 448 with the tap coefficient for each HD class.

The adaptive processing unit 448 performs processing (adaptive processing) similar to the case in the adaptive processing unit 447 in FIG. 48 by using the tap coefficients supplied from the 441, whereby the HD picture data is generated (predicted).

Figure 54:
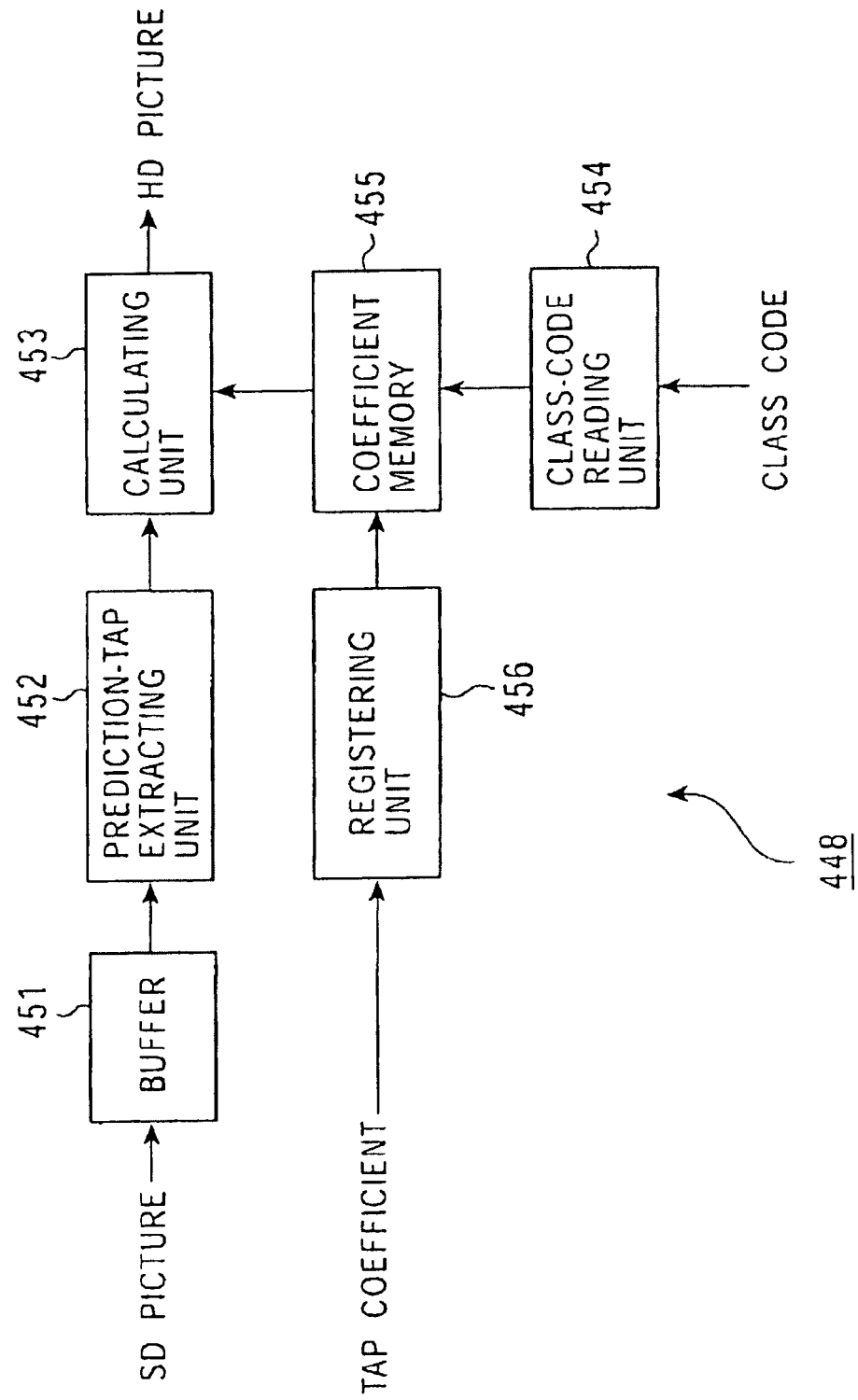
FIG. 54 is a block diagram showing an example of an adaptive processing unit 448.

FIG. 54 shows an example of the adaptive processing unit 448 in FIG. 53. In FIG. 54, by denoting portions corresponding to those in the adaptive processing unit 447 in FIG. 47, their descriptions are omitted if needed. The adaptive processing unit 448 in FIG. 54 is identical in structure to the adaptive processing unit 447 in FIG. 48 excluding a newly provided registering unit 456.

The registering unit 456 receives the tap coefficient for each HD class which is supplied from the receiving-control control unit 441 (FIG. 53), and stores the received tap coefficient in the coefficient memory 455 in overwritten form.

Accordingly, in the example shown in FIG. 48, the adaptive processing is performed by using fixed tap coefficients for HD classes. However, in the example in FIG. 54, when a new tap coefficient for each HD class is transmitted from the transmitting processing unit 401 in FIG. 50, the new tap coefficient for each HD class updates the content of the coefficient memory 455, and the new tap coefficient for each HD class is used to perform adaptive processing.

Since the transmitting processing unit 401 in FIG. 50 updates a tap coefficient by using the new HD picture data as new picture data for learning, as described above, the tap coefficient changes so as to transform an SD picture to a picture closer to an HD picture. Therefore, in the receiving processing unit 402 in FIG. 53, an HD picture having better picture quality can be obtained because such a tap coefficient is used to perform the adaptive processing.

In the data compressing units 421 shown in FIGS. 45 and 50, and the data compressing unit 462 shown in FIG. 51, SD picture data is generated by decimating pixels in the spatial direction of HD picture data. However, the SD picture data can be generated by, for example, decimating pixels in the time domain of the HD picture data.

Figure 55:
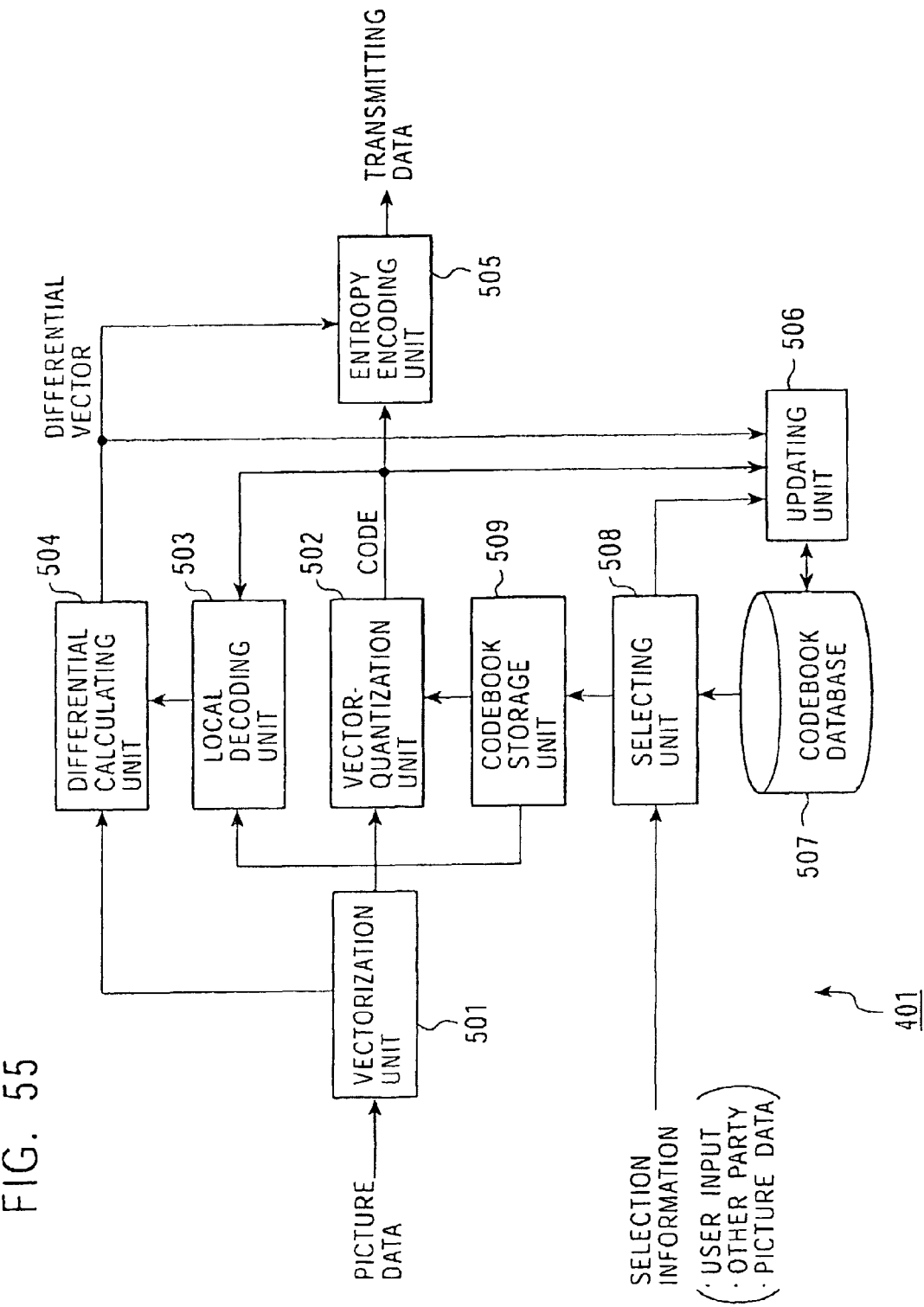
FIG. 55 is a block diagram showing a third example of the transmitting processing unit 401.

Next, FIG. 55 show a third example of the transmitting processing unit 401 in FIG. 44.

In the example shown in FIG. 55, in the transmitting processing unit 401, picture data is encoded by vector-quantization and is transmitted.

Specifically, picture data captured by the CCD camera 65 (FIG. 23), and the picture data stored in the HDD 215 are supplied to a vectorization unit 501. The vectorization unit 501 converts the supplied picture data into a vector. In other words, the vectorization unit 501 converts, for example, the supplied picture data of each frame into, for example, the supplied picture data of each frame into, for example, blocks each composed of horizontally 3 by vertically 3 pixels, and generate a vector (hereinafter referred to as a "picture vector") having components in which the pixel levels of the nine pixels of each block which are arranged in predetermined order. The picture vector obtained in the vectorization unit 501 is supplied to a vector-quantization unit 502 and a differential calculating unit 504.

The vector-quantization unit 502 performs vector quantization on the picture vector supplied from the vectorization unit 501 by referring to a codebook stored in a codebook storage unit 509.

Specifically, the vector-quantization unit 502 calculates distances between all code vectors registered in the codebook stored in the codebook storage unit 509 and the picture vector from the vectorization unit 501, and outputs, as a vector-quantized result, a code corresponding to the code vector corresponding to the least distance. The code output from the vector-quantization unit 502 is supplied to a local decoding unit 503, an entropy encoding unit 505, and an updating unit 506.

The local decoding unit 503 performs vector dequantization on the code supplied from the 502 by using the codebook (identical to that used in vector quantization by the vector-quantization unit 502) stored in the codebook storage unit 509. In other words, in the codebook stored in storage unit 509. In other words, in the codebook stored in the codebook storage unit 509, a code vector corresponding to the code output from the vector-quantization unit 502 is output as a vector-dequantized result by the local decoding unit 503. The code vector as the vector-quantized result is supplied from the local decoding unit 503 to the differential calculating unit 504.

The differential calculating unit 504 calculates a difference between the picture vector supplied from the vectorization unit 501 and the code vector which is supplied from the local decoding unit 503 and which is obtained by performing vector quantization on the picture vector and performing vector dequantization on the vector-quantized result. The differential calculating unit 504 supplies the obtained vector (hereinafter referred to as the "differential vector") to the entropy encoding unit 505 and the updating unit 506.

The entropy encoding unit 505 performs entropy encoding on the code which is supplied from the vector-quantization unit 502 and which is the vector-quantized result of the picture vector, and the differential vector which is supplied from the differential calculating unit 504 and which is obtained for the picture vector. The entropy-encoded result is output as transmitting data. The data is transmitted to the receiving processing unit 402 (the PDA 103 as the receiver) through the communication interface 218 (FIG. 23).

Since the differential vector is entropy-encoded in the entropy encoding unit 505, as described, when a frequency that the differential vector is zero is high, the amount of the transmitting data can be reduced. In other words, when a frequency quantized error caused by the vector quantization (encoding) using the codebook stored in the codebook storage unit 509 is zero is high, the amount of the transmitting data can be reduced. This means that the amount of transmitting data for obtaining an identical quality picture is reduced. Thus, assuming that the amount of the transmitting data is content, the reduction in the amount of the data is equivalent to an increase in picture quality.

Based on the code sub-panel from the vector-quantization unit 502 and the differential vector supplied from the differential calculating unit 504, the updating unit 506 updates a codebook stored in a codebook database 507. The codebook stored in the codebook storage unit 509, that is, information (a codebook number described later) for specifying a codebook for use in the present vector quantization is supplied from a selecting unit 508 to the updating unit 506. Based on the codebook number, the updating unit 506 specifies the codebook to be updated.

The codebook database 507 stores at least one codebook for use in performing vector quantization on the picture vector.

In the codebook database 507, for example, a codebook generated based on the LBG algorithm or the like by using a large amount of prepared picture data for learning is stored as codebook of initial values, and the updating unit 506 updates the codebook of initial values if need, as described later.

The codebook database 507 stores at least one codebook. In a method for storing the codebook, for example, at least one codebook of initial values may be stored. Also, after only one codebook of initial values is initially stored, the codebook of initial values may be copied if needed.

Selection information is supplied to the selecting unit 508. In accordance with the selection information, the selecting unit 508 selects one for use in vector quantization from among the at least one codebook stored in the codebook database 507. The selecting unit 508 reads the selected codebook from the codebook database 507, and supplies and stores the read codebook in the codebook storage unit 509 in overwritten form.

For example, a user's input, information of the other party in communication, picture data identical to that supplied to the vectorization unit 501, etc., can be used as the selection information. The user's input can be supplied such that the user operates the operation unit 224 (FIG. 23). The information of the other party in communication can be supplied through the antenna 64 and the communication interface 218 (FIG. 23) such that it is transmitted from the PDA 103 as the receiver when the PDA 101 as the transmitter initiates communication with the PDA 103 as the receiver. The picture data identical to that supplied to the vectorization unit 501 is supplied from the CCD camera 65 and the HDD 215 (FIG. 23).

When being supplied with the user's input as selection information, the selecting unit 508 selects one codebook from among the at least one codebook stored in the codebook database 507. Accordingly, in this case, in the vector-quantization unit 502, the codebook designated by the user is used to perform vector quantization on the picture data.

Also, when being supplied as selection information with the information of the other party in communication, the selecting unit 508 selects one codebook from among the at least one codebook stored in the codebook database 507. Accordingly, in this case, in the vector-quantization unit 502, vector quantization on the picture data is performed by using codebooks which are different (different for each other party in communication, or different for each group when a plurality of users are divided into groups) depending on other parties in communication.

Also, when being supplied as selection information with the information of the other party in communication, the selecting unit 508 selects one codebook from among the at least one codebook stored in the codebook database 507. Accordingly, in this case, in the vector-quantization unit 502, vector quantization on the picture data is performed by using codebooks which are different depending on characteristics (e.g., activity representing the picture of picture data, brightness, motion, etc.) of the picture data.

When the selecting unit 508 selects one codebook from among the at least one codebook stored in the codebook database 507, and stores the codebook in the codebook storage unit 509, that is, when the codebook used in vector quantization by the vector-quantization unit 502 is changed, the selecting unit 508 supplies the updating unit 506 with a codebook number specifying the changed codebook (the codebook selected from the codebook database 507).

In the transmitting processing unit 401 having the above-described structure, a picture data transmitting process, a codebook selecting process that transmits picture data in vector-quantized form, a codebook selecting process that selects a codebook for use in the vector quantization, and an updating process that updates the content of the codebook database 507 are performed.

Accordingly, at first, the picture data transmitting process and codebook selecting process, performed by the transmitting processing unit 401, are described below with reference to the flowcharts shown in FIGS. 56A and 56B.

First, the picture data transmitting process is described below with reference to the flowchart in FIG. 56A.

In the picture data transmitting process, picture data to be transmitted is supplied to the vectorization unit 501 in units of frames, and the vectorization unit 501 receives the picture data.

In Step S301, the vectorization unit 501 vecterizes the supplied picture data for one frame. Specifically, the vectorization unit 501 converts the picture data for one frame into, for example, blocks each compound of 3 by 3 pixels, and generates a picture vector having components in which the pixel levels of the nine pixels of each block are arrange in predetermined order. The picture vector for the picture data for one frame, obtained in the vectorization unit 501, is supplied to the vector-quantization unit 502 and the differential calculating unit 504.

Steps S302 to S305 (described below) are performed for each picture vector obtained for the picture data for one frame.

After receiving the picture vector from the vectorization unit 501, in Step S302, the vector-quantization unit 502 vecterizes the picture vector by using the codebook stored in the codebook storage unit 509, and supplies the obtained code to the local decoding unit 503, the entropy encoding unit 505, and the updating unit 506. The process proceeds to Step S303.

In Step S303, by using the codebook stored in the codebook storage unit 509, the local decoding unit 503 performs vector dequantization on the code supplied from the vector-quantization unit 502, and supplies the obtained code vector to the differential calculating unit 504 before proceeding to Step S304.

In Step S304, the differential calculating unit 504 calculates the difference between the picture vector supplied from the vectorization unit 501 and the code vector supplied from the local decoding unit 503, and supplies the obtained differential vector to the entropy encoding unit 505 and the 506. The process proceeds to Step S305.

In Step S305, the entropy encoding unit 505 performs entropy encoding on both the code which is supplied from the vector-quantization unit 502 and which is the result of performing vector quantization on picture vector, and the differential vector which is supplied from the differential calculating unit 504 and which is obtained for the picture vector, and outputs the entropy-encoded result as transmitting data. The data is transmitted to the receiving processing unit 402 (the PDA 103 as the receiver) through the communication interface 218 (FIG. 23).

After that, the process proceeds to Step S306, and the vectorization unit 501 determines whether picture data of the next frame is found. If the vectorization unit 501 has determined affirmatively, the process returns to Step S301, and the same processing is repeatedly performed.

Conversely, in Step S306, if it is determined that no picture data of the next frame is found, the process ends.

Next, the codebook selecting process is described below with reference to the flowchart in FIG. 56B.

The codebook selecting process is started, for example, just before the picture data transmitting process (FIG. 56A) starts.

In the codebook selecting process, in Step S311, the selecting unit 508 selects a default codebook from among the at least one codebook stored in the codebook database 507, and supplies and stores the default codebook in the codebook storage unit 509.

For example, the above codebook of initial values can be employed as the default codebook.

After that, the process proceeds to Step S312, and the selecting unit 508 determines whether the selection information has been supplied. If the selecting unit 508 has determined that no selection information has been supplied, the process skips over Step S313 and proceeds to Step S314.

In Step S312, if it is determined that the selection information has been supplied, the process proceeds to Step S313.

The selecting unit 508 selects, in accordance with the selection information, a codebook for vector quantization from among the at least one codebook stored in the codebook database 507, and supplies and stores the codebook in the codebook storage unit 509.

Proceeding to Step S314, the selecting unit 508 determines whether transmission of the picture data has ended which is performed by the picture data transmitting process (FIG. 56A) started just after starting the present codebook selecting process. If the selecting unit 508 has determined negatively, the process returns to Step S312, and the same processing is repeatedly performed.

Therefore, in this case, when the selecting unit 508 is supplied with new selection information while picture data is being transmitted in the picture data transmitting process, the codebook stored in the codebook storage unit 509, that is, the codebook for use in vector quantization in the vector-quantization unit 502 can be changed based on the new selection information.

Conversely, in Step S314, if it is determined that the transmission of the picture data has ended, the process ends.

Figure 56B:
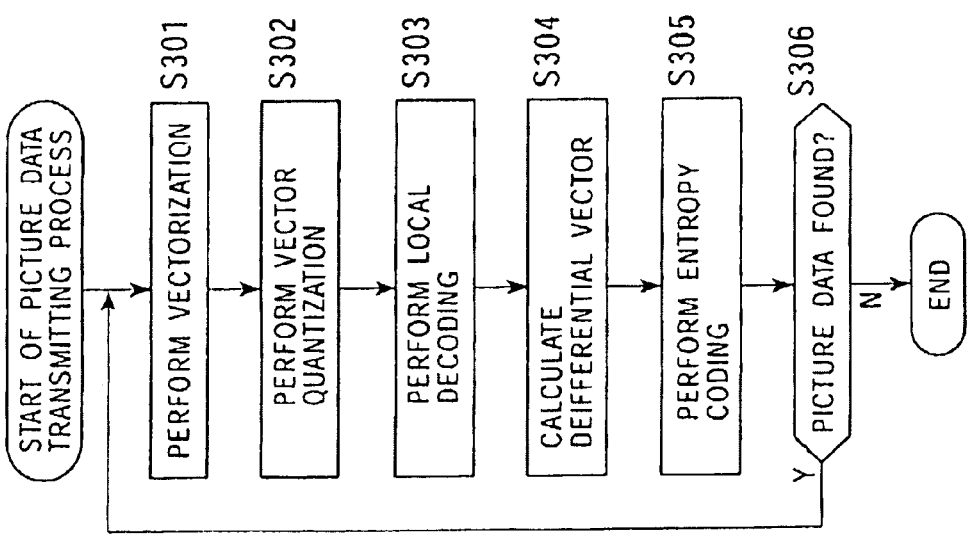
FIGS. 56A and 56B are flowcharts respectively illustrating a picture data transmitting process and a codebook selecting process which are performed by the transmitting processing unit 401.
Figure 56A:
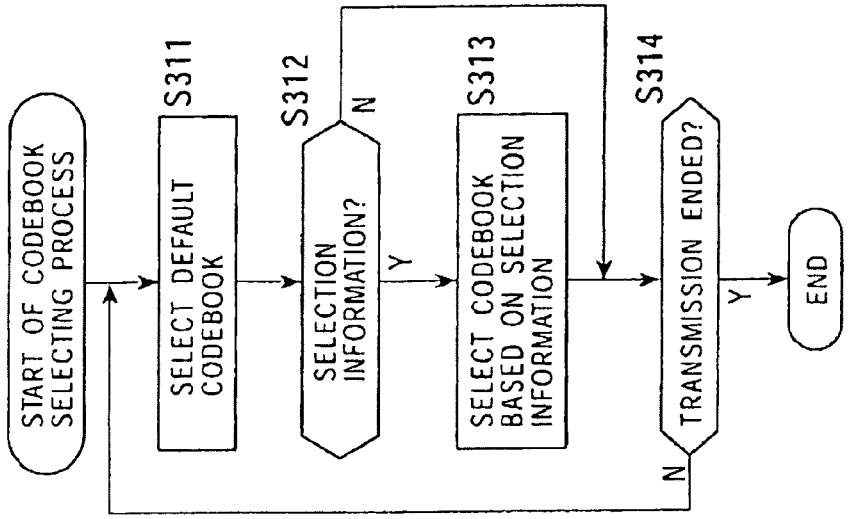

In the example in FIG. 56B, as described above, when the selecting unit 508 is supplied with new selection information while picture data is being transmitted in the picture data transmitting process, the codebook for use in vector quantization in the vector-quantization unit 502 can be changed based on the new selection information. However, the number of times the codebook is changed during the transmission of the picture data by the picture data transmitting process can be limited to only once. In other words, the codebook changing can be limited to a change from the default codebook to a codebook based on the initially supplied selection information.

Next, the updating process for updating the storage content of the codebook database 507, performed by the transmitting processing unit 401 in FIG. 55, will be described. Before that, the codebook stored in the codebook database 507 and the structure of the updating unit 506 are described below.

FIG. 57 shows an example of the codebook stored in the codebook database 507 in FIG. 55.

The codebook includes a codebook number and a codebook version.

The codebook number is a unique number for specifying the codebook. Thus, the codebook number uniquely specifies a codebook. The codebook version is information representing the version of the codebook, and is indicated by, for example, a time and date on the codebook is updated, and the number of times the codebook is updated, etc.

In the codebook in FIG. 57, similarly to a common codebook, code n is correlated with vector $V_n$ ($=(a_n, b_n, \ldots)$). In the example in FIG. 57, the number of codes is n+1, and integers from zero to N are used as codes.

In the codebook in FIG. 57, in addition to code vector $V_n$, frequency $A_n$ up to the previous updating, addition $\Sigma \Delta_n$ ($=(a'_n, b'_n, \ldots)$) of differential vectors, and frequency $B_n$ from the previous updating to the present are also correlated with each code #n.

The frequency $A_n$ up to the previous updating is a frequency of outputting code #n as a vector-quantized result in vector quantization up to the previous updating the codebook.

The addition $\Sigma \Delta_n$ of differential vectors is the summation of differential vectors $\Delta_n$ obtained when the vector-quantized result of code #n is obtained in vector quantization up to the present just after the previous updating of the codebook.

The frequency $B_n$ from the previous updating to the present is a frequency of outputting code #n as vector-quantized results in vector quantization up to the present just after the previous updating of the codebook.

The frequency $A_n$ up to the previous updating, the summation $\Sigma \Delta_n$ of differential vectors, and the frequency $B_n$ from the previous updating to the present are values related to vector quantization that has been performed b using the codebook. The frequency $A_n$ up to the previous updating, the summation $\Sigma \Delta_n$ of differential vectors, and the frequency $B_n$ from the previous updating to the present which are related to vector quantization that has been performed by using another codebook are registered in another codebook.

Also, in the codebook of initial values, the frequency $A_n$ up to the previous updating, the summation $\Sigma \Delta_n$ of differential vectors, and the frequency $B_n$ from the previous updating to the present are all set to, for example, zeros.

Figure 58:
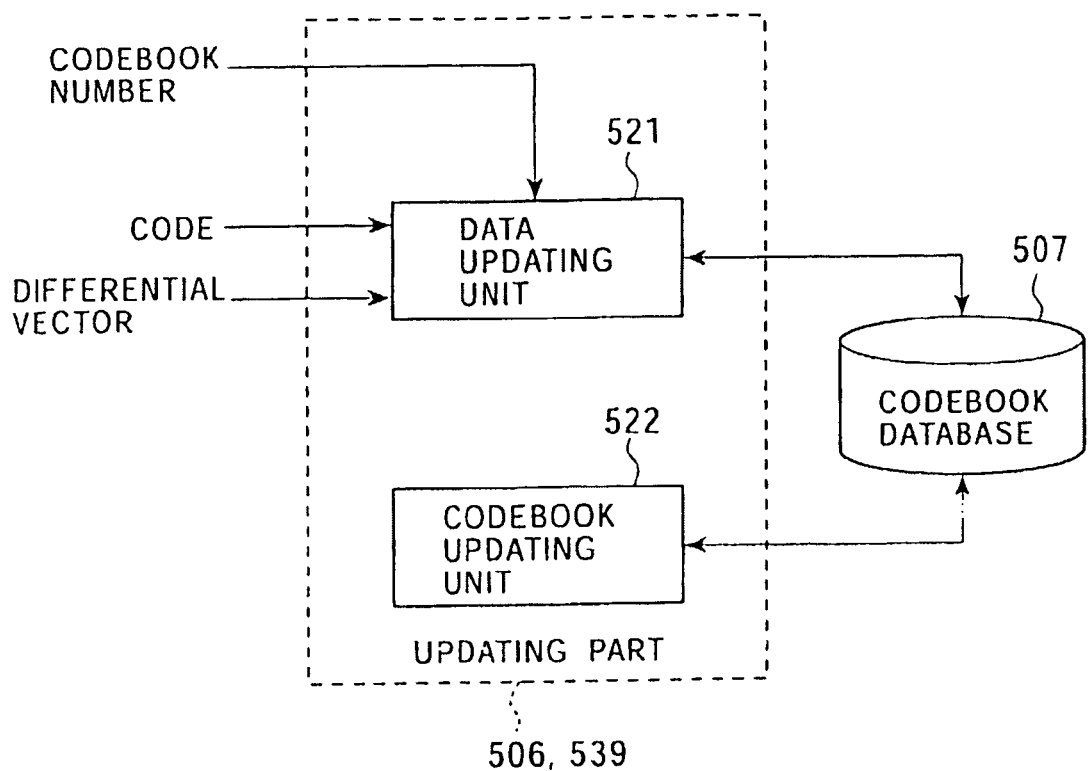
FIG. 58 is a block diagram showing an example of an updating unit 506 (539)

Next, FIG. 58 shows an example the updating unit 506 in FIG. 55.

As shown in FIG. 58, the updating unit 506 includes a data updating unit 521 and a codebook updating unit 522.

From the selecting unit 508, the codebook stored in the codebook storage unit 509, that is, the codebook number as information for specifying the codebook used in the vector-quantization unit 502 is supplied to the data updating unit 521. Also, the data updating unit 521 is supplied with a code which is output as the vector-quantized result of picture vector from the vector-quantization unit 502. The data updating unit 521 is also supplied with the differential vector calculated for the picture vector that is vector-quantized by the vector-quantization unit 502.

The data updating unit 521 specifies a codebook being used for vector quantization from the at least one codebook stored in the codebook database 507 by using the codebook number supplied from the selecting unit 508 (FIG. 55). By using the specified codebook as a codebook of interest, the data updating unit 521 uses the code from the vector-quantization unit 502 and the differential vector from the differential calculating unit 504 to update the summation $\Sigma \Delta_n$ of differential vectors in the codebook of interest and the frequency $B_n$ from the previous updating to the present.

The codebook updating unit 522 updates each of the at least one codebook stored in the codebook database 507 based on the frequency $A_n$ up to the previous updating, the summation $\Sigma \Delta_n$ of differential vectors, and the frequency $B_n$ from the previous updating to the present which are stored in the codebook. The codebook updating unit 522 stores the updated codebook in the codebook database 507 in overwritten form.

Updating processing performed by the updating unit 506 having the above structure consists of a data updating process for updating the summation $\Sigma \Delta_n$ of differential vectors and the frequency $B_n$ from the previous updating to the present which are stored in the codebook database 507, and a codebook updating process for updating code vectors of a codebook, based on the frequency $A_n$ up to the previous updating, the summation $\Sigma \Delta_n$ of differential vectors, and the frequency $B_n$ from the previous updating to the present which are registered in the codebook.

Figure 59:
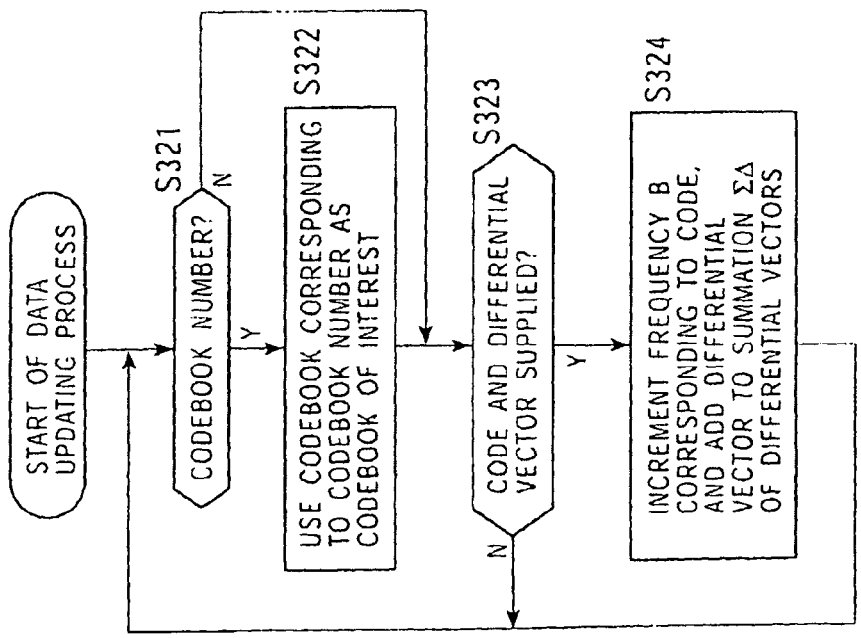
FIGS. 59A and 59B are flowcharts respectively illustrating a data updating process and a codebook updating process which are performed by the updating unit 506.

Accordingly the data updating process and the codebook updating process will be described with reference to the flowcharts in FIGS. 59A and 59B.

First, the data updating process is described below with reference to the flowchart in FIG. 59A.

In the data updating process, in Step S321, the process determines whether the data updating unit 521 has received a codebook number from the selecting unit 508 (FIG. 55).

In Step S321, if it is determined that the data updating unit 521 has received the codebook number from the selecting unit 508, that is, when the codebook used for vector quantization in the vector-quantization unit 502 is changed, the process proceeds to Step S322. In the data updating unit 521, among the at least one codebook stored in the codebook database 507, a codebook which is specified by the codebook number supplied from the selecting unit 508 is used as a codebook of interest. The process proceeds to Step S323.

Conversely, in Step S321, if it is determined that the vector-quantization unit 502 has not received the codebook number form the selecting unit 508, that is, when the codebook that has been used in vector quantization is directly used as a codebook of interest since the codebook used for vector quantization in the vector-quantization unit 502 is unchanged, the process skips over Step S322 and proceeds to Step S323.

In Step S323, the process determines whether the data updating unit 521 has been supplied with both the code as the vector-quantized result of picture vector from the vector-quantization unit 502 (FIG. 55) and a differential vector calculated for the picture vector from the differential calculating unit 504.

In Step S323, if it is determined that the code and the differential vector have not been supplied yet, the process returns to Step S321, and the same processing is repeatedly performed.

In Step S323, if it is determined that the code and the differential vector have been supplied, the process proceeds to Step S324, and the data updating unit 521 updates the summation $\Sigma \Delta_n$ of differential vectors, and the frequency $B_n$ from the previous updating to the present which are registered in the codebook of interest in the codebook database 507.

In other words, in the data updating unit 521, an entry in the codebook of interest of code #n supplied from the vector-quantization unit 502 is used as an entry of interest, and the frequency $B_n$ from the previous updating to the present in the entry of interest is incremented by 1. The data updating unit 521 adds the differential vector supplied from the differential calculating unit 504 to the summation $\Sigma \Delta_n$ of differential vectors in the entry of interest, and uses the sum as new summation $\Sigma \Delta_n$ of differential vectors to overwrite in the entry of interest in the codebook of interest.

After that, the process returns to Step S321, and the same processing is repeatedly performed.

Next, the codebook updating process is described below with reference to the flowchart in FIG. 59B.

The codebook updating process is regularly or irregularly started with arbitrary timing.

In the codebook updating process, the present codebook of interest to be updated can be excluded (so-called "exclusively controlled") from those to be processed by the data updating process in FIG. 59A so that the consistency of the content can be maintained.

In the codebook updating process, in Step S331, the codebook updating unit 522 initializes variable "i" representing a codebook number to, for example, "1", and proceeds to Step S322. In Step S322, the codebook updating unit 522 selectively uses, as a codebook of interest, the i-th codebook from among the at least one codebook stored in the codebook database 507, and proceeds to Step S333. In Step S333, the codebook updating unit 522 initializes variable "n" representing a code in the codebook of interest to, for example, zero, and proceeds to Step S334.

In Step S344, in the codebook updating unit 522, when an entry of code #n in the codebook of interest is used as an entry of interest, and in the entry of interest the frequency $A_n$ up to the previous updating, and the frequency $B_n$ from the previous updating to the present are used as weights, by performing addition for weighting the code vector $V_n$ in the entry of interest and the summation $\Sigma\Delta_n$ of differential vectors, the code vector $V_n$ in the entry of interest is updated.

Specifically, the codebook updating unit 522 updates the code vector $V_n$ in the entry of interest in accordance with, for example, the following expression:

$$V_n = V_n + B_n \times \Sigma\Delta_n/(A_n + B_n)$$

After that, the codebook updating unit 522 proceeds to Step S335, and updates the frequency $A_n$ up to the previous updating, the summation $\Sigma\Delta_n$ of differential vectors, and the frequency $B_n$ from the previous updating to the present.

In other words, the codebook updating unit 522 adds the frequency $A_n$ up to the previous updating and the frequency $B_n$ from the previous updating to the present, and uses the sum as new frequency $A_n$ up to the previous updating. Also, the codebook updating unit 522 initializes the summation $\Sigma\Delta_n$ of differential vectors and the frequency $B_n$ from the previous updating to the present to zeros before proceeding to Step S336.

In Step S336, the codebook updating unit 522 determines whether the variable "n" representing a code in the codebook of interest is equal to its maximum value "N". In Step S336, if the codebook updating unit 522 has determined that the variable "n" is not equal to "N", it proceeds to Step S337, and increments variable "n" by 1. The process returns to Step S334, and the same processing is repeatedly performed.

In Step S336, if it is determined that variable "n" is equal to "N", that is, if all the entries in the codebook of interest have been updated, the process proceeds to Step S338, and determines whether variable "i" is equal to "I" representing the number of codebooks stored in the codebook database 507.

In Step S338, if it is determined that variable "i" is not equal to "I", the process proceeds to Step S339, and the codebook updating unit 522 increments variable "i" by 1. The process returns to Step S332, and the same processing is repeatedly performed.

Conversely in Step S338, if it is determined that variable "i" is equal to "I", that is, when updating of all the codebooks stored in the codebook database 507 ends, the process ends.

As described above, in the codebook database 507, after initially storing only one codebook of initial values, the codebook of initial values can be copied if needed. In this case, after updating the codebook as a copy source, a copy of the codebook of initial values cannot be generated. Accordingly, the codebook as the copy source is prohibited from being processed by the data updating process and the codebook updating process in FIGS. 59A and 59B.

The codebook stored in the codebook database 507 is updated as described above based on a code as the result of vector quantization using the codebook and on a differential vector (differential vector found for a picture vector from which the code is obtained) corresponding to the code. Thus, an increase in picture quality can be achieved.

In other words, the codebook for use in vector quantization in the vector-quantization unit 502 is selected by, for example, the other party in communication. In this case, the codebook for use in vector quantization differs depending on each other party in communication. Accordingly, when a codebook is used as a codebook of interest, the codebook of interest should be updated based on a code and a differential vector which are obtained from picture data which is transmitted to a specified part in communication.

As a result, the codebook of interest becomes updated so as to have a high frequency that the differential vector is zero in response to characteristics of a picture which is frequently transmitted to the specified part in communication, so that the amount of the transmitted data is reduced. In addition, this reduction in the amount of the transmitted data can increase the picture quality, as described above.

The codebook for use in vector quantization in the vector-quantization unit 502 is selected by, for example, activity representing the picture of picture data to be vector-quantized, as described above. In this case, the codebook for use in vector quantization differs depending on each picture of picture data. Accordingly, when a certain codebook is used as a codebook of interest, the codebook of interest is updated based on a code and a differential vector which are obtained from the picture data corresponding to a specified picture.

As a result, the codebook of interest becomes updated so as to have a high frequency that the differential vector is zero for a picture of a specified pattern, so that the amount of transmitted data is reduced. In addition, this reduction in the amount of the transmitted data can increase the picture quality, as described above.

Figure 60:
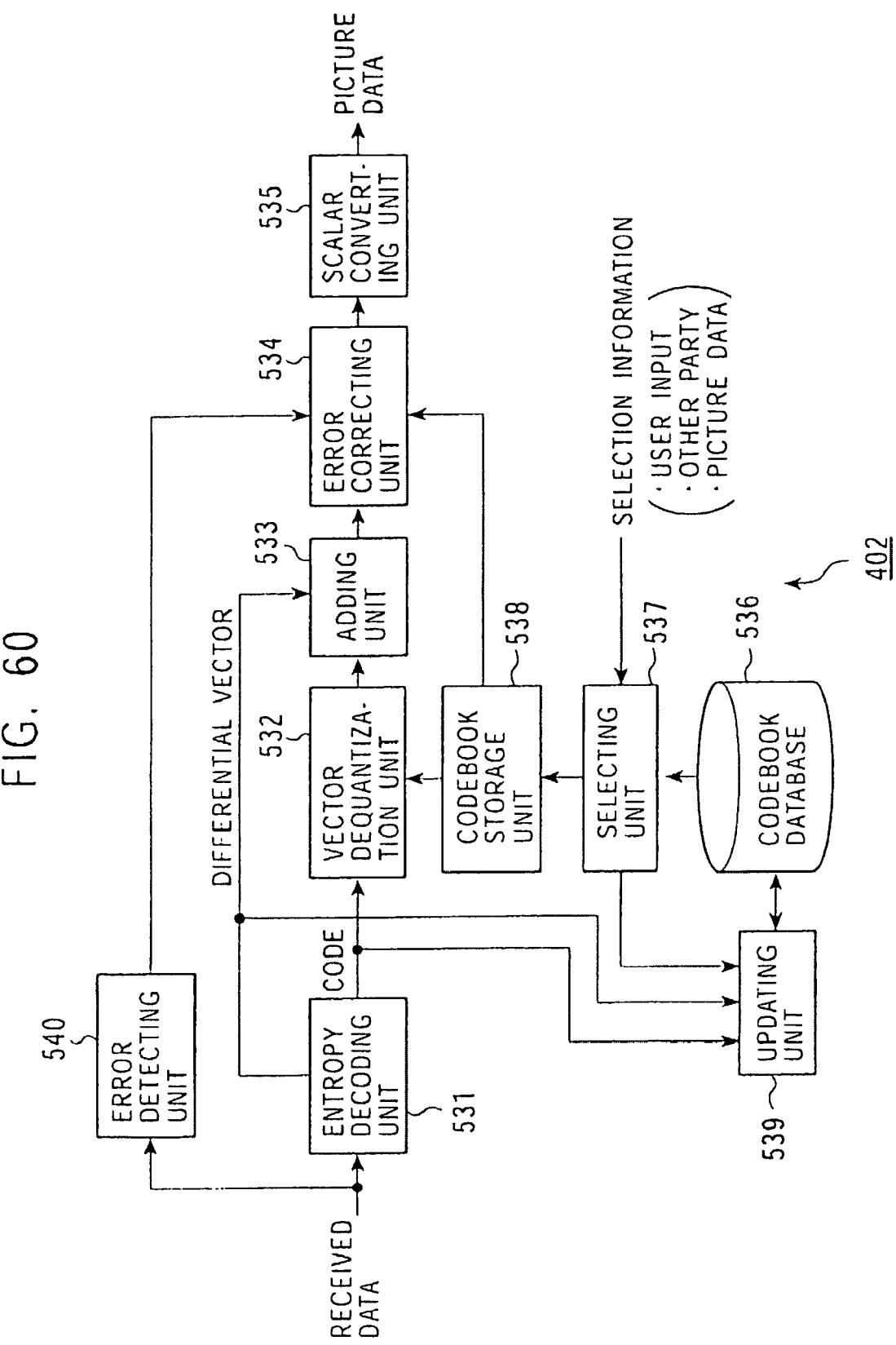
FIG. 60 is a block diagram showing a third example of the receiving processing unit 402.

Next, FIG. 60 shows a third example of the receiving processing unit 402 in FIG. 44. In other words, FIG. 60 shows the example of the receiving processing unit 402 which is obtained when the transmitting processing unit 401 has the structure shown in FIG. 55.

The transmitting data output by the entropy encoding unit 505 in FIG. 55 is received by the antenna 64 (FIG. 23) of the PDA 103 as the receiver and is supplied to an entropy decoding unit 531 and an error detecting unit 540 through the communication interface 218.

The entropy decoding unit 531 generates a code and a differential vector by performing entropy decoding on the supplied received data, and supplies the code to a vector dequantization unit 532 and an updating unit 539 and supplies the differential vector to an adding unit 533 and the updating unit 539.

The vector quantization unit 532 performs vector dequantization on the code supplied from the entropy decoding unit 531 by using the codebook stored in a codebook database 538. Specifically, the vector dequantization unit 532 outputs, among code vectors of the codebook stored in the codebook database 538, a code corresponding to the code from the entropy decoding unit 531 as a vector-dequantized result.

The adding unit 533 adds the differential vector supplied from the entropy decoding unit 531 and the code vector supplied from the picture-quality determining unit 432, whereby the original picture vector is reproduced. The picture vector is supplied to an error correcting unit 534.

When receiving, from an error detecting unit 540, an error message indicating that a code of differential vector as encoded data of the picture vector includes an error such as a lack, the error correcting unit 534 corrects the error by referring to the codebook stored in the codebook database 538. The error correcting unit 534 supplies the error-corrected picture vector to a scalar converting unit 535.

The scalar converting unit 535 performs scalar conversion in which the original picture data for one frame is formed by disposing in their original positions the components of the picture vector as the pixel levels of pixels, and outputs the obtained picture data.

A codebook database 536 stores at least one codebook for use in performing vector dequantization on the code obtained by vector quantization of the picture vector. The codebook stored in the codebook database 536 also has a format identical to, for example, that shown in FIG. 57.

A selecting unit 537 is supplied with selection information. In accordance with the selection information, the selecting unit 537 selects a codebook for use in vector quantization from among the at least one codebook stored in the codebook database 536. The selecting unit 537 reads the selected codebook from the codebook database 536, and supplies and stores the codebook in the codebook database 538 in overwritten form.

For example, a user's input, information of the other party in communication, and picture data reproduced from the code and differential vector output by the entropy decoding unit 531, etc., can be employed as the selection information. The user's input can be supplied such that the user operates the operation nit 224 (FIG. 23). The information of the other party in communication can be supplied through the antenna 64 and the communication interface 218 (FIG. 23) such that it is transmitted from the PDA 103 as the receiver when the PDA 101 as the transmitter initiates communication with the PDA 103 as the receiver. The picture data reproduced from the code and differential vector output by the entropy decoding unit 531 is supplied from the scalar converting unit 535.

When being supplied with the user's input as selection information, the selecting unit 537 selects one codebook from among the at least one codebook stored in the codebook database 536. Accordingly, in this case, the vector dequantization unit 532 performs vector dequantization by using the codebook designated by the user.

Also, when being supplied as selection information with the information of the other party in communication, the selecting unit 537 selects one codebook from among the at least one codebook stored in the codebook database 536. Accordingly, in this case, in the vector dequantization unit 532, vector dequantization is performed by using a different codebook depending on each other party in communication.

Also, when being supplied as selection information with the information of the other party in communication, the selecting unit 537 selects one codebook from among the at least one codebook stored in the codebook database 536. Accordingly, in this case, the vector dequantization unit 532 performs vector dequantization by using a different codebook for the picture data to be reproduced.

When the selecting unit 537 selects one codebook from among the at least one codebook stored in the codebook database 536 and stores the codebook in the codebook database 538, that is, when the codebook for use in vector quantization in the vector dequantization unit 532 is changed, the selecting unit 537 supplies the updating unit 539 with a codebook number for specifying the changed codebook (codebook selected from the codebook database 536).

The updating unit 539 is identical in structure to the updating unit 522 in FIG. 58. Based on the code and differential vector supplied from the entropy decoding unit 531, the updating unit 539 updates the codebook stored in the codebook database 536. As described above, the selecting unit 537 supplies the updating unit 539 with the codebook stored in the codebook database 538, that is, the codebook number as information for specifying the codebook used in the present vector dequantization. Based on the supplied codebook number, the updating unit 539 specifies the codebook to be updated.

Also, in the codebook database 536, similarly to the codebook database 507 in FIG. 55, for example, at least one codebook generated based on the LBG algorithm or the like by using a large amount of prepared picture data for learning is stored as at least one codebook of initial values, and the updating unit 539 sequentially updates the codebook of initial values.

In a method for storing the at least one codebook, performed in the codebook database 536, similarly to the case of the codebook database 507 in FIG. 55, at least one codebook of initial values may be initially stored. Also, after initially storing only one codebook of initial values, the codebook of initial values may be copied if needed.

The error detecting unit 540 checks the received data for an error such as a lack of data occurring in the received data. When detecting the error, the error detecting unit 540 outputs an error message of the detected error to the error correcting unit 534.

Since the entropy encoding unit 505 in FIG. 55 adds an error detecting code to the transmitting data, based on the error detecting code, the error detecting unit 540 checks the received data for an error.

The receiving processing unit 402 having the above-described structure performs a picture data receiving process that decodes the received data to generate picture data, a codebook selecting process that selects a codebook for use in vector dequantization by the vector dequantization unit 532, and an updating process that updates the storage content of the codebook database 536.

The updating process (data updating and codebook updating) is performed by the updating unit 539 by using the code and differential vector supplied from the entropy decoding unit 531 identically to the case described using the flowcharts in FIGS. 59A and 59B. Accordingly, a description of the updating process is omitted.

Accordingly, the picture data receiving process and codebook selecting process performed by the receiving processing unit 402 in FIG. 60 are described with reference to the flowcharts shown in FIGS. 61A and 61B.

At first, the picture data receiving process is described below with reference to the flowchart in FIG. 61A.

The picture data receiving process is started when the received data is supplied to the entropy decoding unit 531 and the error detecting unit 540.

In the picture data receiving process, in Step S351, the entropy decoding unit 531 performs entropy decoding on the received data, and outputs the obtained code and differential vector. The code is supplied to the vector dequantization unit 532 and the updating unit 539, and the differential vector is supplied to the adding unit 533 and the updating unit 539.

Based on the code and differential vector supplied from the entropy decoding unit 531, the updating unit 539 updates the codebook stored in the codebook database 536, as described in FIG. 59B.

Accordingly, if in the transmitting processing unit 401 in FIG. 55 and the receiving processing unit 402 in FIG. 60, codebooks which each differ depending on each other party in communication are respectively selected as codebooks for use in vector quantization and vector dequantization, when picture data is transmitted from the PDA 101 of one user A to the PDA 103 of another user B, the transmitting processing unit 401 in the PDA 101 of the user A uses a codebook corresponding to the user B for vector quantization, while the receiving processing unit 402 in the PDA 103 of the user B uses a codebook corresponding to the user A for vector dequantization.

As a result, whenever the users A and B communicates with each other, the updating unit 506 in the transmitting processing unit 401 (FIG. 55) and the updating unit 539 in the receiving processing unit 402 (FIG. 60) similarly update the codebooks. In other words, between the users A and B (similarly to pairs of other users), identical codebooks are basically used to perform the vector quantization and the vector dequantization, and the codebook for the vector quantization and the codebook for the vector dequantization are identically updated.

In addition, as described in FIG. 59B, the codebook updating is performed so that the amount of data is reduced or picture quality is increased. Thus, the receiving processing unit 402 in FIG. 60 can perform good precision decoding for generating quality-increased picture data.

After the entropy decoding unit 531 finishes entropy decoding on, for example, picture data for one frame, the process proceeds to Step S352. The vector dequantization unit 532 performs vector dequantization on the codes of one frame supplied from the entropy decoding unit 531 by using the codebook stored in the codebook database 538, and obtains code vectors for the codes of one frame. The code vectors are supplied to the adding unit 533.

In Step S353, the adding unit 533 adds, to the code vectors for one frame supplied from the vector dequantization unit 532, corresponding differential vectors supplied from the entropy decoding unit 531, whereby picture vectors for one frame are reproduced. The picture vectors for one frame, obtained by the adding unit 533, are sequentially supplied to the error correcting unit 534.

In Step S534, the error correcting unit 534 performs an error correcting process (described later) on the picture vectors supplied from the adding unit 533, and supplies the processed picture vectors to the scalar converting unit 535.

In Step S535, the scalar converting unit 535 performs the above scalar conversion on the picture vectors for one frame supplied from the error correcting unit 534, and outputs the obtained picture data for one frame. The process proceeds to Step S356.

In Step S356, the entropy decoding unit 531 determines whether to have received the transmitted data of the next frame. If the entropy decoding unit 531 has determined that it has received the transmitted data, the process returns to Step S351, and the same processing is repeatedly performed for the received data of the next frame.

Conversely, in Step S356, if the entropy decoding unit 531 has determined that it has not received the transmitted data, the process ends.

Next, the codebook selecting process is described below with reference to the flowchart shown in FIG. 61B.

The codebook selecting process is started, for example, just before the picture data receiving process (FIG. 61A) starts.

In the codebook selecting process, in Step S361, the selecting unit 537 selects a default codebook from among the at least one codebook stored in the codebook database 536, and supplies and stores the default codebook in the codebook database 538.

For example, the above codebook of initial values can be employed as the default codebook.

After that, the process proceeds to Step S362, and the selecting unit 537 determines whether it has been supplied with selection information. If it has determined that it has not been supplied, the process skips over Step S363 and proceeds to Step S364.

In Step S362 if the selecting unit 537 has determined that it has been supplied with the selection information, the process proceeds to Step S363. In addition with the selection information, the selecting unit 537 selects a codebook for use in vector quantization from among the at least one codebook stored in the codebook database 536, and supplies and stores the codebook in the codebook database 538.

Proceeding to Step S364, the selecting unit 537 determines whether reception of the picture data has ended which is performed in the picture data receiving process (FIG. 61A) started just after starting the present codebook selecting process. If the selecting unit 537 determines negatively, the process returns to Step S362, and the same processing is repeatedly performed.

Accordingly, in this case, while the picture data is being received in the picture data receiving process, when the selecting unit 537 is supplied with new selection information, the codebook stored in the codebook database 538, that is, the codebook for use in vector dequantization in the vector dequantization unit 532 can be changed based on the new selection information.

In Step S364, if it is determined that the reception of the picture data has ended, the process ends.

Figure 61B:
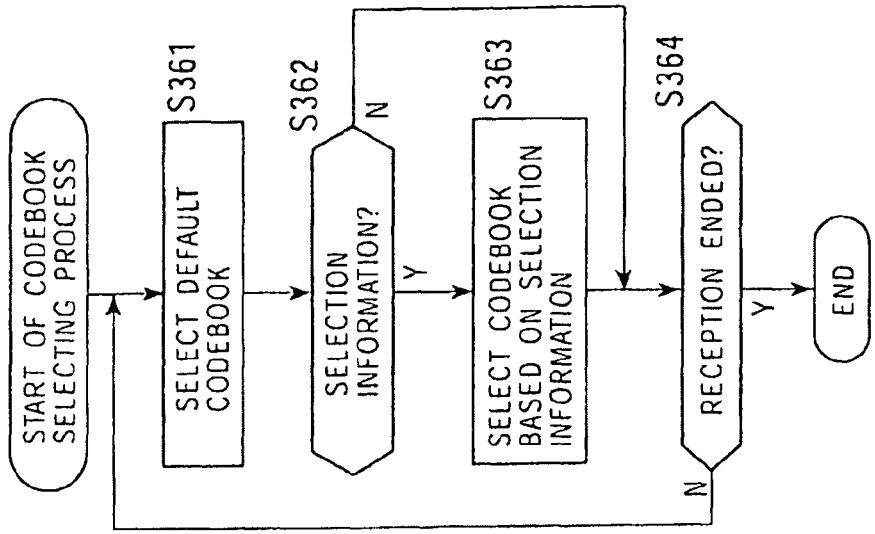
FIGS. 61A and 61B are flowcharts respectively illustrating a picture data receiving process and a codebook selecting process which are performed by the receiving processing unit 402.
Figure 61A:
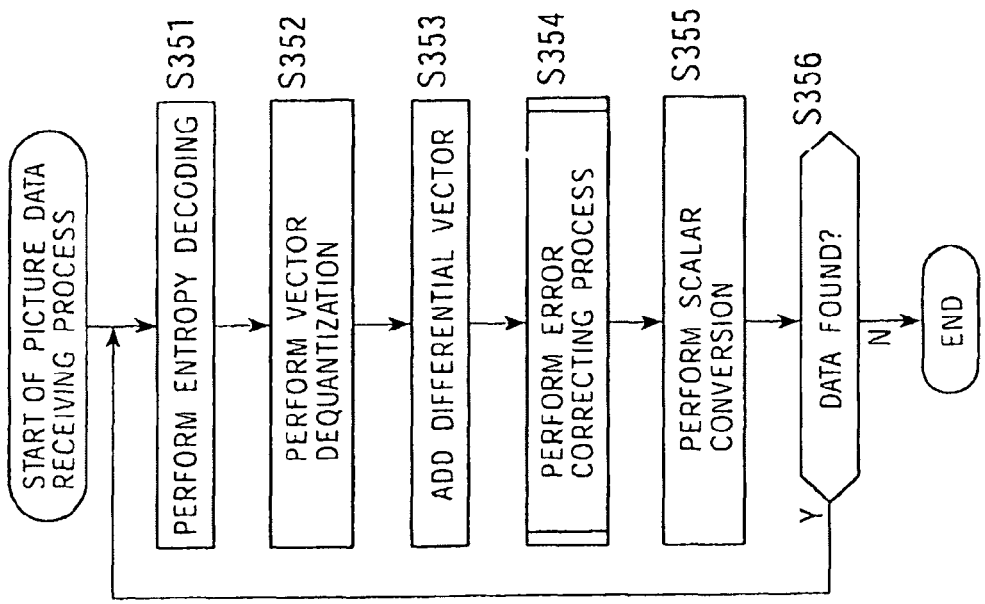

In the example in FIG. 61B, as described above, while picture data is being transmitted in the picture data receiving process, when the selecting unit 537 is supplied with new selection information, the codebook for in vector dequantization can be changed based on the new selection information, if needed. However, while the picture data is being transmitted in the picture data receiving process, the number of times the codebook is changed is limited to only once. In other words, the change of the codebook can be limited to only a change from the default codebook to a codebook based on the initially supplied selection information.

Figure 62:
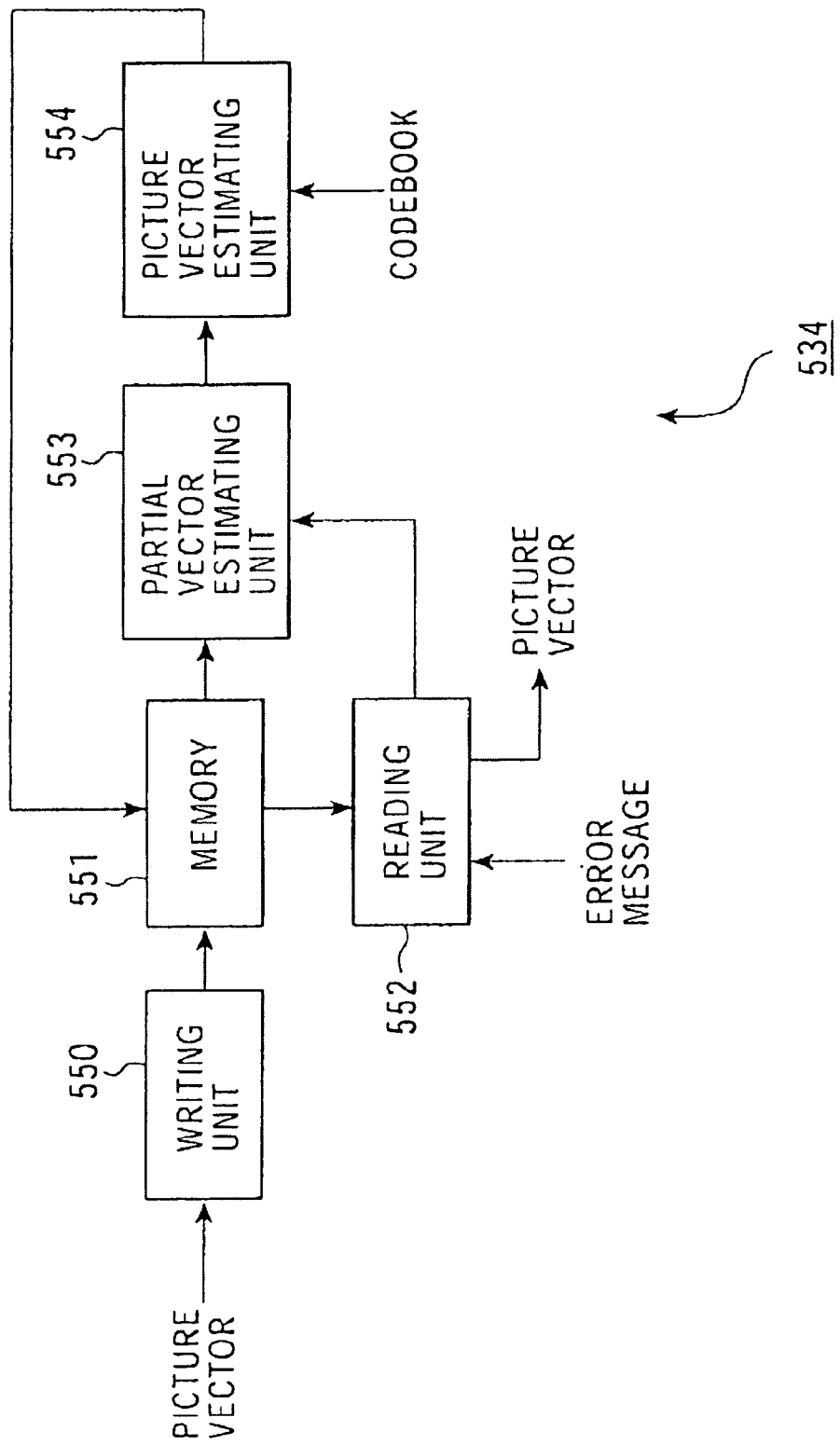
FIG. 62 is a block diagram showing an example of an error correcting unit 534.

FIG. 62 shows an example of the error correcting unit 534 in FIG. 60.

The picture vectors output by the adding unit 533 are supplied to a writing unit 550, and the writing unit 550 supplies and writes the picture vectors in a memory 551. The memory 551 stores the picture vectors supplied from the writing unit 550.

The memory 551 has a storage capacity of storing at least picture vectors for one frame.

As described above, the picture vectors are vectors in which the pixel levels of the nine pixels in each of blocks of 3 by 3 pixels are used as components. The writing unit 550 writes the picture vectors in an address of the memory 551 which corresponds to the block as the picture vectors.

When, for example, the picture vectors for one frame are stored in the memory 551, a reading unit 552 reads the picture vectors for one frame from the memory 551 and supplies the read picture vectors in the scalar converting unit 535 (FIG. 60).

The error message is supplied from the error detecting unit 540 (FIG. 60) to the reading unit 552. Based on the error message, the reading unit 552 controls a partial vector estimating unit 553.

The error message output from the error detecting unit 540 includes information representing the position of the block as picture vectors in which an error occurs. The reading unit 552 controls the partial vector estimating unit 553 so that, for the picture vectors (hereinafter referred to as the "error vectors") in which the error occurs, a partial vector (described later) is estimated.

Figure 63A:
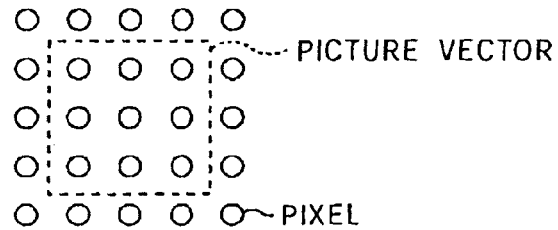
FIGS. 63A, 63B, and 63C are illustrations of a process of a partial vector estimating unit 553.
Figure 63B:
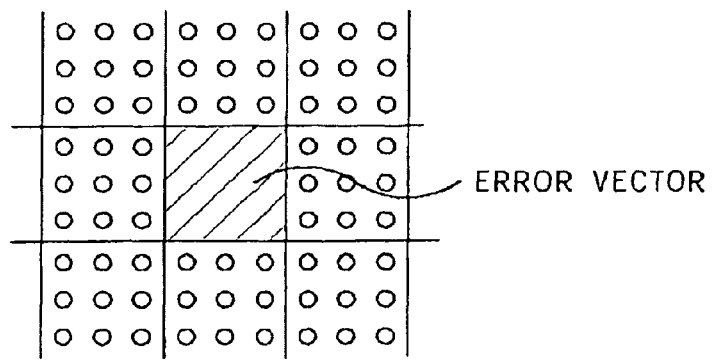
Figure 63C:
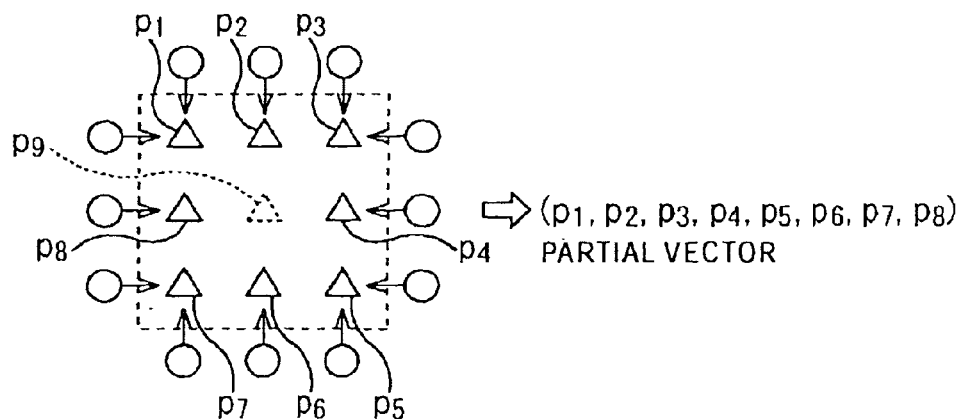

Under control of the reading unit 552, the partial vector estimating unit 553 estimates, for the error vectors, a partial vectors composed of some components of the picture vectors, as shown in, for example, FIGS. 63A to 63C.

Specifically, in this case, as shown in FIG. 63a, in the picture vectors, the pixel levels of nine pixels constitute each block of 3 by 3 pixels are used as components. Thus, a lack in the picture vectors (codes an differential vectors obtained from picture vectors) indicates that the 3 by 3 pixels of the block as the picture vectors cannot be decoded, as shown in FIG. 63B.

Accordingly, as shown in FIG. 63C, in the partial vector estimating unit 553, eight pixels in the block as the error vectors which are adjacent to pixels in other blocks are complemented by the adjacent pixels in the other blocks.

In FIG. 63C, among the 3 by 3 pixels in the error block, eight pixels $p_1$ to $p_8$ except the central pixel $p_9$ are complemented by the pixels in the other blocks which are adjacent to the eight pixels $p_1$ to $p_8$. Among the eight pixels $p_1$ to $p_8$ except the central pixel $p_9$, the pixels $p_2$, $p_4$, $p_6$, and $p_8$, each of which is adjacent to one pixel in the other block, have pixel levels copied from those of the adjacent pixels in the other blocks. The pixels $p_1$, $p_3$, $p_5$, and $p_7$, each of which is adjacent to two pixels in the other blocks, each have the average of the pixel levels of the two pixels in the other blocks, or each have one of the pixel levels of the two pixels in the other blocks.

In the partial vector estimating unit 553, as described above, for the error vectors as vectors which have no component corresponding to the central pixel $p_9$ in the block, and which should originally have the nine pixel levels as components, partial vectors having no component corresponding to the central pixel $p_9$ is generated. The partial vector estimating unit 553 outputs the partial vectors as an estimated value of part (partial vectors) of true picture vectors corresponding to the error vectors.

Referring back to FIG. 62, the partial vectors output by the partial vector estimating unit 553 are supplied to a picture vector estimating unit 554.

The picture vector estimating unit 554 performs error correction by estimating the true picture vectors corresponding to the error vectors from the partial vectors from the partial vector estimating unit 553 and the codebook stored in the codebook database 538. The picture vector estimating unit 554 stores the estimated picture vectors (hereinafter referred to also as the "estimated vectors") in a corresponding address of the memory 551.

Figure 64:
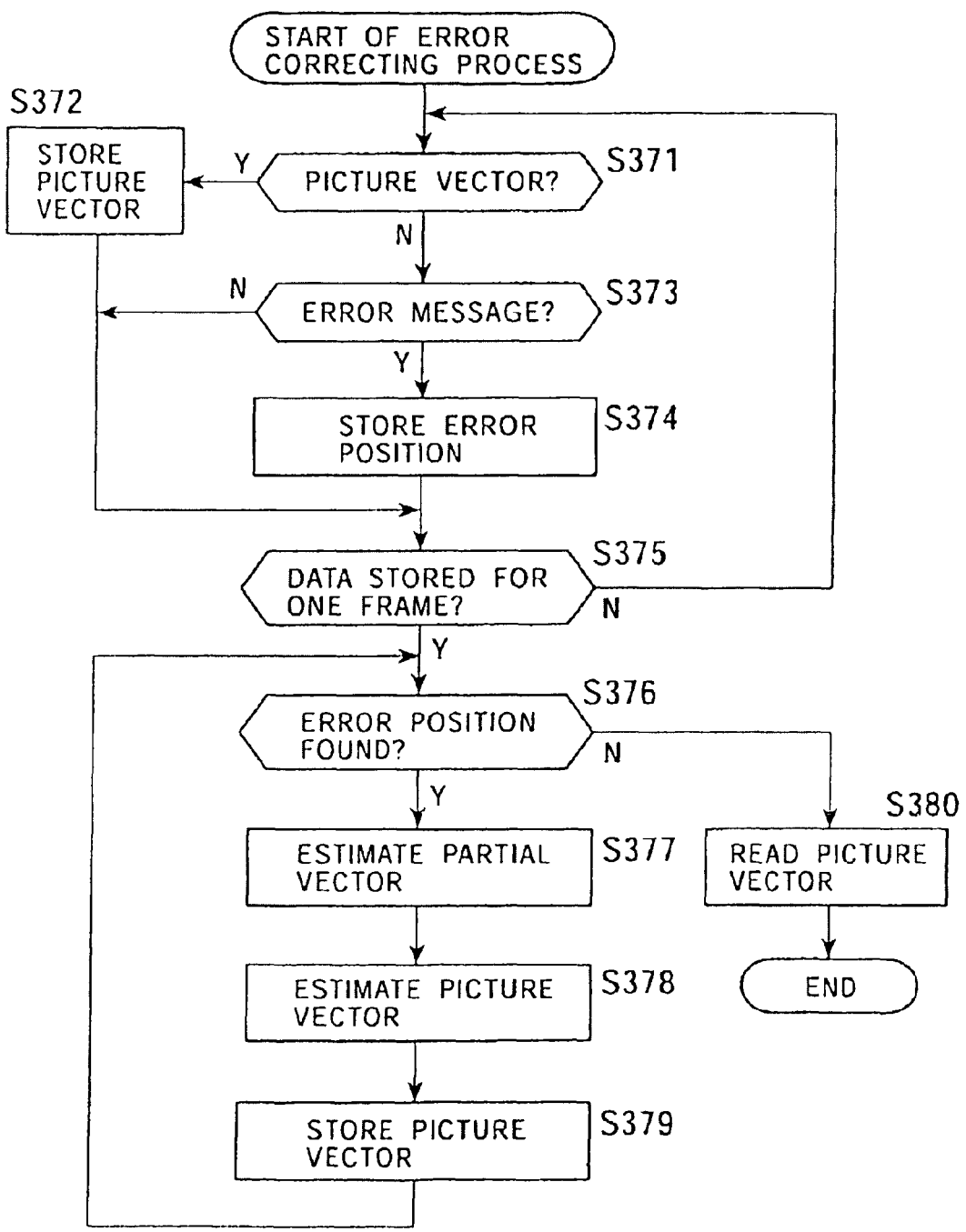
FIG. 64 is a flowchart illustrating an error correcting process.

Next, the error correcting process performed in Step S354 in FIG. 61A by the error correcting unit 534 in FIG. 62 is described below with reference to the flowchart shown in FIG. 64.

In the error correcting process, in Step S371, the process determines whether the picture vectors are supplied from the adding unit 533 (FIG. 60) to the writing unit 550. In Step S371, if it is determined that the picture vectors are supplied, the process proceeds to Step S372, and the writing unit 550 supplies and stores the picture vectors in the memory 551. The process proceeds to Step S375.

In Step S371, if it is determined that the picture vectors are not supplied, the process proceeds to Step S373, and the process determines whether the error message is supplied from the error detecting unit 540 to the reading unit 552.

In Step S373, if it is determined that the error message is not supplied, the process skips over Step S374 and proceeds to Step S375.

In Step S373, if it is determined that the error message is supplied, the process proceeds to Step S374, and the reading unit 552 recognizes, based on the error message, the position (hereinafter referred to also as the "error position") of the block (picture vectors) in which the error occurs, and temporarily stores the recognized position in a built-in memory (not shown).

In Step S375, the reading unit 552 determines whether the picture vectors (including the error vectors) for one frame are stored in the memory 551.

In Step S375, if it is determined that the picture vectors for one frame are not stored in the memory 551, the process returns to Step S371, and the same processing is repeatedly performed.

In Step S375, if it is determined that the picture vectors for one frame are stored in the memory 551, the process proceeds to Step S376, and the reading unit 552 determines whether the error position is stored in its build-in memory.

In Step S376, if it is determined that the error position is stored, the process proceeds to Step S377, and the reading unit 552 controls the partial vector estimating unit 553 so that, among at least one error position stored in the build-in memory, one position is used as an error position of interest, and partial vectors are estimated for error vectors in the error position of interest. Accordingly, in Step S377, the partial vectors are estimated in Step S377 by the partial vector estimating unit 553, as described using FIGS. 63A to 63C, and are output to the picture vector estimating unit 554.

In Step S378, the picture vector estimating unit 554 performs error correction for estimating the true picture vectors corresponding to the error vectors from the partial vectors from the partial vector estimating unit 553 and the codebook stored in the codebook database 538 (FIG. 60), and proceeds to Step S379. The picture vector estimating unit 554 stores the estimated vectors obtained by the error correction in the address of the memory 551 which corresponds to the error position of interest.

In other words, in the picture vector estimating unit 554, code vectors in which components corresponding to the components (here, eight components as described using FIGS. 63B and 63C) of the partial vectors are the closest to the components of the partial vectors are extracted from the codebook stored in the codebook database 538, and are used as estimated vectors.

Specifically, the picture vector estimating unit 554 calculates the sum of squares of differences between each component of the partial vectors and each corresponding component in the code vectors in the codebook, an detects code vectors for minimizing the sum of squares. The picture vector estimating unit 554 writes the code vectors as the estimated vectors of the picture vectors in the error position of interest into the memory 551.

After that, the reading unit 552 deletes the error position of interest from the built-in memory, and returns to Step S376. The processing from steps S376 to S379 has state in which the error position is not stored in the build-in memory.

In Step S376, if it is determined that the error position is not stored, that is, when the picture vectors for one frame are stored, with an error eliminated (corrected), the process proceeds to Step S380, and the memory 551 reads and supplies the picture vectors for one frame to the scalar converting unit 535 (FIG. 60). The error correcting process ends.

Communication in which data is transmitted and received by performing encoding/decoding using a codebook as described using FIGS. 55 to 64 can be performed, not only between the PDA 101 and the other PDA 103, but also between the base station computer 102 (FIG. 22), the PDA 103 or a base station computer (not shown).

When a user A carries the PDA 101 and the base station computer 102, and another user B carries the PDA 103, the user A may use the PDA 101 or the base station computer 102 to perform data exchange with the PDA 103 of the user B.

When the above data exchange is performed between each of the PDA 101 and the base station computer 102 and the PDA 103 of the user B, codebooks for communication with the user B are generated in both the PDA 101 and the base station computer 102.

However, the data exchanged between the PDAs 101 and 103 is not always identical to that exchanged between the base station computer 102 and the PDA 103. In many cases, they differ from each other. Thus, different codebooks are generated as codebooks for communication with the user B in the PDA 101 and the base station computer 102.

Figure 65:
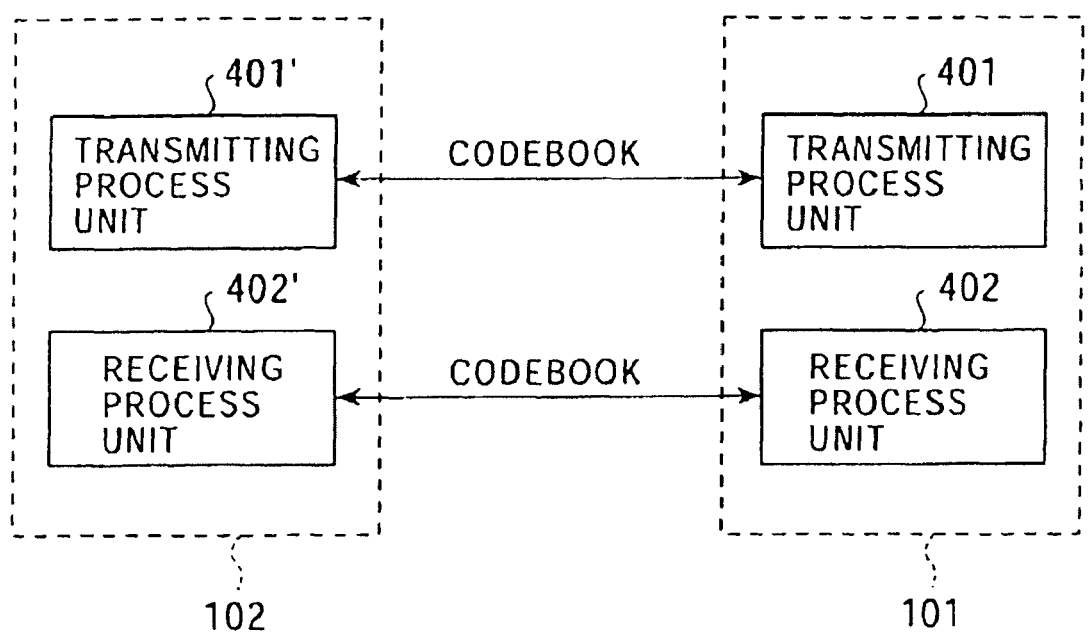
FIG. 65 is a block diagram showing combination of codebooks performed by the PDA 101 and the base station computer 102.

Accordingly, as FIG. 65 shows, the codebook in the PDA 101 and the codebook in the base station computer 102 can be combined to generate identical codebooks.

As shown in FIG. 65, if the PDA 102 includes the transmitting processing unit 401 in FIG. 55 and the receiving processing unit 402 in FIG. 50, and the base station computer 102 includes a transmitting processing unit 4017 identical in structure to that shown in FIG. 55 and a receiving processing unit 402 identical in structure to that shown in FIG. 50, the PDA 101 and the base station computer 102 performs the above communication, whereby their codebooks are exchanged. This integrated corresponding codebooks in the transmitting processing unit 401 of the PDA 101 and the transmitting processing unit 401' of the base station computer 102 into the same codebook. Also, corresponding codebooks in the receiving processing unit 402 of the PDA 101 and the receiving processing unit 402' of the base station computer 102 into the same codebook.

Methods for integrating two codebooks include a method in which the code vectors of one codebook are employed as the code vectors of a codebook obtained after integration, and a method in which the average (average vectors) of code vectors of two codebooks are employed as the code vectors of a codebook obtained after integration.

Although the case of increasing picture quality has been described in the examples shown in FIGS. 45 to 65, the examples shown in FIGS. 45 to 65 can be applied to, for example, the case of increasing sound quality.

In the PDA 101, quality-increasing data for increasing the quality of data is acquired from at least other one PDA, and based on the quality-increasing data and already possessed quality-increasing data, new quality-increasing data is generated. The new quality-increasing data can update the already possessed data. Also, in the PDA 101, based on the updated quality-increasing data (new quality-increasing data), data is processed to acquire higher quality data.

Figure 66:
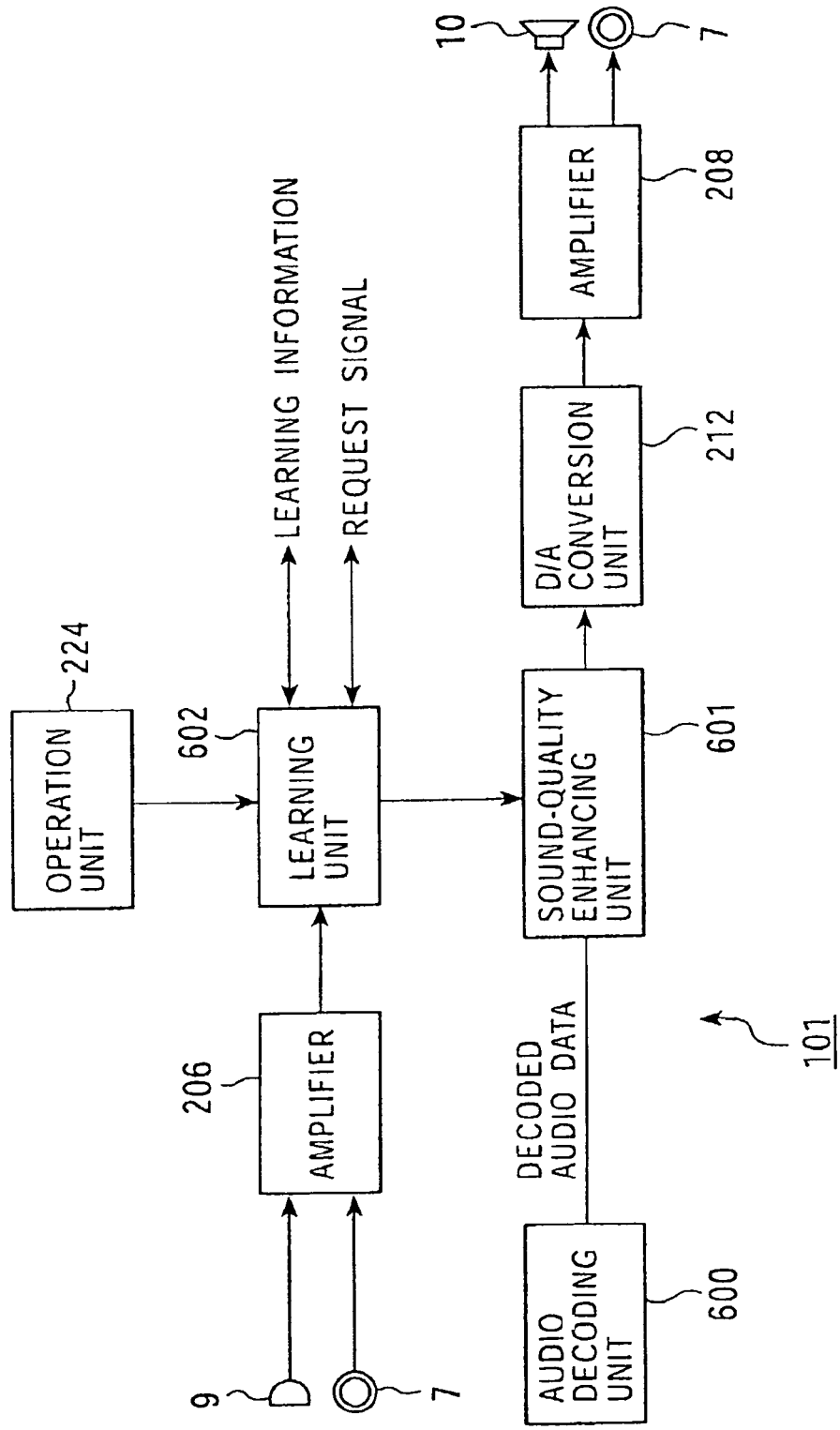
FIG. 66 is a block diagram showing a third functional example of the PDA 101.

FIG. 66 shows a functional example of the above PDA 101. Here, data to be processed for higher quality is used as audio data in the following description. However, the data to be processed for higher quality can include, for example, picture data other than the audio data.

In FIG. 66, by denoting portions corresponding to those in the hardware structure in FIG. 23 by identical reference numerals, descriptions thereof are omitted.

An audio decoding unit 600 decodes encoded audio data which is stored in, for example, the HDD (FIG. 23), and supplies the decoded audio data to a sound-quality enhancing unit 601.

Based on the quality-increasing data supplied from a learning unit 602 and the decoded audio data, the sound-quality enhancing unit 601 finds quality-increased data in which the sound quality of the decoded audio data is increased, and supplies the data to a D/A conversion unit 212.

The learning unit 602 finds quality-increased data by performing learning based on the audio data supplied from an amplifier 209. Also, the learning unit 602 receives learning information (described later) transmitted from at least other one PDA, and finds new quality-increased data by performing learning based on the received learning information, if needed. The learning unit 602 supplies the newly found quality-increased data to the sound-quality enhancing unit 601.

The learning unit 602 is also supplied with the operation signal from the operation unit 224 (FIG. 23). When the operation signal from the operation unit 224 represents an operation for requesting learning information from another PDA, the learning unit 602 generates and outputs a request signal for requesting learning information. This request signal is transmitted, for example, from the antenna 64 through the communication interface 218 (FIG. 23).

The learning unit 602 is also supplied with a request signal from another PDA. Specifically, when the other PDA transmits a request signal, the request signal is received by the antenna 64 (FIG. 23) and is supplied to the learning unit 602 through the communication interface 218. When the learning unit 602 receives the request signal from the other PDA, it transmits its own learning information to the other PDA, from which the request signal is transmitted, through the communication interface 218 and the antenna 64.

Figure 67:
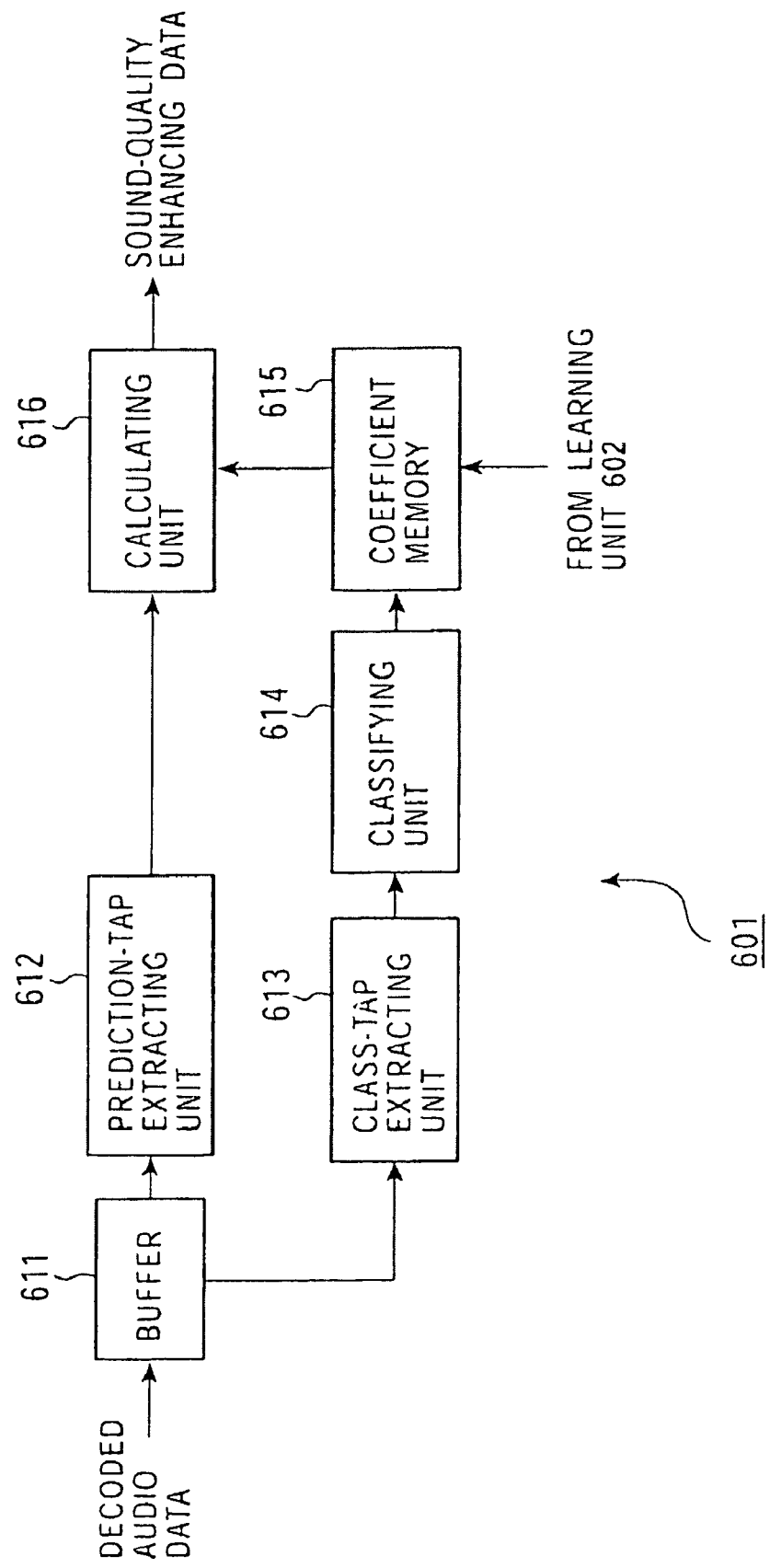
FIG. 67 is a block diagram showing an example of a sound quality enhancing unit 601.

Next, FIG. 67 shows an example of the sound-quality enhancing unit 601 in FIG. 66.

In the example, in FIG. 67, the sound-quality enhancing unit 601 can increase the sound quality of the decoded audio data from the audio decoding unit 600 by performing, for example, the above-described adaptive processing. Therefore, in the sound-quality enhancing unit 601, tap coefficients are used as quality-increasing data.

Specifically, the decoded audio data output by the audio decoding unit 600 is supplied to a buffer 611, and the buffer 611 temporarily stores the supplied decoded audio data.

While sequentially using sound-quality-increased data as data of interest, a prediction-tap extracting unit 612 generates prediction taps for use in calculating predicted values of the data of interest based on the linear first-degree prediction calculation in expression (1) by extracting a number of audio samples for the decoded audio data stored in the buffer 611, and supplies the prediction taps to a calculating unit 616.

The prediction-tap extracting unit 612 generates prediction taps identical to those generated by a prediction-tap extracting unit 624 in FIG. 69, which is described later.

A class-tap extracting unit 613 generates class taps for the data of interest by extracting a plurality of samples from the decoded audio data which is stored in the buffer 611, and supplies the class taps to a classifying unit 614.

The class-tap extracting unit 613 generates class taps identical to those generated by a class-tap extracting unit 625 in FIG. 69, which is described later.

The classifying unit 614 uses the class taps from the class-tap extracting unit 613 to perform classification, and supplies the obtained class codes to a coefficient memory 615.

The classifying unit 614 performs classification identical to that performed by a classifying unit 626 in FIG. 69, which is described later.

In the coefficient memory 615, the tap coefficients for classes which are supplied as the quality-increasing data for the learning unit 602 are stored in the addresses corresponding to the classes. The coefficient memory 615 supplies the calculating unit 616 with the tap coefficients stored in the addresses corresponding to the class codes supplied from the classifying unit 614.

The calculating unit 616 acquires the prediction taps output from the prediction-tap extracting unit 612 and the tap coefficients output from the coefficient memory 615, and uses the taps and tap coefficients to perform the linear prediction calculation in expression (1). This allows the calculating unit 616 to find (prediction values of) the sound-quality-increased data as the data of interest, and the calculating unit 615 supplies the data to the D/A conversion unit 212 (FIG. 66).

Figure 68:
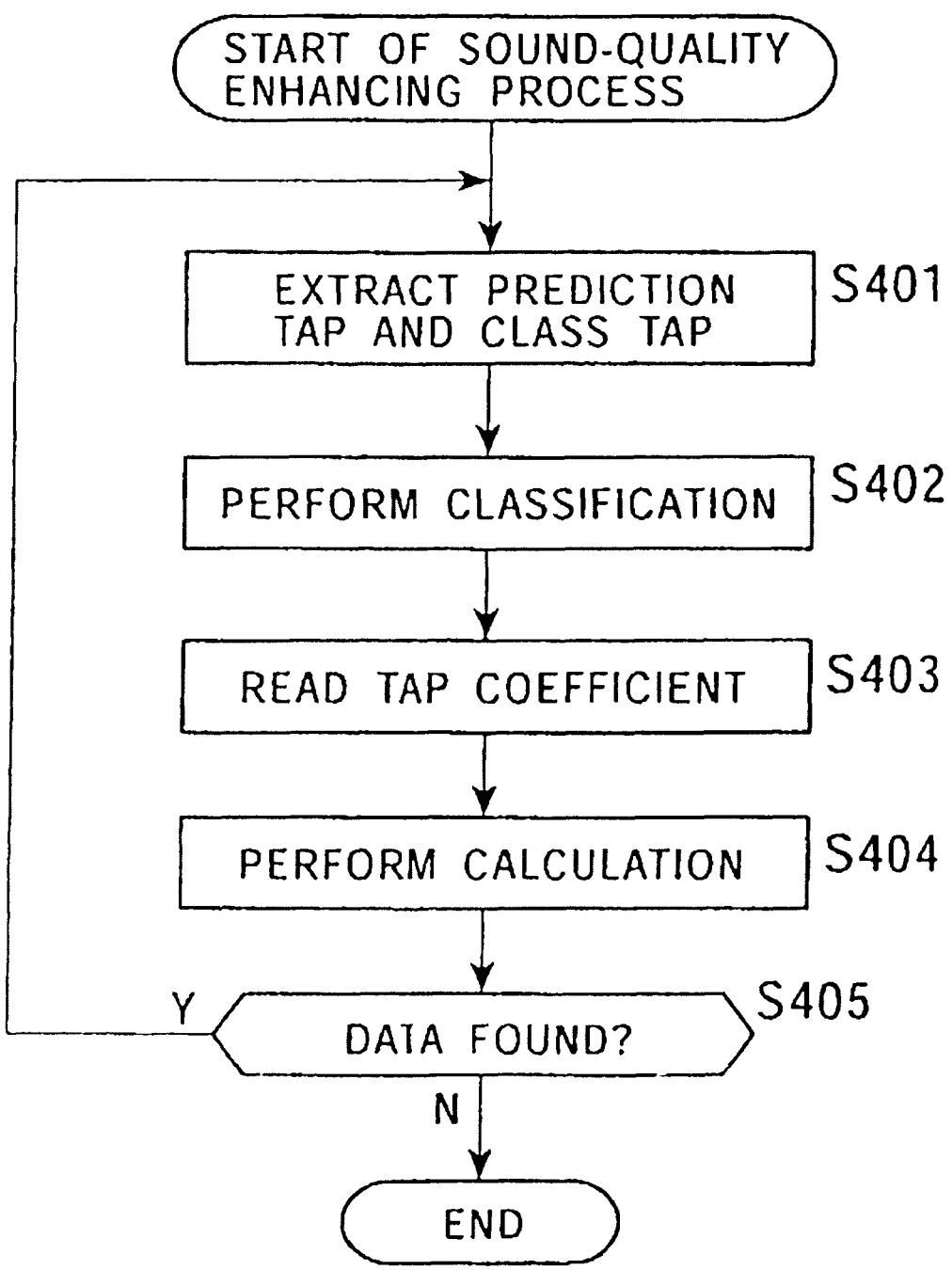
FIG. 68 is a flowchart illustrating a sound quality increasing process.

Next, the process (sound-quality increasing process) of the sound-quality enhancing unit 601 in FIG. 67 is described below with reference to the flowchart shown in FIG. 68.

The buffer 611 sequentially stores the decoded audio data which is output from the audio decoding unit 600 (FIG. 66).

In Step S401, in the prediction-tap extracting unit 612, among the sound-quality-increased data in which the sound quality of the decoded audio data is increased, for example, the oldest audio sample that has not already been used as data of interest is selected as data of interest, and a plurality of audio samples are read for the data of interest form the decoded audio data from the buffer 611, whereby prediction taps are generated and supplied to the calculating unit 616.

Also, in Step S401, by reading a plurality of audio samples among the decoded audio data stored in the buffer 611, the class-tap extracting unit 613 generates class taps for the data of interest, and supplies the class taps to the classifying unit 614.

When receiving the class taps from the class-tap extracting unit 613, the classifying unit 614 proceeds to Step S402. The classifying unit 614 uses the class taps to perform classification, and supplies the obtained class codes to the coefficient memory 615. The process proceeds to Step S403.

In Step S403, the coefficient memory 615 reads the tap coefficients stored in the addresses corresponding to the class codes from the classifying unit 614, and supplies the read taps to the calculating unit 616 before proceeding to Step S404.

In Step S404, the calculating unit 616 acquires the tap coefficients output from the coefficient memory 615, and obtains (predicted value of) sound-quality-increased data by using the tap coefficients and the prediction taps from the prediction-tap extracting unit 612 to perform product-sum calculation in expression (1).

The thus obtained sound-quality-increased data is supplied from the calculating unit 616 to the speaker 10 through the D/A conversion unit 212 (FIG. 66) and the amplifier 208. This allows the speaker 10 to output high quality audio.

After performing Step S404, proceeding to Step S405, the process determines whether sound-quality-increased data to be processed as data of interest is found. If the process determines affirmatively, the process returns to Step S401, and the same processing is repeatedly performed. Conversely, in Step S405, if it is determined that the sound-quality-increased data to be processed as data of interest is not found, the process ends.

Figure 69:
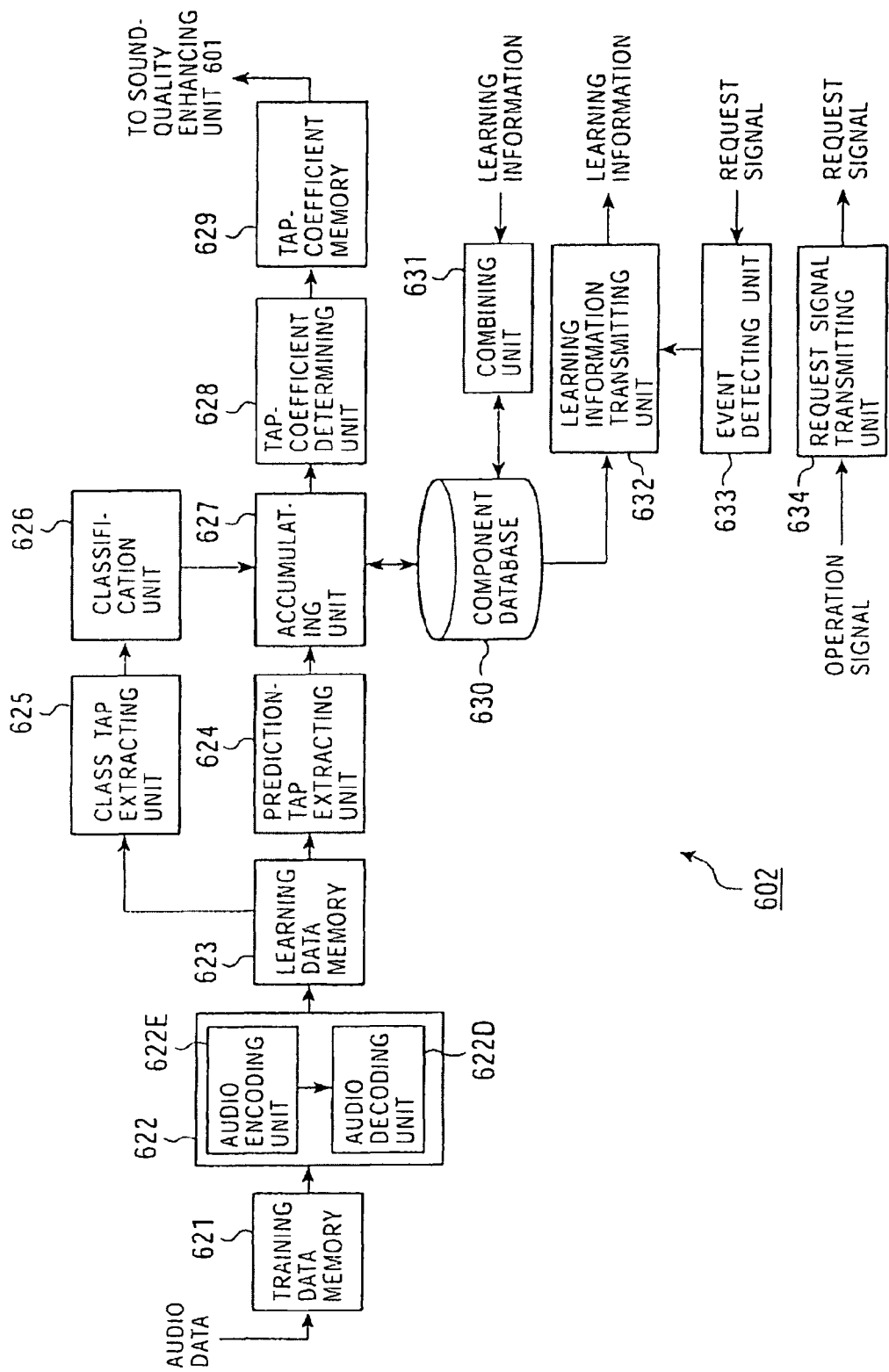
FIG. 69 is a block diagram showing an example of a learning unit 602.

Next, FIG. 69 shows an example of the learning unit 602 in FIG. 66.

The audio data output by the amplifier 209 (FIG. 66) is supplied as data for learning to a training data memory 621, and the training data memory 621 temporarily stores the supplied audio data as training data which is used as a supervisor in learning.

A student data generating unit 622 generates student data which is used as a learner in learning from the audio data as the training data stored in the training data memory 621.

The student data generating unit 622 includes an audio encoding unit 622E and an audio decoding unit 622D. The audio encoding unit 622E encodes audio data by an encoding method corresponding to the decoding method in the audio decoding unit 600 (FIG. 66). The audio encoding unit 622E uses the encoding method to encode the training data stored in the training data memory 621, and outputs the encoded audio data. The audio decoding unit 622D is identical in structure to the audio decoding unit 600. The audio decoding unit 622D decodes the encoded audio data output from the audio encoding unit 622E, and outputs the obtained decoded audio data as student data.

Although in this example the training data is encoded to generate encoded audio data, and the encoded audio data is decoded to generate student data, the student data can be generated by using a low-pass filter to perform filtering on the audio data as the training data so that its sound quality deteriorates.

A student data memory 623 temporarily stores the student data output from the audio decoding unit 622D in the student data generating unit 622.

A prediction-tap extracting unit 624 sequentially uses, data of interest, audio samples stored as training data in the training data memory 621, and extracts, from the student data stored in the student data memory 623, a plurality of audio samples as student data for use in predicting the data of interest, whereby prediction taps (taps for finding predicted values of data of interest) are generated. The prediction taps are supplied from the prediction-tap extracting unit 624 to an accumulating unit 627.

A class-tap extracting unit 625 generates class taps (taps for use in classification) by extracting, from the student data stored in the student data memory 623, a plurality of audio samples as student data for use in classifying the data of interest. The class taps are supplied from the class-tap extracting unit 625 to the classifying unit 626.

Audio samples which are pieces of student data temporarily close to audio samples of student data corresponding to audio samples of training data used as data of interest can be used as the audio samples for generating the prediction taps and the class taps.

Identical audio samples or different audio samples can be used as the audio samples for generating the prediction taps and the class taps.

Based on the class taps from the class-tap extracting unit 625, the classifying unit 626 perform classification on the data of interest, and outputs the obtained class codes corresponding to the classes to the accumulating unit 627.

For example, the ADRC can be employed as the classifying method in the classifying unit 626 similarly to the above-described case.

The accumulating unit 627 reads, from the training data memory 621, the audio samples of the training data used as data of interest, and performs accumulation for each class supplied from the classifying unit 626 on the prediction taps from the prediction-tap extracting unit 624 and the training data as the data of interest by using the storage content of a component database 630, if needed.

Specifically, the accumulating unit 627 basically performs, for the class corresponding to each class code supplied from the classifying unit 626, multiplication $(x_{in}x_{im})$ and calculation corresponding to summation $(\Sigma)$ of the matrix A in expression (8) by using the prediction taps (student data).

Also, the accumulating unit 627 performs, for the class corresponding to each class code supplied from the classifying unit 626, multiplication $(x_{in}y_i)$ and calculation corresponding to summation $(\Sigma)$ of student data and training data which are used as the components of the matrix A in expression (8) by using the prediction taps (student data) and the data of interest (training data).

The component database 630 stores, for each class, the components of the matrix A and vector v in expression (8) which are obtained in the previous learning by the accumulating unit 627.

When learning is performed by using newly input audio data, the component database 630 reads, from the component database 630, the components of the matrix A and vector v in expression (8) which are obtained in the previous learning, and accumulates (performs addition represented by summation in matrix A and vector v) corresponding components $x_{in}x_{im}$ or $x_{in}y_{in}$ which are calculated for the components of the matrix A or vector c by using training data and student data obtained form the newly input audio data, whereby the components of new matrix A and vector v are calculated, and the normalization equation in expression (8) is established for each class.

Accordingly, in the accumulating unit 627, the normalization equation in expression (8) is established not only based on the newly input audio data, but also based on data used for the past learning.

After the accumulating unit 627 finds the components of matrix A and vector v for each class, as described above, by using the components of matrix A and vector v obtained from the newly input audio data, and the components of matrix A and vector v stored in the component database 630, it supplies and stores the obtained components in the component database 630 in overwritten form.

Even if new audio data is not input, the accumulating unit 627 reads the components of matrix A and vector v stored in the component database 630, and establishes the normalization equation in expression (8) by using the read components of matrix A and vector v.

In other words, by performing learning using the new input audio data, in the accumulating unit 627, the components of matrix A and vector v in expression (8) for each class which are stored in the component database 630 are updated based on the components of matrix A and vector v for each new class obtained in the process of the learning, as described above, and are updated by a combining unit 631 (described later).

When the components of matrix A and vector v in expression (8) for each class which are stored in the component database 630 are updated by the combining unit 631, the accumulating unit 627 reads, from the component database 630, the components of matrix A and vector v obtained after the updating, and use the read components of matrix A and vector v to establish the normalization equation in expression (8) for each class.

After the accumulating unit 627 establishes the normalization equation in expression (8) composed of the components of matrix A and vector v for each class, it supplies the normalization equation for each class to a tap-coefficient determining unit 628.

By solving the normalization equation for each class supplied for the accumulating unit 627, the tap-coefficient determining unit 628 calculates tap coefficients for each class, and supplies and stores the tap coefficients as quality-increasing data in the addresses corresponding to each class of a tap-coefficient memory 629 in overwritten form.

The tap coefficients for each class as quality-increasing data which are stored in the tap-coefficient memory 629 are supplied to the sound-quality enhancing unit 601 (FIG. 66).

The component database 630 stores the components of matrix A and vector v in expression (8) for each class, as described above.

The combining unit 631 receives, for the antenna 64 (FIG. 23) and the communication interface 218, the components of matrix A and vector v in expression (8) for each class which are transmitted as learning information from the other PDA. The combining unit 631 finds the components of matrix A and vector v for each class by using the received components of matrix A and vector v, and the components of matrix A and vector v which are stored in the component database 630.

In other words, when the combining unit 631 receives the components of matrix A and vector v for each class from the other PDA, it reads the components of matrix A and vector v stored in the component database 630, and adds (performs addition represented by summation in matrix A and vector v), to the read components of matrix A and vector v for each class, the received components of matrix A and vector v, whereby the components of new matrix A and vector v are calculated for each class.

The combining unit 631 stores the calculated components of new matrix A and vector v for each class in the component database 630 in overwritten form, whereby the components of matrix A and vector v stored in the component database 630 are updated.

In response to a request from an event detecting unit 633, a leaning information transmitting unit 632 reads the components of matrix A and vector v for each class from the component database 630, and transmits the read components as learning information through the communication interface 218 (FIG. 23) and the antenna 64.

The combining unit 631 receives the components of matrix A and vector v for each class which are transmitted from the leaning information transmitting unit 632 of the other PDA.

When a request signal for requesting transmission of learning information is transmitted from the other PDA, the event detecting unit 633 detects the transmission of the request signal as a predetermined event. The request signal transmitted from the other PDA is received by the communication interface 218 through the antenna 64 (FIG. 23), and is supplied to the event detecting unit 633. When detecting the supplied request signal, the event detecting unit 633 recognizes that the predetermined event has occurred, and controls the leaning information transmitting unit 632 to transmits the components of matrix A and vector v for each class which are stored in the component database 630.

A request signal transmitting unit 634 is supplied with an operation signal from the operation unit 224 (FIG. 23). When receiving an operation signal indicating that the operation unit 224 has been operated to request learning information, the request signal transmitting unit 634 recognizes the reception of the operation signal as a predetermined event, and transmits a request signal as a predetermined event, and transmits a request signal for requesting the learning information through the communication interface 218 (FIG. 23) and the antenna 64.

When at least other one PDA receives the request signal transmitted as described above, it recognizes that a predetermined event has occurs in response to reception (detection) of the request signal, and transmits its own components of matrix A and vector v for each class. The components of matrix A and vector v which are transmitted as learning information from the at least other one PDA are received by the combining unit 631.

The above-described 602 performs a learning process that finds tap coefficients for classes, a learning information transmitting process that transmits the components of matrix A and vector v for each class which are stored as learning information in the component database 630, and a component data combining process that updates the learning information stored in the component database 630 based on the components of matrix A and vector v for each class which are transmitted as learning information from the other PDA.

Accordingly, the learning process, the learning information transmitting process, and the component data combining process which are performed by the learning unit 602 in FIG. 69 are described below with reference to the flowcharts shown in FIGS. 70A to 70C.

The learning process is described below with reference to the flowchart in FIG. 70A.

The learning process is started, for example, when at least a predetermined amount of new audio data is stored in the training data memory 621.

Specifically, when at least a predetermined amount of new audio data is stored in the training data memory 621, in Step S411, the accumulating unit 627 reads the components of matrix A and vector v for each class which are stored in the component database 630, and proceeds to Step S412.

In Step S412, the student data generating unit 622 uses the audio data stored in the training data memory 621 as training data, reads the training data, and generates student data from the training data. The student data generating unit 622 supplies and stores the obtained student data in the student data memory 623, and proceeds to Step S413.

In Step S413, in the prediction-tap extracting unit 624, among audio samples stored as training data in the training data memory 621, one that has not yet been used as data of interest is used as data of interest, and for the data of interest, by reading a plurality of audio samples stored as student data in the student data memory 623, prediction taps are generated and supplied to the accumulating unit 627.

In Step S413, similarly to the case of the prediction-tap extracting unit 624, the class-tap extracting unit 625 generates class taps for the data of interest, and supplies the generated taps to the classifying unit 626.

After performing Step S413, the process proceeds to Step S414, and the classifying unit 626 performs classification based on the class taps from the class-tap extracting unit 625, and supplies the obtained class codes to the accumulating unit 627.

In Step S415, the accumulating unit 627 reads data of interest form the training data memory 621, and calculates the components of matrix A and vector v by using the read data of interest and the prediction taps supplied from the prediction-tap extracting unit 624. Also, the accumulating unit 627 adds, to those corresponding to the class codes from the classifying unit 626 among the components of matrix A and vector v for each class, the components of matrix A and vector v which are obtained based the data of interest and the prediction taps, whereby new matrix A and vector v are calculated. The process proceeds to Step S416.

In Step S416, the prediction-tap extracting unit 624 determines whether training data that has not yet been used as data of interest is still stored in the training data memory 621. If the prediction-tap extracting unit 624 has determined that the data is still stored, the process returns to Step S413, and the same processing is repeatedly performed, while using training data that has not yet been as data of interest as new data of interest.

In Step S416, if it is determined that the data that has not yet been used as data of interest is not stored in the training data memory 621, the process proceeds to Step S417. The accumulating unit 627 stores the components of new matrix A and vector v for each class which are obtained by repeatedly performing steps S413 to S416 in the component database 630 in overwritten form. The accumulating unit 627 supplies the tap-coefficient determining unit 628 with the normalization equation in expression (8) composed of the components of new matrix A and vector v for each class, and the process proceeds to Step S418.

In Step S418, the tap-coefficient determining unit 628 calculates tap coefficients for each class by solving the normalization equation for each which is supplied from the accumulating unit 627. In Step S418, the tap-coefficient determining unit 628 supplies and stores the tap coefficients for each class in the tap-coefficient memory 629 in overwritten form, and the process ends.

Next, the learning information transmitting process is described below with reference to the flowchart in FIG. 70B.

In the learning information transmitting process, in Step S431, the event detecting unit 633 determines whether a predetermined event has been generated. If the event detecting unit 633 has determined that the event has not been generated, the process returns to Step S431.

In Step S431, if it is determined that the predetermined event has been generated, that is, when the event detecting unit 633 receives a request signal transmitted from the other PDA, the event detecting unit 633 controls the learning information transmitting unit 632 to transmit learning information, and the process proceeds to Step S432.

In Step S432, under control of the event detecting unit 644, the leaning information transmitting unit 632 reads, from the component database 630, the components of matrix A and vector v for each class as learning information, and the process proceeds to Step S433.

In Step S433, the leaning information transmitting unit 632 transmits the components of matrix A and vector v for each class as learning information which are read from the component database 630 to the other PDA from which the request signal transmitted by the event detecting unit 633 is transmitted. The process returns to Step S431, and the same processing is repeatedly performed.

Next, the component data combining process is described below with reference to the flowchart in FIG. 70C.

In the component data combining process, in Step S441, the request signal transmitting unit 634 recognizes reception of an operation signal for requesting learning information, as a predetermined event, and determines whether the predetermined event has been generated. If request signal transmitting unit 634 has determined that the event has not been generated, the process proceeds to Step S441.

In Step S441, if it is determined that the predetermined event has been generated, that is, when the operation unit 224 (FIG. 23) is operated by the user to request learning information, and an operation signal of the request is received by the request signal transmitting unit 634, the process proceeds to Step S442, and the request signal transmitting unit 634 transmits (e.g., broadcasts), to the at least one PDA, request signals for requesting learning information.

In Step S443, in response to the request signal transmitted in Step S442, the combining unit 631 determines whether learning information has been transmitted from the other PDA.

In Step S443, if it is determined that the learning information has been transmitted, the process proceeds to Step S444, and the combining unit 631 receives and temporarily stores the learning information in its built-in memory (not shown), and proceeds to Step S445.

In Step S443, if it is determined that the learning information has not been transmitted, the process proceeds to Step S445, and the combining unit 631 determines whether a predetermined time has elapsed after the transmission of the request signal in Step S442.

In Step S445, if it is determined that the predetermined time has not elapsed, the process returns to Step S443, and the same processing is repeatedly performed.

In Step S445, if it is determined that the predetermined time has elapsed after the transmission of the request signal, the process proceeds to Step S446, and the combining unit 631 adds, for each class, the components of matrix A and vector v stored for each class as learning information in Step S444, and the components of matrix A and vector v for each class stored in the component database 630, whereby new components of matrix A and vector v for each class are calculated. In Step S446, the combining unit 631 updates the storage content of the component database 630 by overwriting with the new components of matrix A and vector v for each class, and the process proceeds to Step S447.

In Step S447, the accumulating unit 627 reads, for the component database 630, the new components of matrix A and vector v for each class, establishes the normalization equation in expression (8) composed of the read components, and supplies the normalization equation to the tap-coefficient determining unit 628. In Step S447, the tap-coefficient determining unit 628 calculates tap coefficients for each class by solving the normalization equation for each class which is supplied from the accumulating unit 627, and supplies and stores the tap coefficients in the tap-coefficient memory 629 in overwritten form. The process proceeds to Step S441, and the same processing is repeatedly performed.

As described above, the learning unit 602 performs a learning process not only based on new input audio data, but also based on audio data used in the past learning. Thus, as the user speaks, tap coefficients reflecting more advanced learning are calculated. Therefore, in the sound-quality enhancing unit 601, by using the tap coefficients to process the decoded audio data, audio data (sound-quality-increased data) with higher sound quality can be obtained.

Also, in the learning unit 602, the components of matrix A and vector v for each class which are stored in the component database 630 are updated based on the components of matrix A and vector v for each class which are learning information collected from at least other one PDA. By solving the normalization equation in expression (8) composed of the updated components of matrix A and vector v for each class. Accordingly, in the sound-quality enhancing unit 601, by using the tap coefficients to perform processing on the decoded audio data, audio data with higher sound quality can be obtained.

Moreover, in the learning unit 602, from the at least one PDA, the components, as learning information, of matrix A and vector v for each class are collected. Thus, tap coefficients for obtaining audio data with higher sound quality can be rapidly obtained.

When the normalization equation in expression (8) is established by using only audio data input by the user, a class may be generated in which the necessary number of normalization equations is not obtained. However, as described above, when the components of matrix A and vector v for each class are collected as learning information from at least other one PDA, the components of matrix A and vector v for the normalization equation in expression (8) can be rapidly obtained. As a result, tap coefficients for obtaining audio data with increased sound quality can be rapidly obtained.

In addition, as describe above, by exchanging the components of matrix A and vector v for each class among plurality of PDAs, the PDAs can obtain identical and high-sound-quality audio data.

In the case in FIGS. 69 and 70A to 70C, the request signal transmitting unit 634 transmits a request signal when an operation signal is received. However, the request signal can be transmitted with arbitrary timing, for example, regularly or irregularly.

In the PDA 101 in FIG. 66, the components of matrix A and vector v for each class, obtained in the process of learning, are used as learning information, and are exchanged with at least other one PDA. However, for example, tap coefficients themselves can be exchanged as learning information.

When the PDA 101 exchanges tap coefficients with at least other one PDA, updating of the tap coefficients can be performed by addition for weighting the tap coefficients of the PDA 101 and tap coefficients received from the other PDA.

In this case, the number of audio samples used for calculating tap coefficients can be used as weights.

To calculate tap coefficients, components $x_{in}x_{im}$ of matrix A and components $x_{in}y_i$ of vector v, which are calculated by using training data $y_i$ and student data $x_{in}$ obtained from the audio data, must be accumulated. The number (equal to the number of audio samples used as training data) of times the accumulation is performed can e as a weight.

In this case, for example, when the tap coefficients of the PDA 101 are expressed by $w_a = \{w_{a1}, w_{a2}, w_{a3}, \ldots\}$, the number of audio samples used for finding the tap coefficients is represented by $\alpha$, tap coefficients received from the other PDA are represented by $w_b = \{w_{b1}, w_{b2}, w_{b3}, \ldots\}$, and the number of audio samples used for finding the tap coefficients is represented by $\beta$, new tap coefficients can be calculated by the following expression:

$$(\alpha w_a + \beta w_b)/(\alpha + \beta)$$

When the PDA 101 exchanges tap coefficients with at least other one PDA, updating of the tap coefficients can be performed such that tap coefficients in a class in which the PDA 101 has no tap coefficients are complemented by tap coefficients received from the other PDA.

In other words, when the PDA 101 establishes the normalization equation in expression (8) by only using audio data input by the user, an insufficient number of samples of the input audio data, etc., may cause a class in which the required number of normalization equations for calculating tap coefficients cannot be obtained. However, in a PDA of another user, a sufficient number of normalization equations can be obtained for the class.

Accordingly, in the PDA 101, by exchanging the tap coefficients with the other PDA, the tap coefficients of a class which cannot be obtained only by the PDA 101 can be complemented by those obtained by the other PDA.

Although the case of applying the present invention to PDAs has been described, the present invention can be applied to information processing apparatuses other than the PDAs.

The above-described consecutive processing can be implemented by hardware and by software.

When the consecutive processing is implemented by software, programs constituting the software are installed in the PDA 101 and the base station computer 102.

The programs can be prerecorded in the HDD 215 (FIG. 23) or HDD 333 (FIG. 26) as a built-in recording medium of a computer.

Alternatively, the programs can be temporarily or eternally stored (recorded) on a removable recording medium such as a flexible disk, a compact-disk read-only memory (CD-ROM), a magneto-optical (MO) disk, a digital versatile disk (DVD), a magnetic disk, and a semiconductor memory. This type of removable recording medium can be provided in the form of so-called "package software".

The program can be installed from the above removable recording medium into the PDA 101 or the base station computer 102. Also, the programs can be transferred in wireless means from a download site to the PDA 101 or the base station computer 102 through a satellite for digital satellite broadcasting, or can be transferred by wire to the PDA 101 or the base station computer 102 through a network such as a local area network (LAN) or the Internet. In the PDA 101 or the base station computer 102, the programs can be received by the communication unit 108 and is installed.

In this Specification, processing steps constituting programs for controlling the CPU 202 (FIG. 23) of the PDA 101 or the CPU 312 (FIG. 26) of the base station computer 102 do not always need to be performed in time-series order in the order described as a flowchart. The steps include processes (e.g., parallel processes or object-based processes) which are executed in parallel or separately.

The programs may be performed by a single CPU or may be performed in distributed form by a plurality of CPUs. Also, this programs may be transferred and executed in a remote computer or the like.

The foregoing embodiments of the present invention are embodiments of technical concepts indicated by the following display apparatuses AA to BL:

Display Apparatus AA

A display apparatus including a main unit, a cover unit movably mounted on the main unit, and a plurality of display units for displaying information, wherein:

the main unit has a first display unit which is accommodated therein when the cover unit moves to a first position and which is exposed when the cover unit moves to a second position;

the cover unit has a second display unit which is exposed on a top surface when the cover unit moves to the first position, and a third display unit which is exposed on the top surface when the cover unit moves to the second position; and the display apparatus includes a panel having a fourth display means which is removably mounted to said main unit or said cover unit and which is exposed on the top surface when said panel moves to a predetermined position.

Display Apparatus AB

A display apparatus AA further including another panel having a fifth display unit which is movably mounted on the main unit or the cover unit and which is exposed on the top surface when being moved to a predetermined position.

Display Apparatus AC

A display apparatus AA wherein the cover unit is mounted at one end of the main unit so as to revolve, and is closed when being moved to a first position, accommodates the first and third display units so that they oppose each other and the second display unit is exposed, and is opened when being moved to the second position so that the first and third display units are exposed.

Display Apparatus AD

A display apparatus AA wherein the first display unit is mounted on the top surface of the main unit so as to be exposed when the cover unit is opened.

Display Apparatus AE

A display apparatus AC wherein the second display unit is provided on the top surface of the cover unit when it is closed, and the third display unit is provided on the back surface of the cover unit.

Display Apparatus AF

A display apparatus AA wherein the panel is mounted at one end of the main unit or the cover unit so as to revolve, and is in a revolvable state when the cover unit moves to the second position.

Display Apparatus AG

A display apparatus AF wherein the fourth display unit is provided on the back surface of the panel when it is closed.

Display Apparatus AH

A display apparatus AA wherein the panel is mounted at one end of the cover unit, exposes the fourth display unit when being revolved to an opened state, and accommodates the fourth display unit when being revolved to a closed state.

Display Apparatus AI

A display apparatus AH wherein the third display unit is exposed when the cover unit moves to the second position and the panel is open.

Display Apparatus AJ

A display apparatus AA wherein: the cover unit is mounted on the main unit by a hinge mechanism so as to revolve; the hinge mechanism includes: a first hinge fixed to the main unit, a second hinge fixed to the cover unit, a shaft whose ends are pressed into the first and second hinges; and the first hinge and the shaft, and the second hinge and the shaft can revolve.

Display Apparatus AK

A display apparatus AJ wherein the first and second hinges are formed by curling-processed copper plates for spring.

Display Apparatus AL

A display apparatus AA wherein the panel is mounted on the cover unit by a hinge mechanism so as to revolve, the hinge mechanism includes a first hinge fixed to the main unit, a second hinge fixed to the cover unit, and a shaft whose ends are pressed into the first and second hinges, the first hinge and the shaft, and the second hinge and the shaft can revolve.

Display Apparatus AM

A display apparatus AL wherein the first and second hinges are formed by curling-processed steel plates for spring.

Display Apparatus AN

A display apparatus AA wherein the first to fourth display units display pieces of information, respectively.

Display Apparatus AO

A display apparatus AA wherein all the first to fourth display units are used as a single screen to display information.

Display Apparatus AP

A display apparatus AA, further including a detecting unit for detecting the state of the cover unit, and a control unit for controlling the first to fourth display units in response to the state of the cover unit.

Display Apparatus AQ

A display apparatus AA further including a detecting unit for detecting the state of the panel, and a control unit for controlling the first to fourth units in response to the state of the panel.

Display Apparatus AR

A display apparatus AA wherein it is used as a portable terminal, and it includes a band for wearing on a wrist and provided with at least one display unit.

Display Apparatus AS

A display apparatus AA, further including a communication unit for communication with a communicatable communication device.

Display Apparatus AT

A display apparatus AS, further including a destination input unit for inputting a destination of another party in communication.

Display Apparatus AU

A display apparatus AS wherein the communication unit functions as a telephone set for calling in audio form.

Display Apparatus AV

A display apparatus AU, further including an audio input unit for inputting audio to be transmitted in the calling in audio form, and an audio output unit for outputting received audio in the calling in audio for.

Display Apparatus AW

A display apparatus AS wherein the communication unit performs data transmission and reception.

Display Apparatus AX

A display apparatus AW, further including a transmitting/receiving-data selecting unit for selecting data to be transmitted or received.

Display Apparatus AY

A display apparatus AW wherein the communication unit performs transmission/reception of picture data or audio data.

Display Apparatus AZ

A display apparatus AW wherein the communication unit performs transmission/reception of electronic mail.

Display Apparatus BA

A display apparatus AZ, further including a message input unit for inputting a message of the electronic mail.

Display Apparatus BB

A display apparatus AA, further including a data storage unit for storing data.

Display Apparatus BC

A display apparatus BB wherein the data storage unit stores picture data or audio data.

Display Apparatus BD

A display apparatus BB, further including a playback unit for playing back data stored in the data storage unit.

Display Apparatus BE

A display apparatus BD, further including a playback data selecting unit for selecting data to be played back.

Display Apparatus BF

A display apparatus BB, wherein the data storage unit stores a program to be executed by a computer, and the display apparatus further includes an executing unit for executing the program.

Display Apparatus BG

A display apparatus AS wherein the communication unit performs communication in a state with the communication device or without contact.

Display Apparatus BH

A display apparatus AS, further including a battery for a power supply, wherein the communication between the communication unit and the communication device causes the communication device to charge the battery.

Display Apparatus BI

A display apparatus AS, further including an authentication unit for performing authentication with the communication device.

Display Apparatus BJ

A display apparatus AA having a structure removably connected to an information processing apparatus for processing information, whose functions as part of the information processing apparatus when being loaded into the information processing apparatus.

Display Apparatus BK

A display apparatus BJ, further including a memory for storing data, wherein, when the display apparatus is loaded into the information processing apparatus, the memory functions as part of the memory of the information processing apparatus.

Display Apparatus BL

A display apparatus AA which is a portable terminal.

By using the above concepts, even small information-displaying LCDs, or the like, can display information as much as possible.

For example, in small information processing apparatuses of a so-called "palm-size", such as PDAs, small LCDs, or the like, are employed. Accordingly, it is difficult for PDAs to display a large amount of information. Although employment of a large LCD can display a large amount of information, the PDA itself is enlarged, thus causing inconvenience in carrying.

By using the above concepts, a small-sized PDA or the like that can a large amount of information can be provided.

Also, the above-described embodiments are obtained by embodying technical concepts indicated by the following display apparatuses CA to DL, display method DM, program DN, and recording medium DO.

Display Apparatus CA

A display apparatus including a plurality of display units for displaying information, a display control unit for controlling the display units to display pieces of information, respectively, and a detecting unit for detecting any of the displayed pieces of information which is selected, wherein the display control unit controls each of the display units to display a plurality of pieces of information correlated with the selected information.

Display Apparatus CB

A display apparatus CA, further including: a main unit, a cover unit movably mounted on the main unit, a panel movably mounted on the main unit or the cover unit, wherein: the main unit includes, as one of the display units, a first display unit which is accommodated when the cover unit moves to a first position and which is exposed when the cover unit moves to a second position; the cover unit includes, as one of the display units, a second display unit which is exposed on the top surface when moving to the second position; and the panel includes, as one of the display units, a third display unit which is exposed on the tope surface when being moved to a predetermined position.

Display Apparatus CC

A display apparatus CB, further including another panel including a fourth display unit which is movably mounted on the main unit or the cover unit and which is exposed on the top surface when being moved to a predetermined position.

Display Apparatus CD

A display apparatus CB wherein: the cover unit is mounted at one end of the main unit so as to revolve; when the cover unit moves to a first position, it is in a closed state so that the first and second display units are accommodated with them opposed; and when the cover unit moves to the second position, it is in an opened state so that the first and second display units are exposed.

Display Apparatus CE

A display apparatus CD wherein the first display unit is provided on the top surface of the main unit so as to be exposed when the cover unit is opened.

Display Apparatus CF

A display apparatus CD wherein the second display unit is provided on the back surface of the cover unit when it is closed.

Display Apparatus CG

A display apparatus CB wherein the panel is mounted at one end of the main unit or the cover unit so as to revolve, and is in a revolvable state when the cover unit moves to the second position.

Display Apparatus CH

A display apparatus CG wherein the third display unit is provided on the back surface of the panel when it is closed.

Display Apparatus CI

A display apparatus CG wherein the panel is mounted at one end of the cover unit so as to revolve, exposes the third display unit when being revolved to an opened state, and accommodates the third display unit when being revolved to a closed state.

Display Apparatus CJ

A display apparatus CI wherein the second display unit is exposed when the cover unit moves to the second position and the panel is opened.

Display Apparatus CK

A display apparatus CB wherein: the cover unit is mounted on the main unit by a hinge mechanism so as to revolve; the hinge mechanism includes a first hinge fixed to the main unit, a second hinge fixed to the cover unit, and a shaft whose ends are pressed into the first and second hinges; and the first hinge and the shaft, and the second hinge and the shaft can revolve.

Display Apparatus CL

A display apparatus CK wherein the first and second hinges are formed by curling-processed steel plates for spring.

Display Apparatus CM

A display apparatus CB wherein: the panel is mounted on the cover unit by a hinge mechanism so as to revolve; the hinge mechanism includes a first hinge fixed to the main unit, a second hinge fixed to the cover unit, and a shaft whose ends are pressed into the first and second hinges; and the first hinge and the shaft, and the second hinge and the shaft can revolve.

Display Apparatus CN

A display apparatus CM wherein the first and second hinges are formed by curling-processed steel plates for spring.

Display Apparatus CO

A display apparatus CA wherein the display control unit also controls the entirety of the display units to display one piece of information.

Display Apparatus CP

A display unit CB, further including a detecting unit for detecting the state of the cover unit, and the display control unit controls switching on and off the display units in response to the state of the cover unit.

Display Apparatus CQ

A display apparatus CB, further including a detecting unit for detecting the state of the cover unit, and the display control unit controls switching on and off the display units in response to the state of the panel.

Display Apparatus CR

A display apparatus CB which is portable terminal, further including a band for wearing on a wrist, wherein the band is provided with at least one display unit.

Display Apparatus CS

A display apparatus CA, further including a communication unit for communicating with an communicatable communication device.

Display Apparatus CT

A display apparatus CS, further including a destination input unit for inputting a destination corresponding to another party in communication.

Display Apparatus CU

A display apparatus CS wherein the communication unit functions as a telephone set for performing calling in audio form.

Display Apparatus CV

A display apparatus CU, further including an audio input unit for inputting audio to be transmitted in the calling in audio form, and an audio output unit for outputting audio received in the calling in audio form.

Display Apparatus CW

A display apparatus CS wherein the communication unit performs transmission and reception of data.

Display Apparatus CX

A display apparatus CW, further including a transmitting/receiving-data selecting unit for selecting data to be transmitted or received.

Display Apparatus CY

A display apparatus CW wherein the communication unit performs transmission and reception of picture data or audio data.

Display Apparatus CZ

A display apparatus CW wherein the communication unit performs transmission and reception of electronic mail.

Display Apparatus DA

A display apparatus CZ, further including a message input unit for inputting a message of the electronic mail.

Display Apparatus DB

A display apparatus CA, further including a data storage unit for storing data.

Display Apparatus DB

A display apparatus DB wherein the data storage unit stores picture data or audio data.

Display Apparatus DD

A display apparatus DB, further including a playback unit for playing back data stored in the data storage unit.

Display Apparatus DE

A display apparatus DD, further including a playback data selecting unit for selecting data to be played back.

Display Apparatus DF

A display apparatus DB wherein the data storage unit further includes an executing unit for storing a program to be executed by a computer and executing the program.

Display Apparatus DG

A display apparatus CS wherein the communication unit performs communication in a state in contact with the communication device or without contact.

Display Apparatus DH

A display apparatus CS, further including a battery for a power supply, wherein the communication between the communication unit and the communication device causes the communication device to charge the battery.

Display Apparatus DI

A display apparatus CS, further including an authentication unit for performing authentication with the communication device.

Display Apparatus DJ

A display apparatus CS which has a structure removably connected to the communication device, and which functions as part of the communication device when being loaded into the communication device.

Display Apparatus DK

A display apparatus DJ, further including a memory for storing data, wherein the memory functions as part of the memory of the communication device when the display apparatus is loaded into the communication device.

Display Apparatus DL

A display apparatus CA which is a portable terminal.

Display Method DM

A display method for a display apparatus including a plurality of display units for displaying information, including: a display control Step for controlling each of the display units to display one piece of information; and a detecting Step for detecting any of the information displayed on the display units which is selected, wherein, in the display control Step, pieces of information correlated with the selected information are displayed on the display units, respectively.

Program DN

A program for a computer to control a plurality of display units for displaying information, including: a display control Step for controlling each of the display units to display one piece of information; and a detecting Step for detecting any of the information displayed on the display units which is selected, wherein, in the display control Step, pieces of information correlated with the selected information are displayed on the display units, respectively.

Recording Medium DO

A recording medium containing a program for a computer to control a plurality of display units for displaying information, including: a display control Step for controlling each of the display units to display one piece of information; and a detecting Step for detecting any of the information displayed on the display units which is selected, wherein, in the display control Step, pieces of information correlated with the selected information are displayed on the display units, respectively.

By using the above concepts, even small information-displaying LCDs, or the like, can display easily understandable information and enables accurate operations.

For example, in small information processing apparatuses of a so-called "palm-size type", such as PDAs, small LCDs, or the like, are employed. Accordingly, when using a small LCD to display a large amount of information, the information must be displayed in small size, so that the user cannot recognize the information unless he or she stares at the LCD.

The PDA includes a realized type in which an LCD and a touch panel (in this Specification, this includes a table of the like which is operated by a dedicated pen in addition to a panel operable by a finger) are integrated, and the LCD displays buttons and an operation on the button is detected by the touch panel.

As described above, the LCD provided on the PDA is small, so that the buttons must be displayed in small size, and the user may mistakenly operates a button different from that the user should operate.

In addition, it is difficult in the related art to display a large amount of information. Although employment of the large LCD enables displaying of a large amount of information, the PDA itself is enlarged and is inconvenience in carrying.

By using the above concepts, information can displayed is easily understandable form and accurate operation can be performed.

What is claimed is:

1. A transmitting/receiving data processing system comprising:

an encoding apparatus which encodes data; and a decoding apparatus which decodes the encoded data, wherein:

said encoding apparatus comprises:

a first codebook storage apparatus storing a codebook;

encoding unit which encodes the data by using the codebook required for encoding the data, and outputs the encoded data, the encoded data including a code and a differential vector; and encoding-information updating unit, connected to the encoding unit and the first codebook storage apparatus, which updates the codebook in the first codebook storage apparatus based on the code and the differential vector; and said decoding apparatus comprises:

second codebook storage apparatus storing the codebook;

decoding unit which decodes the encoded data by using the codebook required for decoding the encoded data, decoded data including the code and the differential vector; and decoding-information updating unit, connected to the decoding unit and the second codebook storage apparatus which updates the codebook in the second codebook storage apparatus based on the code and the differential vector.

2. An encoding apparatus for encoding data, comprising:

a codebook storage unit storing a codebook;

encoding unit which encodes the data by using the codebook required for encoding the data, and outputs the encoded data, the encoded data including a code and a differential vector; and encoding-information updating unit, connected to the encoding unit and the codebook storage unit, which updates the codebook in the codebook storage unit based on the code and the differential vector.

3. An encoding apparatus according to claim 2, further comprising: encoding-information storage unit which stores at least one piece of the codebook; and encoding-information selecting unit which, from the at least one piece of the codebook, selects encoding information for encoding the data by said encoding unit, wherein said encoding unit encodes the data by using the codebook selected by said encoding-information selecting unit.

4. An encoding apparatus according to claim 3, further comprising transmitting unit which transmits the encoded data, wherein, based on a destination to which the encoded data is transmitted, said encoding-information selecting unit selects the codebook.

5. An encoding apparatus according to claim 3, wherein, based on an external input, said encoding-information selecting unit selects the codebook.

6. An encoding apparatus according to claim 3, wherein, based on a feature of the data, said encoding-information selecting unit selects the codebook.

7. An encoding apparatus according to claim 6, wherein: the data is picture data; and said encoding-information selecting unit detects the picture represented by the picture data, and selects the codebook based on the detected picture.

8. An encoding apparatus according to claim 2, wherein: the codebook is used for vector quantization and in which code vectors are correlated with codes representing the code vectors; said encoding unit comprises:
vector-quantization unit which performs vector quantization on the data by using the codebook, and outputs corresponding codes among said codes;
vector-dequantization unit which uses the codebook to perform vector dequantization on the codes output by said vector-quantization unit, and outputs the dequantized data; and
differential calculation unit which calculates a difference between the data and the dequantized data corresponding to the data, and outputs the differential data; and the data and the differential data are output as the encoded data.

9. An encoding apparatus according to claim 8, wherein said encoding-information updating unit updates the codebook based on: a first frequency which is a frequency at which each of the codes is output up to the previous updating of the codebook in vector quantization on the data by using the codebook; a second frequency which is a frequency at which each of the codes is output from the previous updating of the codebook to the present in vector quantization on the data by using the codebook; and a summation of the differential data which is obtained from the previous updating of the codebook to the present in vector quantization on the data by using the codebook.

10. An encoding apparatus according to claim 8, further comprising vectorization unit which, when the data is picture data, outputs picture vectors having, as components, the pixel levels of a plurality of pixels constituting the picture data, wherein said vector quantization unit performs vector quantization on the picture vectors.

11. An encoding apparatus according to claim 2, wherein the data is picture data or audio data.

12. An encoding method of a computer for encoding data, comprising:
a storage step of storing a codebook in a storage unit of the computer;
an encoding step which encodes the data by using the codebook required for encoding the data, and outputs the encoded data, the encoded data including a code and a differential vector; and
an encoding-information updating step which updates the codebook in the storage unit based upon the code and the differential vector.

13. A program, embodied on a non-transitory computer readable medium, causing a computer to perform an encoding process for encoding data, said program comprising:
an encoding step which encodes the data by using a codebook required for encoding the data, and outputs the encoded data, the encoded data including a code and a differential vector; and
an encoding-information updating step which updates the codebook based upon the code and the differential vector.

14. A non-transitory computer readable medium containing a program causing a computer to perform an encoding process for encoding data, said program comprising:
an encoding step which encodes the data by using a codebook required for encoding the data, and outputs the encoded data, the encoded data including a code and a differential vector; and
an encoding-information updating step which updates the codebook based upon the code and the differential vector.

15. A decoding apparatus for decoding encoded data generated by encoding data, comprising:
a codebook storage unit for storing a codebook;
decoding unit which decodes the encoded data by using the codebook required for decoding the encoded data, and outputs the decoded data, the decoded data including a code and a differential vector; and
decoding-information updating unit, connected to the decoding unit and the codebook storage unit, which updates the codebook in the codebook storage unit based upon the code and the differential vector.

16. A decoding apparatus according to claim 15, further comprising: decoding-information storage unit which stores at least one piece of the codebook; and decoding-information selecting unit which selects the codebook for decoding the encoded data from said at least one piece of the codebook, wherein said decoding unit decodes the encoded data by using the codebook selected by said decoding-information selecting unit.

17. A decoding apparatus according to claim 16, further comprising receiving unit which receives the encoded data, wherein, based on a transmitting source of the encoded data, said decoding-information selecting unit selects the codebook.

18. A decoding apparatus according to claim 16, wherein, based on an external input, said decoding-information selecting unit selects the codebook.

19. A decoding apparatus according to claim 16, wherein, based on a feature of the data, said decoding-information selecting unit selects the codebook.

20. A decoding apparatus according to claim 19, wherein: the data is picture data; and said decoding-information selecting unit detects the picture represented by the picture data, and selects the codebook based on the detected picture.

21. A decoding apparatus according to claim 15, wherein: the codebook is used for vector dequantization and in which code vectors are correlated with codes representing the code vectors; the encoded data is differential data generated by performing vector dequantization on the codes obtained by performing vector quantization on the data and the code vectors corresponding thereto, and calculating the difference between the dequantized result and the data; said decoding unit comprises: vector-dequantization unit which uses the codebook to performs vector dequantization on a code in the encoded data, and outputs a code vector corresponding to the code; and adding unit which, by adding the code vector output by said vector-dequantization unit the differential data in the encoded data, outputs decoded data generated by decoding the encoded data.

22. A decoding apparatus according to claim 21, wherein said decoding-information updating unit updates the codebook based on: a first frequency which is a frequency of each of the codes up to the previous updating of the codebook in vector dequantization using the codebook; a second frequency which a frequency of each of the codes from the previous updating of the codebook to the present in vector dequantization using the codebook; and a summation of the differential data for each of the codes from the previous updating of the codebook to the present in vector dequantization using the codebook.

23. A decoding apparatus according to claim 21, wherein: the data is picture data; and the codes in the encoded data are obtained by performing vector quantization on picture vectors having, as components, the pixel levels of a plurality of pixels constituting the picture data.

24. A decoding apparatus according to claim 15, further comprising: error-detecting unit which detects an error in the encoded data; and error-correcting unit which corrects the error in the encoded data.

25. A decoding apparatus according to claim 24, wherein: the codebook is used for vector dequantization and in which code vectors are correlated with codes representing the code vectors; and said error-correcting unit corrects the error in the encoded data by using the codebook.

26. A decoding apparatus according to claim 15, wherein the data is picture data or audio data.

27. A decoding method of a computer for decoding encoded data generated by encoding data, comprising:
   a storing step of storing a codebook in a storage unit of the computer;
   a decoding step which decodes the encoded data by using the codebook required for decoding the encoded data, and outputs the decoded data, the decoded data including a code and a differential vector; and
   a decoding-information updating step which updates the codebook in the storage unit based upon the code and the differential vector.

28. A program, embodied on a non-transitory computer readable medium, causing a computer to perform a decoding process for decoding encoded data generated by encoding data, said program comprising:
   a decoding step which decodes the encoded data by using a codebook required for decoding the encoded data, and outputs the decoded data, the decoded data including a code and a differential vector; and
   a decoding-information updating means which updates the codebook based upon the code and the differential vector.

29. A non-transitory computer readable medium containing a program causing a computer to perform a decoding process for decoding encoded data generated by encoding data, said program comprising:
   a decoding step which decodes the encoded data by using a codebook required for decoding the encoded data, and outputs the decoded data, the decoded data including a code and a differential vector; and
   a decoding-information updating step which updates the codebook based on the code and the differential vector.

* * * * *